United States Patent [19]

Miike et al.

[11] Patent Number: 5,787,414
[45] Date of Patent: Jul. 28, 1998

[54] DATA RETRIEVAL SYSTEM USING SECONDARY INFORMATION OF PRIMARY DATA TO BE RETRIEVED AS RETRIEVAL KEY

[75] Inventors: Seiji Miike; Satoshi Ito, both of Kanagawa-ken; Hiroshi Mizoguchi, Tokyo; Yoichi Takebayashi, Kanagawa-ken; Mika Fukui, Kanagawa-ken; Yoshiaki Kurosawa, Kanagawa-ken; Akira Morishita, Kanagawa-ken; Shigenobu Seto, Kanagawa-ken; Hideaki Shinchi, Kanagawa-ken; Yasushi Kawakura, Kanagawa-ken; Yoshikuni Matsumura, Kanagawa-ken; Hisako Tanaka, Kanagawa-ken, all of Japan

[73] Assignee: Kabushiki Kaisha Toshiba, Kawasaki, Japan

[21] Appl. No.: 720,218

[22] Filed: Sep. 26, 1996

Related U.S. Application Data

[63] Continuation of Ser. No. 254,050, Jun. 3, 1994, abandoned.

[30] Foreign Application Priority Data

| Jun. 3, 1993 | [JP] | Japan | 5-133118 |
| Jun. 4, 1993 | [JP] | Japan | 5-133746 |
| Sep. 20, 1993 | [JP] | Japan | 5-255241 |
| Dec. 22, 1993 | [JP] | Japan | 5-325231 |
| Dec. 29, 1993 | [JP] | Japan | 5-351113 |

[51] Int. Cl.$^6$ .................................................. G06F 17/30
[52] U.S. Cl. ........................................... 707/2; 707/3
[58] Field of Search ............................... 395/603, 605; 707/2, 3, 5

[56] References Cited

U.S. PATENT DOCUMENTS

| 4,638,445 | 1/1987 | Mattaboni | 364/424.01 |
| 4,980,842 | 12/1990 | Kamada et al. | 364/518 |
| 5,144,685 | 9/1992 | Nasar et al. | 382/48 |
| 5,261,087 | 11/1993 | Mukaino | 395/603 |
| 5,535,063 | 7/1996 | Lamming | 360/4 |

OTHER PUBLICATIONS

Takebayashi et al., "A Robust Speech Recognition System Using Word-Spotting with Noise Immunity Learning", Proceedings of the ICASSP 91—1991 Inter. Conf. on Acoustics, Speech, and Signal Processing, May 1991, pp. 905–908.

Takebayashi et al., "A Real-Time Speech Dialogue System Using Spontaneous Speech Understanding", Proceedings of the ICSLP 92—1992 Intern. Conf. on Spoken Language Processing, (1992), pp. 651–654.

Tsuboi et al., "A Real-Time Task-Oriented Speech Understanding System Using Keyword-Spotting", Proceedings of the ICASSP 92—1992 Intern. Conf. on Acoustics, Speech, and Signal Processing, (1992), pp. I-197-I-200.

Stefik et al., "Beyond the Chalkboard: Computer Support forCollaboration and Problem Solving in Meetings", Communications ofthe ACM, vol. 30, No. 1, Jan. 1987, pp. 32–47.

*Primary Examiner*—Paul R. Lintz
*Attorney, Agent, or Firm*—Foley & Lardner

[57] ABSTRACT

A data retrieval system capable of carrying out the retrieval using the secondary information of the primary data to be retrieved such as environmental information or structural information as the retrieval key. In the system, the primary data which are filing target to be stored and retrieved are stored in a first memory while secondary information associated with the primary data, which are not directly related with data content of the primary data, are stored in a second memory in correspondence to the primary data stored in the first memory. Then, when a retrieval key specifying a desired retrieval of the primary data from the first memory is entered, the secondary information is selected from the second memory in accordance with the retrieval key, and the primary data corresponding to the secondary information selected in accordance with the retrieval key is retrieved and outputted as a retrieval result.

68 Claims, 128 Drawing Sheets

FIG. 2

| RETRIEVAL TARGET DATA | DATA TO BE RE-UTILIZED BY USER FOR RETRIEVAL OUTPUT ETC. WHICH ARE DOCUMENT PRODUCED BY APPLICATIONS SUCH AS WORD PROCESSOR/ELECTRONIC PUBLISHING SYSTEM, OR ACOUSTIC/IMAGE DATA RECORDED BY MICROPHONE/CAMERA, AND WHICH ARE GOING TO BE FILED. |
|---|---|
| ENVIRONMENTAL INFORMATION | DATA MEANINGFUL FOR USER WHICH BECOME KEYS FOR RETRIEVAL OF RETRIEVAL TARGET DATA, SUCH AS DATA CONCERNING USER HIMSELF OR SURROUNDING SITUATION AT A TIME OF OPERATIONS SUCH AS INPUT, EDITING, RETRIEVAL, OUTPUT OF RETRIEVAL TARGET DATA. |
| ENVIRONMENTAL ANALYSIS TARGET DATA | DATA OBTAINED AUTOMATICALLY AT A TIME OF OPERATIONS SUCH AS INPUT, EDITING, RETRIEVAL, OUTPUT OF RETRIEVAL TARGET DATA, WHICH ARE NOT GOING TO BE RETRIEVAL KEYS THEMSELVES. DATA INCLUDING NON-STRUCTURED TIME SEREIS DATA SUCH AS SURROUNDING SOUND/IMAGE OBTAINED BY MICROPHONE/CAMERA, OR POSITION MEASUREMENT DATA OBTAINED BY GPS, ETC., WHICH ARE ANALYSIS TARGET DATA FROM WHICH ENVIRONMENTAL INFORMATION ARE OBTAINED BY ANALYSIS SUCH AS DETECTION, EXTRACTION, RECOGNITION, AND UNDERSTANDING. |

| | |
|---|---|
| ⟨FORMAT⟩ | DOCUMENT NAME : DOCUMENT ID |
| ⟨EXAMPLES⟩ | PAST AND FUTURE OF MACHINE TRANSLATION : FILE 8 |
| | CONFIGURATION OF POSITIONING SATELLITE : FILE 11 |
| | COMMUNICATION AND PERSONAL COMPUTER : FILE 23 |

```
<FORMAT>
    NORTH (SOUTH) LATITUDE ; VALUE , EAST (WEST)
    LONGITUDE ; VALUE : DOCUMENT ID
<EXAMPLES>

NORTH LATITUDE ; 35° 52', EAST LONGITUDE ; 139° 58' : file11
NORTH LATITUDE ; 34° 57', EAST LONGITUDE ; 135° 21' : file8
```

```
<FORMAT>
  LOCATION   NORTH(SOUTH)                 EAST(WEST)
  NAME     : LATITUDE     ; VALUE ,       LONGITUDE  ; VALUE

<EXAMPLES>
  HEAD OFFICE (TOKYO) : NORTH LATITUDE ; 35° 51',
                        EAST LONGITUDE ; 139° 56'
  RESEACH CENTER (KOBE) : NORTH LATITUDE ; 34° 57',
                          EAST LONGITUDE ; 135° 25'
```

| LOCATION | DOCUMENT NAME |
|---|---|
| RESEARCH CENTER (KOBE) | ☐ PAST AND FUTURE OF MACHINE TRANSLATION<br>☐ COMMUNICATION AND PERSONAL COMPUTER |

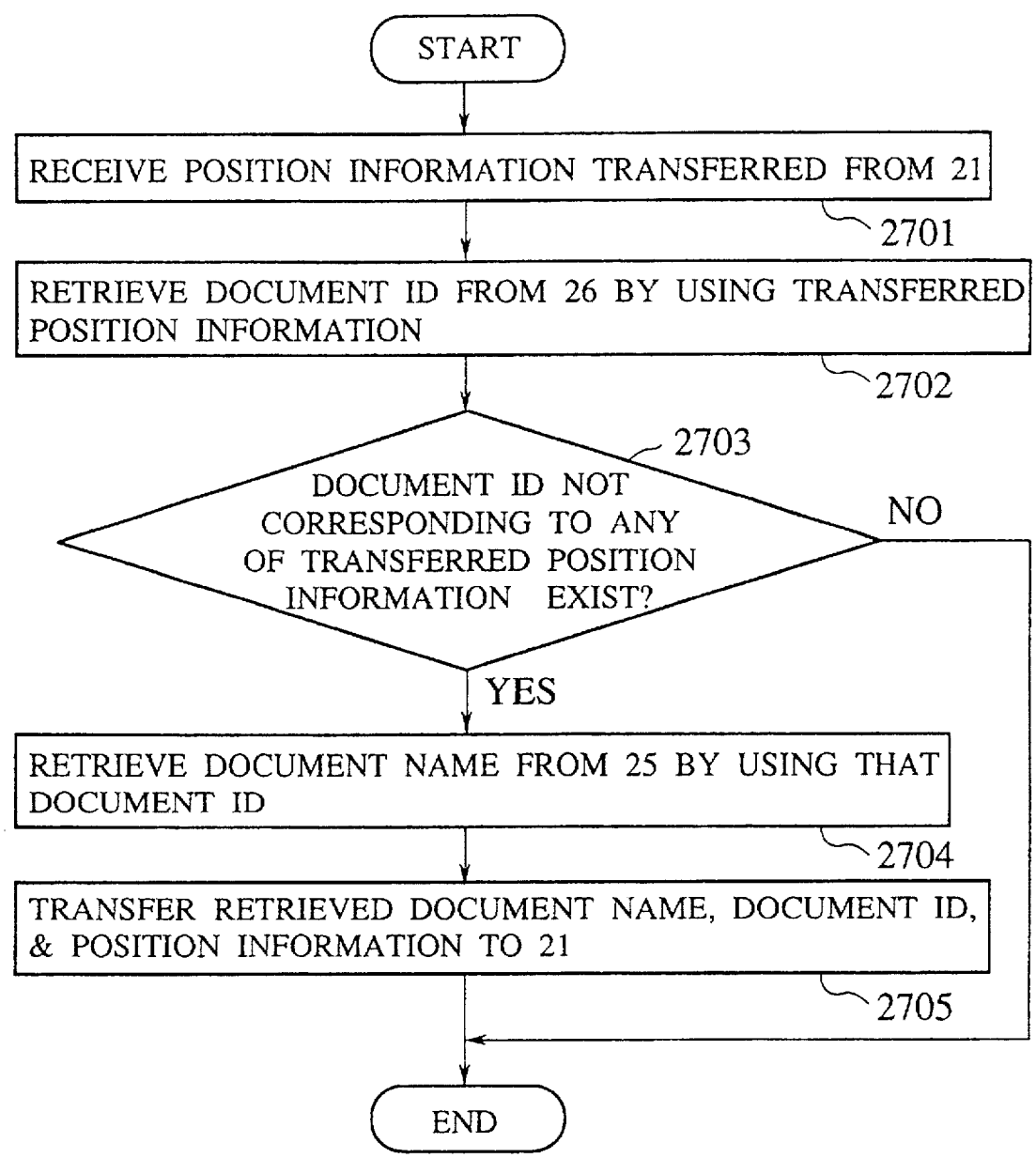

FIG. 28

| PLEASE ENTER LOCATION NAME. | | [FINISH] |
|---|---|---|
| DOCUMENT NAME | LOCATION NAME | CLOSEST LOCATION |
| CHANGES OF COMPUTERS | | RESEARCH CENTER (KOBE) |
| MIND, BRAIN & COMPUTER | | RESEARCH CENTER (KOBE) |
| SOFTWARE DEVELOPMENT TECHNIQUE | | HEAD OFFICE (TOKYO) |

FIG. 29

| PLEASE ENTER LOCATION NAME. | | [FINISH] |
|---|---|---|
| DOCUMENT NAME | LOCATION NAME | CLOSEST LOCATION |
| SOFTWARE DEVELOPMENT TECHNIQUE | | HEAD OFFICE (TOKYO) |

| LOCATION NAME IS REGISTERED AS FOLLOWS. | |
|---|---|
| DOCUMENT NAME | LOCATION NAME |
| CHANGES OF COMPUTERS | KANSAI BRANCH OFFICE (OSAKA) |
| MIND, BRAIN & COMPUTER | KANSAI BRANCH OFFICE (OSAKA) |

FIG. 36

<FORMAT>
 USER ID (6DIGITS) ; YEAR-MONTH-DAY-HOUR-MINUTE
 (12 DIGITS)
<EXAMPLE>
 941810 ; 199302222315

FIG. 37

<FORMAT>

YEAR-MONTH-DAY-HOUR-MINUTE (12 DIGITS) ;
 (DOCUMENT ID, DOCUMENT NAME)

<EXAMPLES>

199302222315 ;
   (file11, CONFIGURATION OF POSITIONING SATELLITE) ,
   (file23, COMMUNICATION AND PERSONAL COMPUTER)
 199303020831 ;
   (file8, PAST AND FUTURE OF MACHINE TRANSLATION)
 199303141726 ;
   (file9, GENERAL THEORY OF ARTIFICIAL INTELLIGENCE)

FIG. 38

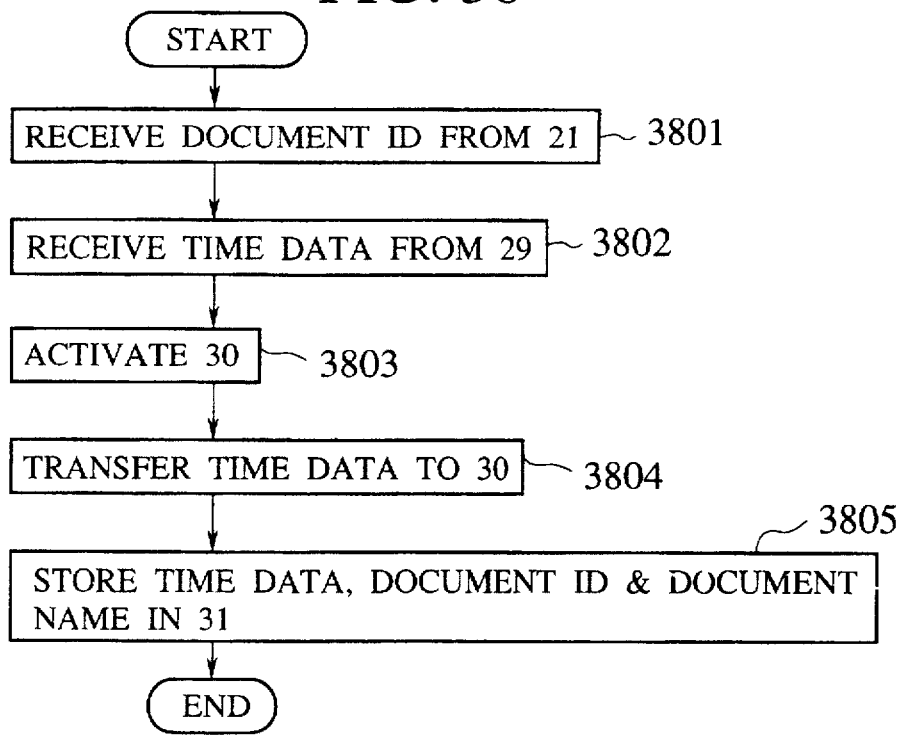

```
        START
          ↓
RECEIVE DOCUMENT ID FROM 21  — 3801
          ↓
RECEIVE TIME DATA FROM 29    — 3802
          ↓
ACTIVATE 30                  — 3803
          ↓
TRANSFER TIME DATA TO 30     — 3804
          ↓
STORE TIME DATA, DOCUMENT ID & DOCUMENT  — 3805
NAME IN 31
          ↓
         END
```

FIG. 39

⟨FORMAT⟩
    USER ID (6DIGITS) ; YEAR-MONTH-DAY-HOUR-MINUTE
    (12 DIGITS) ; LOCATION ID ;
    (DOCUMENT ID, DOCUMENT NAME)

⟨EXAMPLES1⟩
    829113 ; 199303301234 ; HQC1
    941810 ; 199302222315 ; RD101
    941810 ; 199303020831 ; HQC1
    941810 ; 199303141726 ; RD101
    951215 ; 199301071109 ; RD101

⟨EXAMPLES2⟩
    829113 ; 199303301234 ; HQC1
    941810 ; 199302222315 ; RD101 ;
      (file11, CONFIGURATION OF POSITION SATELLITE) ,
      (file23, COMMUNICATION AND PERSONAL COMPUTER)
    941810 ; 199303020831 ; HQC1 ;
      (file8, PAST AND FUTURE OF MACHINE TRANSLATION)
    941810 ; 199303141726 ; RD101 ;
      (file9, GENERAL THEORY OF ARTIFICIAL INTELLIGENCE)
    951215 ; 199301071109 ; RD101

FIG. 41

```
<FORMAT>
    LOCATION ID ; LOCATION NAME
<EXAMPLE>
    RD101 ; RESEARCH CENTER CONFERENCE ROOM #1
    HQC1 ; HEAD OFFICE CONFERENCE ROOM C
```

FIG. 42

| LOCATION | TIME | DOCUMENT NAME |
|---|---|---|
| RESEARCH CENTER CONFERENCE ROOM #1 | 1993 / 2 / 22 / 23 : 15 | ☐ CONFIGURATION OF POSITIONING SATELLITE<br>☐ COMMUNICATION AND PERSONAL COMPUTER |
| | 1993 / 3 / 14 / 17 : 26 | ☐ GENERAL THEORY OF ARTIFICIAL INTELLIGENCE |
| HEAD OFFICE CONFERENCE ROOM C | 1993 / 3 / 2 / 8 : 31 | ☐ PAST AND FUTURE OF MACHINE TRANSLATION |

FIG. 46

⟨FORMAT⟩   YEAR-MONTH-DAY-HOUR-MINUTE (12 DIGITS) ;
           LOCATION ID ; (DOCUMENT ID, DOCUMENT NAME)

⟨EXAMPLES⟩ 199302222315 ; RDI01 ; (file11, CONFIGURATION OF POSITIONING SATELLITE) ,
           (file23, COMMUNICATION AND PERSONAL COMPUTER)

199303020831 ; HQC1 ; (file8, PAST AND FUTURE OF MACHINE TRANSLATION)

199303141726 ; RDI01 ; (file9, GENERAL THEORY OF ARTIFICIAL INTELLIGENCE)

```
<FORMAT>     AFFILIATION ; AFFILIATION ; LOCATION
             LEVEL          NAME          ID

<EXAMPLES>  1; HEAD OFFICE; HQC 1 ······
            1; RESEARCH CENTER; RD 101, ······
                              :
```

FIG. 57
DEVELOPMENT OF LARGE CAPACITY
MEMORY DEVICE
I. TANAKA
AOSHIBA K. K.
AOSHIBA 190-12, KOHOKU, YOKOHAMA
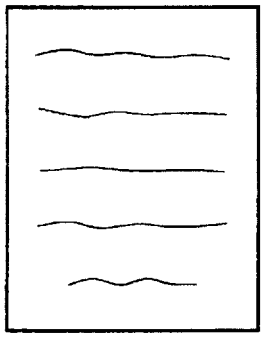 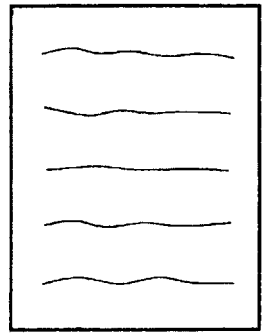
FIG. 58
⟨FORMAT⟩ DOCUMENT ID ; ADDRESS
⟨EXAMPLE⟩ text 11 ; AOSHIBA 190-12, KOHOKU, YOKOHAMA

FIG. 59
⟨FORMAT⟩
ADDRESS : NORTH(SOUTH) LATITUDE ; VALUE , EAST(WEST) LONGITUDE ; VALUE
⟨EXAMPLE⟩
AOSHIBA, KOHOKU, YOKOHAMA : NORTH LATITUDE ; 35° 40'
EAST LONGITUDE ; 139° 10'
FIG. 60A
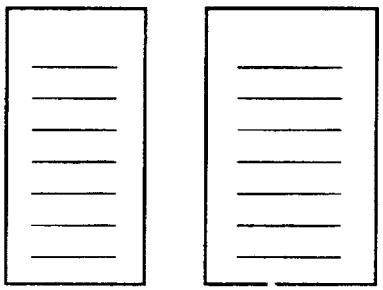
FIG. 60B
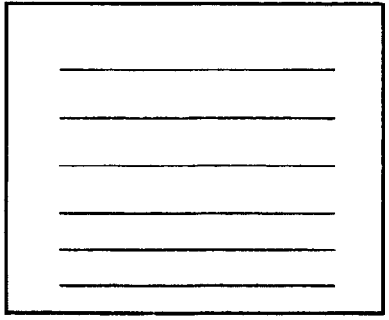

FIG. 61

⟨FORMAT⟩ DOCUMENT ID ; AFFILIATED ORGANIZATION OR SECTION NAME

⟨EXAMPLE⟩ text8 ; KOBE RESEARCH CENTER
text11 ; AOSHIBA K. K.

FIG. 62

⟨FORMAT⟩
AFFILIATED ORGANIZATION OR SECTION NAME : NORTH(SOUTH) LATITUDE ; VALUE, EAST(WEST) LONGITUDE ; VALUE

⟨EXAMPLE⟩
AOSHIBA K. K. : NORTH LATITUDE ; 35° 40'
EAST LONGITUDE ; 139° 10'
KOBE RESEARCH CENTER : NORTH LATITUDE ; 34° 57'
EAST LONGITUDE ; 135° 25'

FIG. 63

| ISSUED DATE | DOCUMENT NAME |
|---|---|
| NOVEMBER 1984 | TRANSLATION SCHEME BASED ON EXAMPLES |
| APRIL 1989 | EXPERIMENT ON TRANSLATION USING EXAMPLES |
| ⋮ | ⋮ |

FIG. 64

| ISSUED DATE | STORED DATABASE | DOCUMENT NAME |
|---|---|---|
| NOVEMBER 1984 | WORKSHOP | TRANSLATION SCHEME BASED ON EXAMPLES |
| APRIL 1989 | STUDY MEETING | EXPERIMENT ON TRANSLATION USING EXAMPLES |
| ⋮ | | |

FIG.68

| DATA | TIME | SCHEDULE | | |
|---|---|---|---|---|
| MARCH 2 | 13:30 ~ 15:00 | DEVELOPMENT CONFERENCE | ANTECEDENT | CONFERENCE MATERIALS |
| | | | CURRENT | STENOGRAPHIC NOTE |
| | | | RETROSPECTIVE | MINUTES OF DEVELOPMENT CONFERENCE |
| MARCH 8 | 10:00 ~ 11:30 | PRELIMINARY CONSULTATION FOR DEVELOPMENT CONFERENCE | RETROSPECTIVE | MINUTES OF CONFERENCE |
| MARCH 9 | 13:30 ~ 16:30 | DEVELOPMENT CONFERENCE | ANTECEDENT | FINAL REPORT |
| | | | RETROSPECTIVE | PROPOSAL NOTE |

FIG.72
| COLUMN TEMPLATE | CONSTRAINTS |
|---|---|
| (ONE COLUMN) 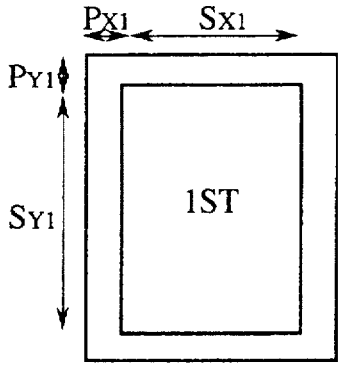 | |
| (TWO COLUMNS) 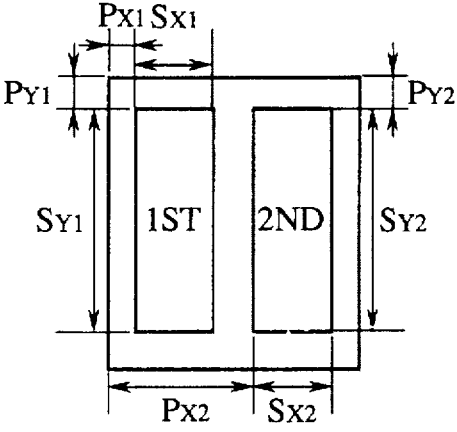 | $\begin{cases} S_{X1} \approx S_{X2} \\ S_{Y1} \approx S_{Y2} \\ P_{Y1} \approx P_{Y2} \\ P_{X1} + S_{X1} < P_{X2} \end{cases}$ |
| (TWO COLUMNS + TITLE) 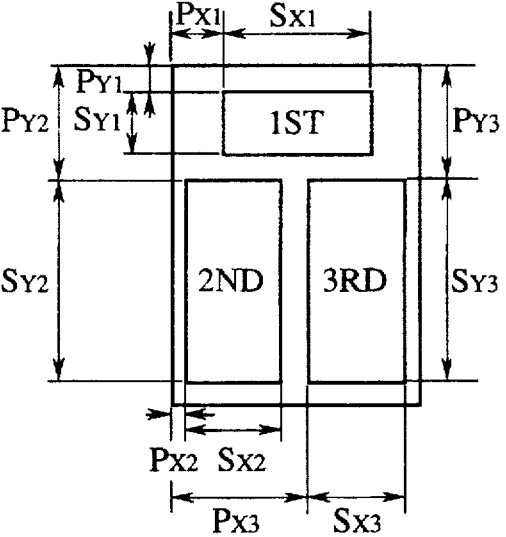 | $\begin{cases} S_{X2} \approx S_{X3} \\ S_{Y2} \approx S_{Y3} \\ P_{Y2} \approx P_{Y3} \\ P_{X2} + S_{X2} < P_{X3} < P_{X1} + S_{X1} \\ P_{Y1} + S_{Y1} < P_{Y2} \end{cases}$ |

FIG.73
OF SENTENCE FRAMES=3
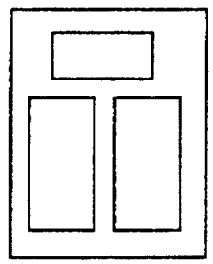
A
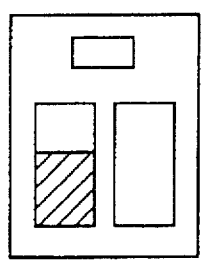
B
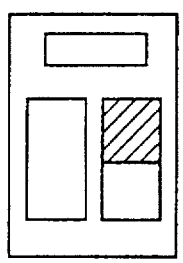
C
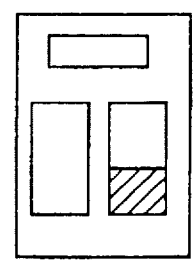
D
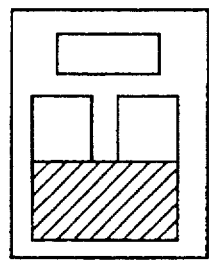
E
OF SENTENCE FRAMES=2
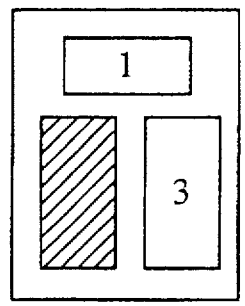
F
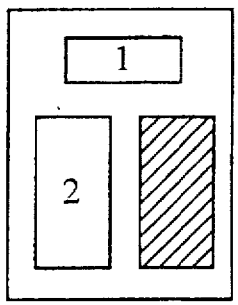
G
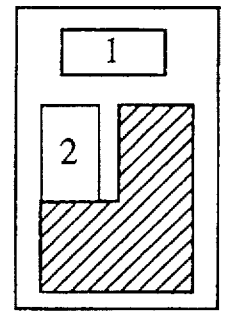
H

FIG.74

| DOCUMENT INFORMATION | |
|---|---|
| TITLE | AUTOMATIC DOCUMENT LAYOUT SYSTEM |
| AUTHOR | J.AKAI |
| AFFILIATION | AOSIBA K.K |
| SOURCE | PREPRINT OF 40TH ○○××SOCIETY,pp.152-153 |
| LAYOUT INFORMATION | |
| PAGE NUMBER | 2 |
| PAGE SIZE | A4 |
| 1ST COLUMN | TWO COLUMNS WITH TITLE |
| 1ST SENTENCE FRAME | X    Y |
| SIZE | 170mm× 50mm |
| POSITION | 40mm× 30mm |
| 2ND SENTENCE FRAME | |
| SIZE | 100mm×200mm |
| POSITION | 20mm×100mm |
| FIGURE/TABLE ARRANGEMENT TYPE | G |
| 1ST FIGURE/TABLE | |
| SIZE | 100mm× 90mm |
| POSITION | 130mm×100mm |
| TYPE | TABLE |
| 2ND FIGURE/TABLE | |
| SIZE | 100mm×100mm |
| POSITION | 130mm×200mm |
| TYPE | GRAPH |
| 2ND COLUMN | TWO COLUMNS |

WHAT KINDS OF FIGURE/
TABLE ARE THERE?

☐ FLOW CHART
☐ BLOCK DIAGRAM
☑ GRAPH
☐ TABLE
☐ MAP
☐ DESIGN CHART
☐ LOGO
☐ ILLUSTRATION
☐ PHOTO
☐ OTHERS

GRAPH TYPES

☐ CIRCLE
☑ BAR
☐ LINE
☐ AREA
☐ VOLUME
☐ PICTORIAL
☐ MAP
☐ COMBINATION
☐ OTHERS

FIG.91A
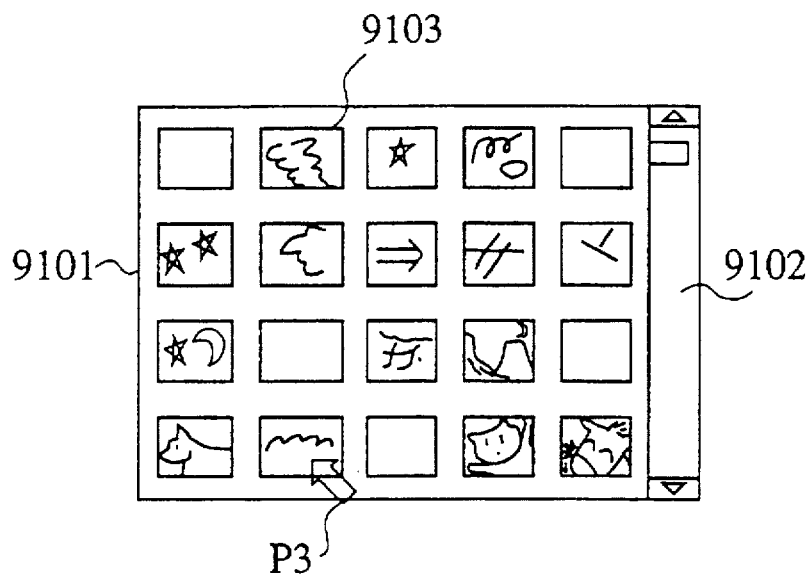
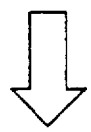
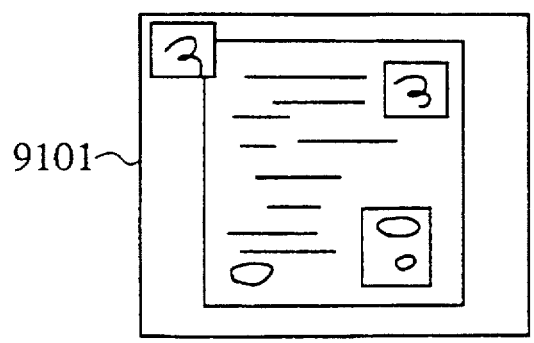
FIG.91B

| RETRIEVAL  .  DOCUMENT PRODUCED AROUND DEADLINE |
| KEY        ·  OF PAPER FOR ○○ SOCIETY |

MORPHOLOGICAL ANALYSIS RESULT :

DOCUMENT / PRODUCED / AROUND / DEADLINE / OF / PAPER / FOR /○○/ SOCIETY/

RETRIEVAL WORD EXTRACTION RESULT :   ○○SOCIETY
PAPER
DEADLINE

⟨FORMAT⟩ CONDITION ; EXECUTION

⟨EXAMPLE⟩ SOCIETY ; (Select.-1)

FIG.101

| OPERATION EVENTS DETECTED BY 45 |
|---|
| · NEW DATA PRODUCTION<br>· DATA NAME CHANGE<br>· DATA ACCESS START<br>· DATA ACCESS END<br>· DATA DELETION<br>· DATA PRINT OUT |

FIG.102

| ATTRIBUTES OF ACCESS INFORMATION ELEMENT |
|---|
| · NEW DATA PRODUCTION TIME<br>· DATA AMOUNT AT NEW DATA PRODUCTION TIMING<br>· DATA ACCESS START TIME<br>· DATA AMOUNT AT DATA ACCESS START TIMING<br>· DATA ACCESS END TIME<br>· DATA AMOUNT AT DATA ACCESS END TIMING<br>· WITH / WITHOUT DATA WRITING OPERATION<br>· NUMBER OF DATA PRINT OUT |

FIG.103

| MEANINGS OF VARIABLES |
|---|
| · V is a data amount at latest access end timing.<br>· Te is an access end time of an access information element having data content changed.<br>· Ts is an access start time or new production time of an access information element having data content changed. |

FIG. 110

| KEYWORD TYPE | KEYWORD |
|---|---|
| INFORMATION CONCERNING TIMING (TIMING PATTERN1) | "PRODUCED BETWEEN~TO~" <br> "PRODUCTION STARTED BETWEEN~TO~" <br> "PRODUCTION ENDED BETWEEN~TO~" |
| INFORMATION CONCERNING TIMING (TIMING PATTERN2) | "PRODUCED AROUND~" <br> "PRODUCTION STARTED AROUND~" <br> "PRODUCTION ENDED AROUND~" |
| INFORMATION CONCERNING PERIOD | "PRODUCED AT PERIOD OF~" |
| INFORMATION CONCERNING LOOK UP FREQUENCY | "LOOKED UP ABOUT~TIMES" <br> "LOOKED UP MANY TIMES" <br> "LOOKED UP SEVERAL TIMES" <br> "NEVER LOOKED UP" |
| INFORMATION CONCERNING PRODUCTION URGENCY LEVEL | "PRODUCED IN HASTE" <br> "PRODUCED AT NORMAL PACE" <br> "PRODUCED IN ELABORATION" |
| INFORMATION CONCERNING PRINT OUT | "PRINTED OUT ABOUT~TIMES" <br> "PRINTED OUT MANY TIMES" <br> "PRINTED OUT SEVERAL TIMES" <br> "NEVER PRINTED OUT" |

FIG. 122

| PRODUCTION DATE | DOCUMENT NAME |
|---|---|
| 1990 / 10 / 9 | LAYOUT INFORMATION ANALYSIS TECHNIQUE |
| 1991 / 1 / 21 | KNOWLEDGE-BASE MAINTENANCE METHOD |
| 1991 / 3 / 11 | DEVELOPMENT CONFERENCE REPORT |
| ⋮ | ⋮ |

⟨FORMAT⟩
COMPUTER ID : NAME : USER ID : USE START TIME : USE END TIME : APPLICATION+FILE NAME

⟨EXAMPLES⟩
331.56 : Tom : Suzuki : 9312121059 : 9312121418 : WP+file10, IR+file16.
331.56 : Tom : Satou : 9312130908 : 9312131145 : EDITORT+file3, PRINTER+file 32.

⟩
file 3 : MINUTES OF DEVELOPMENT CONFERENCE
⟩
file 10 : BRAIN-STORMING MEMO
⟩
file 16 : BUSINESS TRIP REPORT (NATIONAL MEETING)
⟩
file 32 : MEETING MEMO

FIG. 130

SELECT COMPUTER YOU USED.

☐ Tom

☐ Jerry

☐ Beth

☐ Mary

FIG. 131

| THESE ARE DOCUMENTS YOU MADE ACCESSES AT Tom. |||
|---|---|---|
| NAME | SOFTWARE / COMMAND USED | DATE |
| MINUTES OF DEVELOPMENT CONFERENCE | EDITOR | 1993-12-13 |
| MESSAGE MEMO | PRINTER | 1993-12-13 |

WHICH ROOM ZONE IS IT?

☐ 26F 1ST ZONE

☐ 14F LABORATORY

☐ 3F GUEST ROOM

WHICH SECTION DID YOU USE COMPUTER?

⟨FORMAT⟩
    TEMPERATURE : DOCUMENT NAME
⟨EXAMPLES⟩
        28° : REPORT
        18° : CONTRIBUTING PAPER
        23° : SPECIFICATION

FIG. 145

| STRUCTURAL ELEMENT | ATTRIBUTE SET | | AUXILIARY INFORMATION | ATTRIBUTE VALUE |
|---|---|---|---|---|
| | NAME | VALUE | | |
| BACKGROUND PORTION, | (COLOR, PINK), | | PAPER COLOR, | PINK |
| | (SIZE, 50), | | MARGIN, | LARGE |
| | (NOISE LEVEL, 3) ... | | PAPER QUALITY, | ORDINARY |
| | | | STAIN, | PRESENT |
| STAIN PORTION, | (COLOR, BROWN), | | CHARACTER COLOR, | BLACK |
| | (SIZE, 30), | | WRITING TYPE, | HANDWRITING |
| | (POSITION, (x,y)) ... | | FONT, | NULL |
| | | | COPYIST, | MYSELF |
| | | | WRITING INSTRUMENT, | PENCIL |
| | | | AMOUNT OF HANDWRITING, | NULL |
| CHARACTER PORTION, | (COLOR, BLACK), | | CHARACTER TYPE, | JAPANESE |
| | (LINE THICKNESS, 0.5), | | CHARACTER SIZE, | SMALL |
| | (LINE PITCH, 6.8), | | CHARACTER DENSITY, | DENSE |
| | (CHARACTER PITCH, 3.5) ... | | WRITING DIRECTION, | TRANSVERSE WRITING IN LENGTH DIRECTION |
| DRAWING PORTION, | (COLOR, NULL), | | PAPER TYPE, | REPORT PAPER |
| | (SIZE, 20), | | DRAWING RATE, | 20% |
| | (POSITION, (x,y)) ... | | DRAWING POSITION, | LOWER RIGHT |
| | | | SPECIFIC MARK, | PRESENT |
| GRAPH PORTION, | (TYPE, BAR GRAPH) | | .... | |
| .... | | | | |

| SUPPLEMENTED TIME SERIES DATA | | | |
|---|---|---|---|
| TIME SERIES DATA ID | | | SP-129 |
| DATA TYPE | DEVICE | | MICROPHONE |
| | CHANNEL NUMBER | | 2 |
| | MEDIA | | SPEECH DATA |
| | DISCRETIZATION INFORMATION | SAMPLING INFORMATION | 12kHz |
| | | QUANTIZATION INFORMATION | 16bit |
| TIME INFORMATION | START TIME | | ts |
| | END TIME | | te |
| SPEECH DATA | | | |

| TIME SERIES DATA STORAGE POSITION ||
|---|---|
| TIME SERIES DATA ID | ADDRESS IN 302 |
| ⋮<br>SP-129<br>⋮ | ⋮<br>× × × ×<br>⋮ |

FIG. 152

| STRUCTURAL INFORMATION | | |
|---|---|---|
| STRUCTURAL INFORMATION ID | | WD-5 |
| TIME SERIES DATA ID | | SP-129 |
| STRUCTURAL INFORMATION NAME | | WORD DETECTION RESULT |
| TIME INFORMATION | START TIME | t1 |
| | END TIME | t2 |
| WORD NAME | | **** |

FIG. 153A

| STRUCTURAL INFORMATION STORAGE POSITION ||
|---|---|
| STRUCTURAL INFORMATION ID | ADDRESS IN 304 |
| ⋮ WD-5 ⋮ | ⋮ ○○○○ ⋮ |

FIG. 153B

| ADDRESS | STRUCTURAL INFORMATION |
|---|---|
| ⋮ ○○○○ ⋮ | ⋮ STRUCTURAL INFORMATION ID \| WD-5 ⋮ |

| STRUCTURAL INFORMATION | |
|---|---|
| STRUCTURAL INFORMATION ID | VP-013 |
| TIME SERIES DATA ID | SP-129 |
| STRUCTURAL INFORMATION NAME | SPEECH SECTION |
| TIME INFORMATION — START TIME | t1 |
| TIME INFORMATION — END TIME | t2 |
| SPEECH SECTION | t1 TO t2 |

FIG. 157A

| STRUCTURAL INFORMATION ||
|---|---|
| STRUCTURAL INFORMATION ID | WD-7 |
| TIME SERIES DATA ID | SP-129 |
| STRUCTURAL INFORMATION NAME | WORD DETECTION RESULT |
| TIME INFORMATION — START TIME | t1 |
| TIME INFORMATION — END TIME | t2 |
| WORD NAME | "YES" |
| LIKELIHOOD | 0.82 |

FIG. 157B

| STRUCTURAL INFORMATION ||
|---|---|
| STRUCTURAL INFORMATION ID | WD-8 |
| TIME SERIES DATA ID | SP-129 |
| STRUCTURAL INFORMATION NAME | WORD DETECTION RESULT |
| TIME INFORMATION — START TIME | t1 |
| TIME INFORMATION — END TIME | t2 |
| WORD NAME | "LARGE" |
| LIKELIHOOD | 0.75 |

FIG. 158

| STRUCTURAL INFORMATION ||
|---|---|
| STRUCTURAL INFORMATION ID | SR-5 |
| TIME SERIES DATA ID | SP-129 |
| STRUCTURAL INFORMATION NAME | UTTERANCE MEANING |
| TIME INFORMATION | START TIME | t1 |
| | END TIME | t2 |
| MEANING OF UTTERANCE | AFFIRMATION |
| CONSTITUENT WORDS | TOTAL NUMBER | 2 |
| | 1 | "YES" (WD-7) |
| | 2 | "THAT'S RIGHT" (WD-*) |
| SELECTED / NOT SELECTED | SELECTED |

FIG. 164A

```
-Start of Dialogue 01050005 57.6038 0.0189 16:44:58.100
Change Dialog Manager State SYSO
Sys Act: INITIAL_GREETING
  SYS 1 :    160- 2760 : WELCOME, PLEASE MAKE YOUR ORDERS.
  USR 1 :   3100 : 7708 :
     1    3508-  3684 :  sim 0.766 : NIKO
     2    3300-  3764 :  sim 0.805 : SORETO
     3    3780-  3940 :  sim 0.826 : KO-RA
     4    3348-  3924 :  sim 0.862 : HAXBA-GA-
     5    3604-  3972 :  sim 0.793 : ATO
     6    4196-  4548 :  sim 0.841 : HITOTSU
     7    4148-  4548 :  sim 0.871 : FUTATSU
     8    4548-  4868 :  sim 0.829 : YOXKO
     9    4596-  4836 :  sim 0.721 : MIQTSU
    10    4724-  5044 :  sim 0.723 : KUDASAI
    11    4868-  5044 :  sim 0.811 : DAI
    12    4868-  5108 :  sim 0.825 : ZEXBU
    13    4740-  5124 :  sim 0.887 : POTETO
    14    4932-  5172 :  sim 0.776 : ATO
    15    4916-  5140 :  sim 0.810 : ZUTSU
    16    5268-  5492 :  sim 0.882 : DAI
    17    5428-  5732 :  sim 0.767 : IIDESU
    18    5604-  5956 :  sim 0.833 : HITOSU
    19    5748-  5940 :  sim 0.812 : ZUTSU
    20    5972-  6500 :  sim 0.833 : IQKO
    21    6308-  6596 :  sim 0.888 : KO-RA
    22    6660-  6964 :  sim 0.829 : MIQTSU
    23    6740-  7076 :  sim 0.798 : ITSUTSU
    24    7028-  7236 :  sim 0.765 : ZUTSU
```

```
       TO FIG. 164A                                                                                                    TO FIG. 164A 25    7124-    7364 : sim 0.775 : FUTATSU
       26    6932-    7364 : sim 0.886 : KUDASAI
       27    7188-    7364 : sim 0.873 : DAI
       28    7172-    7428 : sim 0.759 : IANAKUTE
       29    7108-    7524 : sim 0.836 : SAXKO
       ParsingFinishedAt  8210 : 10AcceptedCandietesAre
       o score 0.990 of 8 words 4/HAXBA-GA- 7/FUTATSU 13/POTETO 16/DAI 18/HITOTSU 21/KO-RA 22/MIQTSU
       26/KUDASAI
         Act CHUUMON : SItem (HANB NOSIZE 2)  (POTATO LARGE 1)  (COLA NOSIZE 3)
         x score 0.985 of 8 words 4/HAXBA-GA- 6/HITOTSU 13/POTETO 16/DAI 18/HITOTSU 21/KO-RA 22/MIQTSU
       26/KUDASAI
         Act CHUUMON : SItem (HANB NOSIZE 1)  (POTATO LARGE 1)  (COLA NISIZE 3)
         x score 0.984 of 7 words 4/HAXBA-GA- 7/FUTATSU 13/POTETO 16/DAI 18/HITOTSU 21/KO-RA
       26/KUDASAI
         Act CHUUMON : SItem (HANB NOSIZE 1)  (POTATO LARGE 1)  (COLA NOSIZE 0)
         x score 0.980 of 7 words 4/HAXBA-GA- 7/FUTATSU 13/POTETO 18/HITOTSU 21/KO-RA 22/MIQTSU
       26/KUDASAI
         Act CHUUMON : SItem (HANB NOSIZE 2)  (POTATO NOSIZE 1)  (COLA NOSIZE 3)
         x score 0.978 of 7 words 4/HAXBA-GA- 6/HITOTSU 13/POTETO 16/DAI 18/HITOTSU 21/KO-RA TO FIG. 164C                                                                                                    TO FIG. 164C
```

26/KUDASAI
    Act CHUUMON : SItem (HANB NOSIZE 1)  (POTATO LARGE 1)  (COLA NOSIZE 0)
    x score 0.974 of 8 words 4/HAXBA-GA- 7/FUTATSU 13/POTETO 16/DAI 18/HITOTSU 21/KO-RA
22/MIQTSU 27/DAI
    Act NOACT : SItem (HANB NOSIZE 2)  (POTATO LARGE 1)  (COLA LARGE 3)
    x score 0.973 of 8 words 4/HAXBA-GA- 7/FUTATSU 13/POTETO 16/DAI 18/HITOTSU 21/KO-RA
23/ITSUTSU 27/DAI
    Act NOACT : SItem (HANB NOSIZE 2)  (POTATO LARGE 1)  (COLA LARGE 5)
    x score 0.970 of 9 words 4/HAXBA-GA- 7/FUTATSU 13/POTETO 16/DAI 18/HITOTSU 21/KO-RA
22/MIQTSU 24/ZUTSU 27/DAI
    Act NOACT : SItem (HANB NOSIZE 2)  (POTATO LARGE 1)  (COLA LARGE 3)
    x score 0.965 of 7 words 4/HAXBA-GA- 7/FUTATSU 13/POTETO 16/DAI 18/HITOTSU 21/KO-RA
23/ITSUTSU
    Act NOACT : SItem (HANB NOSIZE 2)  (POTATO LARGE 1)  (COLA NOSIZE 5)
    x score 0.962 of 8 words 4/HAXBA-GA- 7/FUTATSU 13/POTETO 16/DAI 18/HITOTSU 21/KO-RA
22/MIQTSU 24/ZUTSU
    Act NOACT : SItem (HANB NOSIZE 2)  (POTATO LARGE 1)  (COLA NOSIZE 3)
    DialogManager State USRO
```

FIG. 166A

| STRUCTURAL INFORMATION ||| 
|---|---|---|
| STRUCTURAL INFORMATION ID || WC-5 |
| TIME SERIES DATA ID || SP-129 |
| STRUCTURAL INFORMATION NAME || WORD OF CORRECT ANSWER |
| TIME INFORMATION | START TIME | t1 |
| | END TIME | t2 |
| WORD NAME || "YES" |

FIG. 166B

| STRUCTURAL INFORMATION ||| 
|---|---|---|
| STRUCTURAL INFORMATION ID || WRR-03 |
| TIME SERIES DATA ID || SP-129 |
| STRUCTURAL INFORMATION NAME || WORD DETECTION PERFORMANCE |
| TIME INFORMATION | START TIME | t1 |
| | END TIME | t2 |
| DETECTION RESULT || CORRECT DETECTION |
| CORRECT WORD || "YES" (WC-5) |
| DETECTED WORD || "YES" (WC-7) |

DATA RETRIEVAL SYSTEM USING SECONDARY INFORMATION OF PRIMARY DATA TO BE RETRIEVED AS RETRIEVAL KEY

This application is a continuation of application Ser. No. 08/254,050, abandoned.

BACKGROUND OF THE INVENTION

1. Field of the Invention

The present invention relates to a data retrieval system for retrieving desired data such as document data and time series data from a large number of data stored in a database. It is to be noted that the term "detection" is often used in the literature of the field instead of the term "retrieval" used in the following description. The present specification adheres to the use of the term "retrieval" throughout.

2. Description of the Background Art

In the conventional document retrieval system or word processor, in order for the user to retrieve the document that had been retrieved in the past again, it has been necessary for the user to either call up the document by recalling the title or the content of the retrieved document, or retrieve the document by recalling the retrieval key used in the past retrieval. Here, the retrieval key must be specified as a character string, while the title or the content of the document must be specified as a natural language expression indicative or at least suggestive of the title or the content itself. Consequently, in a case the user cannot recall the retrieval key, the title or the content of the document, or in a case the user cannot express it appropriately as the character string or the natural language expression, it has been impossible to carry out the retrieval.

On the other hand, conventionally, there has been an electronic filing system in which the document image is taken by a scanner and stored as the image data, so as to replace the conventional document files in paper. However, such an electronic filing system could have been quite inconvenient especially when an amount of documents stored in such a filing system becomes huge, as it is possible for the user to forget the keyword or retrieval key assigned to a desired document after that document has been filed such that it can be extremely difficult to find out the desired document out of a huge number of filed documents, In this regard, in a case of the document files in paper, there still remains a clue for finding out the desired document such as the characteristic external appearance of each file. For instance, the user can remember the desired document as one with stains of coffee, such that this desired document can be found out relatively easily by checking out those with stains of coffee alone. However, in a case of the electronic filing system, such an information concerning the characteristic external appearance of each file is going to be disregarded as insignificant at a time of recording, so that it has been impossible in the conventional electronic filing system to carry out the retrieval of the document based on such a natural recollection of each file by the human user.

In particular, in a system for filing the result of processing for each document image such as the document structure analysis or the character recognition, the noises such as stains are going to be eliminated at a time of the processing in order to improve the processing performance. Consequently, in such a filing system, the document to be displayed at a time of the retrieval is only the result of such a processing which may have the external appearance different from that of the original document remembered by the human user, and it has been difficult to judge whether the retrieved document is indeed the desired document or not by a glance.

Now, in recent years, in conjunction with the advance of the processing performance of the computer, it has become possible to carry out the recording or the retrieval of the multi-media data such as speeches, images, etc. in various manners for the purposes of recording, reproducing, and editing such multi-media data.

In addition, as it becomes possible to utilize a large capacity recording medium relatively easily, many applications using input/output, manipulation or editing processing of the multi-media data are developed, but the presently available applications are limited to the realization of the editing function utilizing the straightforward handling of the multi-media data.

As for the recording of the multi-media data which requires a huge amount of data to be stored, it is possible to realize it by using a recording medium having a sufficient recording capacity. However, the retrieval and the output of the recorded multi-media data are not realized at truly satisfactory level, because the work load of the computer for finding out a necessary portion out of huge recorded data becomes increasingly large as an amount of stored data increases.

In particular, in a case of dealing with the time series data, the time required for the retrieval becomes longer in proportion to the length of the time series data itself.

Moreover, the user may wish to retrieve and output the information other than the multi-media data itself, such as the significant portion within the multi-media data, or the key data indicating the meaning represented by that significant portion. Here, the key data cannot be obtained by the conventionally available straightforward recording, reproducing, and editing processing of the multi-media data.

For instance, when the input utterance of "Well, I want one orange juice, no, three orange juices," is given as the speech data, it may be helpful for the user to obtain only the meaningful information indicating that "I want three orange juices." rather than this speech data as it is.

In order to make such a key data available, it is necessary to carry out the recognition processing for the multi-media data to detect the key data, produce a structure information containing at least the detected key data itself and a link data relating the detected key data with the original time series data, and output a combination of a part of the structure information containing the key data as a meaningful portion.

In such a structural analysis processing for generating the structure information automatically such as the recognition processing, there are problems concerning the real time processing and the error in the detected key data.

Of these, the problem of the real time processing is becoming increasingly less problematic as the real time realization of the recognition processing for the speeches and images is becoming plausible due to the advance of the computer performance.

On the other hand, the problem of the error in the structural analysis result can be resolved by providing a provision for producing more accurate key data by the correction of the automatically generated key data or the updating of the key data itself by the user operation, assuming that the error may be contained in the key data.

However, up to now, there has been no system which utilizes such a key data as the retrieval key for the retrieval operation.

SUMMARY OF THE INVENTION

It is therefore an object of the present invention to provide a data retrieval system capable of carrying out the retrieval using the secondary information of the primary data to be retrieved such as environmental information or structural information as the retrieval key.

More specifically, it is an object of the present invention to provide a data retrieval system capable of carrying out the retrieval even when the user cannot recall the retrieval key, the title or the content of the document, or in a case the user cannot express it appropriately as the character string or the natural language expression.

It is another object of the present invention to provide a data retrieval system capable of carrying out the retrieval according to the characteristic external appearance of each file as the retrieval key.

It is another object of the present invention to provide a data retrieval system capable of obtaining only the meaningful information from the multi-media time series data by retrieving and outputting only a significant portion of the stored time series data that can be required by the user.

According to one aspect of the present invention there is provided a data retrieval system, comprising: first memory means for storing primary data which are filing target to be stored in the system and retrieved from the system; second memory means for storing secondary information associated with the primary data which are not directly related with data content of the primary data, the secondary information being stored in correspondence to the primary data stored in the first memory means; input means for entering a retrieval key specifying a desired retrieval of the primary data from the first memory means; retrieval means for selecting the secondary information from the second memory means in accordance with the retrieval key entered by the input means, and retrieving the primary data corresponding to the secondary information selected in accordance with the retrieval key; and output means for outputting the primary data retrieved by the retrieval means as a retrieval result.

According to another aspect of the present invention there is provided a data retrieval system, comprising: first memory means for storing time series data which are filing target to be stored in the system and retrieved from the system; structural analysis means for extracting key data indicative of a semantic content of the time series data, and generating a structural information containing the key data and a link information relating the key data with the time series data; second memory means for storing the structural information generated by the structural analysis means; input means for entering a retrieval key in terms of the key data of a desired time series data to be retrieved; retrieval means for retrieving the structural information from the second memory means in accordance with the retrieval key entered by the input means, and retrieving the desired time series data according to the link information contained in the structural information retrieved in accordance with the key data; and output means for outputting the time series data retrieved by the retrieval means as a retrieval result.

According to another aspect of the present invention there is provided a method of data retrieval, comprising the steps of: storing primary data which are filing target to be stored and retrieved, in a first memory; storing secondary information associated with the primary data which are not directly related with data content of the primary data, the secondary information being stored in a second memory in correspondence to the primary data stored in the first memory; entering a retrieval key specifying a desired retrieval of the primary data from the first memory; selecting the secondary information from the second memory in accordance with the retrieval key entered at the entering step, and retrieving the primary data corresponding to the secondary information selected in accordance with the retrieval key; and outputting the primary data retrieved at the retrieving step as a retrieval result.

According to another aspect of the present invention there is provided a method of data retrieval, comprising the steps of: storing time series data which are filing target to be stored and retrieved, in a first memory extracting key data indicative of a semantic content of the time series data, and generating a structural information containing the key data and a link information relating the key data with the time series data; storing the structural information generated by the structural analysis means in a second memory; entering a retrieval key in terms of the key data of a desired time series data to be retrieved; retrieving the structural information from the second memory in accordance with the retrieval key entered at the entering step, and retrieving the desired time series data according to the link information contained in the structural information retrieved in accordance with the key data; and outputting the time series data retrieved at the retrieving step as a retrieval result.

Other features and advantages of the present invention will become apparent from the following description taken in conjunction with the accompanying drawings.

BRIEF DESCRIPTION OF THE DRAWINGS

FIG. 2 is a table summarizing definitions of various data used in the system of FIG. 1.

FIG. 27 is a flow chart for the operation of the retrieval unit in the configuration of FIG. 10 in a case urging the location registration.

FIG. 28 is an illustration of an exemplary display by the retrieval result display unit in the configuration of FIG. 10 during a case of urging the location registration.

FIG. 29 is an illustration of an exemplary display by the retrieval result display unit in the configuration of FIG. 10 after a case of urging the location registration.

FIG. 36 is a table showing a format and an example for information transmitted from the communication unit in the first device of FIG. 33.

FIG. 37 is a table showing a format and examples for data in the operation history storage unit in the first device of FIG. 33.

FIG. 38 is a flow chart for the operation of the retrieval unit in the first device of FIG. 33 in a case of document production.

FIG. 39 is a table showing a format and examples for data in the position operation information storage unit in the second device of FIG. 34.

FIG. 41 is a table showing a format and examples for data in the location name storage unit in the second device of FIG. 34.

FIG. 42 is an illustration of an exemplary display by the retrieval result display unit in the second device of FIG. 34.

FIG. 46 is a table showing a format and examples for data in the operation history storage unit in the first device of FIG. 43.

FIG. 57 is an illustration of one exemplary document in the eighth specific embodiment of the system of FIG. 1.

FIG. 58 is a table showing a format and an example for data in the document data storage unit in the configuration of FIG. 56 for an exemplary document of FIG. 57.

FIG. 59 is a table showing a format and an example for data in the position database in the configuration of FIG. 56 for an exemplary document of FIG. 57.

FIGS. 60A and 60B are illustrations of other exemplary documents in the eighth specific embodiment of the system of FIG. 1.

FIG. 61 is a table showing a format and an example for data in the document data storage unit in the configuration of FIG. 56 for exemplary documents of FIGS. 60A and 60B.

FIG. 62 is a table showing a format and an example for data in the position database in the configuration of FIG. 56 for exemplary documents of FIGS. 60A and 60B.

FIG. 63 is an illustration of an exemplary document list display in the eighth specific embodiment of the system of FIG. 1.

FIG. 64 is an illustration of another exemplary document list display in the eighth specific embodiment of the system of FIG. 1.

FIG. 68 is an illustration of an exemplary schedule display in the ninth specific embodiment of the system of FIG. 1.

FIG. 72 is a table summarizing the column template and constraints used in the tenth specific embodiment of the system of FIG. 1.

FIG. 73 is an illustration of an exemplary arrangement type list display in the tenth specific embodiment of the system of FIG. 1.

FIG. 74 is an illustration of data stored in the layout information memory unit in the configuration of FIG. 69.

FIGS. 91A and 91B are illustrations of one scheme for utilizing the images in the eleventh specific embodiment of the system of FIG. 1.

FIG. 101 is a table summarizing the operation events detected by the access information detection unit in the configuration of FIG. 96.

FIG. 102 is a table summarizing the attributes of access information elements used in the twelfth specific embodiment of the system of FIG. 1.

FIG. 103 is a table summarizing the meanings of variables used in the twelfth specific embodiment of the system of FIG. 1.

FIG. 110 is a table summarizing keywords used in the twelfth specific embodiment of the system of FIG. 1.

FIG. 120 is an illustration of another exemplary display used in the twelfth specific embodiment of the system of FIG. 1.

FIG. 121 is an illustration of another exemplary access information display used in the twelfth specific embodiment of the system of FIG. 1.

FIG. 122 is an illustration of an exemplary document display used in the twelfth specific embodiment of the system of FIG. 1.

FIG. 123 is a schematic block diagram for a functional configuration of the thirteenth specific embodiment of the system of FIG. 1.

FIG. 124 is an illustration of an exemplary environmental information display used in the thirteenth specific embodiment of the system of FIG. 1.

FIG. 125 is a schematic block diagram for a functional configuration of the fourteenth specific embodiment of the system of FIG. 1.

FIG. 126 is a table showing a format and examples for data in the computer ID memory unit in the configuration of FIG. 125.

FIG. 127 is a table showing an example for data in the retrieval target data memory unit in the configuration of FIG. 125.

FIG. 128 is a flow chart for the operation of the computer ID setting unit in the configuration of FIG. 125.

FIG. 129 is a flow chart for one operation of the retrieval unit in the configuration of FIG. 125.

FIG. 130 is an illustration of a menu display used in the operation of FIG. 129.

FIG. 131 is an illustration of a retrieval result display used in the operation of FIG. 129.

Figure 1:
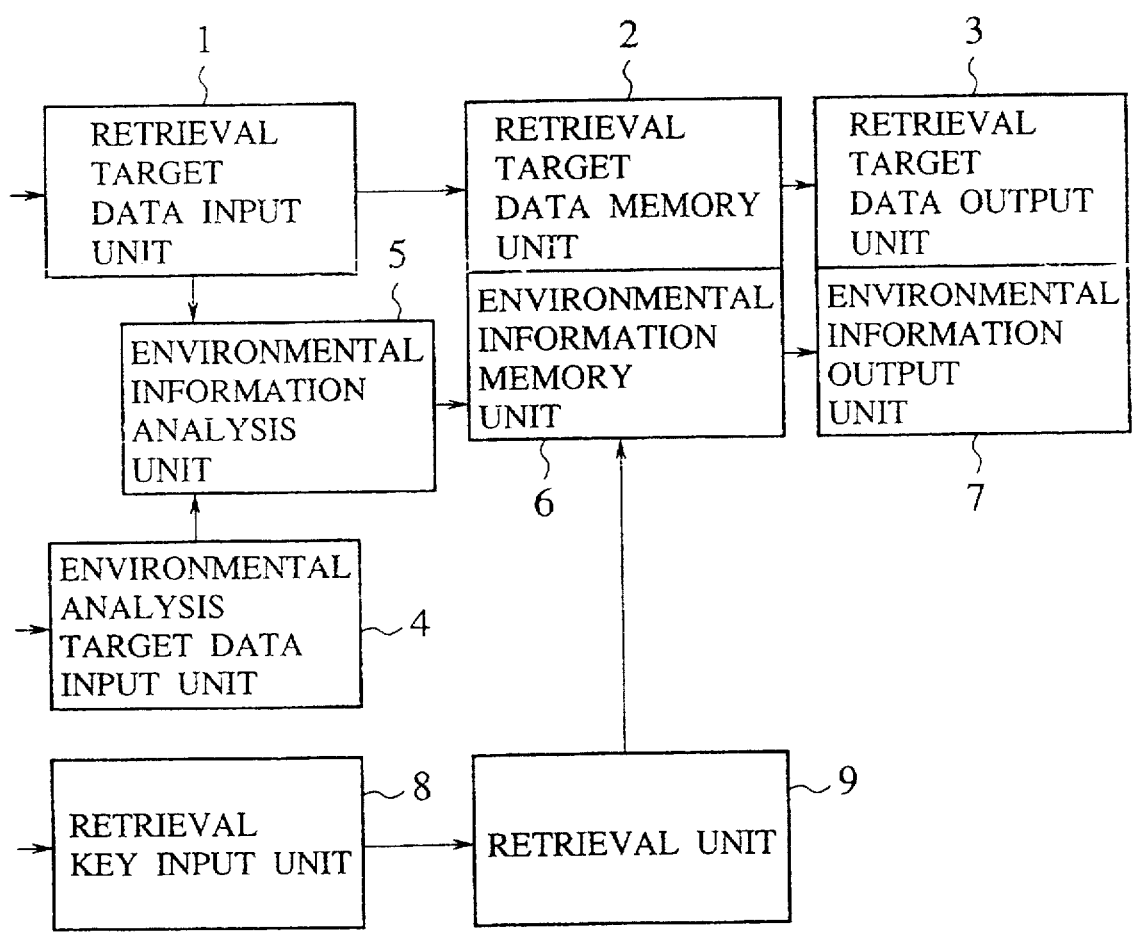
FIG. 1 is a schematic block diagram of the first general embodiment of the data retrieval system according to the present invention.
Figure 132:
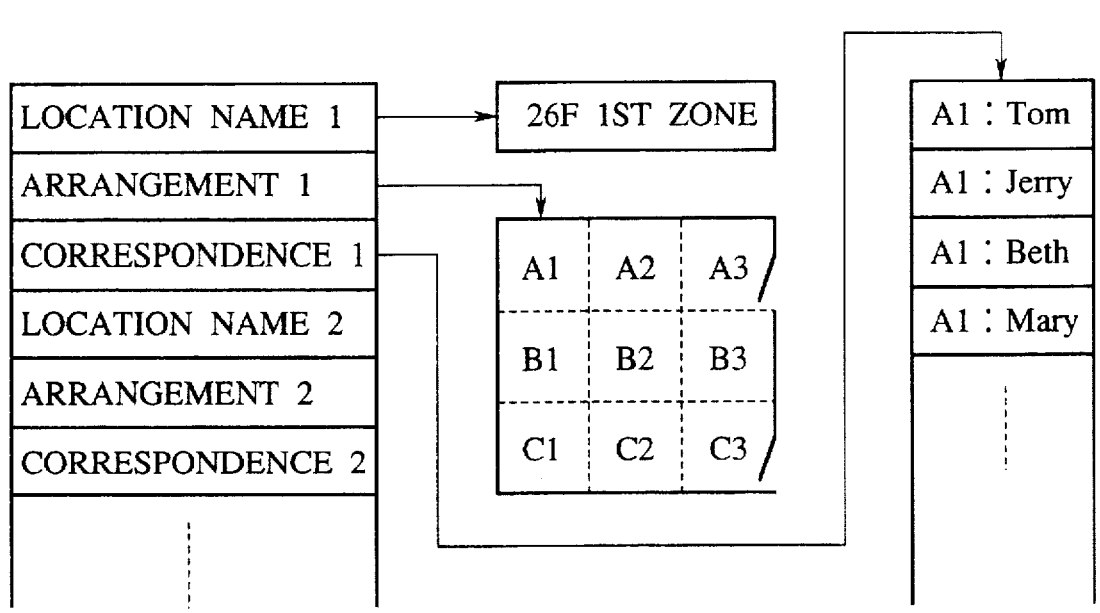

FIG. 132 is an illustration of a correspondence table used in the fourteenth specific embodiment of the system of FIG. 1.

Figures 125, 126, 127:
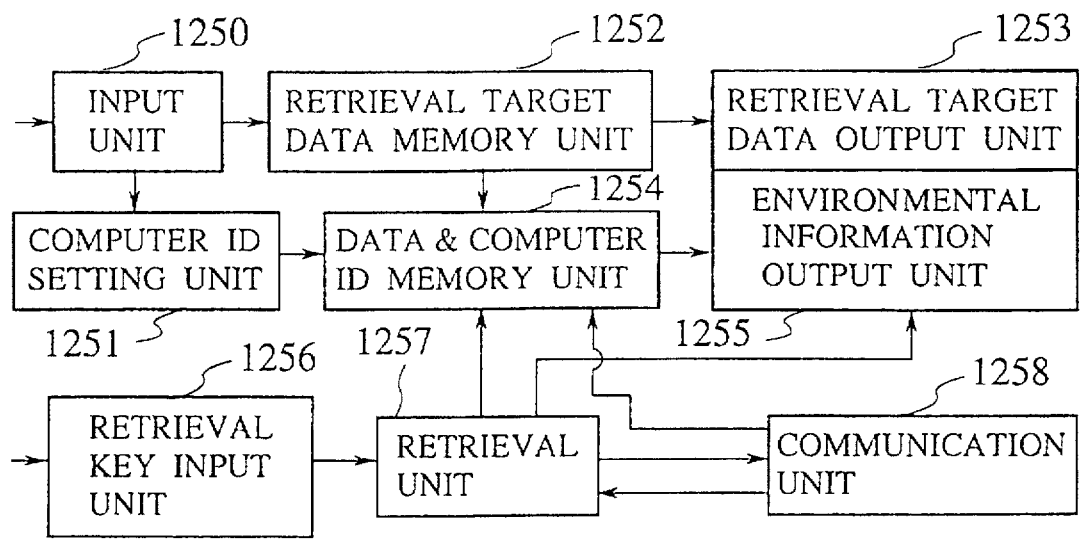
Figure 133:
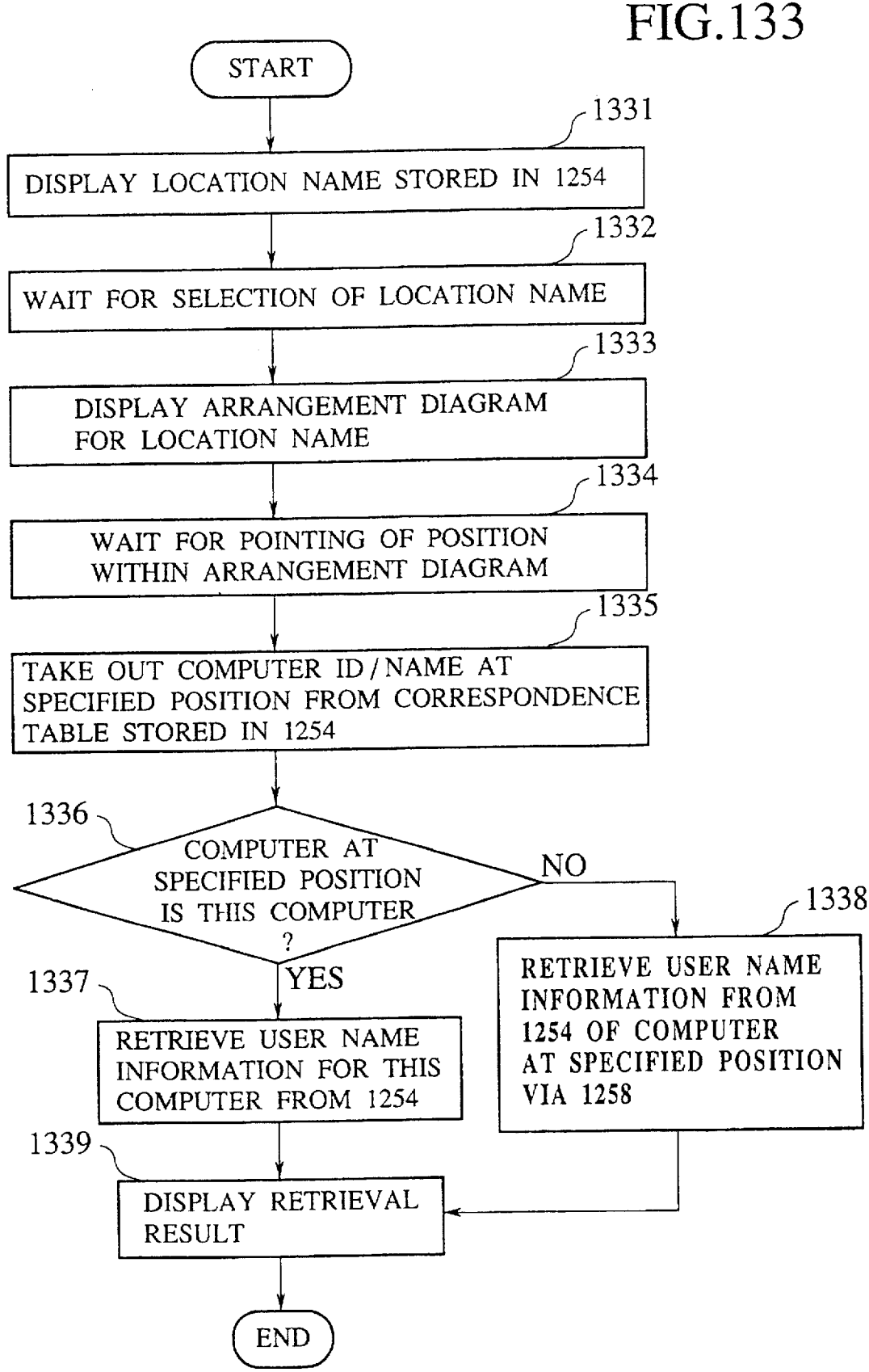

FIG. 133 is a flow chart for another operation of the retrieval unit in the configuration of FIG. 125.

Figures 134, 135:
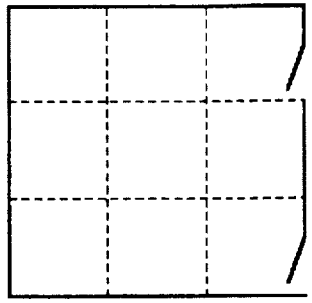

FIG. 134 is an illustration of one display used in the operation of FIG. 133.

FIG. 135 is an illustration of another display used in the operation of FIG. 133.

Figures 136, 137:
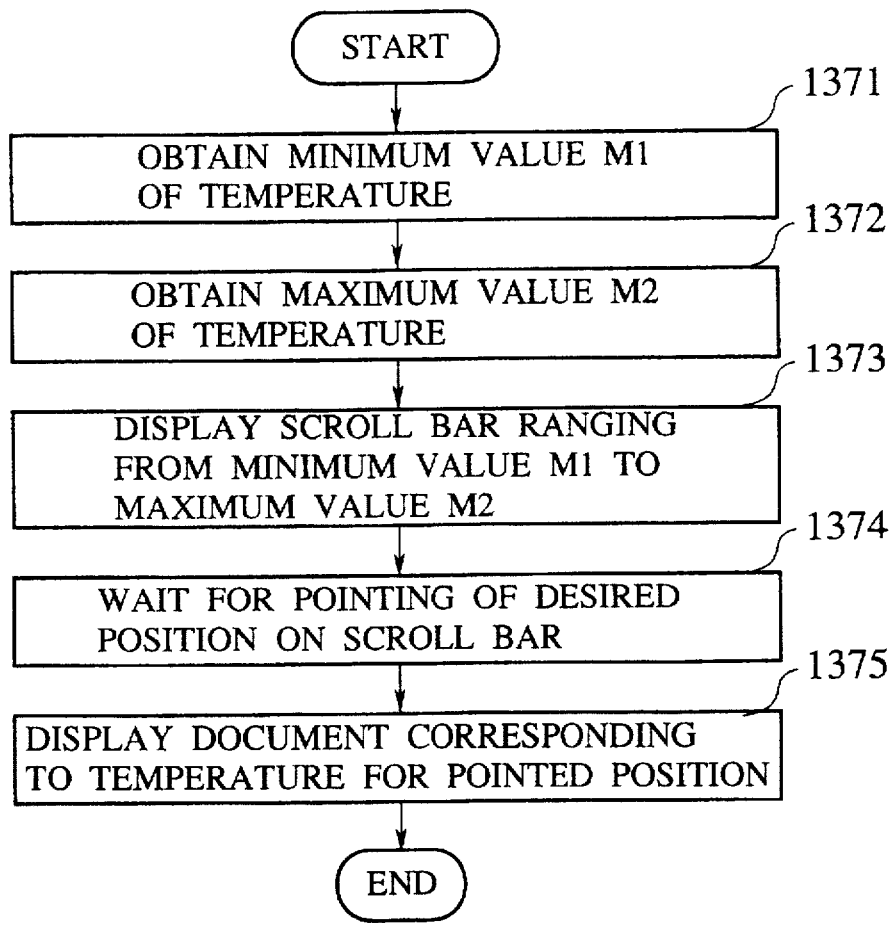

FIG. 136 is a table showing a format and examples of the environmental information used in the fourteenth specific embodiment of the system of FIG. 1.

FIG. 137 is a flow chart for the operation of the environmental information output unit in the configuration of FIG. 125.

Figure 138:
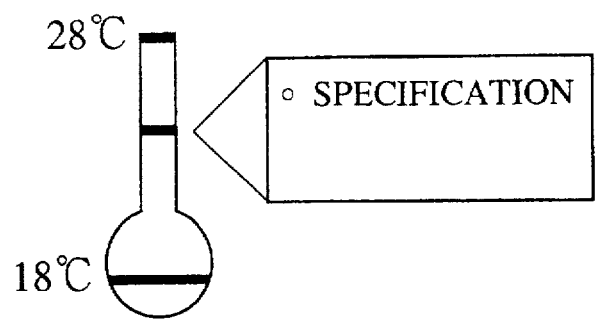

FIG. 138 is an illustration of an exemplary environmental information display used in the fourteenth specific embodiment of the system of FIG. 1.

Figure 139A:
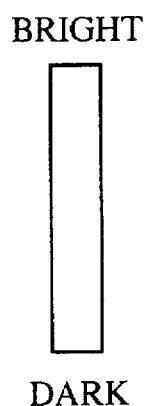
Figure 139B:

FIGS. 139A and 139B are illustrations of another exemplary environmental information displays used in the fourteenth specific embodiment of the system of FIG. 1.

Figure 140:
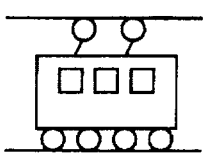

FIG. 140 is an illustration of still another exemplary environmental information display used in the fourteenth specific embodiment of the system of FIG. 1.

Figure 141:
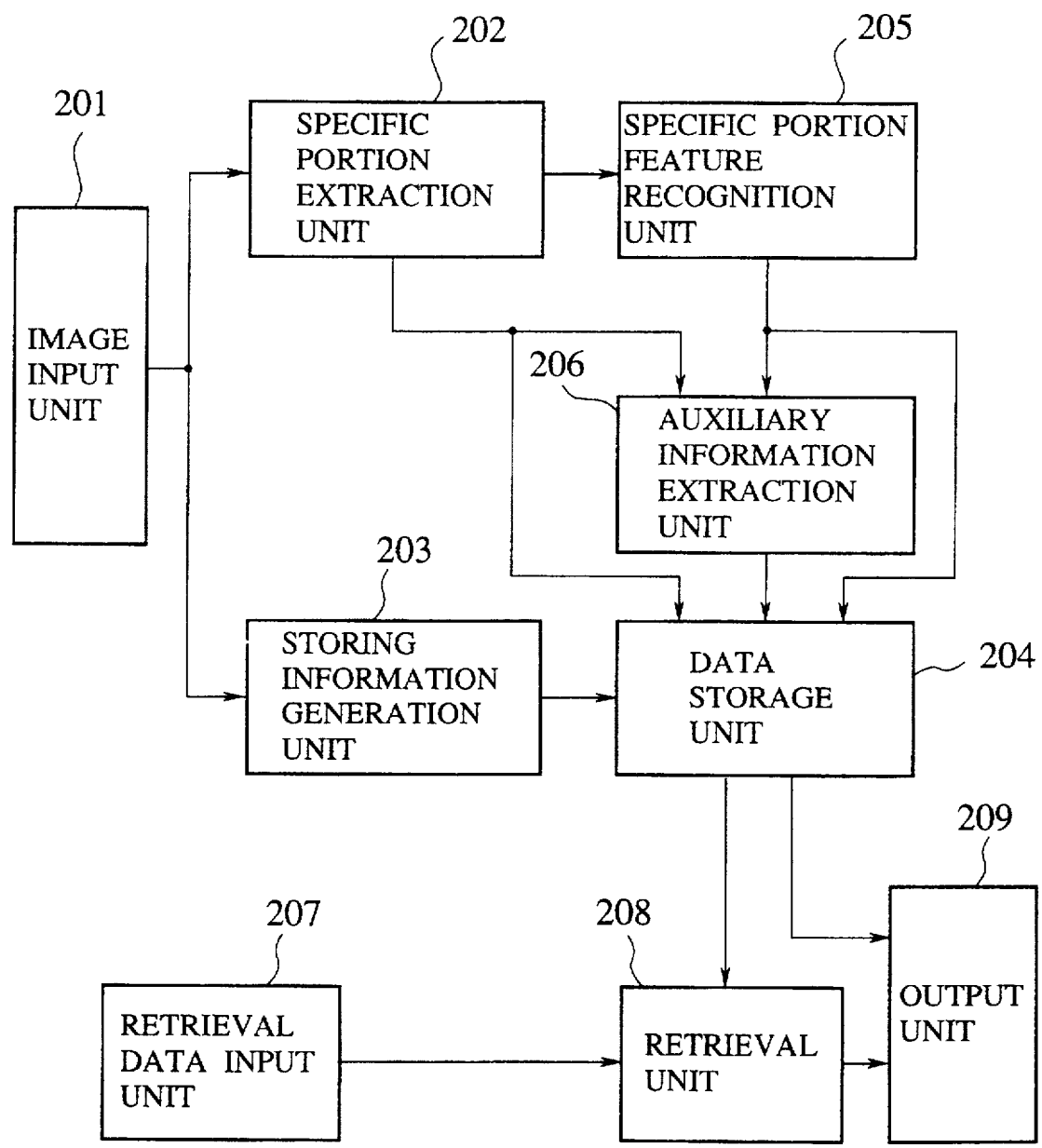

FIG. 141 is a schematic block diagram for a functional configuration of the second general embodiment of the data retrieval system according to the present invention.

Figure 142:
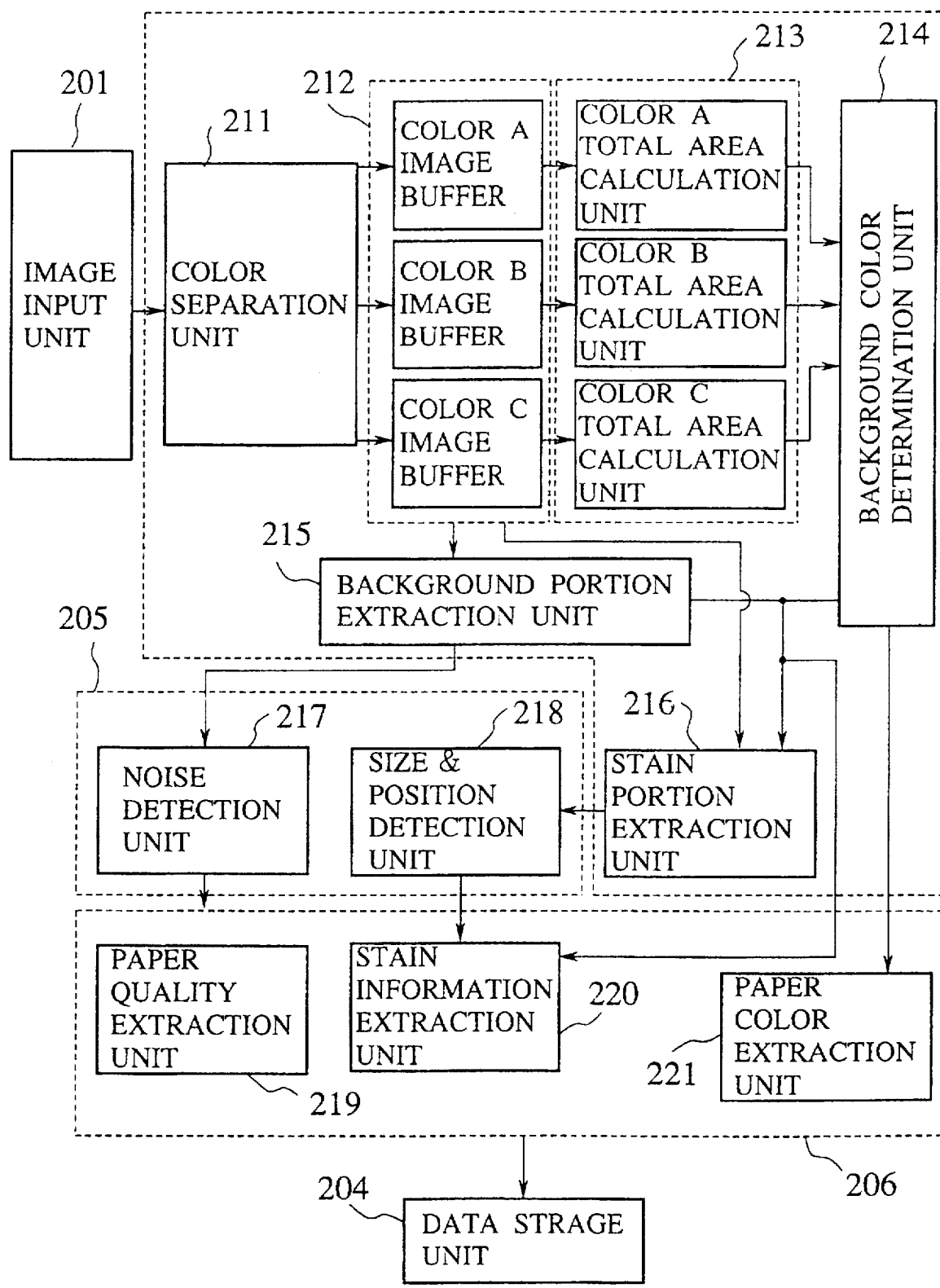

FIG. 142 is a partially detailed block diagram for the configuration of FIG. 141 for a case of extracting background portion.

Figure 143:
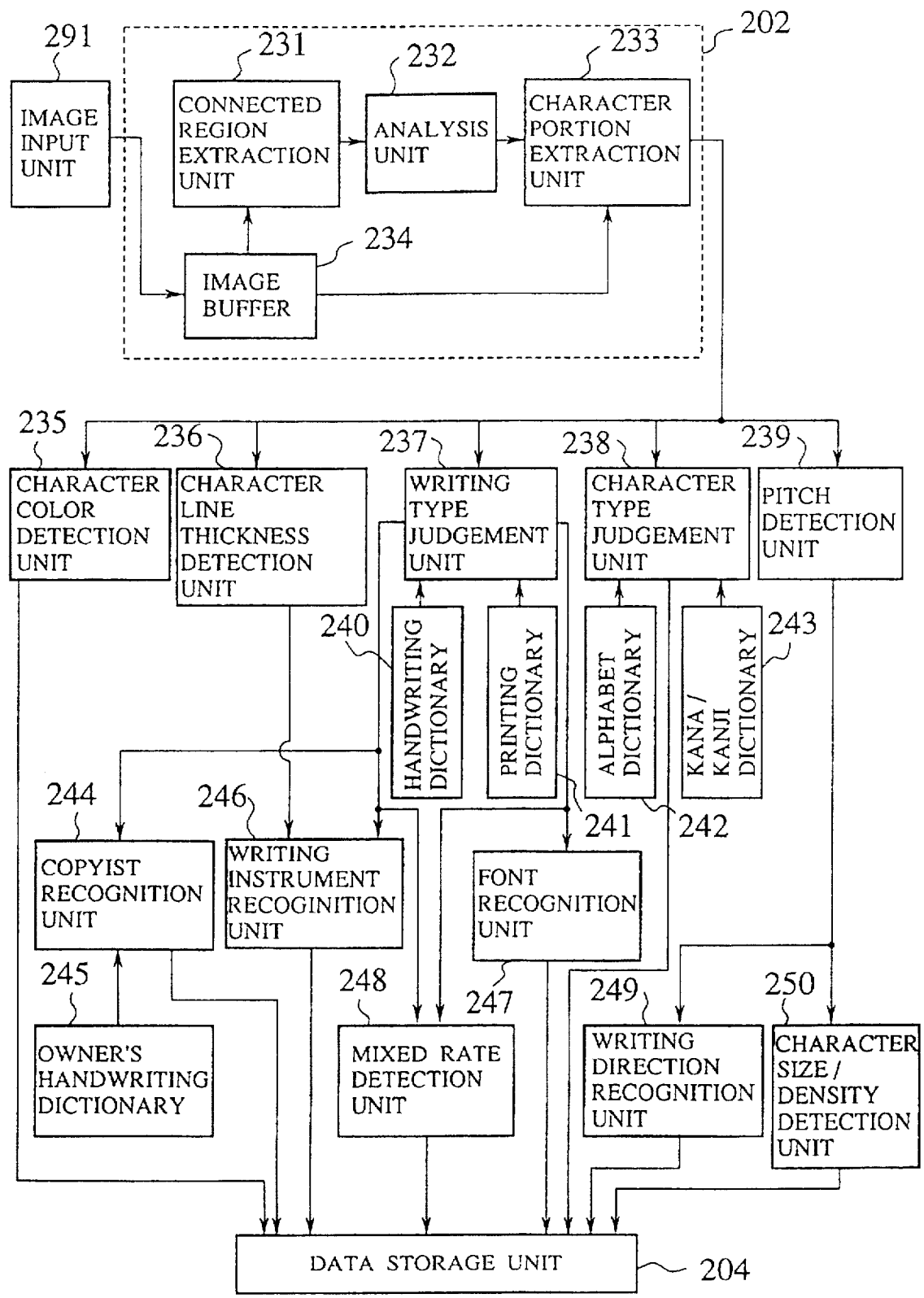

FIG. 143 is a partially detailed block diagram for the configuration of FIG. 141 for a case of extracting character portion.

Figure 144:
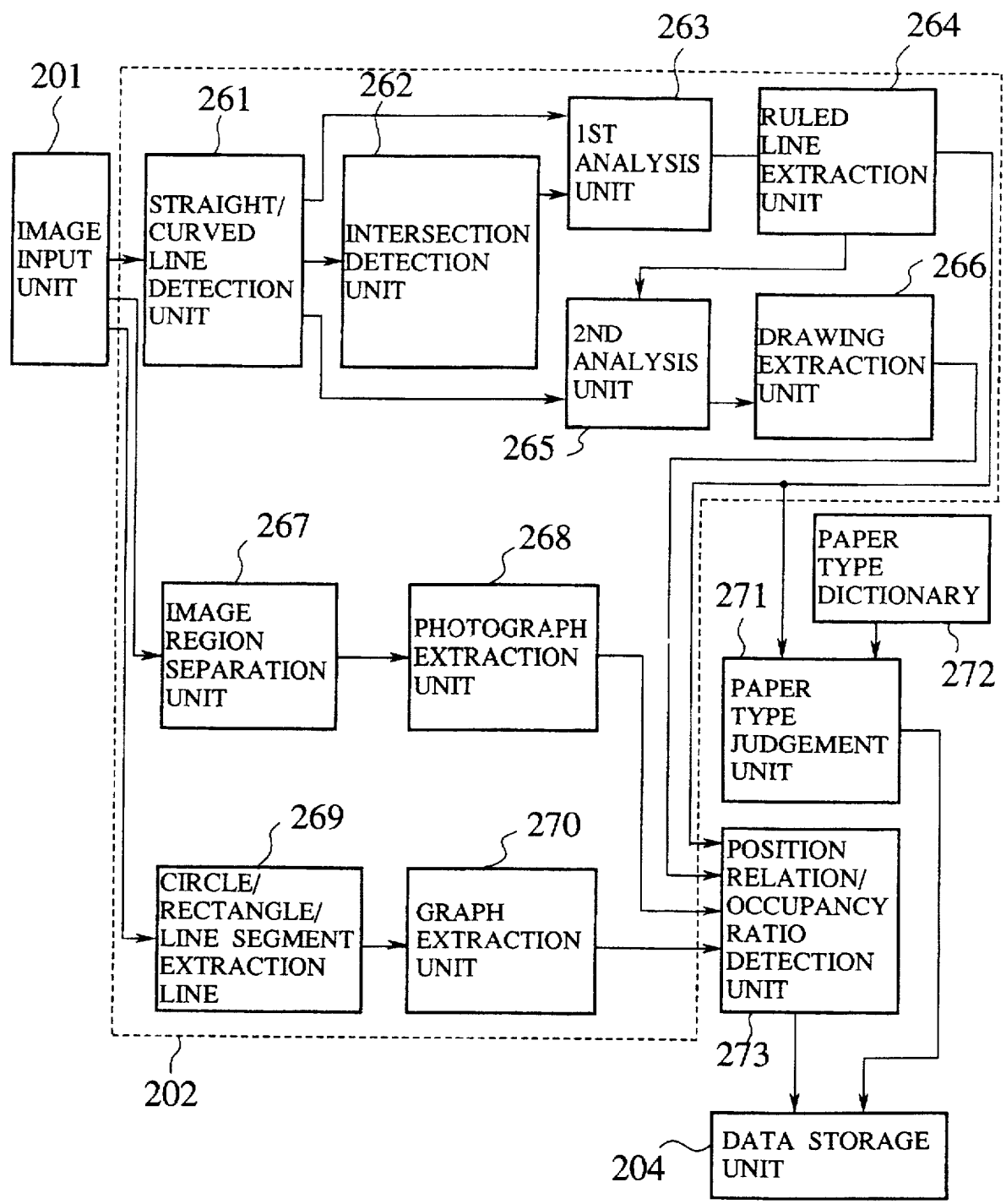

FIG. 144 is a partially detailed block diagram for the configuration of FIG. 141 for a case of extracting specific portion.

FIG. 145 is a table showing an example of data stored in the data storage unit in the configuration of FIG. 141.

Figure 146A:
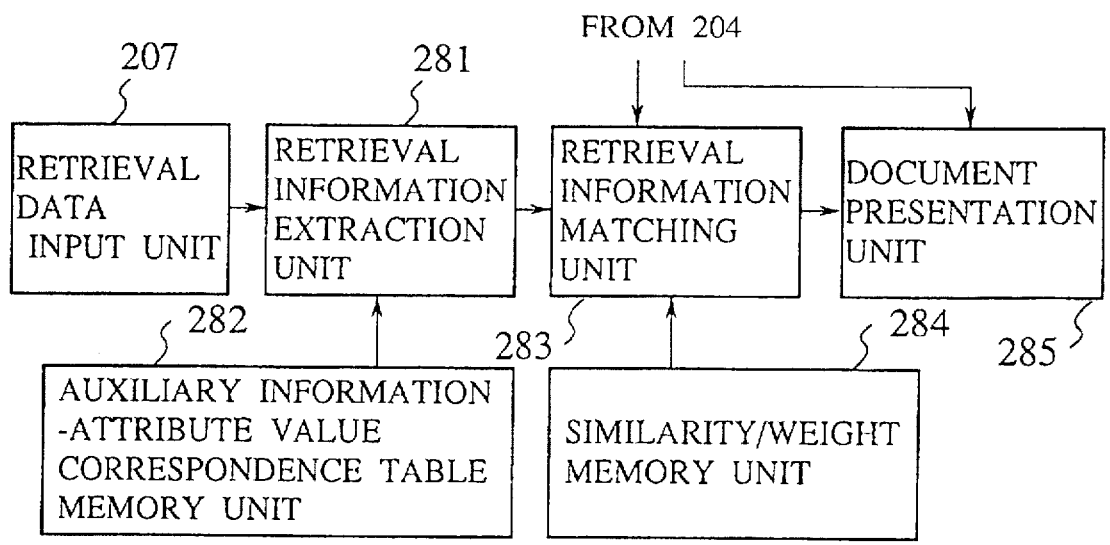
Figure 146B:
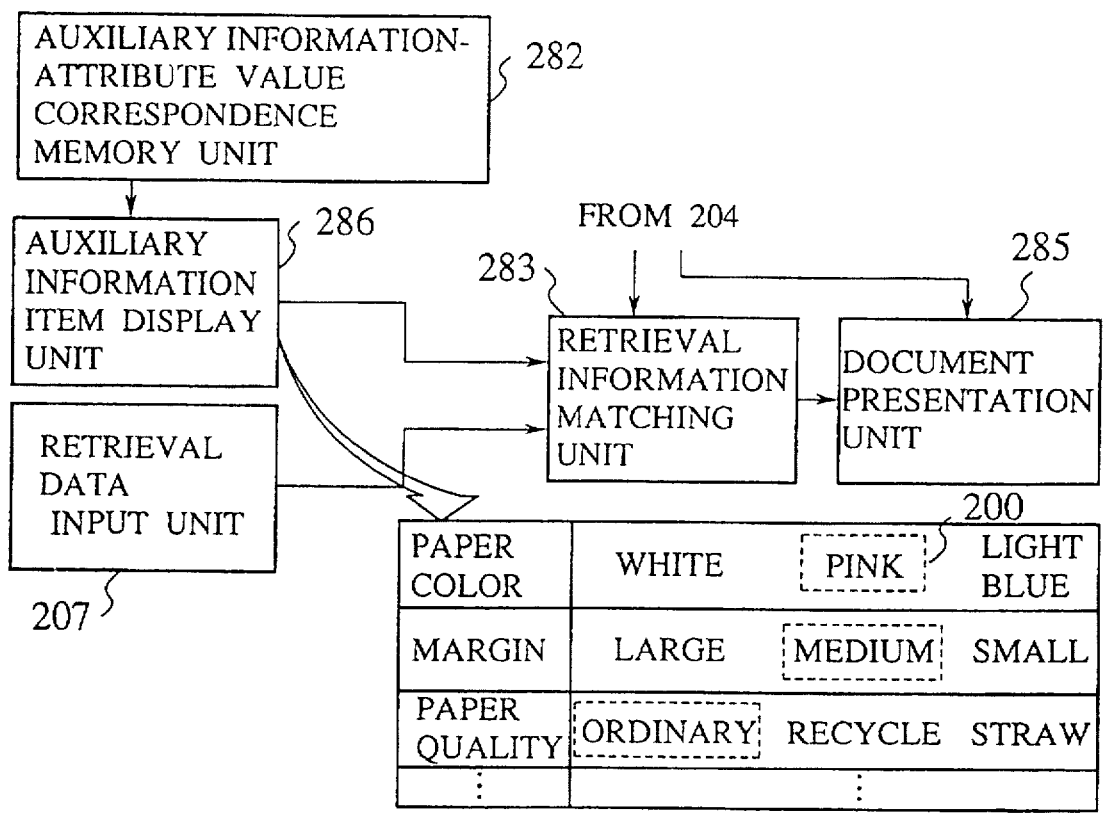

FIGS. 146A and 146B are block diagrams for detailed configurations of the retrieval unit in the configuration of FIG. 141.

Figure 147:
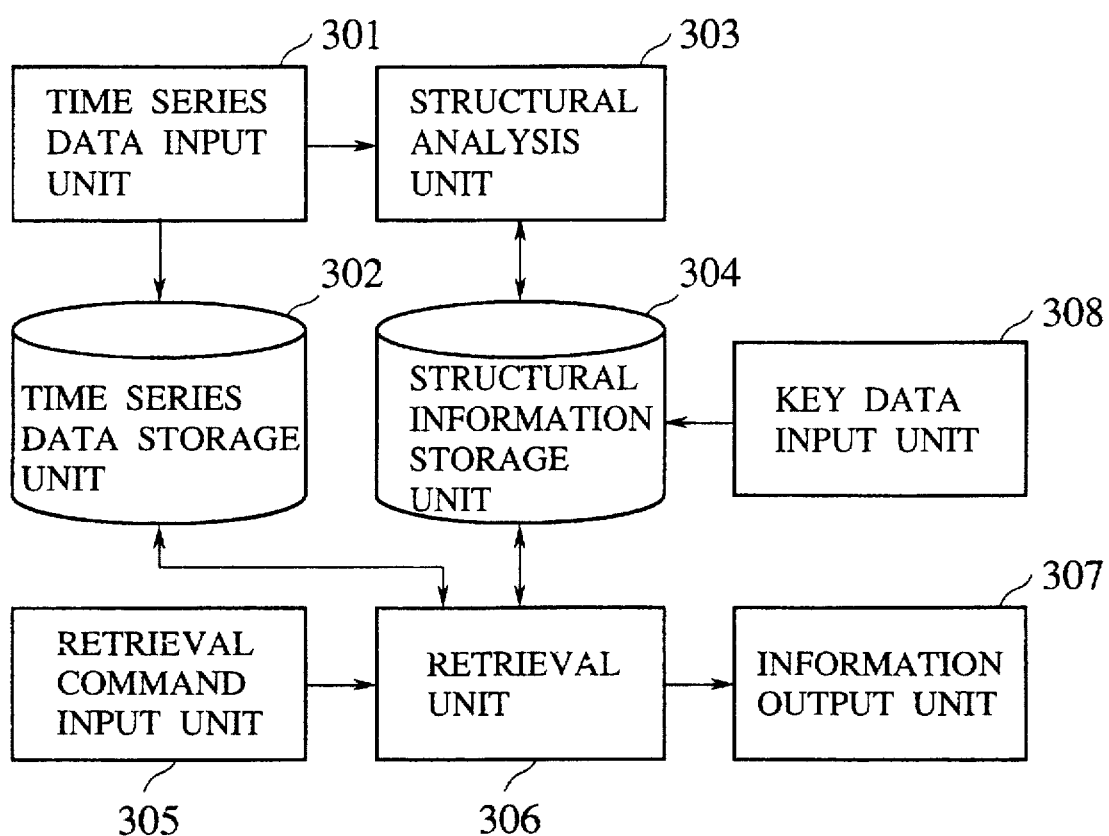

FIG. 147 is a schematic block diagram for a functional configuration of the third general embodiment of the data retrieval system according to the present invention.

Figure 148:
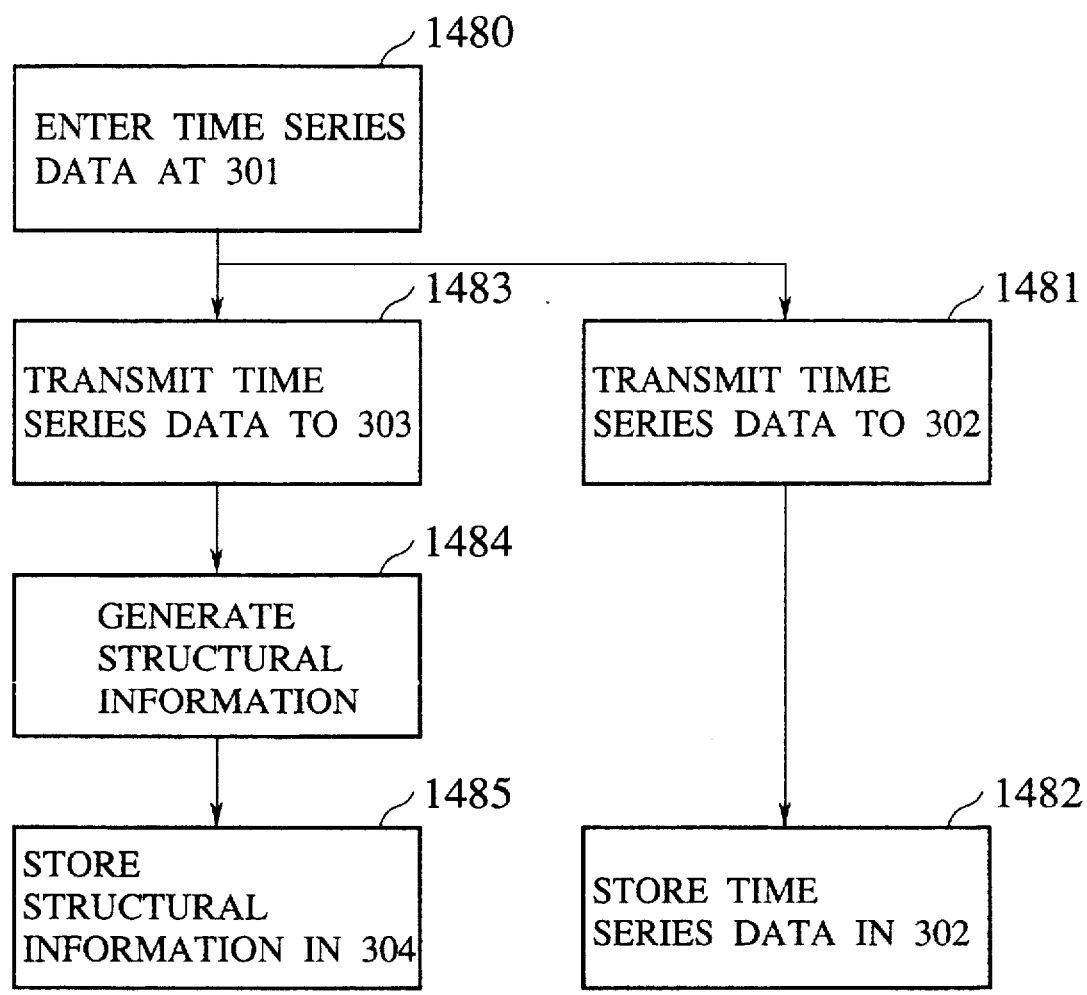

FIG. 148 is a flow chart for the time series data input operation in the system of FIG. 147.

Figure 149:
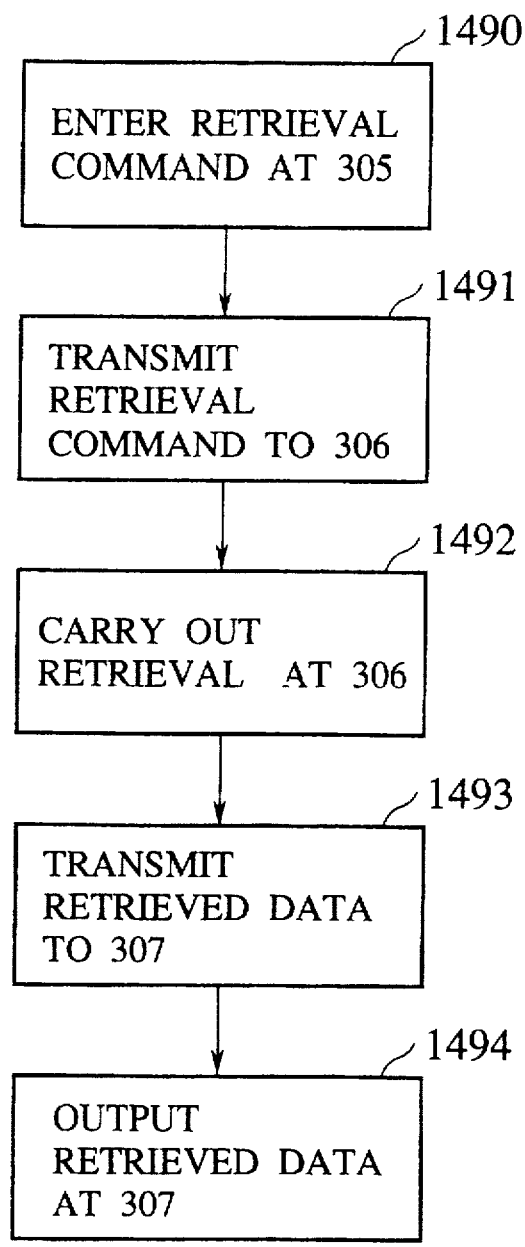

FIG. 149 is a flow chart for the retrieval data output operation in the system of FIG. 147.

Figures 150A, 150B:
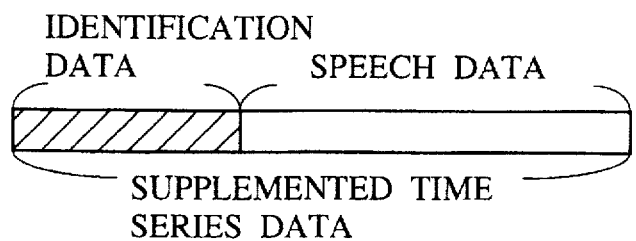

FIGS. 150A and 150B are a diagram and a table showing supplemented time series data used in the system of FIG. 147.

Figures 151A, 151B:
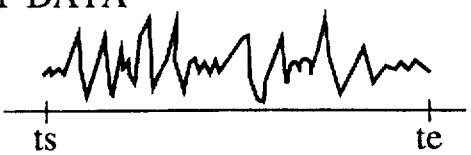

FIGS. 151A and 151B are illustrations of exemplary data formats in the time series data storage unit in the system of FIG. 147.

FIG. 152 is an illustration of an exemplary structural information used in the system of FIG. 147.

FIGS. 153A and 153B are illustrations of exemplary data formats in the structural information storage unit in the system of FIG. 147.

Figure 154:
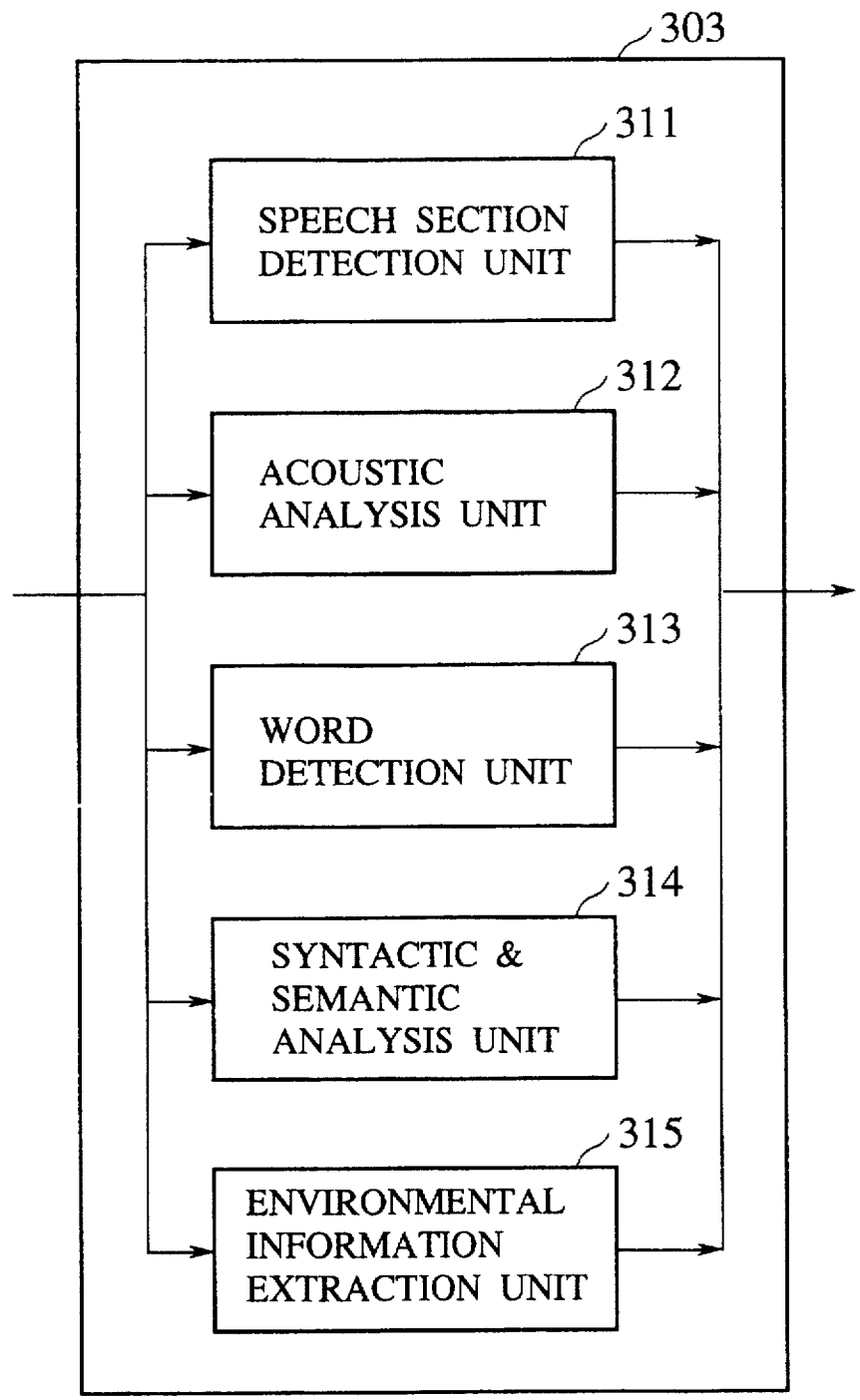

FIG. 154 is a block diagram for a detailed configuration of the structural analysis unit in the system of FIG. 147.

Figures 155, 156:
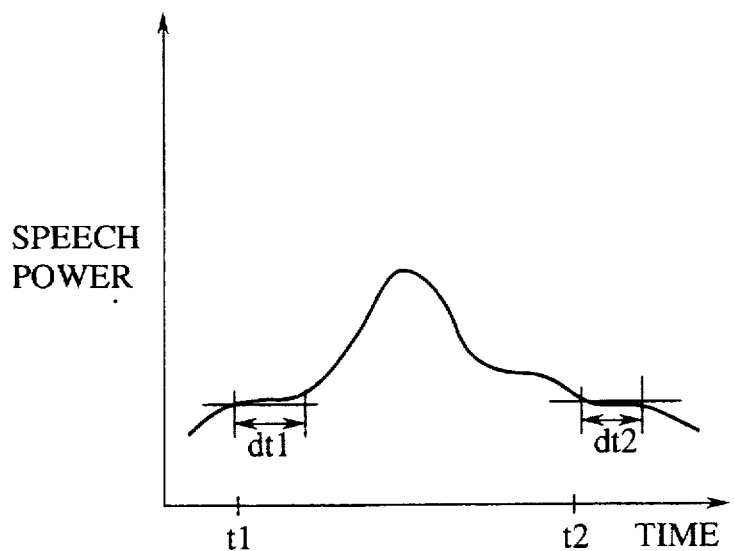

FIG. 155 is a graph of speech power analyzed in the configuration of FIG. 154.

FIG. 156 is an illustration of one exemplary structural information obtained by the configuration of FIG. 154.

FIGS. 157A and 157B are illustrations of another exemplary structural information obtained by the configuration of FIG. 154.

FIG. 158 is an illustration of another exemplary structural information obtained by the configuration of FIG. 154.

FIGS. 159A, 159B, 159C, 159D, and 159E are graphs of exemplary data and its analysis result in the system of FIG. 147.

Figure 160:
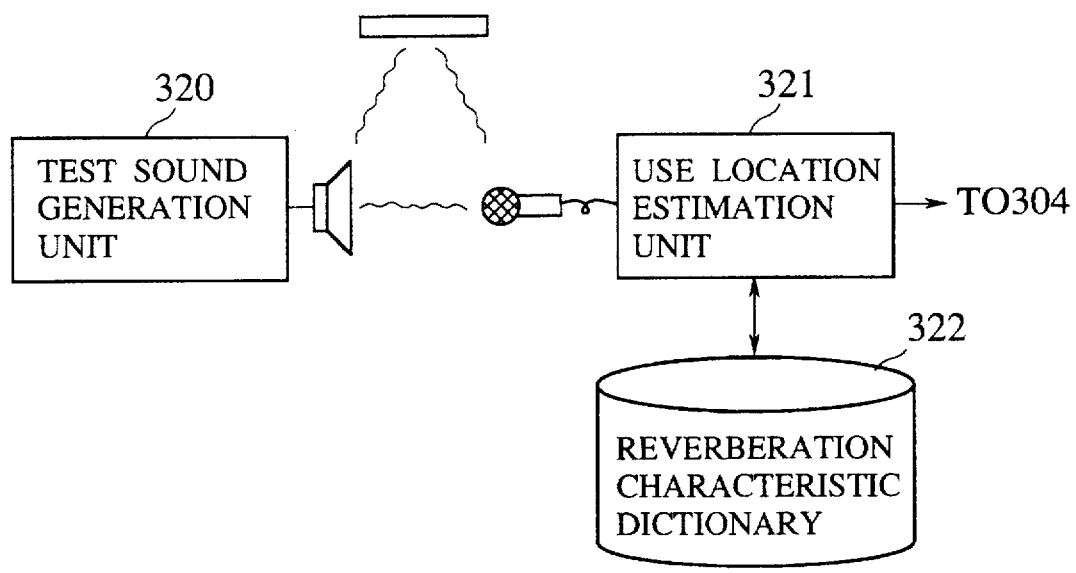

FIG. 160 is a schematic block diagram of a configuration for estimating the location in the system of FIG. 147.

Figure 161:
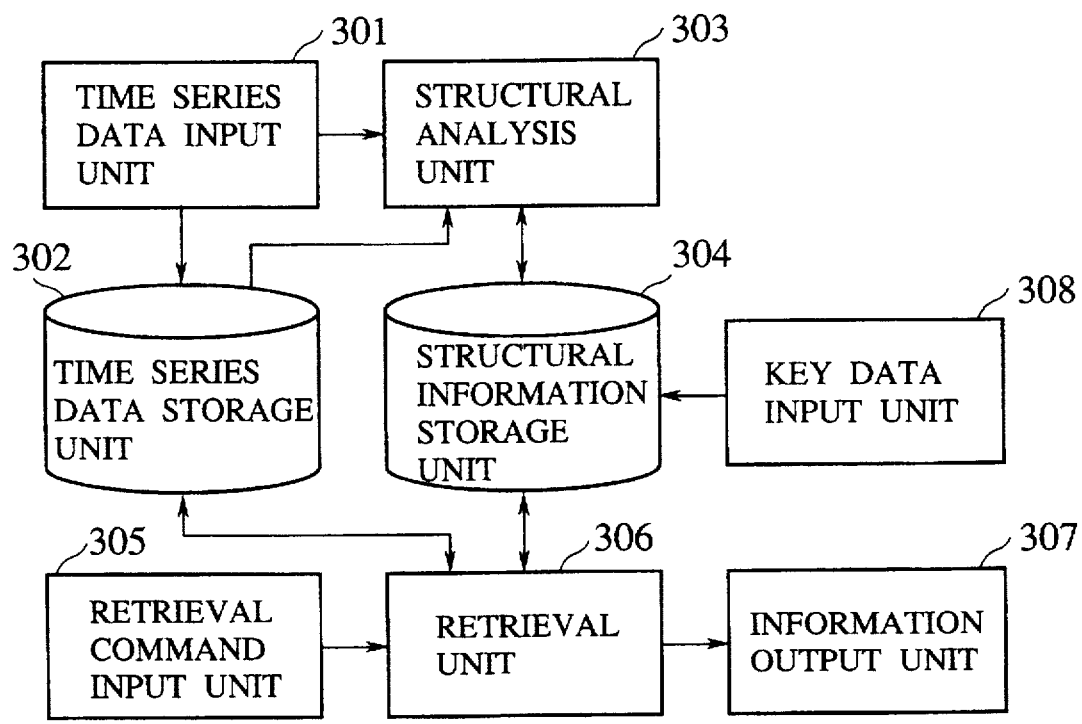

FIG. 161 is a schematic block diagram of a modified configuration for the third general embodiment of the data retrieval system according to the present invention.

Figure 162A:
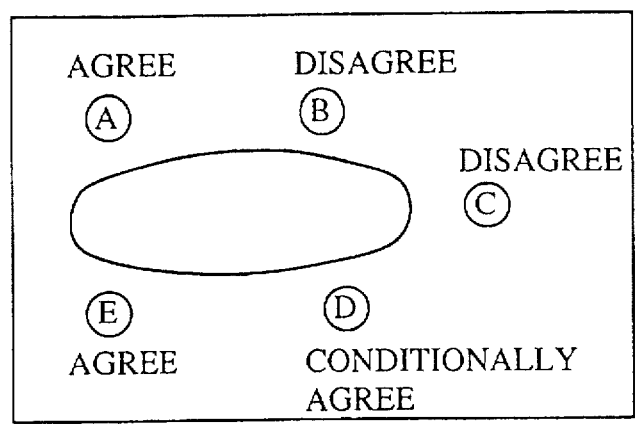
Figure 162B:
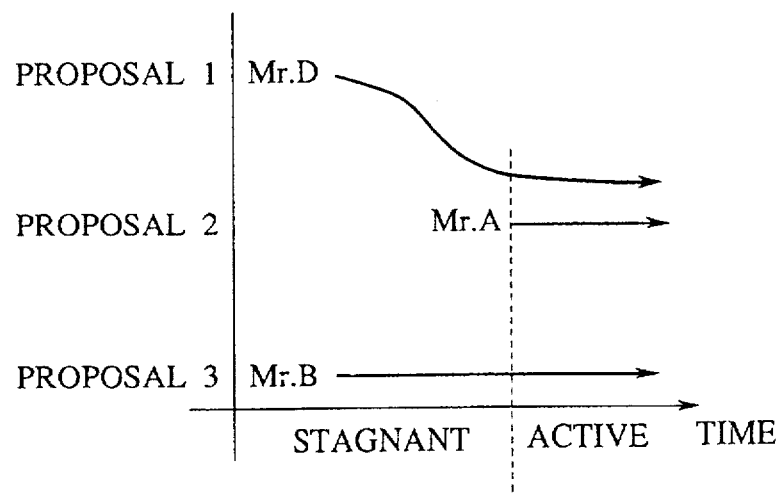

FIGS. 162A and 162B are illustrations of exemplary displays used in the system of FIG. 161.

Figure 163:
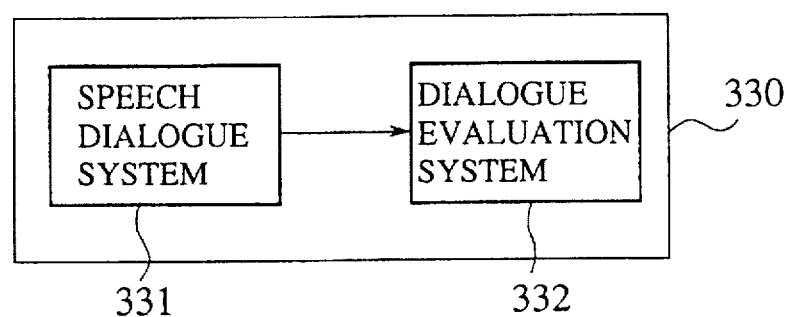

FIG. 163 is a schematic block diagram of a speech dialogue evaluation system utilizing the system of FIG. 147.

FIGS. 164A, 164B and 164C are illustrations of an exemplary output of the speech dialogue system in the configuration of FIG. 163.

Figure 165:
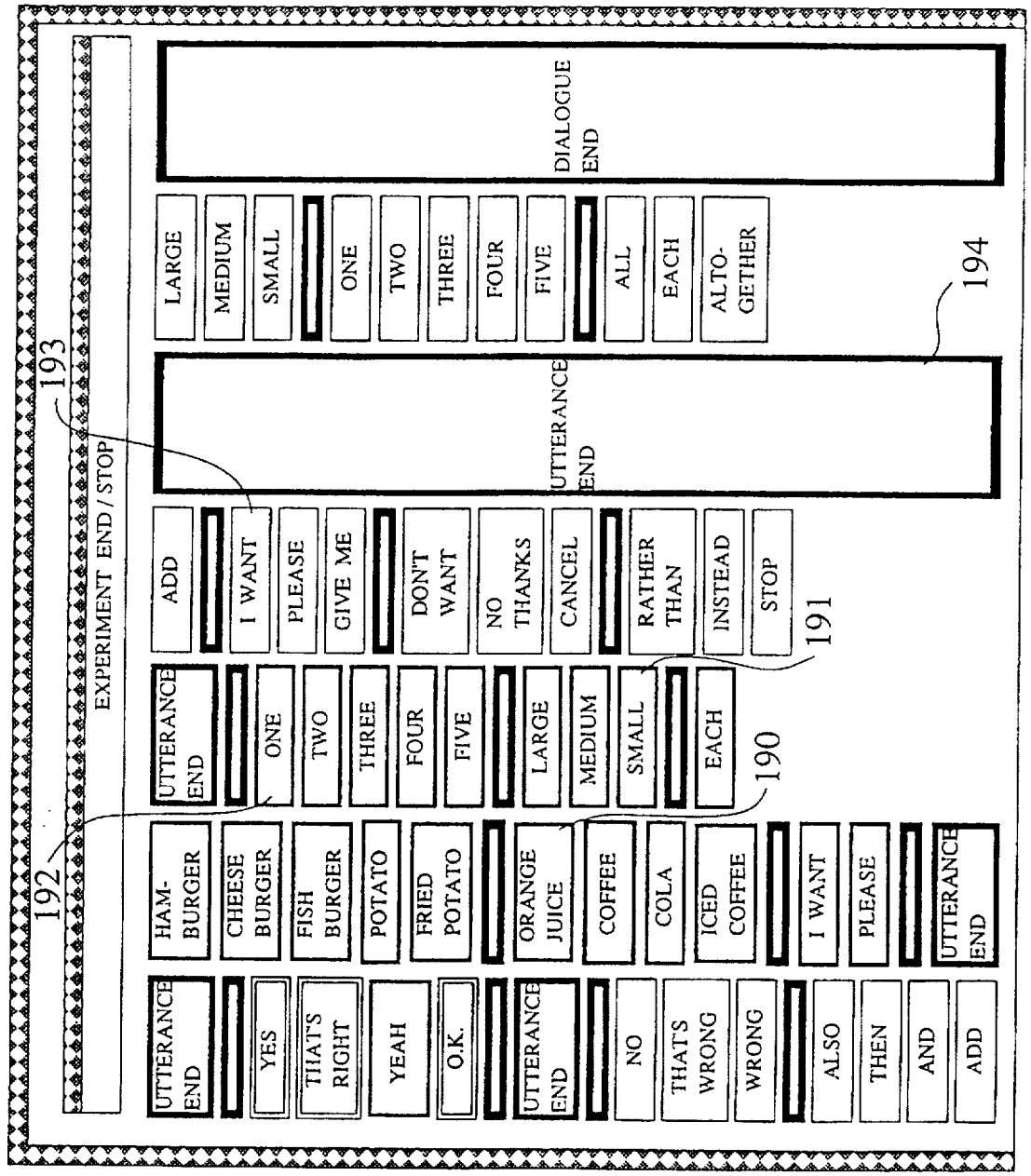

FIG. 165 is an illustration of an exemplary window interface used in the system of FIG. 163.

FIGS. 166A and 166B are illustrations of examples of the structural information obtained in the system of FIG. 163.

Figure 167:
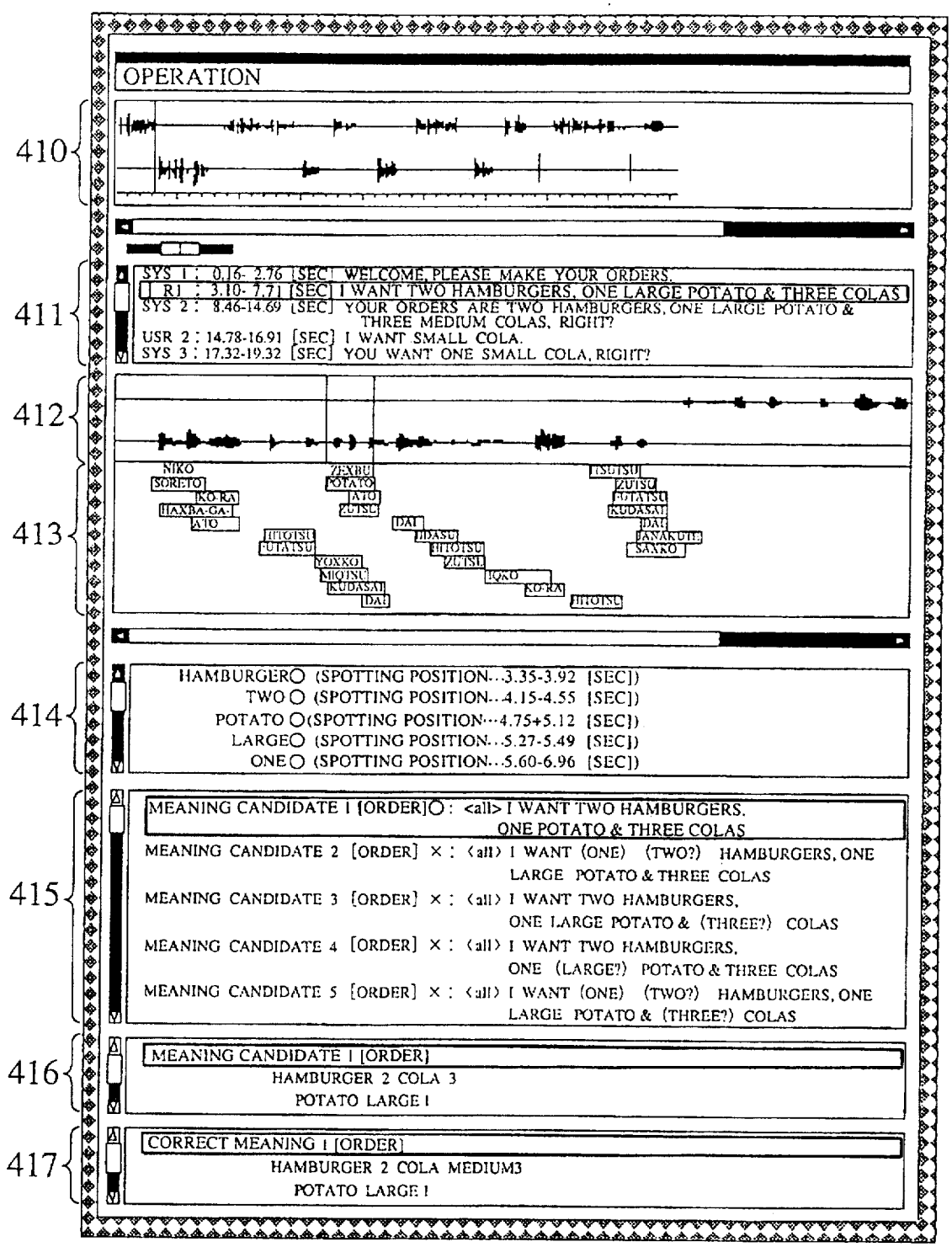

FIG. 167 is an illustration of an exemplary output of the dialogue evaluation system in the configuration of FIG. 163.

DETAILED DESCRIPTION OF THE PREFERRED EMBODIMENTS

First, the basic concepts of the data retrieval system according to the present invention and the definitions of the terms used in the following description of the preferred embodiments will be described.

As represented by a word processor, in many of the present day information related system, the data entered into the system are often re-utilized after the manipulation. However, as a number of data entered into the system increases, there arises a problem that the retrieval of the data to be re-utilized requires a longer time.

In the data retrieval system according to the present invention, at a time of the system use, i.e., at a time of entering the data into the system or at a time of making an access to the data for the purposes of manipulation or editing, the environmental information indicating the situations of the user himself, the system itself, or their surrounding is utilized as the retrieval key for the data to be retrieved, where this environmental information is basically extracted automatically.

Conventionally, in a case of retrieving the necessary data out of many data already entered into the system, when the label consciously assigned to the data by the user such as the data file name is not available or inappropriate, the only available additional retrieval key is a physical label such as a data generation time which can be automatically assigned by the system relatively easily, and in many cases, the judgement of the correspondence between such a physical label and the data to be retrieved has largely relied on the memory of the user.

However, in a usual circumstance in which the data retrieval is required, it is more natural for the human user to relate the data to be retrieved with the situations of the user himself, the system itself, or their surrounding at a time the previous access to that data to be retrieved, such as "around a time at which this and that had happened", "when I was doing this and that", "when I was at so and so" "when I was with so and so", etc., rather than the physical label such as the time, so that the retrieval based on the above described physical label has often been quite inconvenient.

In the data retrieval system according to the present invention, the physical information called environmental analysis target data, which are obtainable from the situations of the user himself, the system itself, or their surrounding at a time of the previous access to the data to be retrieved, are automatically obtained and analyzed to produce the environmental information which is much more convenient to use as the retrieval key, and such an environmental information is stored in relation to the data to be retrieved and provided as the retrieval key whenever the retrieval is required.

Now, the first general embodiment of the data retrieval system according to the present invention will be described in detail.

In this first general embodiment, the system has a basic overall configuration as shown in FIG. 1. Namely, this data retrieval system comprises: a retrieval target data input unit 1 to which the retrieval target data is entered; a retrieval target data memory unit 2 which receives the output of the retrieval target data input unit 1; a retrieval target data output unit 3 which receives the output of the retrieval target data memory unit 2; an environmental analysis target data input unit 4 to which the environmental analysis target data is entered; an environmental information analysis unit 5 which receives the outputs of the retrieval target data input unit 1 and the environmental analysis target data input unit 4; a retrieval key input unit 8 to which a retrieval key is entered; a retrieval unit 9 which receives the output of the retrieval key input unit 8; an environmental information memory unit 6 which receives the outputs of the environmental information analysis unit 5 and the retrieval unit 9; and an environmental information output unit 7 which receives the output of the environmental information memory unit 6.

Here, as summarized in the table shown in FIG. 2, the retrieval target data are the data entered into the system in general. For example, the retrieval target data include the document or data file containing texts and images entered by utilizing the keyboard, mouse, pen, etc., the image data such as still pictures and dynamic pictures entered by utilizing the image scanner or camera, and the acoustic data recorded by the microphone or synthesized electronically, which are entered into the system, stored therein, and made available for the re-utilization by the operations such as editing, manipulation, and looking up.

Figure 3:
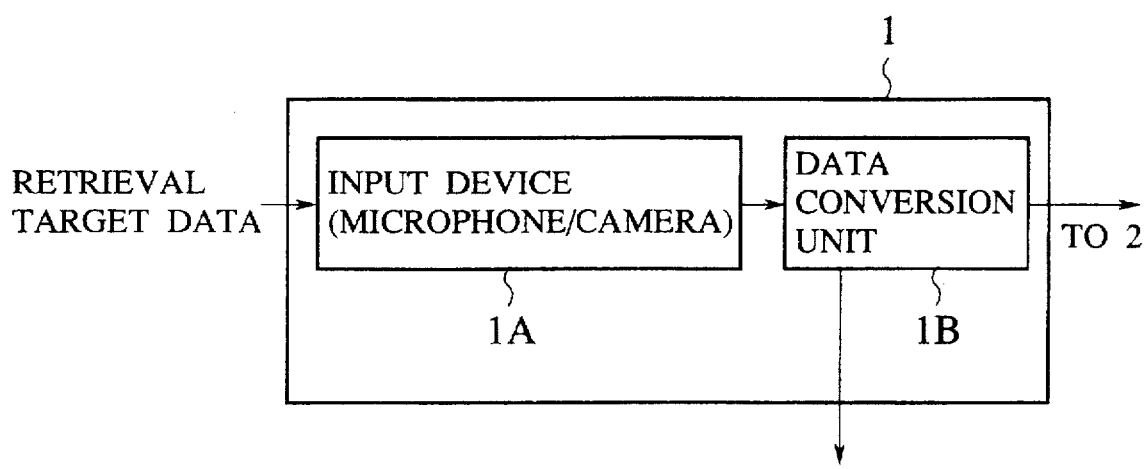
FIG. 3 is a schematic block diagram of a retrieval target data input unit in the system of FIG. 1.

As shown in FIG. 3, the retrieval target data input unit 1 further comprises input devices 1A for entering the retrieval target data such as a microphone, a camera, etc., and a data conversion unit 1B for attaching information related to the input data which will be required by the later analysis, such as a device identifier in a case of using more than one input devices 1A, a quantization bit number, a sampling frequency, etc., for example.

The retrieval target data memory unit 2 stores the retrieval target data entered by the retrieval target data input unit 1.

The retrieval target data output unit 3 takes out the retrieval target data stored in the retrieval target data memory unit 2 and outputs and presents them to the user. Here, the manner of output and presentation depends on the application. In a case of dealing with the document or image data, it is appropriate to provide means for displaying and printing, while in a case of dealing with the acoustic data, it is appropriate to provide means for realizing the acoustic reproduction and output such as a loudspeaker.

Also, as summarized in the table shown in FIG. 2, the environmental analysis target data are the source data from which the environmental information is extracted by the analysis, and which are entered into the system automatically at a time of the system use by the user.

For example, the environmental analysis target data can include the history of the input operation utilizing the keyboard, mouse, pen, etc., the image data such as the still pictures and the dynamic pictures entered by utilizing the scanner, camera, etc., the acoustic data recorded by the microphone or synthesized electronically, the position measurement data obtained by utilizing the position measurement device such as GPS (Global Positioning System) and magnetic sensor, and the data indicative of the external situation and the user's behavior at a time of the system use such as the measurement data obtained by the temperature, humidity, and pressure sensors, and the user's health condition measurement data such as the pulse, blood pressure, body temperature, blood sugar level, etc.

In addition, the environmental analysis target data may also include the input entered by the user at a time of the system use without an intention of being used for the retrieval. For example, as the workstation is usually used by a plurality of users, there is a need to enter the user name at a beginning of the system use, and this reveals the user ID according to which who has been using the system can be determined. Also, as the identifier of the computer connected through the network is acquired, it is possible to determine which system has been used. In a case the location of the system is fixed, it is also possible to determine where the system has been used. Similarly, who entered the data where can be determined by analyzing the input data other than the retrieval target data such as the schedule and the other documents. It is also possible to utilize the retrieval target data as the environmental analysis target data.

Figure 4:
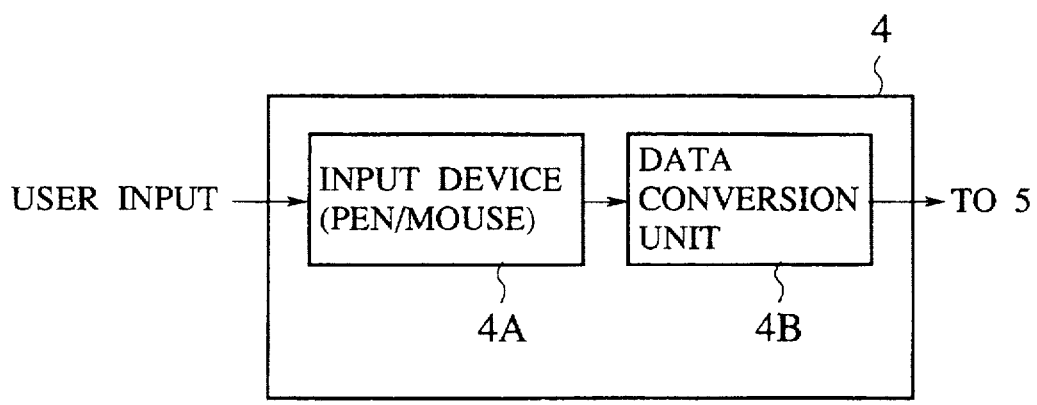
FIG. 4 is a schematic block diagram of an environmental analysis target data input unit in the system of FIG. 1.

As shown in FIG. 4, the environmental analysis target data input unit 4 further comprises input devices 4A for entering the environmental analysis target data such as a pen, mouse, etc., and a data conversion unit 4B for attaching information related to the input data which will be required by the later analysis.

The environmental analysis target data is associated with the correspondence information indicating to which retrieval target data this environmental analysis target data corresponds. For example, when the retrieval target data is the time series data, the input time of the retrieval target data can be utilized for this correspondence information. Namely, by attaching an input time to each of the retrieval target data and the environmental analysis target data, it becomes possible to make a correspondence between them according to the attached time information.

Also, in a case the retrieval target data is either invariable or varying very slightly in time, or else the environmental analysis target data is invariable or varying very slightly in time, an identifier can be attached to each data such that it can be utilized as the correspondence information. Namely, by attaching a data identifier to each of the retrieval target data and the environmental analysis target data, it becomes possible to identify the corresponding data according to the data identifiers.

From this environmental analysis target data, the environmental information can be obtained by the analysis such as the extraction of the utterance content by the speech recognition, the distinction of the system use location by the acoustic characteristic, the identification of the speaker by the speaker recognition, the identification of the system use location by the image recognition, the layout analysis of the document data, and the analysis of the schedule or the data access information, for example.

Such an analysis is carried out at the environmental information analysis unit 5. Here, the actual analysis to be carried out depends on the form of the environmental analysis target data, and the higher level environmental information may be obtained by analyzing a plurality of analysis results and structuring them. The concrete details of the analysis of the environmental analysis target data and the resulting environmental information will be described in conjunction with the specific embodiments below.

It is preferable for this analysis to be carried out automatically at a time of the system use, but in a case the analysis processing is complicated and the real time processing cannot be guaranteed, the analysis may be carried out while the user is not using the system.

Also, in a case the user wishes to correct the errors in the automatically obtained analysis result or add the environmental information intentionally, it is possible to enable the user to make the manual correction and addition on the analysis result.

Similarly to the environmental analysis target data which is associated with the correspondence information as described above, the environmental information is also associated with the correspondence information indicating from which environmental analysis target data this environmental information has been obtained by the analysis. Here, this correspondence information may be that which makes the correspondence between the retrieval target data and the environmental information instead. Just as the correspondence information between the retrieval target data and the environmental analysis target data, this correspondence information associated with the environmental information can be given by the input time of the retrieval data in a case the data change in time is significant, or by the data identifier in a case the data change in time is insignificant.

Also, in a case the obtained environmental information corresponds to a part of the retrieval target data or the environmental analysis target data, by attaching the correspondence information indicating which part of the whole it is corresponding to, it becomes possible to carry out the retrieval more easily and accurately.

By tracing the correspondence information among the environmental information, the environmental analysis target data, and the retrieval target data, it becomes possible to carry out the retrieval of the retrieval target data by using the environmental information as the retrieval key.

In addition, the environmental information may also be attached with the information indicating by what kind of analysis it has been obtained, or under what likelihood it has been obtained. In such a case, such an additional information can be utilized for judging which environmental information among those obtained by a plurality of analysis methods is most reliable.

Here, as summarized in the table shown in FIG. 2, the environmental information is the information related to the user himself or his surrounding situation (time, location), at a time the user inputs, edits, retrieves, or outputs the retrieval target data by using the system, which is not just simple physical time and location, but the structured information meaningful to the user in carrying out the retrieval, such as "location at which the user was present at a certain time", "time in which the user was at a certain location", "location and time at which the user was doing a certain thing", "location and time at which the user was in a certain state", "location and time at which the user was with a certain person", etc. For example, the environmental information is related to a time at which the user was with somebody, a time at which the user attended the conference, a time at which the user was in a train to the company, a location of the living room of the user's home, etc. By linking such an environmental information with the retrieval target data, it becomes possible to search out the retrieval target data required by the user easily, using the environmental information as the retrieval key.

Each environmental information can be made easier to recognize for the user in a case of presenting the content of the environmental information to the user, by attaching the identifier in accordance with the topic obtained by the analysis to the concrete analysis result. For example, such an identifier to be attached may include "who entered the retrieval target data", "where the retrieval target data had entered", "how the retrieval target data had entered", "why the retrieval target data had entered", etc.

Such an environmental information is obtained by analyzing the physical data such as the sounds automatically taken while the user uses the system, the signals such as the video signals, and the measurement values for position, etc. Here, the data which are the target of the analysis for obtaining the environmental information are referred as the environmental analysis target data as summarized in the table shown in FIG. 2.

The environmental information analysis unit 5 analyzes and structures the environmental analysis target data entered into the system through the environmental analysis target data input unit 4, to generate the environmental information.

The environmental information memory unit 6 stores the environmental information containing the analysis result as well as its structural information, obtained by the environmental information analysis unit 5.

The environmental information output unit 7 outputs the environmental information containing the analysis result as well as its structural information, stored in the environmental information memory unit 6.

The retrieval key input unit 8 includes an input device such as a keyboard, a touch panel, a pen, and a mouse for admitting the input from the user, and an environmental information conversion unit for converting the input from the user into the desired environmental information to be retrieved.

The retrieval unit 9 retrieves the environmental information specified by the user at the retrieval key input unit 8 from the environmental information memory unit 6, and takes out the retrieval target data linked with that environmental information.

In addition, the retrieval unit 9 is also capable of tracing the environmental information and the structural information stored in the environmental information memory unit 6 to obtain the related environmental information.

In contrast to the above described data retrieval system according to the present invention, the conventional word processor, electronic publishing system, or input/output application for multi-media data such as sound and video recording system is only realizing the function to control the input/output and storing of the retrieval target data, as it is only equipped with the equivalents of the retrieval target data input unit 1, the retrieval target data memory unit 2, and the retrieval target data output unit 3 in the configuration of FIG. 1.

On the other hand, the present invention provides the framework for searching out the retrieval target data by utilizing the environmental information indicating the situation of the user and the surrounding at a time the user was manipulating the retrieval target data on the system, by linking the environmental information with the retrieval target data. In particular, it is characterized in that the generation of the environmental information is made automatically by the system in principle.

Now, further details of the individual operations involved in this data retrieval system according to the present invention will be described.

<Input of data from the input device>

The input device 1A or 4A of the retrieval target data input unit 1 or the environmental analysis target data input unit 4 enters the continuous data such as the acoustic media or video media, the relative position data of the input device and the system indicating the pointing position, and the absolute position data of the system itself obtained by utilizing the position measurement system, etc. into the system.

The data conversion unit 1B or 4B of the retrieval target data input unit 1 or the environmental analysis target data input unit 4 converts the input data into a format suitable for handling within the system. For example, the continuous data are stored and processed in a discretized and quantized format. Here, the discretized and quantized retrieval target data and environmental analysis target data are attached with the discretization and quantization information as well. The discretization and quantization information will be utilized at a time of reproducing and outputting a part or a whole of the retrieval target data. In the following, the retrieval target data and the environmental analysis target data referred within the context of this data retrieval system are assumed to be the converted ones.

<Handling of time information as the environmental analysis target data>

When the operations with respect to the retrieval target data such as input, editing, retrieval, and output are regarded as events, the occurrence time of each event can be utilized as the analysis target for obtaining the environmental information related to the retrieval target data. Namely, the event occurrence time series such as the time information indicating the times at which the retrieval target data are entered into the system can be handled as the environmental analysis target data. This time information can provide the records as to when the retrieval target data has been operated, or when each part of the retrieval target data has been operated.

Similarly, for the environmental analysis target data, the time information indicating its input time can be handled as the environmental analysis target data.

By providing the time information for each input data in this manner, it becomes possible to make the timewise correspondences among the data. Thus, the time information can be utilized in establishing the timewise link between the retrieval data or its part and the environmental analysis target data, or the timewise link between the operation event with respect to the retrieval target data and the environmental analysis target data.

<Storing of the retrieval target data and the environmental analysis target data>

The retrieval target data memory unit 2 and the environmental analysis target data memory unit 6 store the retrieval target data and the environmental analysis target data, respectively, in association with the additional information such as the discretization and quantization information.

Here, the main body of the retrieval target data or the environmental analysis target data may be linked with the additional information, if desired. Alternatively, in view of the fact that the main body of the retrieval target data or the environmental analysis target data usually requires a large memory capacity while the additional information is often commonly shared among the input devices or input data, each of the retrieval target data or the environmental analysis target data may be provided with a frame having a pointer for pointing the main body of the data and a pointer for pointing the additional information or the main body of the additional information.

<Timing for environmental analysis at the environmental information analysis unit 5>

The environmental information analysis unit 5 obtains the environmental information by analyzing the environmental analysis target data, using the processing such as the parameter extraction and the pattern recognition and comprehension.

Figure 5:
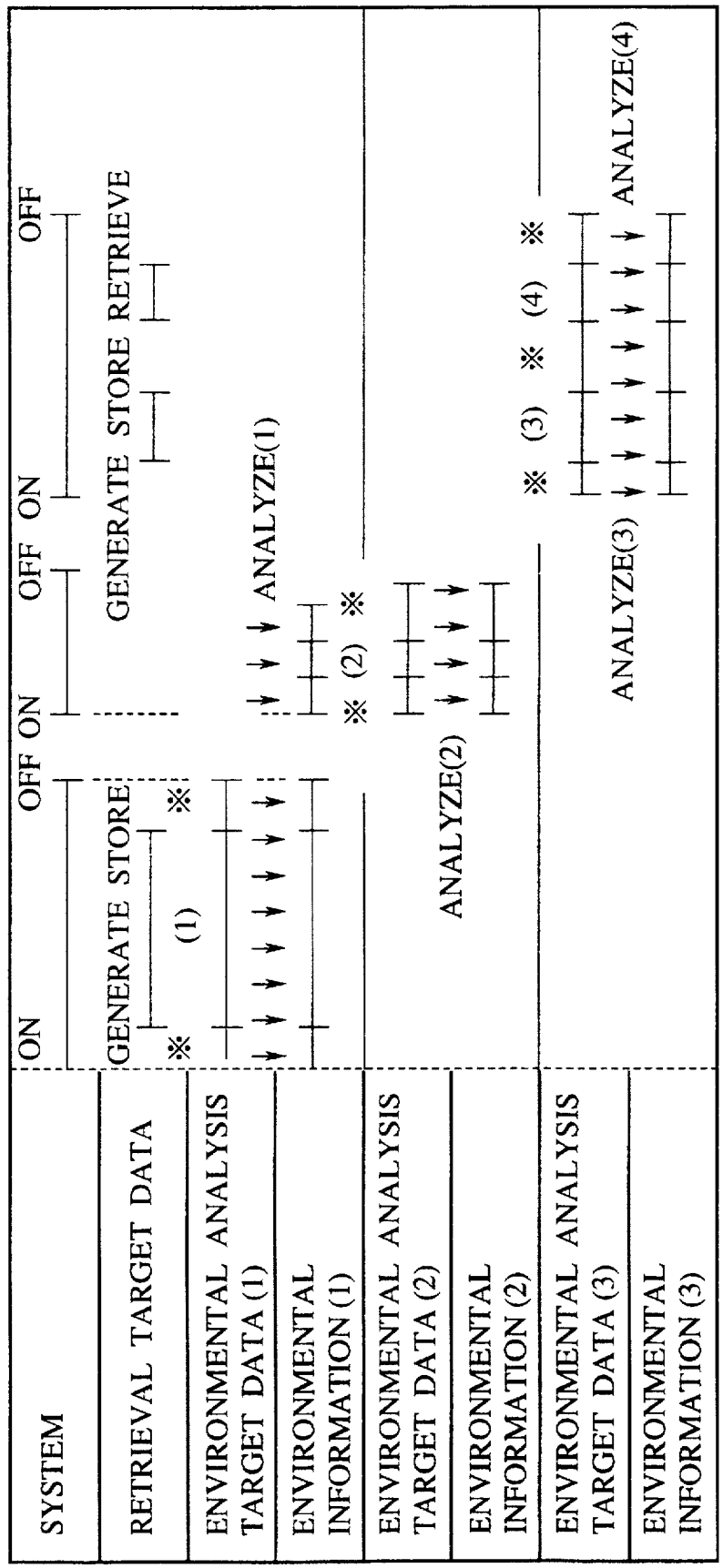
FIG. 5 is a timing chart showing timings for analysis of the environmental analysis target data used in the system of FIG. 1.

Here, as indicated in FIG. 5, the analysis of the environmental analysis target data is carried out automatically when the environmental analysis target data are entered. As already mentioned, the environmental analysis target data are entered whenever the user has been manipulating the retrieval target data on the system, so that the analysis is going to be carried out throughout the period in which the user is using the system.

<Analysis of the environmental information at the environmental information analysis unit 5>

The information obtained by the environmental information analysis unit 5 through the extraction or the recognition and comprehension processing is the information indicating the situation of the user himself and his surrounding at a time the user is using the system either directly or indirectly.

Figure 6:
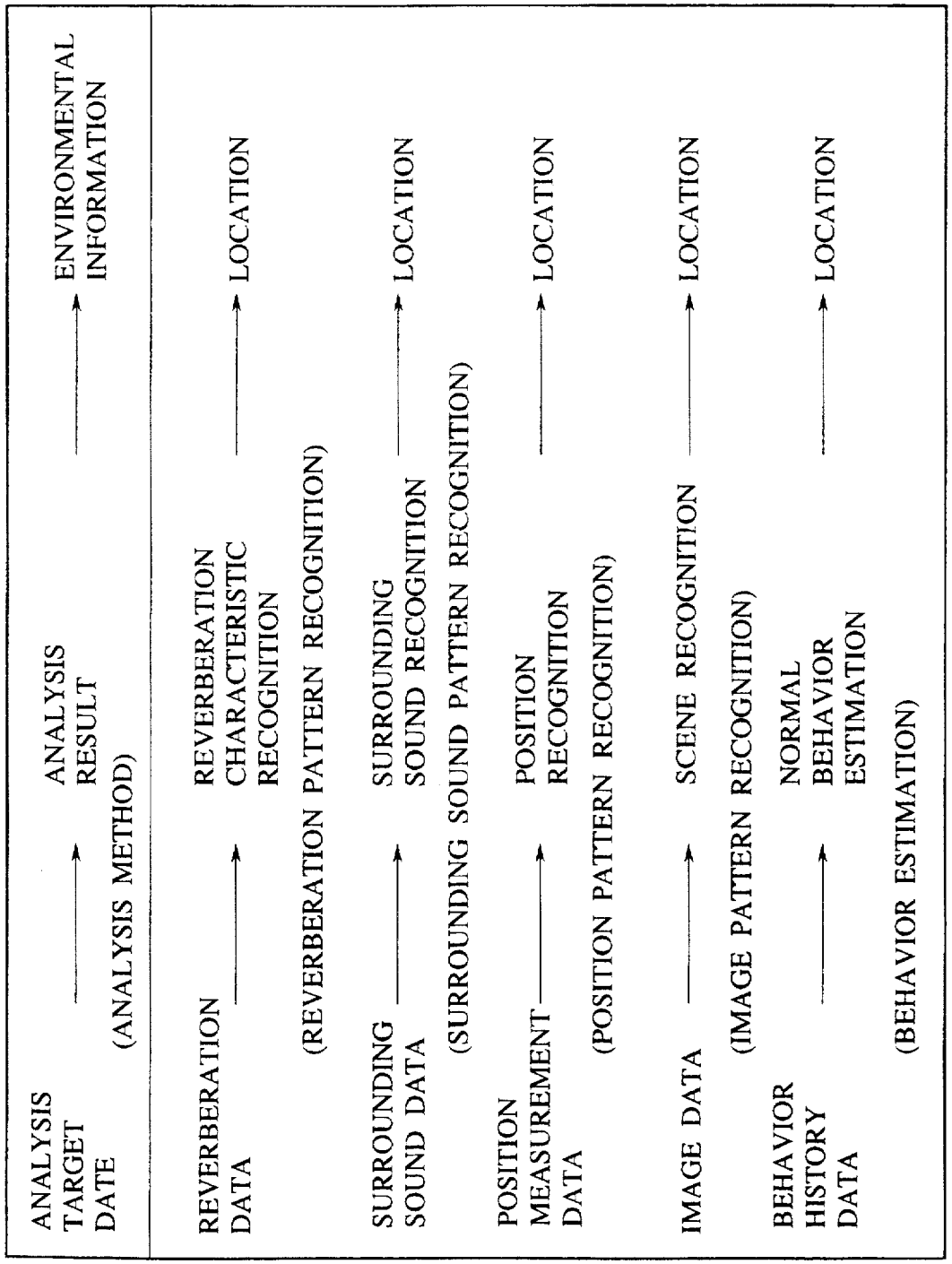
FIG. 6 is a table summarizing exemplary analysis for various environmental analysis target data used in the system of FIG. 1.

As an example, a case of using the fact that the retrieval target data had been produced at the living room of the user's home as the environmental information will be described here. This environmental information can be obtained from the position data series transmitted from the position measurement system such as the GPS as the environmental analysis target data, by recognizing the fact that its location is the living room of the user's home. The environmental information indicating the use location can also be obtained from the environmental analysis target data other than that obtained by the GPS, such as the reverberation data, the surrounding sound data, the image data, and the behavior history data, by the appropriate processing, as indicated in FIG. 6.

Now, it is necessary for the environmental information analysis unit 5 to have the automatic interpretations set up in advance as to which environmental information is to be obtained, from which analysis result can this environmental information be obtained, and from which environmental analysis target data and by which analysis method can this analysis result be obtained. In the above example, for the environmental information concerning the system use location, before the analysis, it is necessary to set up the facts including the use location to be recognized such as his own working place, the use of the GPS position measurement data as the environmental analysis target data to be used in recognizing that use location, the correspondence between the position measurement data value and the use location to be recognized, etc.

Among these automatic interpretations, "which environmental analysis target data should be analyzed in which analysis method in order to obtain a certain environmental information" is hardly dependent on the situations or the users, so that this information can be provided in the system as the default knowledge concerning the analysis in advance. In the examples shown in FIG. 6, in order to obtain the environmental information indicating the use location, it suffices to analyze the reverberation pattern of the reverberation data, the surrounding sound pattern of the surrounding sound data, etc., and this information can be provided as the preliminary knowledge provided in advance in the system regardless of the applications.

On the other hand, "which (instance of) environmental information is to be obtained, or from which analysis result can this (instance of) environmental information be obtained" is largely dependent on the situations and the users. Namely, the former is the knowledge concerning what is to be recognized, such as the living room of the own home, the working place, and the car for transportation which can be three locations to be recognized as the environmental information indicating the use location. On the other hand, the latter is the knowledge concerning the comprehension of the analysis result, such as it should be recognized as the living room of the own home when what kind of the reverberation pattern or what kind of surrounding sound pattern is obtained as a result of the analysis. Both of these are knowledges which are largely dependent on the requests from the applications or the users. Thus, it is necessary for the user to set up the portions where the individual environmental information is obtained from the analysis result, before the analysis takes place. The concrete examples include the sound, image, position, schedule, access information, etc. which will be described in detail below.

<Mechanism of retrieval>

Each analysis result is attached with the information concerning the analysis such as it is obtained by the analysis of which part of the environmental analysis target data. By this information, the individual environmental information is linked with a part or a whole of the environmental analysis target data that had been analyzed. As already mentioned, there is a link between the retrieval target data and the environmental analysis target data, so that it becomes possible to retrieve the retrieval target data from the environmental information.

In the retrieval operation, the environmental information linked with the retrieval target data is searched out first. For example, the environmental informations indicating the use location, the use time, the use state, etc. are displayed through the environmental information output unit 7, and the user selects the appropriate environmental information to be used as the retrieval key from the displayed environmental informations. Here, the environmental information to be used as the retrieval key is specified through the retrieval key input unit 8.

The retrieval unit 9 then searches out the specified environmental information in the environmental information memory unit 6, and the retrieval target data linked with the searched out environmental information is outputted from the retrieval target data output unit 3 as the retrieval result.

<Attachment of the likelihood to the environmental information at the environmental information analysis unit 5>

The possibility for being accurate (likelihood) of the analysis result depends on the analysis method. In addition, even among the results obtained by the same analysis method, the likelihood varies from one analysis result to another.

Consequently, as the information concerning the analysis described above, the information indicating which analysis method it is obtained from and what level of the likelihood it has according to that analysis method is attached. This likelihood may be the value subjectively determined by the user, or the value set up by the system semi-automatically.

For example, for the higher frequency to use the environmental information obtained by a particular analysis method as the retrieval key, the likelihood of that particular analysis method can be set to be higher. Also, when the analysis is some kind of the pattern recognition, the likelihood can be given by the similarity to the reference pattern.

When there are more than one analysis methods and the analysis results obtained by these analysis methods contradicts with each other, by looking up the information concerning the likelihood of the analysis method and the analysis result and giving a higher priority to those having the higher likelihood, it becomes possible to carry out the retrieval of the retrieval target data more efficiently. It is also possible to give a higher priority to the environmental information which has been obtained by many analysis methods with the high likelihoods.

<Structuring of the analysis result at the environmental information analysis unit 5>

In a case the multi-media data are available as the environmental analysis target data, the analysis is carried out for each medium separately first.

Then, the analysis result for each medium is structured for each environmental information to be obtained. For example, the environmental information concerning the use location indicating where the retrieval target data had been entered can be obtained by various methods, such as the position measurement system, the recognition by the acoustic data such as the reverberation characteristic or the surrounding sound, the scene recognition using the images, the estimation from the data such as the schedule or the ordinary behavior history, as indicated in FIG. 6. The analysis results concerning the use location obtained by these methods using a plurality of media are structured as the environmental informations with the same semantic content.

<Use of the retrieval target data as the environmental analysis target data>

In the above, the retrieval target data and the environmental analysis target data are described as if they are clearly distinct data, but these data may be identical. Namely, the retrieval target data can be directly used as the environmental analysis target data to obtain the environmental information by the analysis. For example, in a case of reproducing the utterance of a particular person by using the recognition result obtained by the speaker recognition applied to the speech data entered from the microphone as the environmental information, the retrieval target data as well as the environmental analysis target data are given by the identical speech data.

In this manner, it is possible within the system for a certain data to be the retrieval target from the viewpoint of the retrieval and the analysis target from the viewpoint of the analysis of the environment, simultaneously.

<Handling of the device information as the environmental analysis target data>

The system can be equipped with a plurality of input devices in the retrieval target data input unit 1 or the environmental analysis target data input unit 4. In a case of using a plurality of input devices, the device information indicating from which input device each input data has been entered can be used as the environmental analysis target information. For example, the environmental information can be obtained from the information such as it is the data in a video media or acoustic media, it is the data entered by the input device located where, it is the data entered by the microphone or camera oriented toward which direction, etc.

<Attachment of the likelihood by the device information>

In a case the quality of the environmental analysis target data differs from one input device to another, it is also possible to change the likelihood according to the device information.

Next, the modification of the configuration of FIG. 1 to enable the input of the environmental information from the user will be described with reference to FIG. 7.

Figure 7:
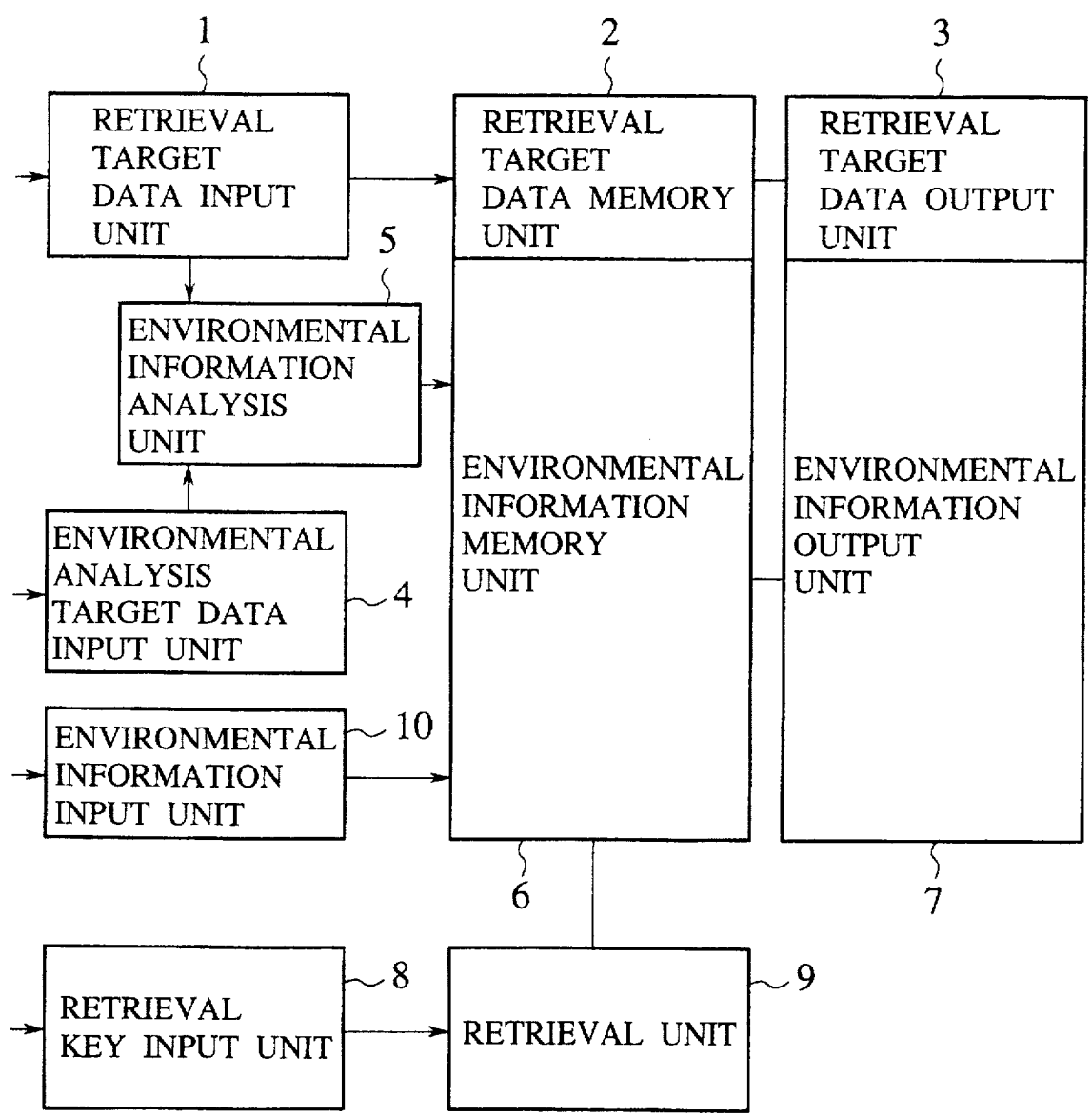
FIG. 7 is a schematic block diagram of one modified configuration for the first general embodiment of the data retrieval system according to the present invention.

This configuration of FIG. 7 differs from that of FIG. 1 in the incorporation of the environmental information input unit 10 which includes an input device such as a keyboard, a touch panel, a pen, and a mouse for admitting the input from the user, and an environmental information conversion unit for converting the entered input into the environmental information.

In general, it is unavoidable for the result obtained by the automatic analysis to contain some errors, and the direct use of such a result containing errors, without making any correction, can cause the lowering of the retrieval efficiency. In this configuration of FIG. 7, by allowing the user to enter the environmental information directly, it is possible to correct or delete the analysis errors made by the system and to add the necessary environmental information.

Here, the environmental information that can be entered by the user contains the system analysis result, its structured information, and its likelihood. It is also possible to attach a higher likelihood to the environmental information directly entered by the user. Also, for the analysis method whose analysis results are frequently deleted by the user, the likelihood of that analysis method can be lowered. On the contrary, the analysis method which obtained many environmental informations which are repeatedly used as the retrieval keys with frequent corrections can be judged as that which yields the analysis results to which the user's attentions are paid, so that the likelihood of this analysis method can be raised.

Next, the modification of the configuration of FIG. 1 to enable the storing of the environmental analysis target data will be described with reference to FIG. 8.

Figure 8:
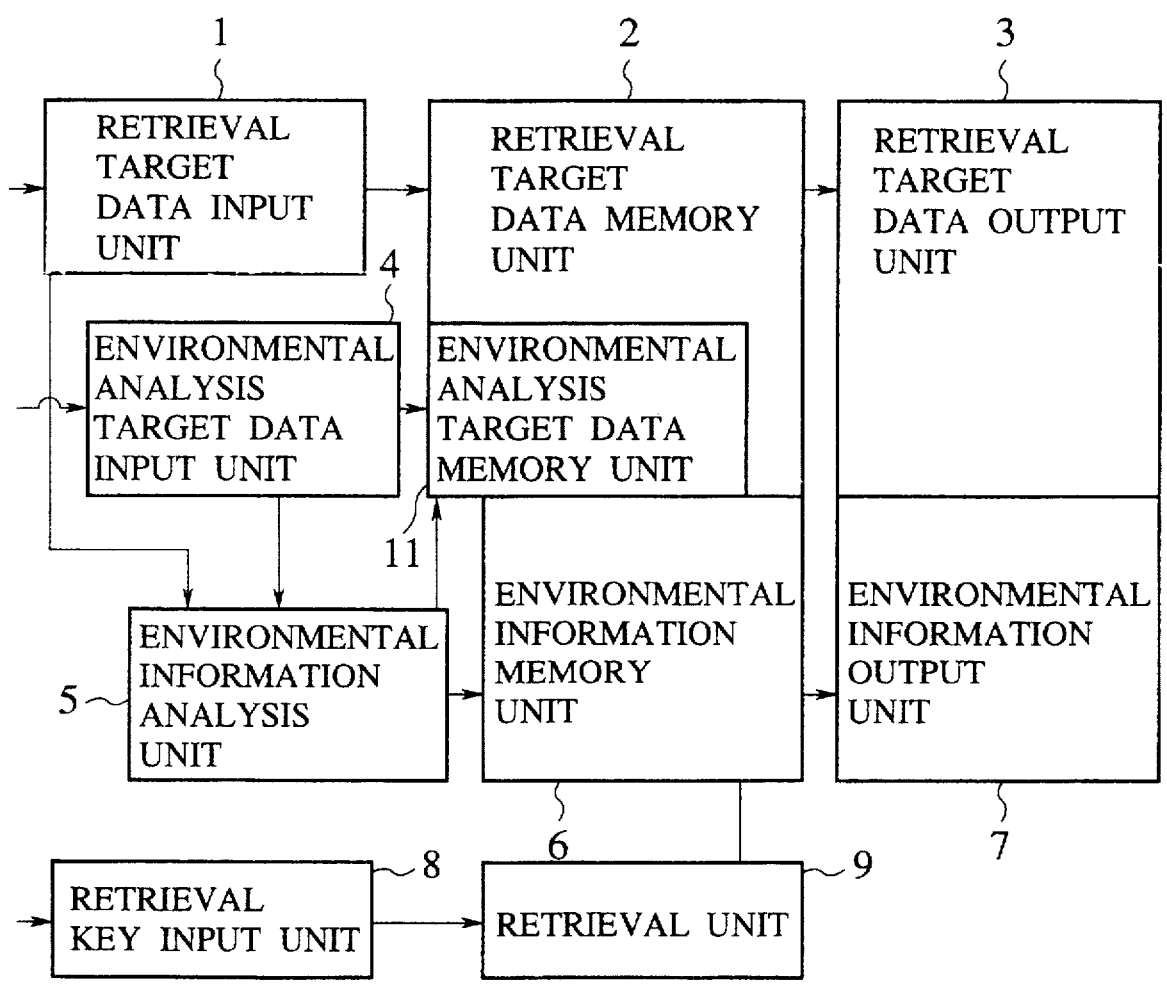
FIG. 8 is a schematic block diagram of another modified configuration for the first general embodiment of the data retrieval system according to the present invention.

This configuration of FIG. 8 differs from that of FIG. 1 in the incorporation of the environmental analysis target data memory unit 11 which stores the environmental analysis target data entered from the environmental analysis target data input unit 4. The environmental analysis target data stored in this environmental analysis target data memory unit 11 are read out according to the need, and supplied to the environmental information analysis unit 5 for the analysis and the structuring.

By analyzing the environmental analysis target data already entered into the system once, it becomes possible to re-analyze the environmental analysis target data in a case the analysis excessively complicated for the hardware performance level is to be carried out off line, or in a case the already obtained environmental information is not sufficient. Namely, in the analysis of the environmental analysis target data to obtain the environmental information, there is a need to decide what is to be taken out by the analysis (analysis result), and how it is to be analyzed (analysis method including the necessary parameter setting), but depending on the purpose of the retrieval, it is possible for the already obtained analysis result or the analysis method is insufficient. In this configuration of FIG. 8, the environmental analysis target data are stored within the system, so that the environmental information suitable for the need of the time can be obtained by resetting the analysis method or the analysis result to be obtained.

Now, various specific embodiments for the above described first general embodiment of the data retrieval system according to the present invention will be described in detail.

First, the first specific embodiment concerns with a case in which the data ID and the position information indicating the data production or retrieval location are stored in correspondence at a time of the data production or retrieval, and the desired data is retrieved by using this position information. For example, the data obtained by the GPS which is capable of collecting the user's behavior history can be used as the position information, and the extraction of the position information can be carried out in accordance with the information concerning the maps and the diagrams of rooms. In the following, the retrieval target data is assumed to be the document data for the sake of definiteness.

Figure 9:
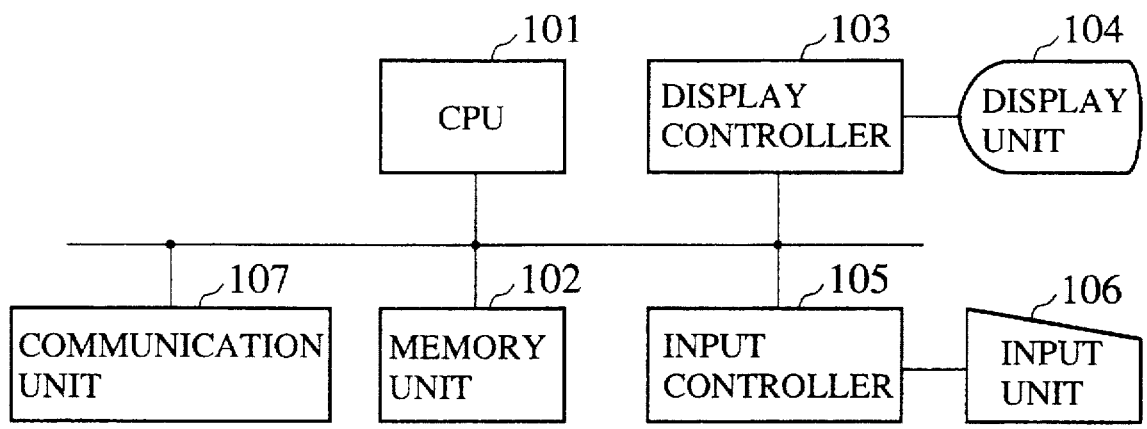
FIG. 9 is a schematic block diagram for a physical configuration of the first specific embodiment of the system of FIG. 1.

This first specific embodiment provides a document retrieval system in a form of a compact device having a physical configuration as shown in FIG. 9, which comprises: a CPU 101 for controlling an overall operation of the system; a memory unit 102 such as a semiconductor memory, a magnetic disk, an optical disk, a CD-ROM, an IC card, etc. which stores the programs and the data; a display unit 104 such as a liquid crystal display, a plasma display, etc. for displaying the retrieval result and the document content, under the control of a display controller 103; an input unit 106 such as a keyboard, a mouse, etc. for making the input of the retrieval command from the user, under the control of an input controller 105; and a communication unit 107 such as a GPS antenna, an infrared receiver, etc. for communicating with the external of the system, all of which are connected through a bus line.

Figure 10:
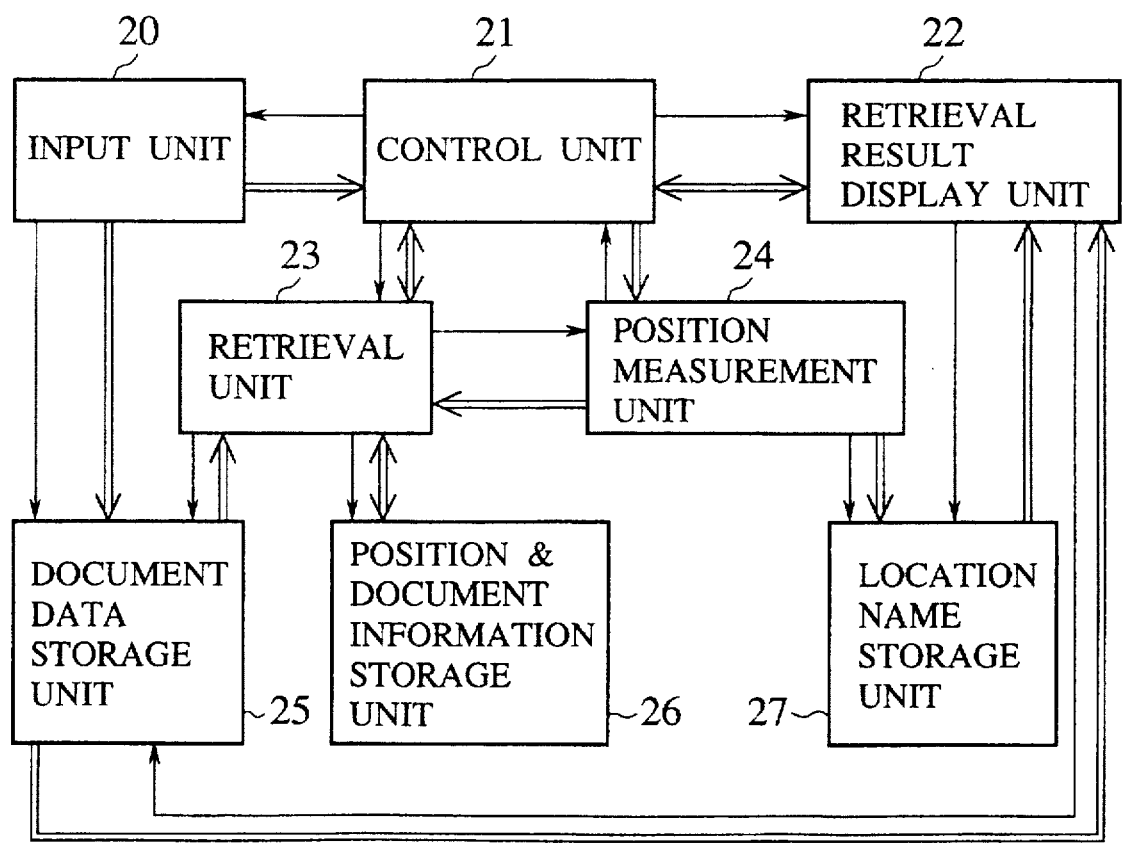
FIG. 10 is a schematic block diagram for a functional configuration of the first specific embodiment of the system of FIG. 1.

The functional configuration of this first specific embodiment is as shown in FIG. 10, which comprises: a document data storage unit 25 for storing the document data; an input unit 20 for entering the retrieval command; a retrieval unit 23 for retrieving the document data according to the retrieval command; a retrieval result display unit 22 for displaying the retrieval result; a position measurement unit 24 for measuring a position at which the system itself is located; a position and document information storage unit 26 for storing the measured position information and the retrieved document name; a location name storage unit 27 for storing the measured position information and the location name representing the measured position; and a control unit 21 for controlling operation of the above mentioned elements.

Figures 11, 12:
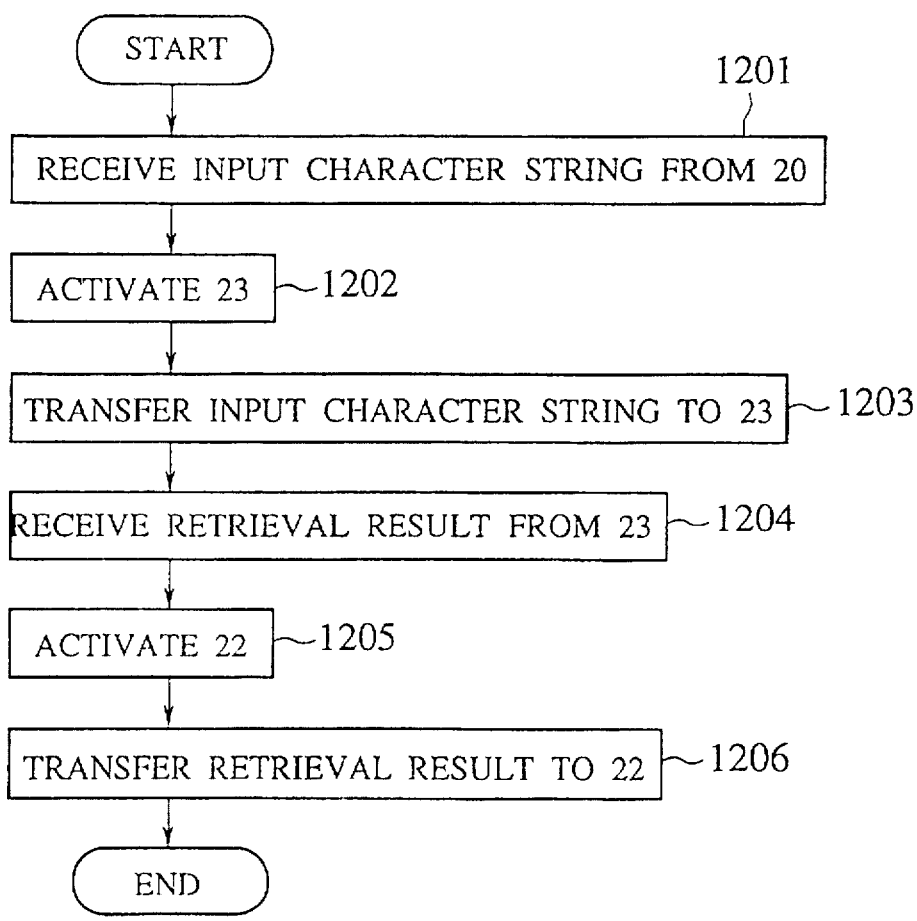
FIG. 11 is a table showing a format and examples for data in the document storage unit in the configuration of FIG. 10.
FIG. 12 is a flow chart for the operation of the control unit in the configuration of FIG. 10 in a case of the retrieval.

In this case, the document data in the document data storage unit 25 is expressed in a format as shown in FIG. 11, which comprises a document name and a document ID of a file in which the document data is stored. In the exemplary data shown in FIG. 11, "file 8", "file 11", and "file 23" represent the document IDs. The document names are arranged in a prescribed order such as that of the JIS (Japanese Industrial Standards) codes. The document data storage unit 25 is physically realized on the memory unit 102 in FIG. 9, and can be exchanged as in a case of the CD-ROM or the IC card.

Now, the processing in a case of retrieving a specific document will be described in detail.

In this case, the user enters the name of the document to be retrieved through the input unit 20 such as a keyboard, and either specifies "retrieval" command on the display window (now shown) through the input unit 20 such as a mouse, or presses "retrieval" key provided on the keyboard. Here, the control unit 21 operates according to the flow chart of FIG. 12, while the retrieval unit 23 operates according to the flow chart of FIG. 13 as follows.

Namely, when the "retrieval" is selected, the control unit 21 receives the input character string from the input unit 20 (step 1201), activates the retrieval unit 23 (step 1202), and transfer the entered input character string to the activated retrieval unit 23 (step 1203). Then, the retrieval unit 23 retrieves the document data by using the input character string transferred from the control unit 21 (step 1301), and when a pertinent document name is found (step 1302 yes), the obtained document name and document ID are transferred to the control unit 21 (step 1303).

Next, the control unit 21 receives the retrieval result containing the document name and the document ID transferred from the retrieval unit 23 (step 1204), activates the retrieval result display unit 22 (step 1205), and transfer the received retrieval result to the activated retrieval result display unit 22 (step 1206). In response, the retrieval result display unit 22 generates the window for the retrieval result display and displays the content of the retrieved document data on that window. In this manner, the user can look up the desired document. It is also possible to enable the user to make a correction on the displayed document, in addition to the looking up.

Next, the retrieval unit 23 activates the position measurement unit 24 (step 1304). In response, the position measurement unit 24 calculates the latitude and longitude of a location at which the system is located, and transfers the position information containing the calculated latitude and longitude to the retrieval unit 23. Here, the method of position measurement to be used at the position measurement unit 24 is not essential to the present invention, and can be provided by any known position measurement method. In a case of using the GPS, it is possible to measure the position at the outside where the positioning satellite can be utilized.

Figures 14, 15:
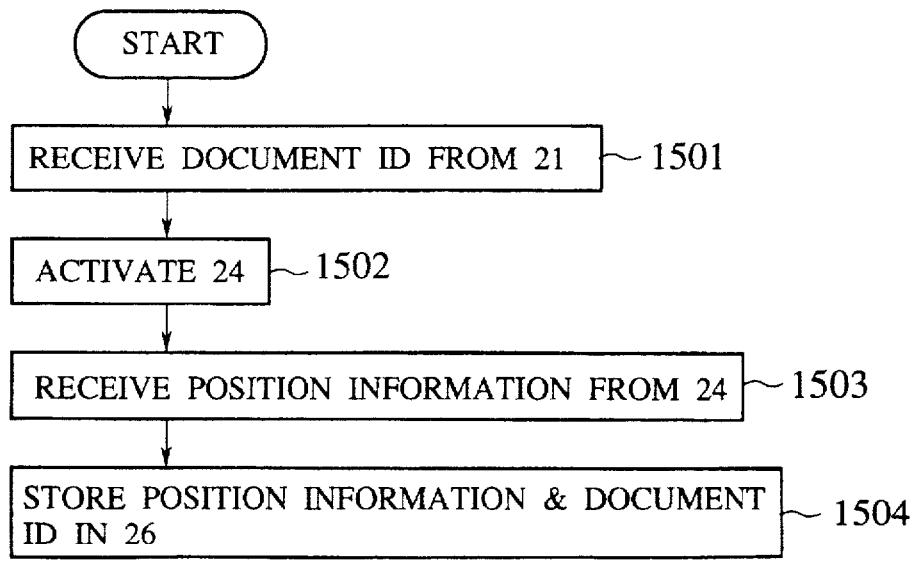
FIG. 14 is a table showing a format and examples for data in the position and document information storage unit in the configuration of FIG. 10.
FIG. 15 is a flow chart for the operation of the retrieval unit in the configuration of FIG. 10 in a case of the new document production.

Then, the retrieval unit 23 receives the position information transferred from the position measurement unit 24 (step 1305), and stores the received position information in correspondence with the obtained document ID of the retrieved document data in the position and document information storage unit 26 (step 1306). Here, the data format and the exemplary data in the position and document information storage unit 26 are as shown in FIG. 14. Here, in a case a plurality of document data are retrieved, instead of storing the document IDs of all the retrieved document data, it is possible to store only the document ID of the document data which is selected by the user on the retrieval result display unit 22 to display its content.

In addition to the looking up and the correction of the already existing document as described above, the user can also produce the new document. In this case, the input unit 20 stores the input entered by the user into the document data storage unit 25 along with the document ID and the document name specified by the user, and transfers the document ID to the control unit 21, and the control unit 21 activates the retrieval unit 23 and transfers the received document ID to the retrieval unit 23. In response, the retrieval unit 23 operates according to the flow chart of FIG. 15 as follows.

Namely, the retrieval unit 23 receives the document ID from the control unit 21 (step 1501), and activates the position measurement unit 24 (step 1502). Then, the retrieval unit 23 receives the position information from the position measurement unit 24 (step 1503), and stores the position information and the document ID in the position and document information storage unit 26 (step 1504).

Next, the processing in a case of setting up the desired location name in the system will be described in detail.

Figure 16:
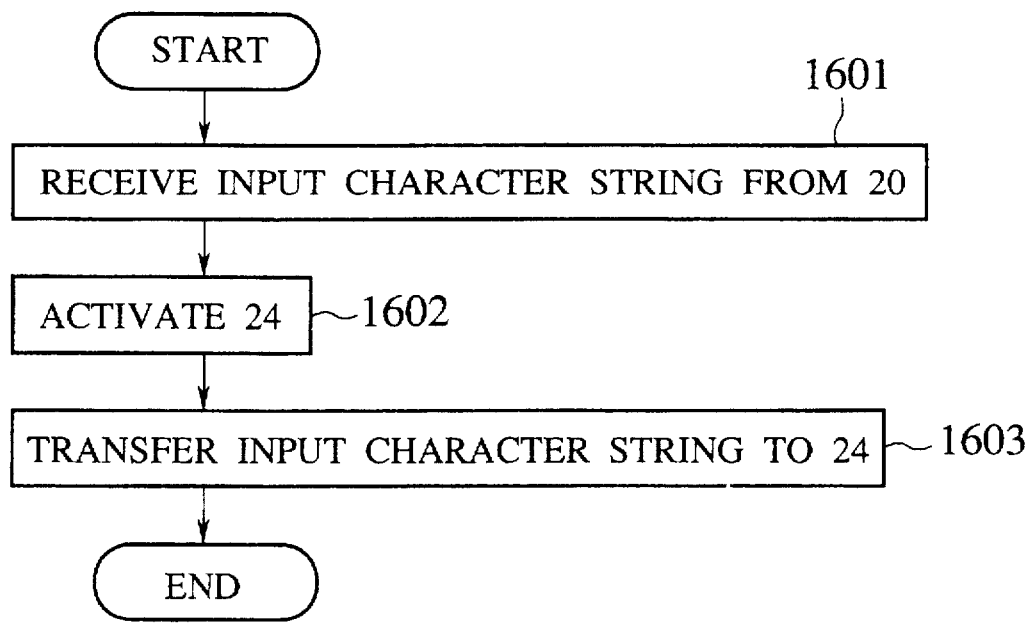
FIG. 16 is a flow chart for the operation of the control unit in the configuration of FIG. 10 in a case of the location registration.
Figure 17:
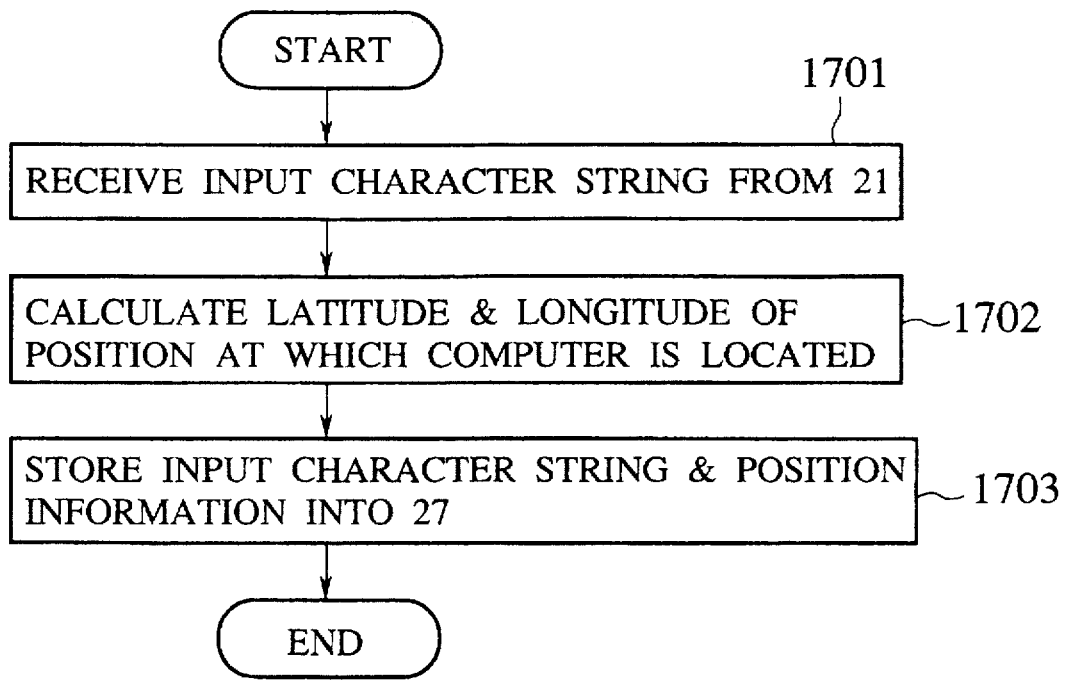
FIG. 17 is a flow chart for the operation of the position measurement unit in the configuration of FIG. 10 in a case of the location registration.

In this case, the user enters the name representing the desired location through the input unit 20, and either specify "location registration" command on the display window (now shown) through the input unit 20 such as a mouse, or presses "location registration" key provided on the keyboard. Here, the control unit 21 operates according to the flow chart of FIG. 16, while the position measurement unit 24 operates according to the flow chart of FIG. 17 as follows.

Figures 18, 19:
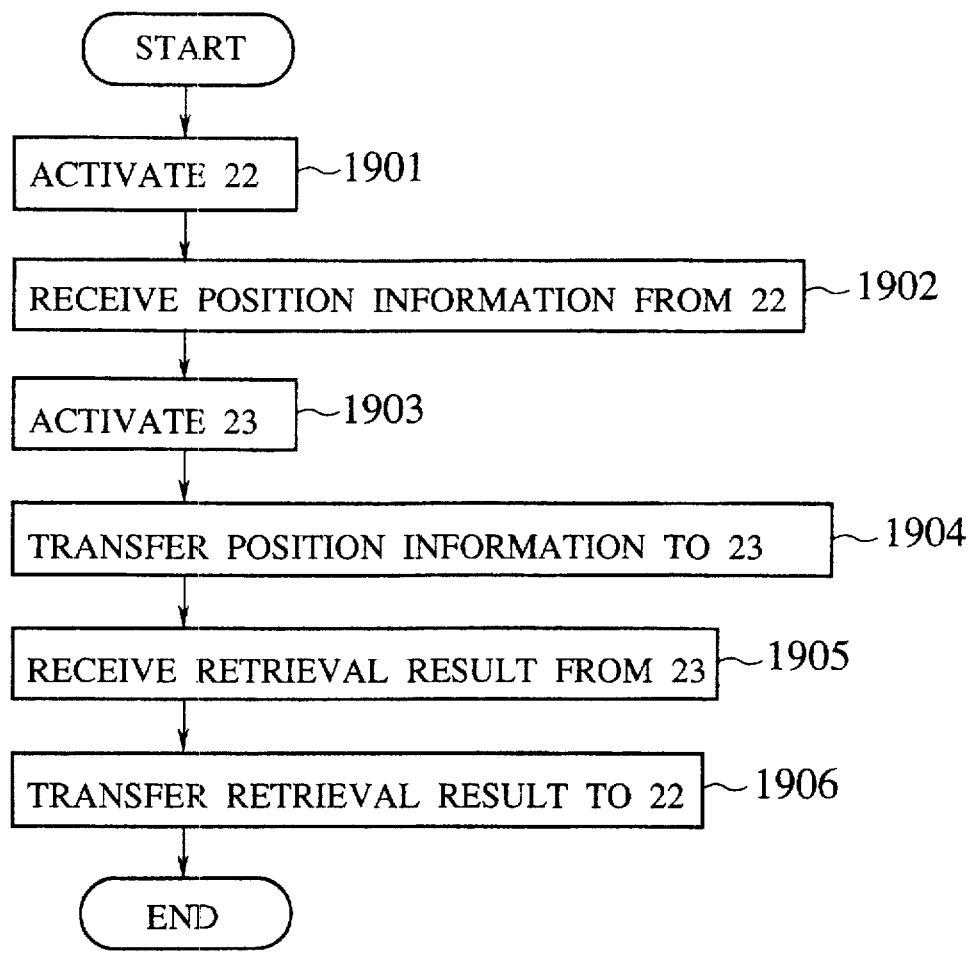
FIG. 18 is a table showing a format and examples for data in the location name storage unit in the configuration of FIG. 10.
FIG. 19 is a flow chart for the operation of the control unit in the configuration of FIG. 10 in a case of the location retrieval.

Namely, when "location registration" is selected, the control unit 21 receives the input character string from the input unit 20 (step 1601), activates the position measurement unit 24 (step 1602), and transfers the entered input character string to the activated position measurement unit 24 (step 1603). Then, the position measurement unit 24 receives the input character string transferred from the control unit 21 (step 1701), calculates the latitude and longitude of the position at which this computer is located (step 1702), and stores the the position information containing the calculated latitude and longitude in correspondence with the transferred input character string in the location name storage unit 27 (step 1703). Here, the data format and the exemplary data in the location name storage unit 27 are shown in FIG. 18.

Next, the processing in a case of retrieving the document which had been looked up, corrected, or produced according to the location name will be described.

Figure 20:
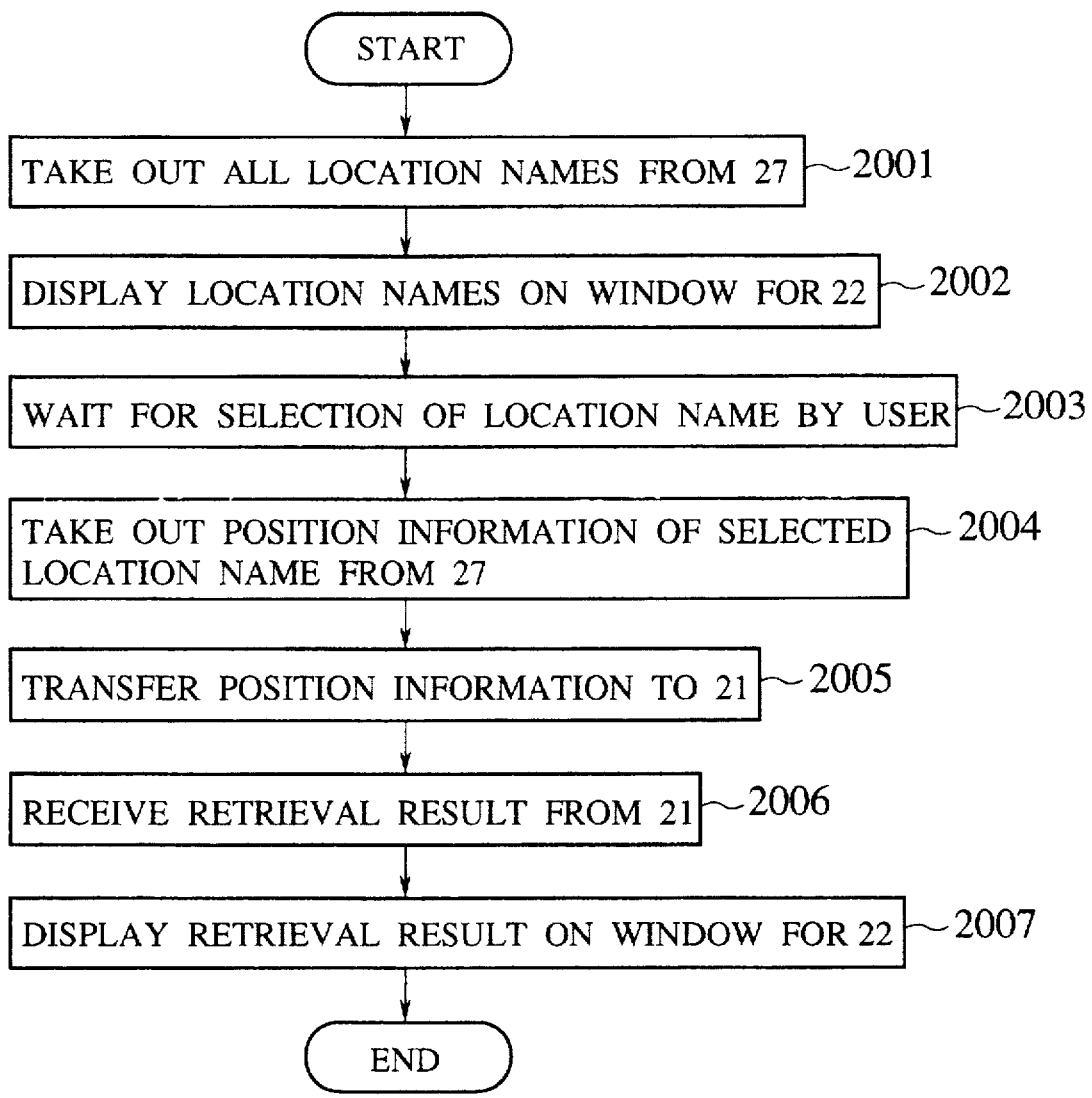
FIG. 20 is a flow chart for the operation of the retrieval result display unit in the configuration of FIG. 10 in a case of the location retrieval.

In this case, at the desired timing and location, the user either specifies "location retrieval" command on the display window (now shown) through the input unit 20 such as a mouse, or presses "location retrieval" key provided on the keyboard. Here, the control unit 21 operates according to the flow chart of FIG. 19, while the retrieval result display unit 22 operates according to the flow chart of FIG. 20 as follows.

Figure 21:
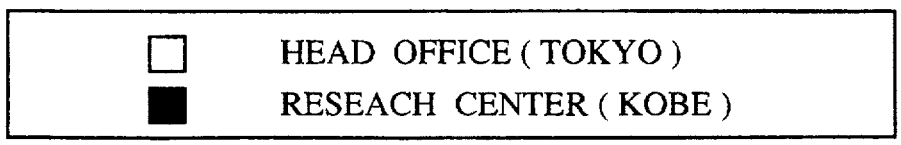
FIG. 21 is an illustration of an exemplary display by the retrieval result display unit in the configuration of FIG. 10 during the location retrieval.

Namely, when the "location retrieval" is selected, the control unit 21 activates the retrieval result display unit 22 (step 1901) first. In response, the retrieval result display unit 22 takes out all the location names stored in the location name storage unit 27 (step 2001), displays these location names on the window for the retrieval result display (step 2002), and awaits the selection of one location name from the displayed location names by the user through the mouse (step 2003). Here, the exemplary display on the window for the retrieval result display appears as shown in FIG. 21, where the location name accompanied by the blacked box is the one selected by the user. The retrieval result display unit 22 then takes out the position information corresponding to the selected location name from the location name storage unit 27 (step 2004), and transfers that position information to the control unit 21 (step 2005).

Figure 22:
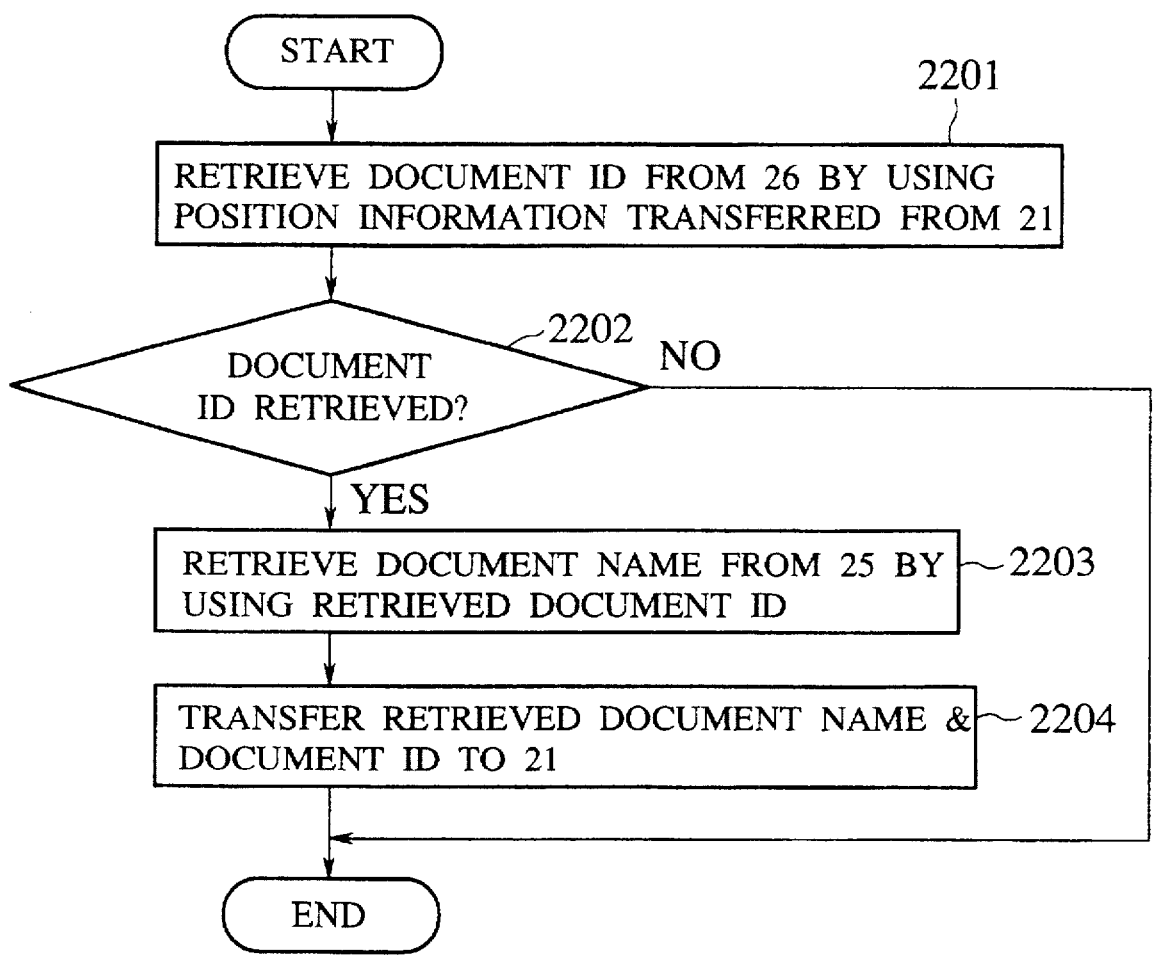
FIG. 22 is a flow chart for the operation of the retrieval unit in the configuration of FIG. 10 in a case of the location retrieval.

Then, the control unit 21 receives the position information transferred from the retrieval result display unit 22 (step 1902), activates the retrieval unit 23 (step 1903), and transfer the received position information to the activated retrieval unit 23 (step 1904). Here, the retrieval unit 23 operates according to the flow chart of FIG. 22 as follows.

Namely, the retrieval unit 23 retrieves the document ID from the position and document information storage unit 26 by using the transferred position information (step 2201). Here, the retrieval processing proceeds according to the flow chart shown in FIG. 23. That is, the coincidences of the latitude and the longitude are judged within a prescribed range such as ±0.3° (steps 2301, 2302), and retrieves the document ID of the document with the coinciding latitude and longitude values as the retrieval result (step 2303). Then, the retrieval unit 23 retrieves the document name from the document data storage unit 25 by using the retrieved document ID in the position and document information storage unit 26 (step 2203), and transfers the retrieved document name and document ID to the control unit 21 (step 2204).

The control unit 21 then receives the retrieval result containing the retrieved document name and document ID transferred from the retrieval unit 23 (step 1905), and transfers the received retrieval result to the retrieval result display unit 22 (step 1906).

Figures 23, 24:
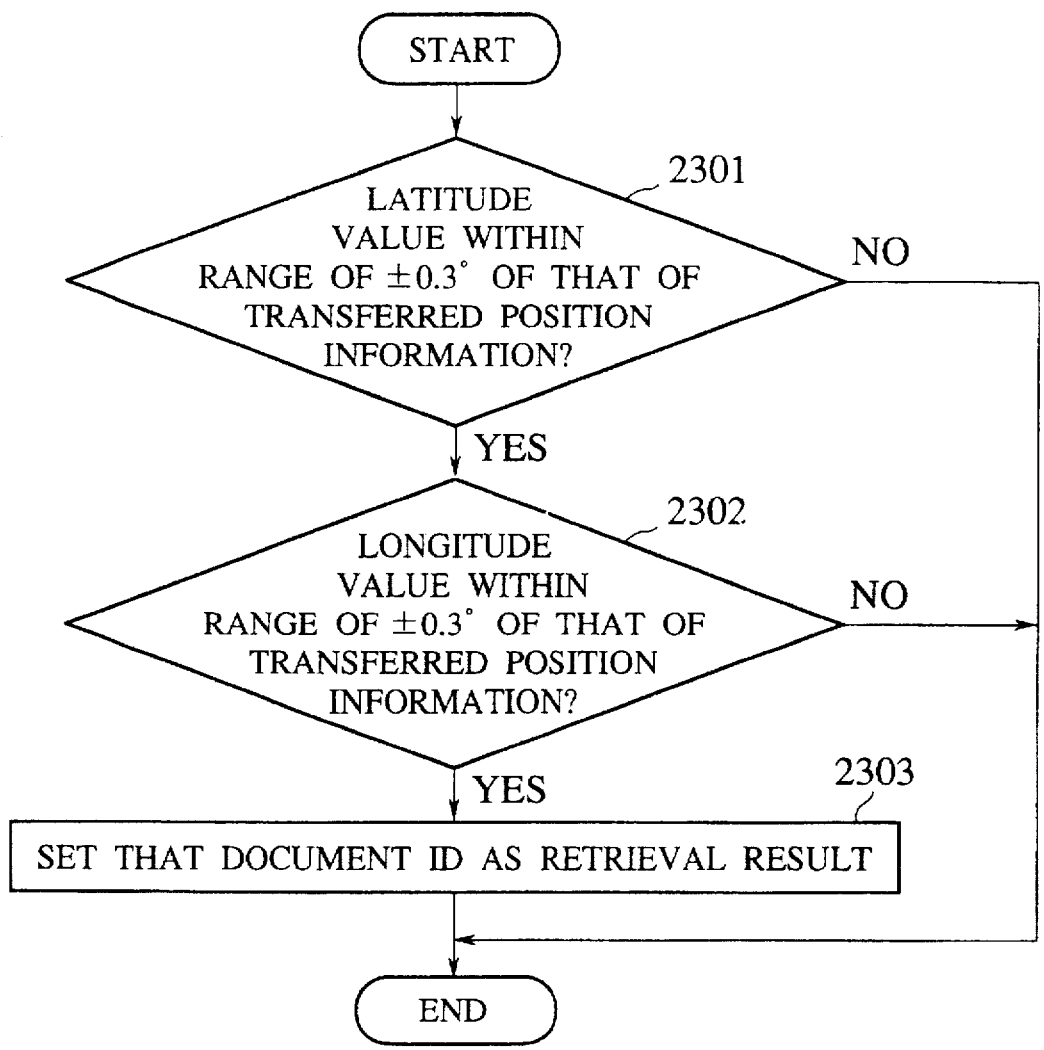
FIG. 23 is a flow chart for the retrieval processing at the retrieval unit in the configuration of FIG. 10 in a case of the location retrieval.
FIG. 24 is an illustration of an exemplary display by the retrieval result display unit in the configuration of FIG. 10 after the location retrieval.

The retrieval result display unit 22 then receives the retrieval result transferred from the control unit 21 (step 2006), and displays the received retrieval result on the window for the retrieval result display (step 2007). Here, in a case there is only one document in the retrieval result, the document name and the content of the document identified by the document ID are displayed, whereas when there are more than one documents in the retrieval result, a list of the document names is displayed as shown in FIG. 24. In the latter case, the user can select the desired document name from the displayed document names, and the retrieval result display unit 22 displays the content of the document identified by the document ID corresponding to the selected document name on the window for the retrieval result display.

It is also possible to modify the display of FIG. 21 such that, for each location name, all the relevant document names are also displayed simultaneously. In this case, it suffices to carry out the processing of FIG. 22 not just for the position information of the location selected by the user, but also for the position informations of all the location names stored in the location name storage unit 27.

Figure 25:
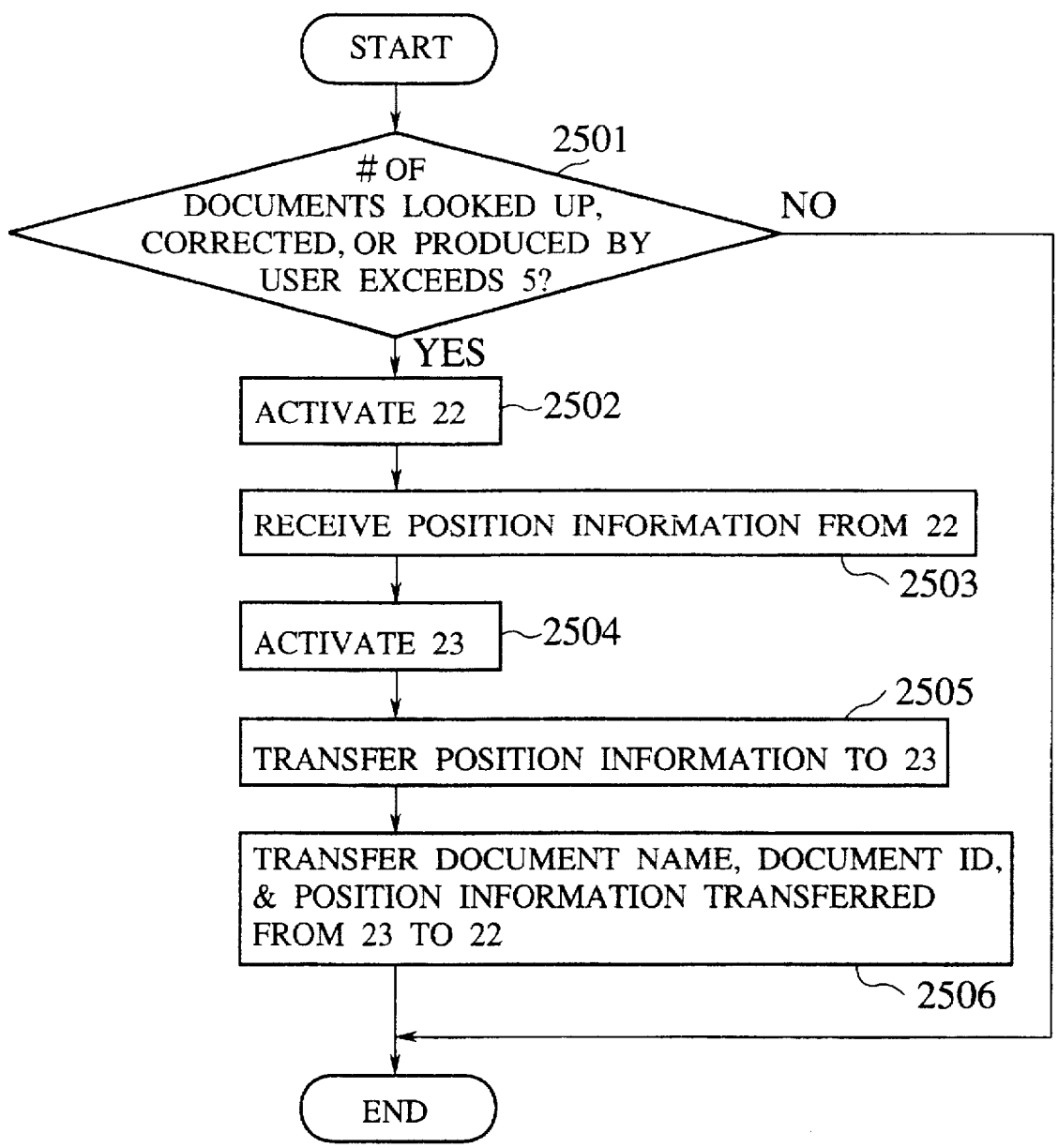
FIG. 25 is a flow chart for the operation of the control unit in the configuration of FIG. 10 in a case urging the location registration.

Also, for the documents looked up, corrected, or produced by the user under the prescribed condition, or all the documents produced by the user, whether the location name corresponding to the position information of each document has been set up or not can be checked, and in a case there is a document for which the corresponding location name has not been set up, it is possible urge the user to register the location name. In this case, the control unit 21 operates according to the flow chart of FIG. 25 as follows.

Figure 26:
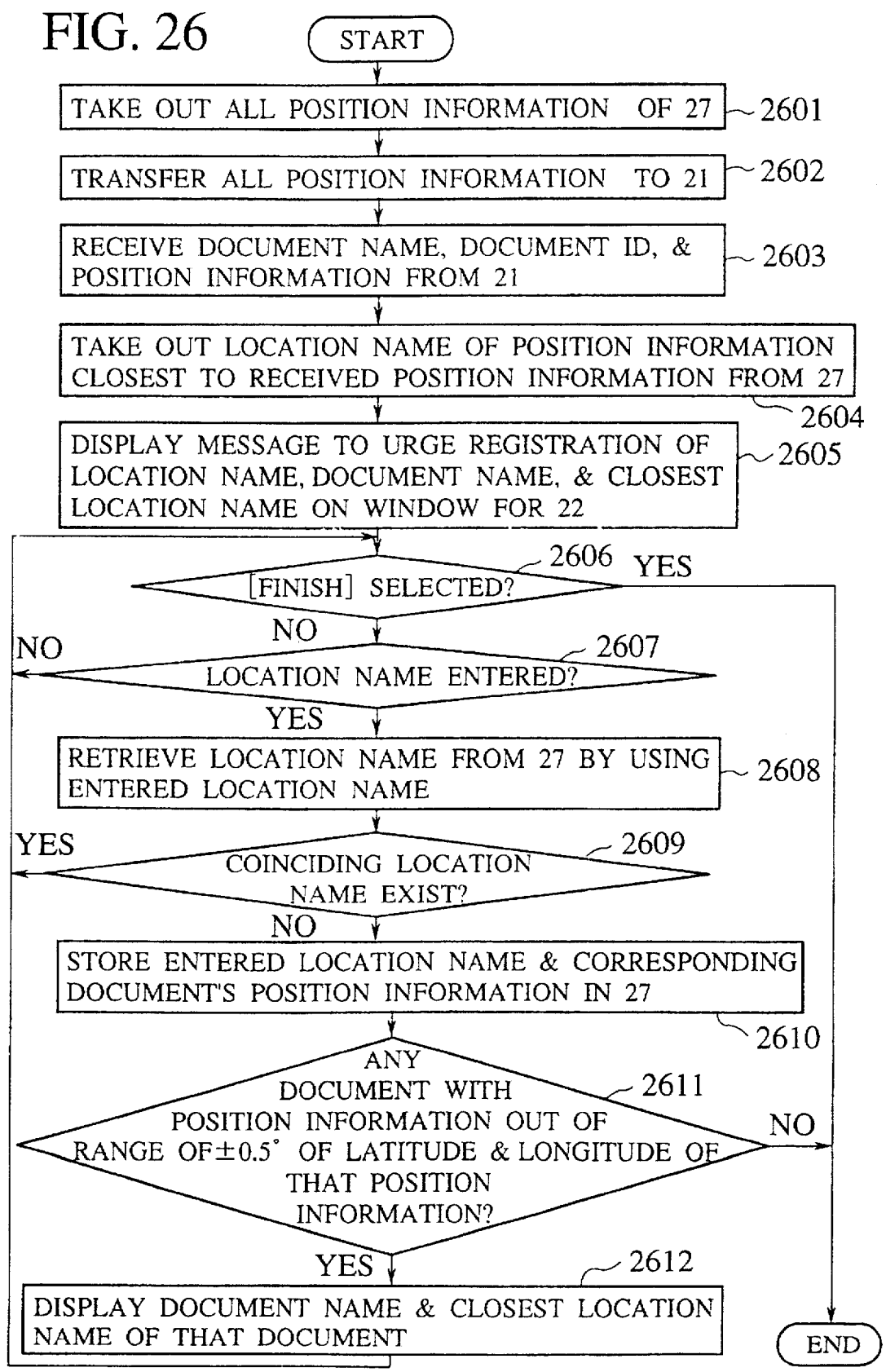
FIG. 26 is a flow chart for the operation of the retrieval result display unit in the configuration of FIG. 10 in a case urging the location registration.

Namely, when a number of documents looked up, corrected, or produced by the user exceeds a prescribed number (step 2501 yes), the control unit 21 activates the retrieval result display unit 22 (step 2502). Here, the retrieval result display unit 22 operates according to the flow chart of FIG. 26 as follows.

The retrieval result display unit 22 takes out all the position informations stored in the location name storage unit 27 (step 2601), and transfers these position informations to the control unit 21 (step 2602). The control unit 21 then receives the position informations transferred from the retrieval result display unit 22 (step 2503), activates the retrieval unit 23 (step 2504), and transfer the received position informations to the retrieval unit 23 (step 2505). Then, the retrieval unit 23 operates according to the flow chart of FIG. 27 as follows.

The retrieval unit 23 receives the position informations transferred from the control unit 21 (step 2701), and retrieves the document IDs from the position and document information storage unit 26 by using the received position informations (step 2702). When there is a position information among the position informations in the position and document information storage unit 26 which is not within a prescribed range from the transferred position informations, i.e., the position informations with the registered location names (step 2703 yes), the retrieval unit 23 retrieves the document name from the document data storage unit 25 by using the document ID corresponding to that position information (step 2704), and transfers the retrieved document name and document ID along with that position information to the control unit 21 (step 2705).

The control unit 21 then transfers the document name, document ID, and position information transferred from the retrieval unit 23 to the retrieval result display unit 22 (step 1706). The retrieval result display unit 22 then receives the document name, document ID, and position information transferred from the control unit 21 (step 2603), takes out the location name of the position information in the location name storage unit 27 which is closest to the received position information (step 2604), and displays the message for urging the user to register the location name, along with the received document name and the the location name taken out from the location name storage unit 27 as the closest one, on the window for the retrieval result display (step 2605).

Here, the exemplary display on the window for the retrieval result display appears as shown in FIG. 28. At this point, unless [FINISH] command is selected by the user (step 2606 no), when the user enters the location name (step 2607 yes), the location name is retrieved from the location name storage unit 27 by using the entered location name (step 2608). Then, unless there is a coinciding location name (step 2609 no), the entered location name and the position information of the corresponding document are stored in the location name storage unit 27 (step 2610). Then, among the documents displayed, when there is a document with the position information which is out of the prescribed range such as ±0.5° from the stored position information (step 2611 yes), the document name and the closest location name of such a document are displayed again (step 2612) and the operation returns to the step 2606. Here, the exemplary display after the registration of the location name by the user in response to the display of FIG. 28 appears as shown in FIG. 29.

In this first specific embodiment described above, the position measurement method is not limited to that using the GPS. For example, the infrared transmitter and receiver can be used as follows. Namely, the infrared transmitter which generates the characteristic bit pattern is provided at the desired location such as the conference rooms or working places in buildings or houses within a different sites or grounds, or in different buildings, houses, or floors in the same site or ground. Then, the infrared receiver can be used as the position measurement unit in the above embodiment, by receiving the bit pattern generated by the infrared transmitter instead of measuring the latitude and longitude, and then setting up the appropriate location name or room name.

Also, in this first specific embodiment described above, instead of selecting the displayed location name, the location name used for the retrieval may be entered. Namely, when the location name is entered, the entered location name is matched with the location names in the location name storage unit 27, and when there is a coinciding location name, the retrieval from the position and document information storage unit 26 is carried out by using the latitude and longitude values of that coinciding location name, so as to display the document with the document ID for which the latitude and longitude values are within the prescribed range.

Similarly, the latitude and longitude values for the retrieval may be entered. Namely, when the latitude and longitude values are entered, the retrieval from the position and document information storage unit 26 is carried out by using the entered latitude and longitude values, so as to display the document with the document ID for which the latitude and longitude values are within the prescribed range. In this case, the retrieval from the location name storage unit 27 by using the entered latitude and longitude values can be carried out at the same time, such that the location name for which the latitude and longitude values are within the prescribed range can be displayed simultaneously.

Also, in addition to the storing and displaying of the location name and the document name, the time can be measured at the same time, and a set of the location name, the document name, and the time can be stored. In this case, the document name can be displayed along with the time, for each location name.

Moreover, this first specific embodiment is not limited to the cases of looking up, correcting, and producing the document as described above. For example, by combining with the portable telephone, the position information concerning the use of the telephone can be stored, and it is possible to retrieve the information indicating where the telephone call was made with respect to where or who later on. Similarly, by combining with the electronic camera or video recorder, the position information concerning the picture or video taking location can be stored, and it is possible to retrieve the information indicating where the picture or video of what was taken later on. Also, by combining with the moving object or transportation means such as the automobile, the position information during the moving can be stored, and it is possible to retrieve the information indicating which route was taken later on.

Figure 30:
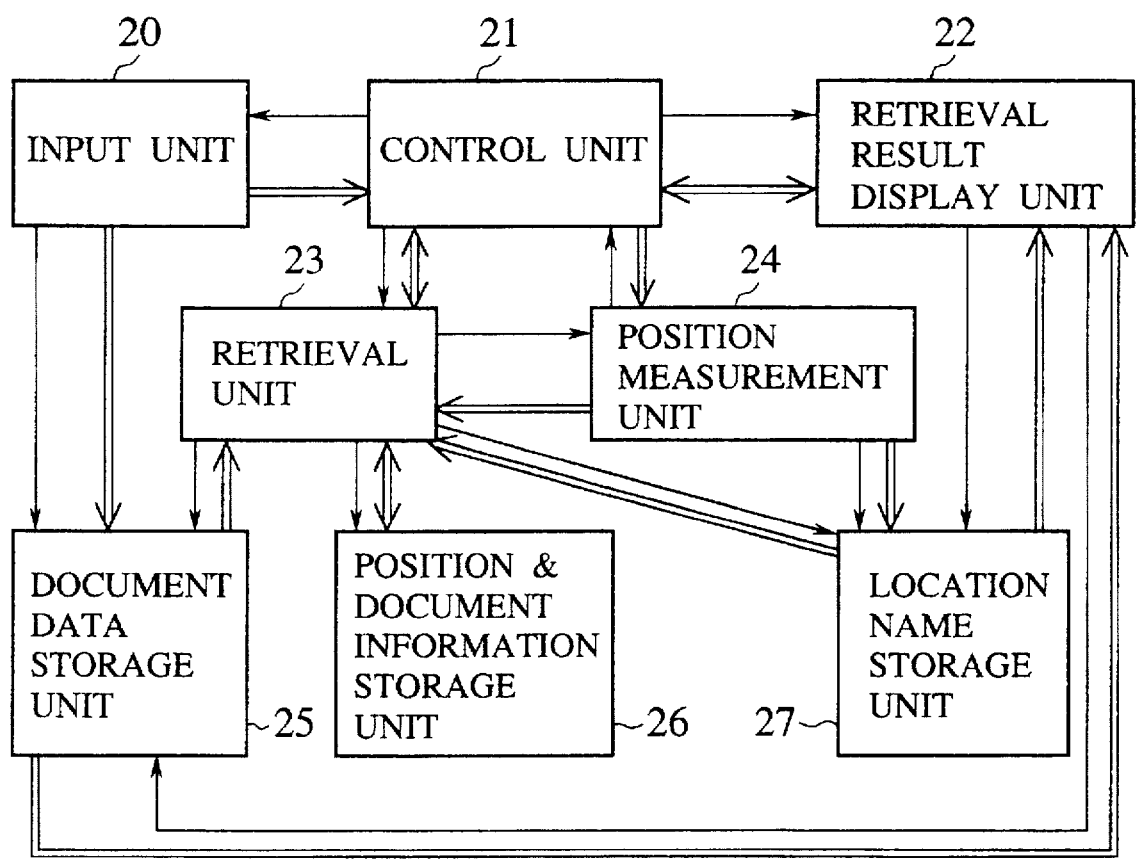
FIG. 30 is a schematic block diagram for a functional configuration of the second specific embodiment of the system of FIG. 1.

Next, the second specific embodiment concerns with a modification of the first specific embodiment described above. In this second specific embodiment, the physical configuration of the system is the same as in FIG. 9 described above, while the functional configuration of the system is as shown in FIG. 30, which differs from that of FIG. 10 in that the retrieval unit 23 and the location name storage unit 27 are connected with each other such that, instead of providing the registration of the location name which is independent from the looking up, correcting, and producing of the documents as in the first specific embodiment, the presence or absence of the already registered location name is checked when the user looks up, corrects, or produces the document, and the registration is urged in a case of the absence.

In this second specific embodiment, in a case the user looks up or corrects the document, the retrieval unit 23 operates according to the flow chart of FIG. 31 as follows.

Figure 13:
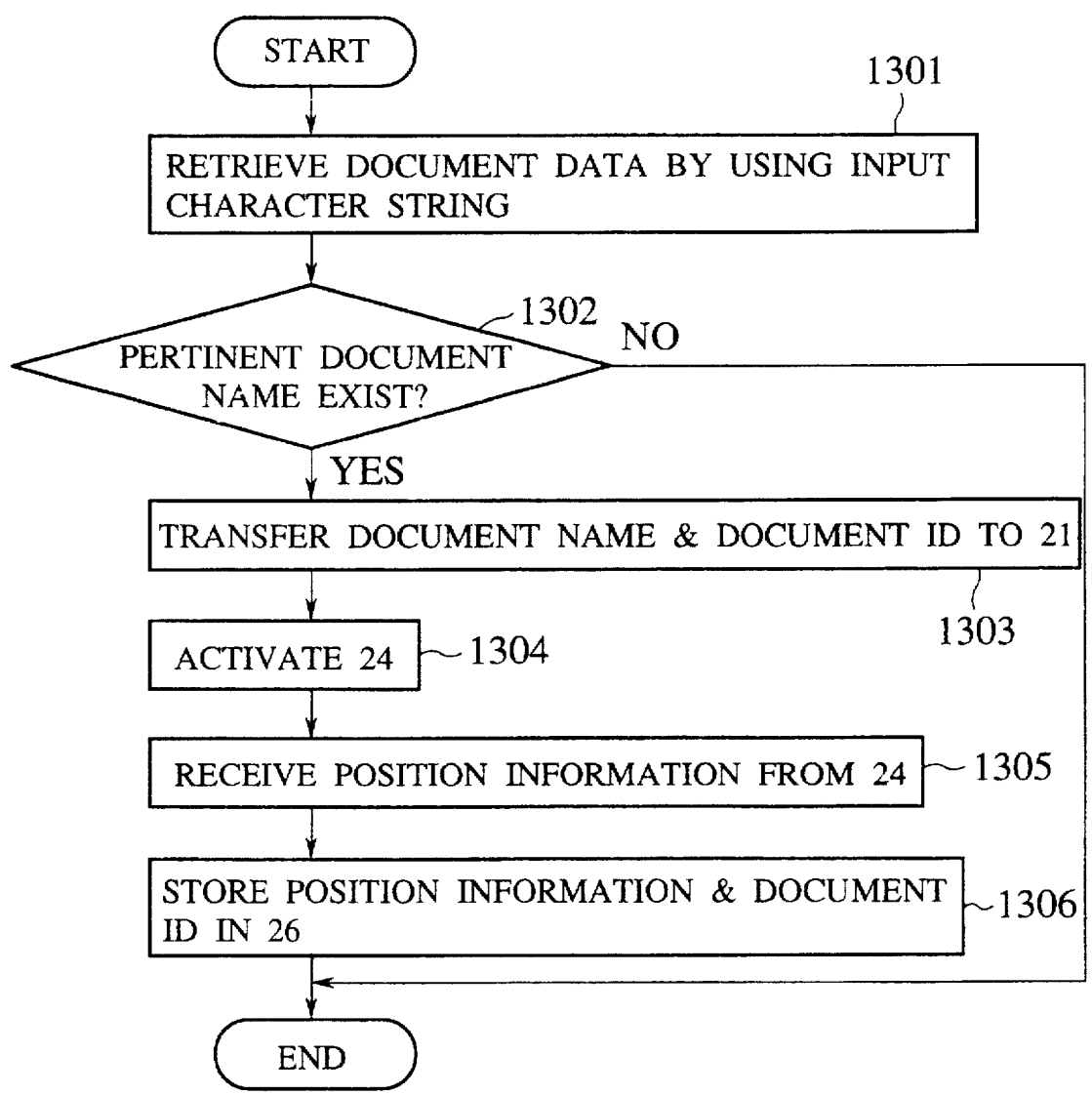
FIG. 13 is a flow chart for the operation of the retrieval unit in the configuration of FIG. 10 in a case of the retrieval.
Figure 31:
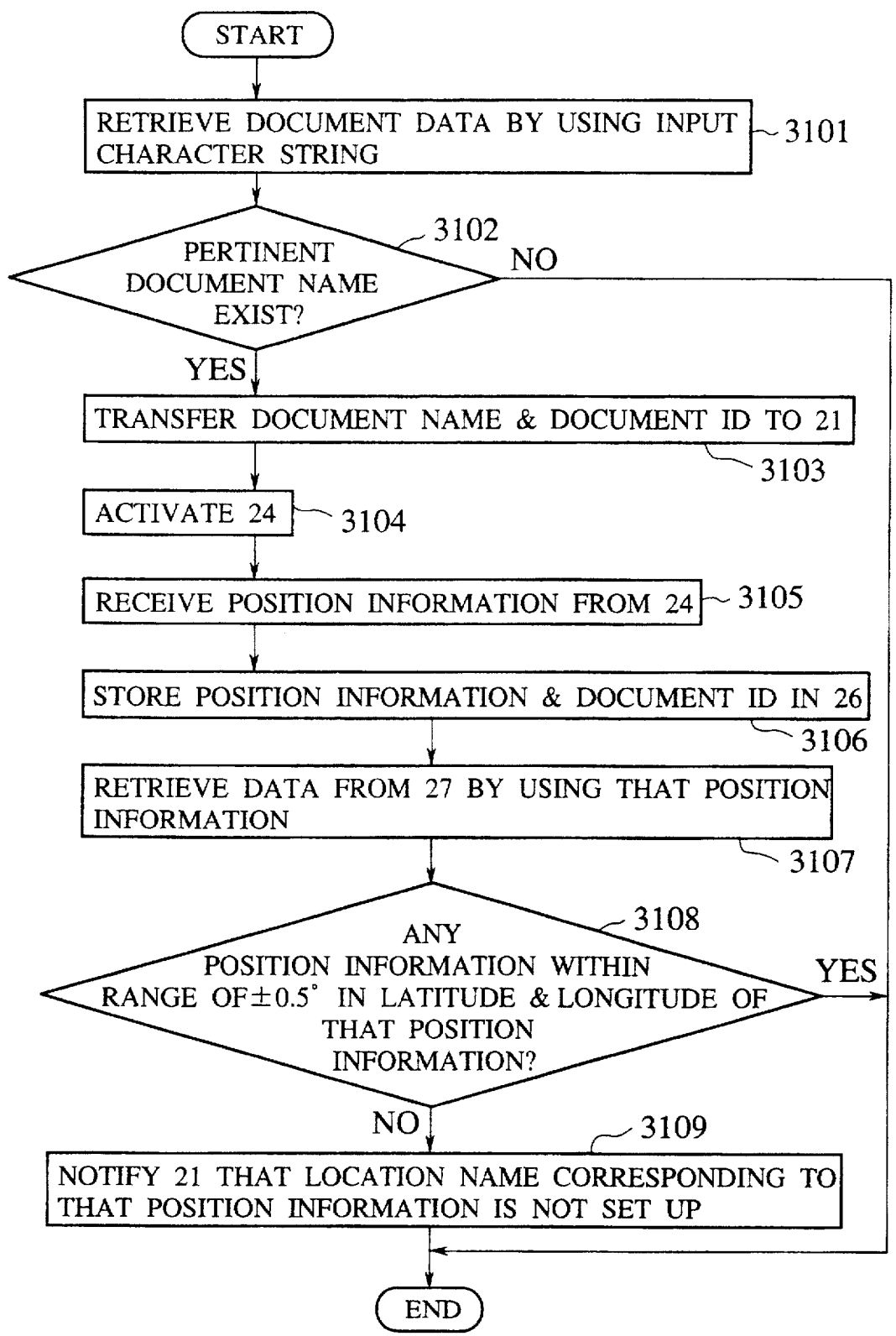
FIG. 31 is a flow chart for the operation of the retrieval unit in the configuration of FIG. 30 in a case of document loop up or correction.

Namely, in the flow chart of FIG. 31, the steps 3101 to 3106 are identical to the steps 1301 to 1306 in FIG. 13 described above. After the step 3106, the location name is retrieved from the location name storage unit 27 by using the position information stored at the step 3106 to check if there is an already registered location name (step 3107), and if such an already registered location name is absent, i.e., when there is no position information which is within the prescribed range such as ±0.5° from the stored position information (step 3108 no), the retrieval unit 23 notifies the control unit 21 that the location name corresponding to that position information is not set up, so as to urge the registration of the location name (step 3109).

Similarly, in a case the user produces the document, the retrieval unit 23 operates according to the flow chart of FIG. 32 as follows.

Figure 32:
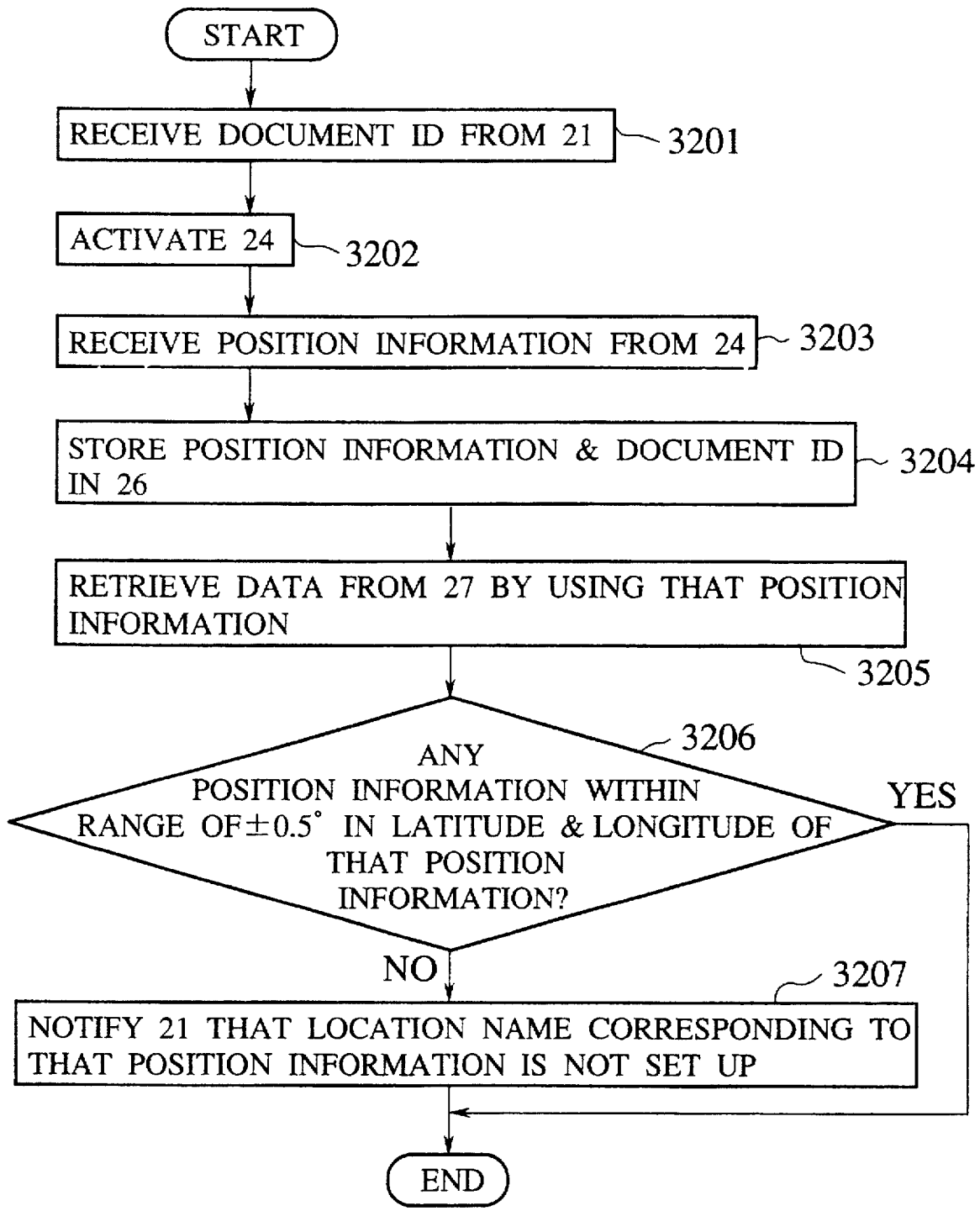
FIG. 32 is a flow chart for the operation of the retrieval unit in the configuration of FIG. 30 in a case of document production.

Namely, in the flow chart of FIG. 32, the steps 3201 to 3204 are identical to the steps 1501 to 1504 in FIG. 15 described above. After the step 3104, the location name is retrieved from the location name storage unit 27 by using the position information stored at the step 3204 to check if there is an already registered location name (step 3205), and if such an already registered location name is absent, i.e., when there is no position information which is within the prescribed range such as ±0.5° from the stored position information (step 3206 no), the retrieval unit 23 notifies the control unit 21 that the location name corresponding to that position information is not set up, so as to urge the registration of the location name (step 3207).

Next, the third specific embodiment concerns with a modification of the first specific embodiment described above in which the data retrieval system comprises a first compact portable device having means for looking up, correcting, and producing the document and means for transmitting information, and a second device having means for receiving information and means for retrieving.

In this third specific embodiment, each of the first and second devices has the physical configuration similar to that of FIG. 9 described above, where the first device has the infrared transmitter as the communication unit 107 while the second device has the infrared receiver as the communication unit 107.

Figure 33:
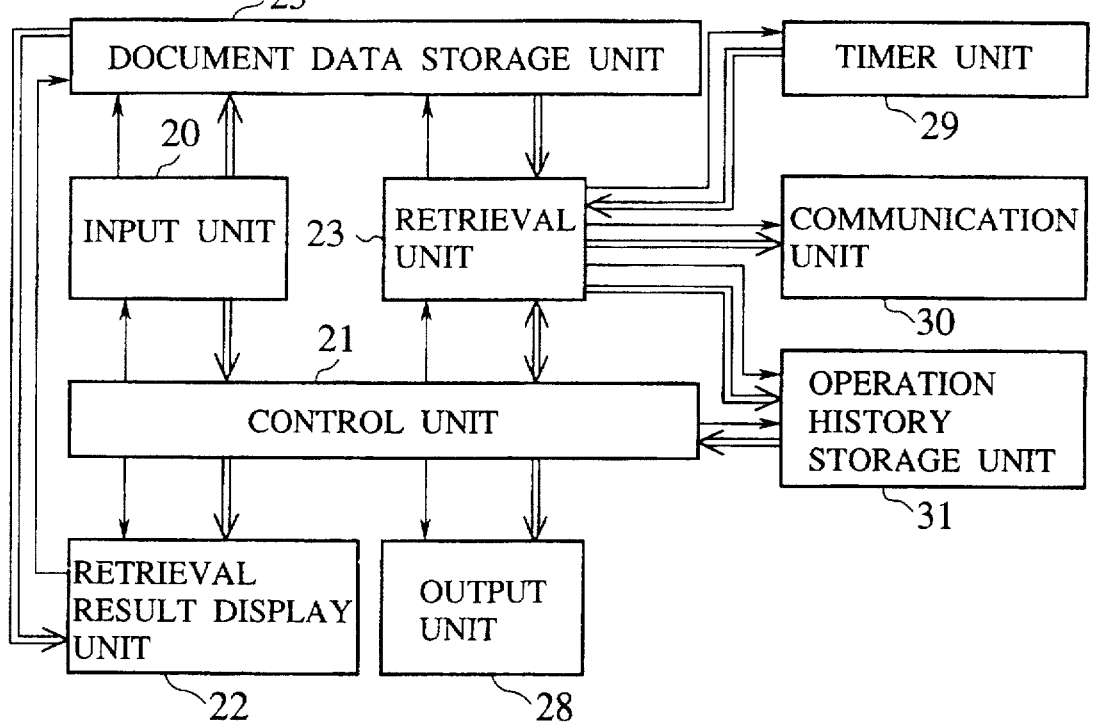
FIG. 33 is a schematic block diagram for a functional configuration of a first device in the third specific embodiment of the system of FIG. 1.

The first device has the functional configuration as shown in FIG. 33, which comprises: a document data storage unit 25 for storing the document data; an input unit 20 for entering the retrieval command; a retrieval unit 23 for retrieving the document data according to the retrieval command; a retrieval result display unit 22 for displaying the retrieval result; a timer unit 29 for measuring time; an operation history storage unit 31 for storing the time data and the document ID and document name of the document in the retrieval result; a communication unit 30 for notifying the presence of the first device; an output unit 28 for outputting the data stored in the operation history storage unit 31; and a control unit 21 for controlling operation of the above mentioned elements. This first device can be provided in plurality.

Figure 34:
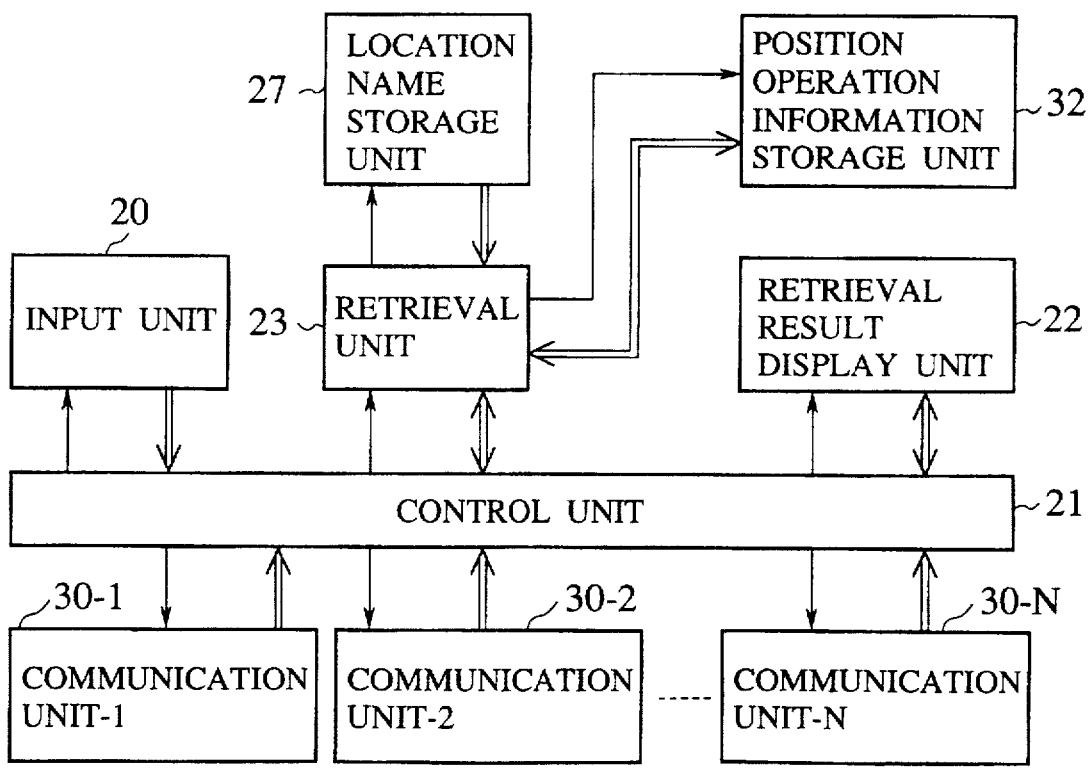
FIG. 34 is a schematic block diagram for a functional configuration of a second device in the third specific embodiment of the system of FIG. 1.

On the other hand, the second device has the functional configuration as shown in FIG. 34, which comprises: an input unit 20 for entering the retrieval command and the data input; a retrieval unit 23 for retrieving the document data according to the retrieval command; a retrieval result display unit 22 for displaying the retrieval result; a communication unit 30 (30-1 to 30-N corresponding to a plurality of the first devices) for receiving the information transmitted from the first device; a position operation information storage unit 32 for storing the information transmitted from the first device; a location name storage unit 27 for storing the location name representing the measured position; and a control unit 21 for controlling operation of the above mentioned elements.

Here, the document data in the document data storage unit 25 of the first device of FIG. 33 is expressed in the same format as that of FIG. 11 described above, while the control unit 21 in the first device of FIG. 33 operates according to the same flow chart as that of FIG. 12 described above.

Figure 35:
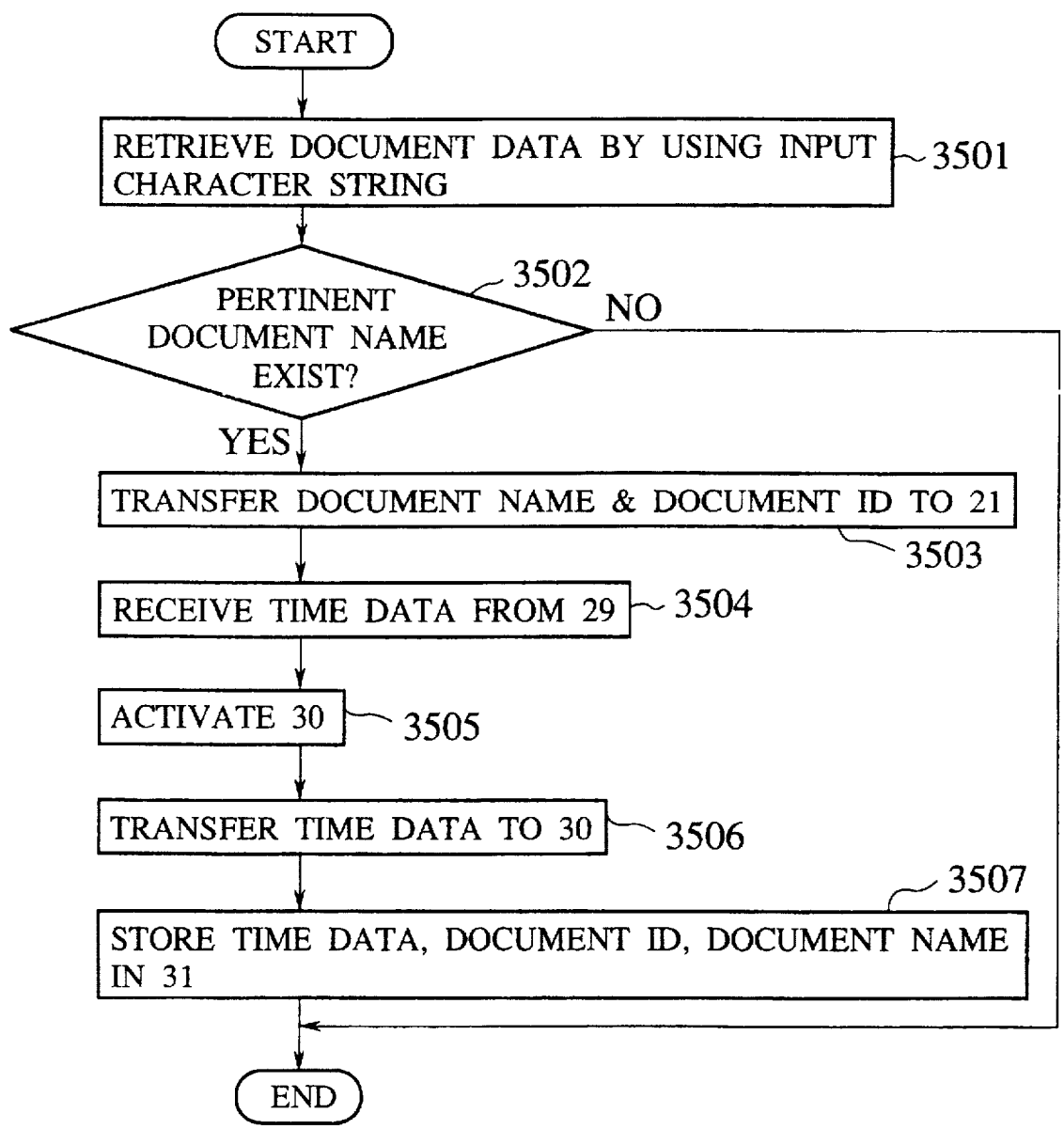
FIG. 35 is a flow chart for the operation of the retrieval unit in the first device of FIG. 33 in a case of document look up or correction.

The retrieval unit 23 in the first device of FIG. 33 operates according to the flow chart of FIG. 35 as follows. Namely, the retrieval unit 23 retrieves the document data by using the input character string transferred from the control unit 21 (step 3501), and when a pertinent document name is found (step 3502 yes), the obtained document ID is transferred to the control unit 21 (step 3503) and the time data for that timing is received from the timer unit 29 (step 3504).

Then, the retrieval unit 23 activates the communication unit 30 (step 3505), and transfer the time data to the communication unit 30 (step 3506). In response, the activated communication unit 30 transmits the user ID of the user who is operating the first device and the transferred time data. Here, the communication unit 30 transmits this information in a format shown in FIG. 36. Then, the retrieval unit 23 stores the time data and the document ID and document name of the retrieved document in the operation history storage unit 31 (step 3507). Here, the operation history storage unit 31 stores the data in a format shown in FIG. 37. Also, in a case a plurality of document data are retrieved, instead of storing the document IDs and the document names of all the retrieved document data, it is possible to store only the document ID of the document data which is selected by the user on the retrieval result display unit 22 to display its content.

In addition to the looking up and the correction of the already existing document as described above, the user can also produce the new document. In this case, the input unit 20 stores the input entered by the user into the document data storage unit 25 along with the document ID and the document name specified by the user, and transfers the document ID to the control unit 21. The control unit 21 then activates the retrieval unit 23 and transfers the document ID to the retrieval unit 23. In response, the retrieval unit 23 operates according to the flow chart of FIG. 38 as follows.

Namely, the retrieval unit 23 receives the document ID from the control unit 21 (step 3801), and the time data from the timer unit 29 (step 3802). Then, the retrieval unit 23 activates the communication unit 30 (step 3803), and transfers the time data to the communication unit 30 (step 3804). Finally, the retrieval unit 23 stores the time data and the document ID and document name of the produced document in the operation history storage unit 31 (step 3805).

In the second device, the processing in a case of receiving the information transmitted from an arbitrary one of the first devices, and the processing for retrieving the document looked up, corrected, or produced in the past by using the location name. Here, the communication unit 30 of the second device is assigned with the location ID indicating a location at which it is provided.

When an arbitrary communication unit 30-i receives the information transmitted from an arbitrary one of the first devices, the control unit 21 stores a set of the received information and the location ID assigned to that communication unit 30-i in the position operation information storage unit 32. Here, the data in the position operation information storage unit 32 is in a format shown in FIG. 39, and the exemplary data immediately after that processing is shown as the example 1 in FIG. 39, in which the document ID and the document name are not yet set up, as they are to be set up by the subsequent processing described below.

Next, the processing for retrieving the document by using the location name is carried out as follows. Namely, the user enters the data in the operational history storage unit 31 in the first device from the output unit 28 of the first device to the input unit 20 of the second device. More specifically, for example, the output unit 28 of the first device and the input unit 20 of the second device are connected through a cord, and the user either specifies "operation history input" command on the window (not shown) displayed in the second device through the mouse, or presses "operation history input" key on the keyboard. Here, instead of using a cord connection, the optical communication may be utilized. When the "operation history input" is selected and the data in the operation history storage unit 31 in the first device is entered, the control unit 21 of the second device transfers the entered data to the retrieval unit 23.

Figure 40:
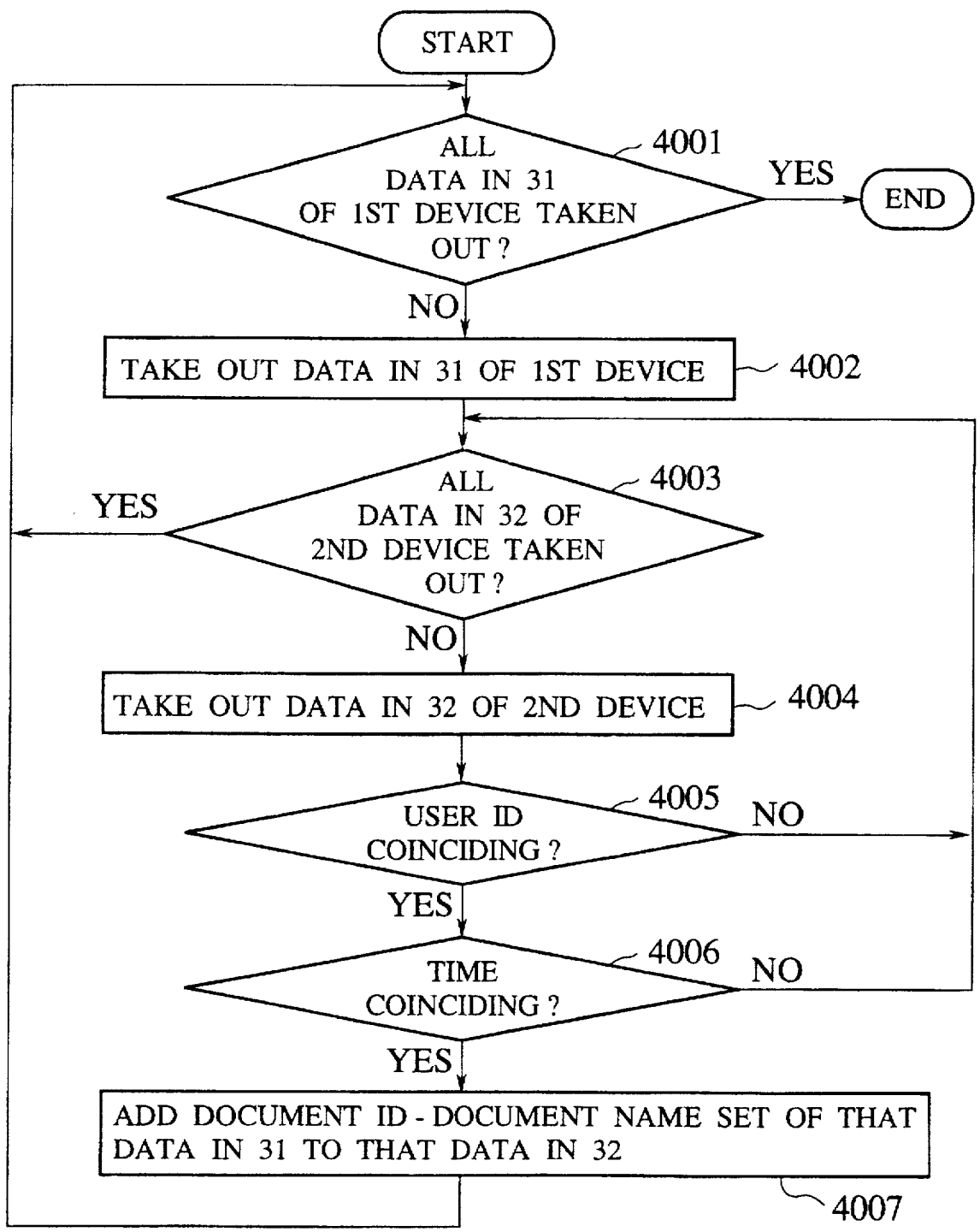
FIG. 40 is a flow chart for the operation of the retrieval unit in the second device of FIG. 34.

The retrieval unit 23 then carries out the processing according to the flow chart of FIG. 40 for all the transferred data as follows. Namely, for all the transferred data of the operation history storage unit 31 in the first device (steps 4001, 4002), the data in the position operation information storage unit 32 in the second device are retrieved (steps 4003, 4004), and when the user ID and the time coincide (step 4005 yes, step 4006 yes), a set of the document ID and the document name in the coinciding data of the operation history storage unit 31 is added to the coinciding data in the position operation information storage unit 32 (step 4007). As a result, the exemplary in the position operation information storage unit 32 becomes shown as the example 2 in FIG. 39, in which the document ID and the document name are set up.

Next, the user either specifies "location retrieval" command on the window (not shown) displayed in the second device through the mouse, or presses "location retrieval" key on the keyboard. When the "location retrieval" is selected, the control unit 21 of the second device activates the retrieval unit 23. The retrieval unit 23 then takes out the data coinciding with the user ID of this user from the position operation information storage unit 32, carries out the retrieval of the location name from the location name storage unit 27 by using the location ID of the taken out data, and replaces the location ID by the location name stored in the location name storage unit 27. Here, the data in the location name storage unit 27 is in a format shown in FIG. 41. The retrieval unit 23 then transfers the retrieval result to the control unit 21. The control unit 21 then activates the retrieval result display unit 22, and transfers the retrieval result to the retrieval result display unit 22. The retrieval result display unit 22 then displays the retrieval result on the window for the retrieval result display. Here, the exemplary display on the window for the retrieval result display in the retrieval result display unit 22 appears as shown in FIG. 42.

Next, the fourth specific embodiment concerns with a modification of the third specific embodiment described above in that the communication unit 30 in each of the first and second devices is an infrared transceiver for both transmitting and receiving the information.

In this third specific embodiment, each of the first and second devices has the physical configuration similar to that of FIG. 9 described above, where each of the first and second devices has the infrared transceiver as the communication unit 107.

Figure 43:
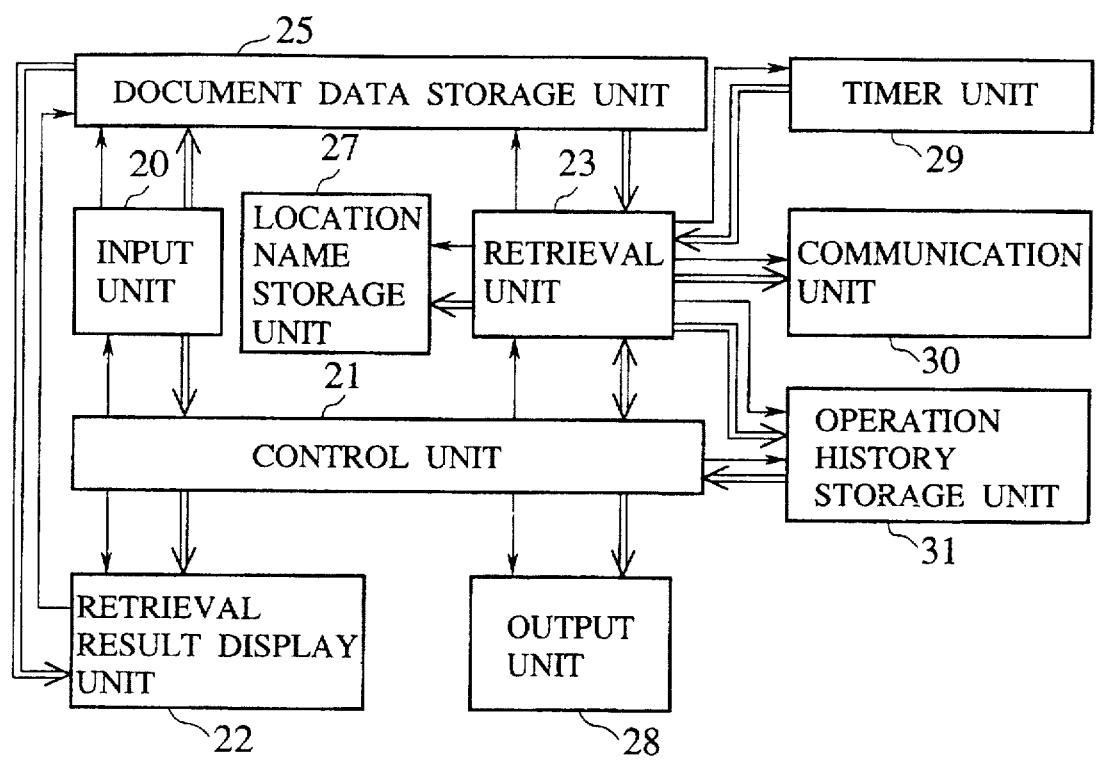
FIG. 43 is a schematic block diagram for a functional configuration of a first device in the fourth specific embodiment of the system of FIG. 1.

The first device has the functional configuration as shown in FIG. 43, which comprises: a document data storage unit 25 for storing the document data; an input unit 20 for entering the retrieval command; a retrieval unit 23 for retrieving the document data according to the retrieval command; a retrieval result display unit 22 for displaying the retrieval result; a timer unit 29 for measuring time; an operation history storage unit 31 for storing the time data, the location ID, and the document ID and document name of the document in the retrieval result; a location name storage unit 27 for storing the location name corresponding to the location ID, a communication unit 30 for notifying the presence of the first device to the second device, and receiving the location ID from the second device; an output unit 28 for outputting the data stored in the operation history storage unit 31; and a control unit 21 for controlling operation of the above mentioned elements. This first device can be provided in plurality.

Figure 44:
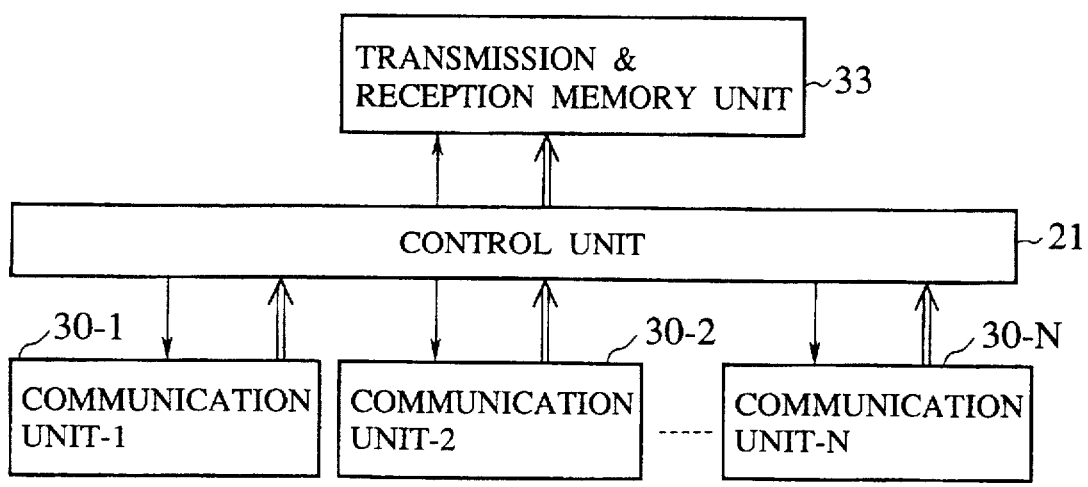
FIG. 44 is a schematic block diagram for a functional configuration of a second device in the fourth specific embodiment of the system of FIG. 1.

On the other hand, the second device has the functional configuration as shown in FIG. 44, which comprises: a communication unit 30 (30-1 to 30-N corresponding to a plurality of the first devices) for receiving the information transmitted from the first device, and transmitting the location ID; a transmission and reception memory unit 33 for storing the received data and the transmitted location ID; and a control unit 21 for controlling operation of the above mentioned elements.

Here, the document data in the document data storage unit 25 of the first device of FIG. 43 is expressed in the same format as that of FIG. 11 described above, while the control unit 21 in the first device of FIG. 43 operates according to the same flow chart as that of FIG. 12 described above.

The retrieval unit 23 in the first device of FIG. 43 operates according to the flow chart of FIG. 45 as follows. Namely, the retrieval unit 23 retrieves the document data by using the input character string transferred from the control unit 21 (step 4501), and when a pertinent document name is found (step 4502 yes), the obtained document ID is transferred to the control unit 21 (step 4503) and the time data for that timing is received from the timer unit 29 (step 4504).

Then, the retrieval unit 23 activates the communication unit 30 (step 4505), and transfer the time data to the communication unit 30 (step 4506). In response, the activated communication unit 30 transmits the user ID of the user who is operating the first device and the transferred time data. Here, the communication unit 30 transmits this information in the same format as that shown in FIG. 36. It is to be noted that the data to be transmitted from the communication unit 30 may not necessary contains both the user ID and the time data, and can be only the user ID, only the time data, or some other data, as long as the presence of the first device can be notified to the second device.

The communication unit 30 also receives the location ID transmitted from the communication unit 30 of the second device, and transfers the received location ID to the retrieval unit 23.

Then, the retrieval unit 23 receives the location ID from the communication unit 30 (step 4507), and stores the time data, the location ID, and the document ID and document name of the retrieved document in the operation history storage unit 31 (step 4508). Here, the operation history storage unit 31 stores the data in a format shown in FIG. 46. Also, in a case a plurality of document data are retrieved, instead of storing the document IDs and the document names of all the retrieved document data, it is possible to store only the document ID of the document data which is selected by the user on the retrieval result display unit 22 to display its content.

In addition to the looking up and the correction of the already existing document as described above, the user can also produce the new document. In this case, the input unit 20 stores the input entered by the user into the document data storage unit 25 along with the document ID and the document name specified by the user, and transfers the document ID to the control unit 21. The control unit 21 then activates the retrieval unit 23 and transfers the document ID to the retrieval unit 23. In response, the retrieval unit 23 operates according to the flow chart of FIG. 47 as follows.

Namely, the retrieval unit 23 receives the document ID from the control unit 21 (step 4701), and the time data from the timer unit 29 (step 4702). Then, the retrieval unit 23 activates the communication unit 30 (step 4703), and transfers the time data to the communication unit 30 (step 4704). The activated communication unit 30 then transmits the user ID of the user who is operating the first device and the transferred time data, receives the location ID transmitted from the communication unit 30 of the second device, and transfers the received location ID to the retrieval unit 23.

Then, the retrieval unit 23 receives the location ID from the communication unit 30 (step 4705), and stores the time data, the location ID, and the document ID and document name of the retrieved document in the operation history storage unit 31 (step 4706).

On the other hand, the communication unit 30 of the second device is assigned with the location ID indicating a location at which it is provided. When an arbitrary communication unit 30-i of the second device receives the information transmitted from an arbitrary one of the first devices, the control unit 21 stores a set of the received information and the location ID assigned to that communication unit 30-i in the transmission and reception memory unit 33, and transmits the location ID from that communication unit 30-i.

Next, the processing for retrieving the document by using the location name is carried out as follows. Namely, the user either specifies "location retrieval" command on the window (not shown) displayed in the first device through the mouse, or presses "location retrieval" key on the keyboard. When the "location retrieval" is selected, the control unit 21 of the first device activates the retrieval unit 23. The retrieval unit 23 then takes out the data coinciding with the user ID of this user from the position operation information storage unit 32, carries out the retrieval of the location name from the location name storage unit 27 by using the location ID of the taken out data, and replaces the location ID by the location name stored in the location name storage unit 27. Here, the data in the location name storage unit 27 is in the same format as that shown in FIG. 41. The retrieval unit 23 then transfers the retrieval result to the control unit 21. The control unit 21 then activates the retrieval result display unit 22, and transfers the retrieval result to the retrieval result display unit 22. The retrieval result display unit 22 then displays the retrieval result on the window for the retrieval result display. Here, the exemplary display on the window for the retrieval result display in the retrieval result display unit 22 appears the similar to that shown in FIG. 42.

In this fourth specific embodiment, the measurement of the time data may be omitted such that only the location ID and the document ID and document name of the document are stored and displayed.

Also, instead of transmitting and receiving the location ID, the location name may be transmitted and received between the first and second devices. In this case, the location name storage unit 27 in the first device becomes unnecessary.

Next, the fifth specific embodiment concerns with a modification of the third specific embodiment described above in that the first device has the communication unit 30 for making a reception while the second device has the communication unit 30 for making a transmission, contrary to the third specific embodiment.

In this third specific embodiment, each of the first and second devices has the physical configuration similar to that of FIG. 9 described above, where the first device has the infrared receiver as the communication unit 107, while the second device has the infrared transmitter as the communication unit 107.

The first device has the functional configuration similar to that of FIG. 43 described above, except that the communication unit 30 only makes the reception of the location ID transmitted from the second device.

Figure 48:
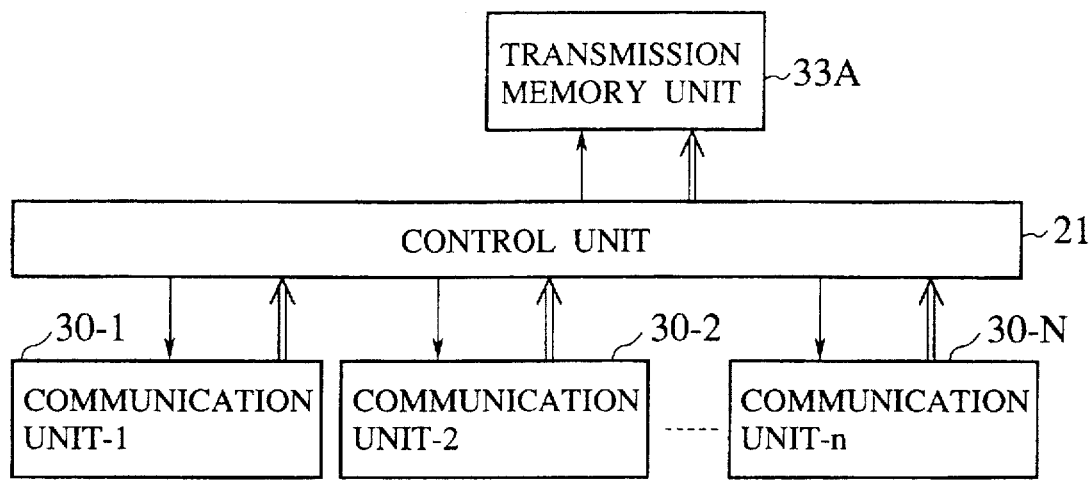
FIG. 48 is a schematic block diagram for a functional configuration of a second device in the fifth specific embodiment of the system of FIG. 1.

On the other hand, the second device has the functional configuration as shown in FIG. 48, which comprises: a communication unit 30 (30-1 to 30-N corresponding to a plurality of the first devices) for transmitting the location ID; a transmission memory unit 33A for storing the transmitted location ID; and a control unit 21 for controlling operation of the above mentioned elements.

Here, the document data in the document data storage unit 25 of the first device is expressed in the same format as that of FIG. 11 described above, while the control unit 21 in the first device operates according to the same flow chart as that of FIG. 12 described above.

Figure 45:
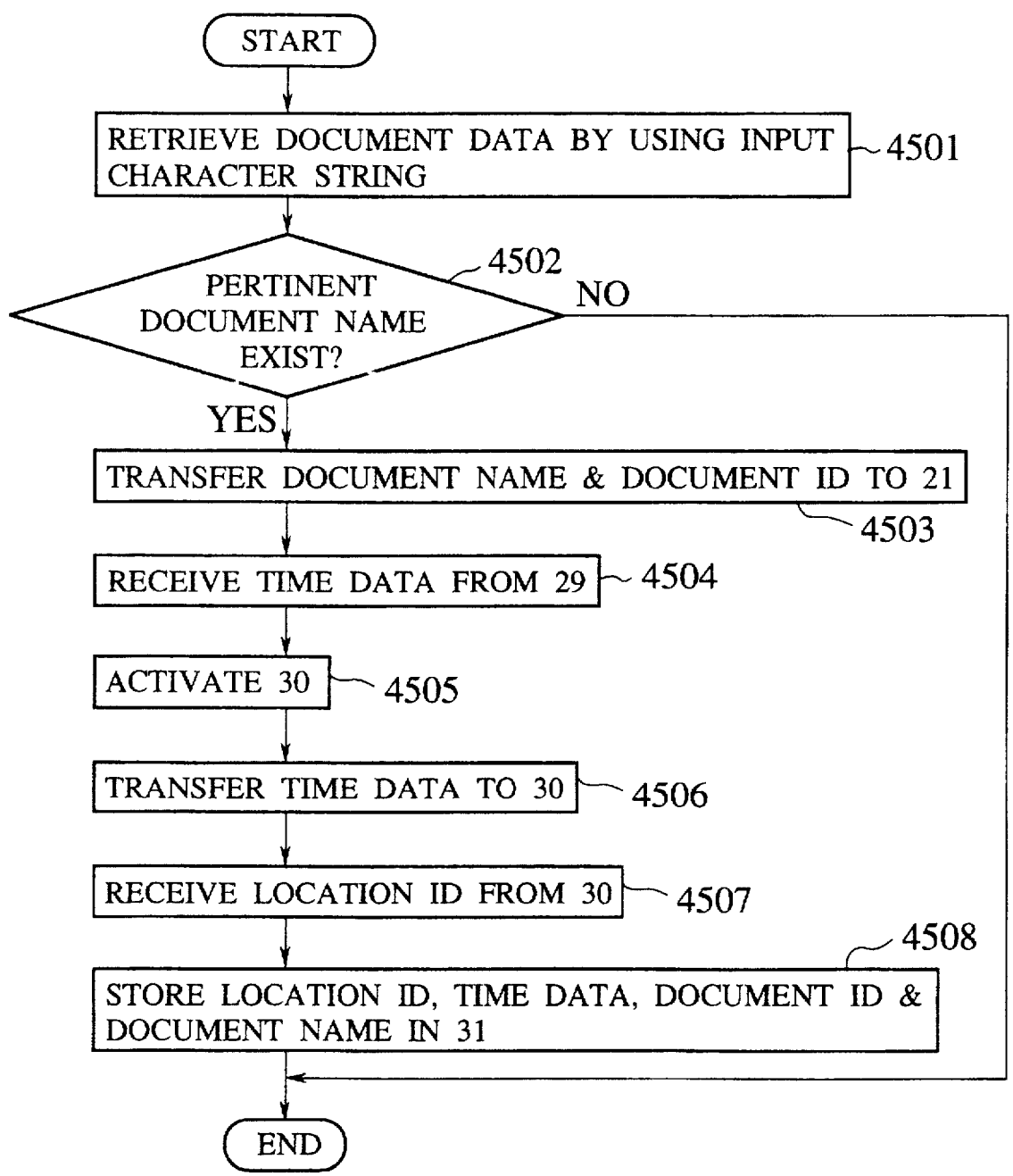
FIG. 45 is a flow chart for the operation of the retrieval unit in the first device of FIG. 43 in a case of document look up or correction.
Figure 47:
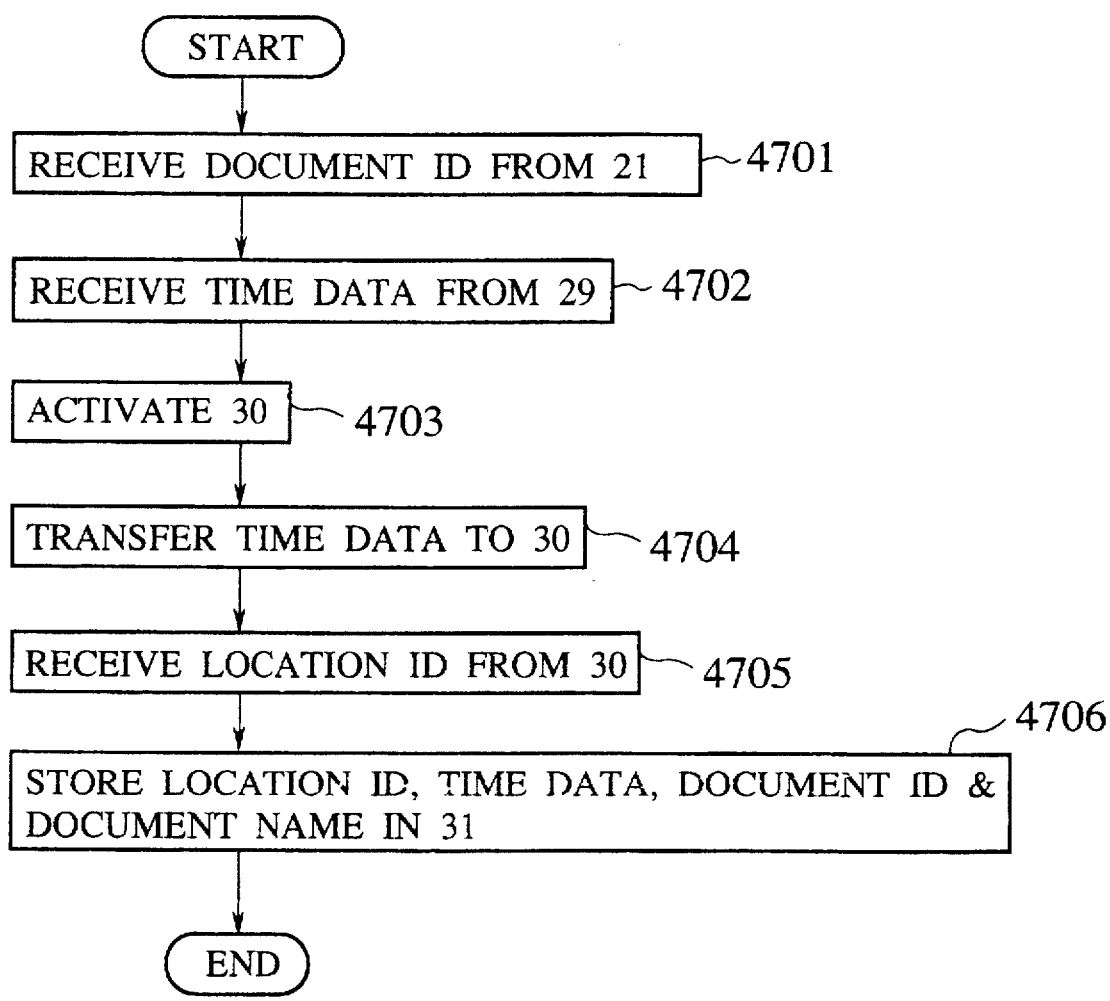
FIG. 47 is a flow chart for the operation of the retrieval unit in the first device of FIG. 43 in a case of document production.

Also, the retrieval unit 23 in the first device operates according to the same flow chart as that of FIGS. 45 and 47 described above, except that the communication unit 30 of the second device is transmitting the location ID either always or at constant intervals, so that the steps 4506 in FIG. 45 and the step 4704 in FIG. 47 are omitted.

Besides these, the data format in the operation history storage unit 31 and the data format in the location name storage unit 27 are the same as those in the fourth specific embodiment described above.

Next, the sixth specific embodiment concerns with a modification of the above described specific embodiments in which the position information of the system itself is matched with the position information of the document looked up, corrected, or produced in the past, and the document with the position information coinciding with that of the system itself is displayed.

Figure 49:
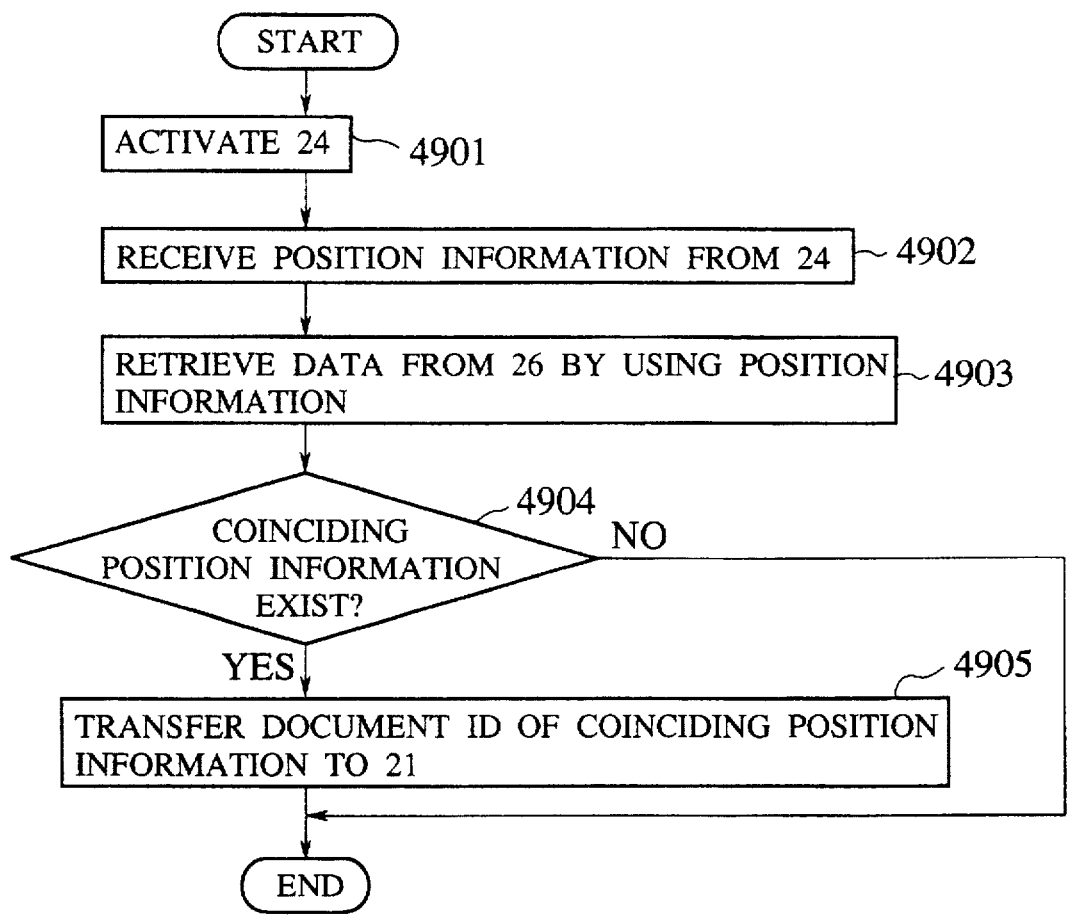
FIG. 49 is a flow chart for the operation of the retrieval unit in the sixth specific embodiment of the system of FIG. 1, in a case corresponding to the first and second specific embodiments.

In this case, the retrieval unit 23 corresponding to that in the first and second specific embodiments described above operates according to the flow chart of FIG. 49 as follows. Namely, the retrieval unit 23 activates the position measurement unit 24 (step 4901), and receives the position information from the position measurement unit 24 (step 4902). Then, the retrieval unit 23 retrieves the data from the position and document information storage unit 26 by using the received position information (step 4903). When there is a position information in the position and document information storage unit 26 which is coinciding with the received position information (step 4904 yes), the retrieval unit 23 transfers the retrieved document ID of that coinciding position information to the control unit 21 (step 4905).

Figure 50:
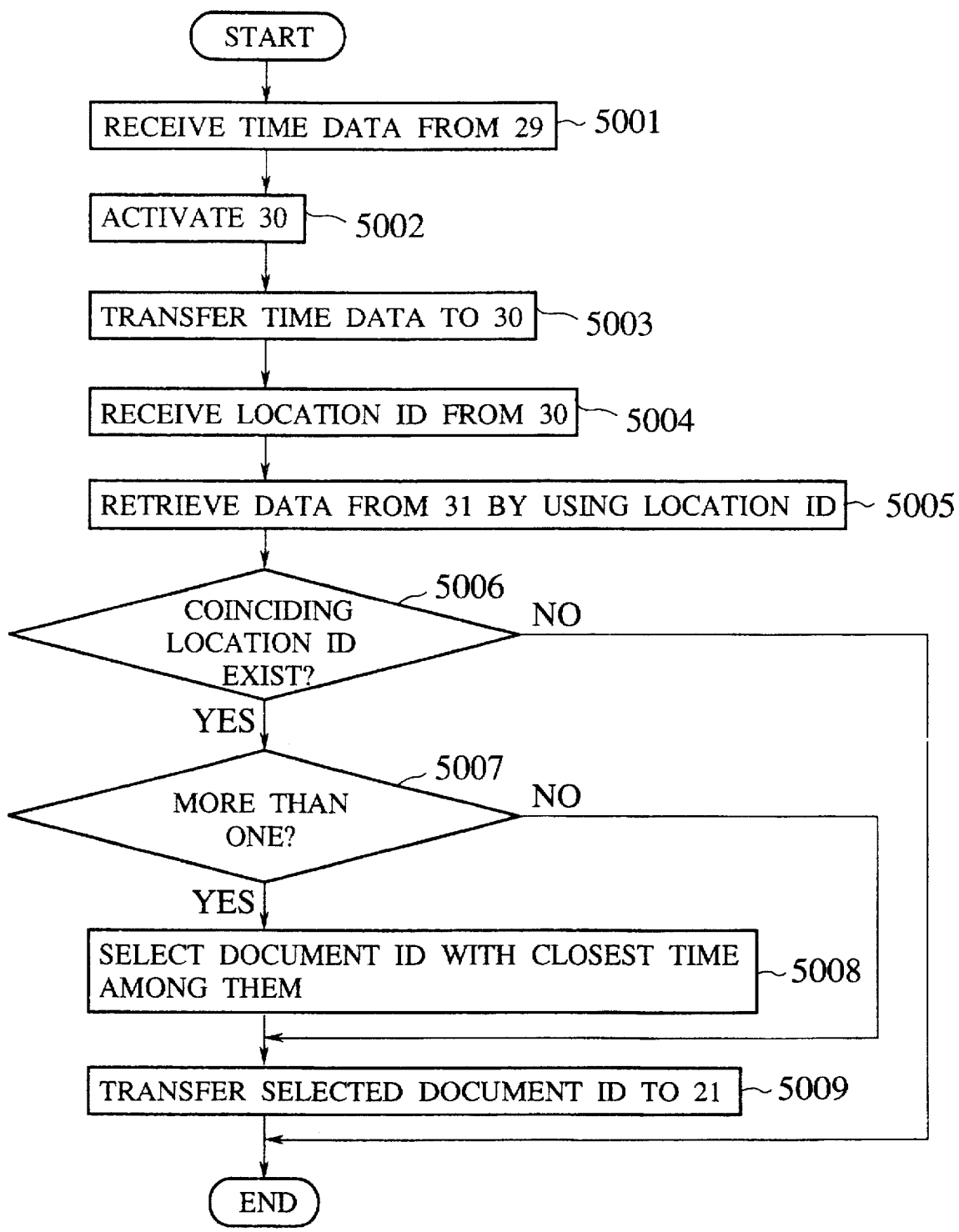
FIG. 50 is a flow chart for the operation of the retrieval unit in the sixth specific embodiment of the system of FIG. 1, in a case corresponding to the fourth and fifth specific embodiments.

On the other hand, the retrieval unit 23 corresponding to that in the fourth and fifth specific embodiments described above operates according to the flow chart of FIG. 50 as follows. Namely, the retrieval unit 23 receives the time data from the timer unit 29 (step 5001), activates the communication unit 30 (step 5002), and transfers the time data to the communication unit 30 (step 5003). Then, the retrieval unit 23 receives the location ID from the communication unit 30, and retrieves the data from the operation history storage unit 31 by using the received location ID (step 5005). When there are more than one coinciding location IDs (step 5006 yes and step 5007 yes), the document ID of the document for which the time value is the closest is selected (step 5008), and that document ID is transferred to the control unit 21 (step 5009).

Besides these, the operation flow of the control unit 21 as well as the data format in various elements are the same as those in the above described specific embodiments so that they are not repeated here.

Next, the seventh specific embodiment concerns with a modification of the above described specific embodiments in that in addition to the display of the name of the location, the display of the image is also provided.

Figure 51:
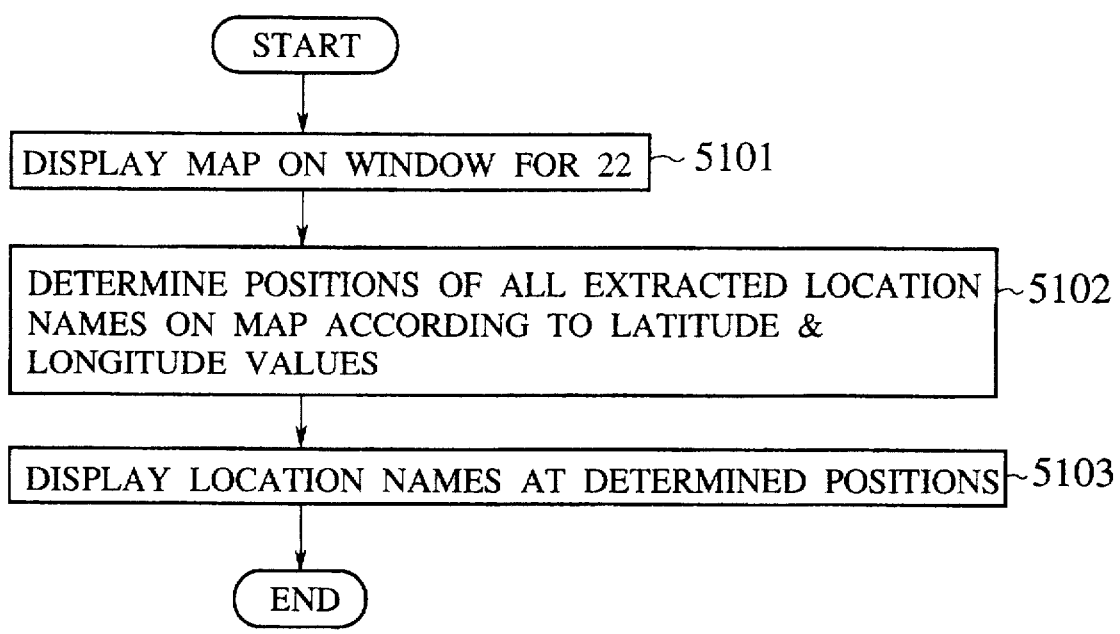
FIG. 51 is a flow chart for the operation of the retrieval result display unit in the seventh specific embodiment of the system of FIG. 1.

The functional configuration of the system of this seventh specific embodiment is basically the same as that shown in FIG. 10 described above, except that the retrieval result display unit 22 has a map database. In this case, the retrieval result display unit 22 operates basically as in the flow chart of FIG. 20 described above, except that the step 2002 is carried out in detail according to the flow chart of FIG. 51 as follows. Namely, the map is displayed on the window for the retrieval result display first (step 5101), and positions of all the extracted location names on the map are determined according to their latitude and longitude values (step 5102). Then, the location names are displayed on the map at the determined positions (step 5103).

Figure 52A:
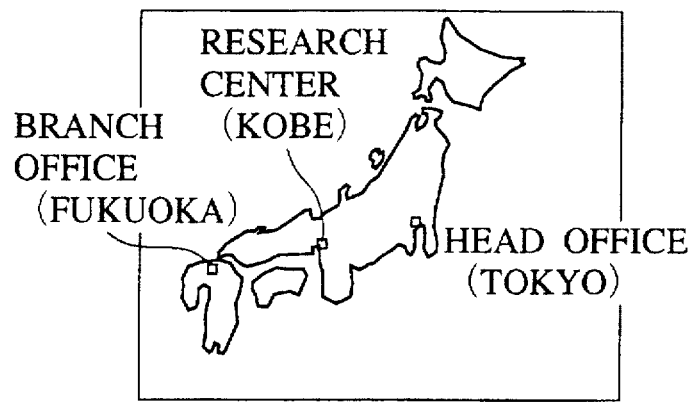
FIGS. 52A and 52B are illustrations of exemplary displays by the retrieval result display unit in the seventh specific embodiment of the system of FIG. 1 at the step 5101 in FIG. 51.
Figure 52B:
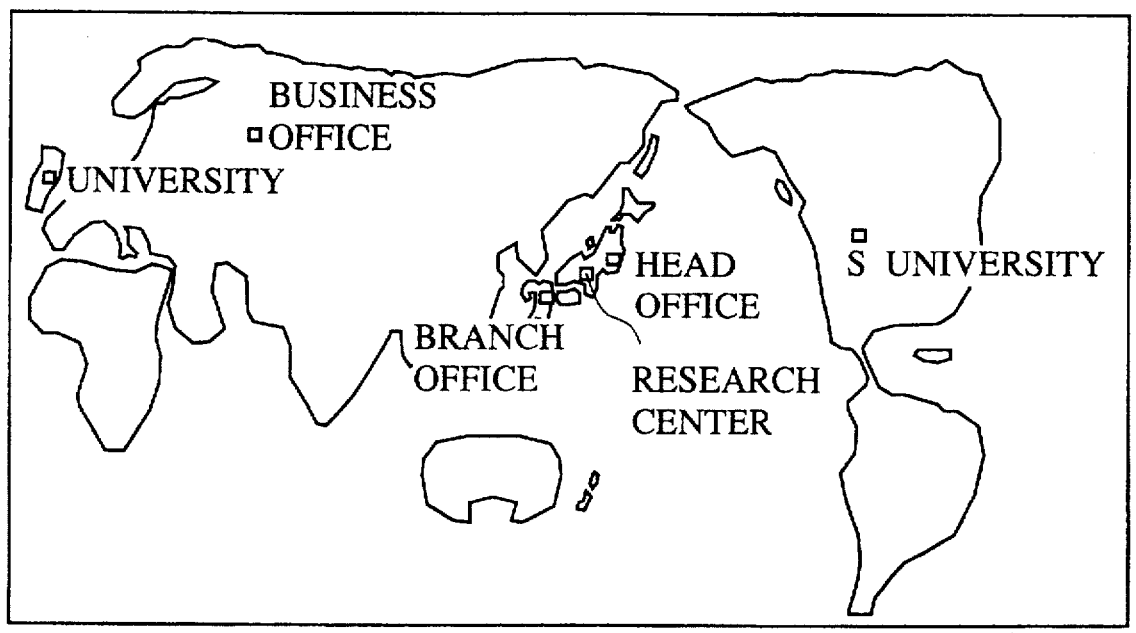
Figure 53:
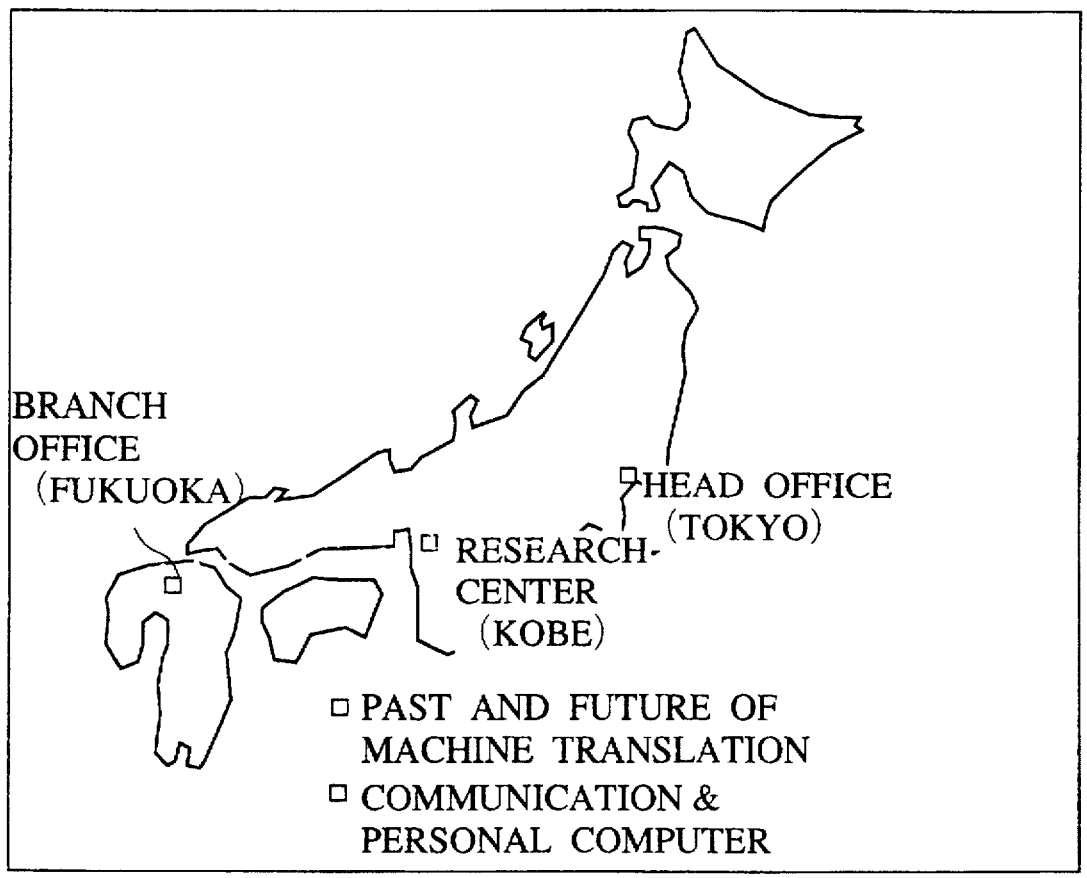
FIG. 53 is an illustration of an exemplary display by the retrieval result display unit in the seventh specific embodiment of the system of FIG. 1 after the step 5103 in FIG. 51.

For example, FIGS. 52A and 52B show examples of the display at the step 5101 on the window for the retrieval result display, where FIG. 52A depicts the atlas of Japan while FIG. 52B depicts the atlas of the world. In these exemplary displays, the X and Y coordinates on the display corresponds to the latitude and longitude, respectively. FIG. 53 shows an exemplary display after the step 5103, for a case in which a particular location "research center (Kobe)" has been selected on the map of FIG. 52A so that the document names associated with this location are also displayed in relation to the location name of this particular location. The remaining operation of the retrieval result display unit 22 is substantially equivalent to that in the first specific embodiment.

It is also possible to display all the corresponding document names in relation to all the location names simultaneously. In either case, it is also possible to limit the number of document names that can be displayed at once to a prescribed number, and the document names in excess of the prescribed number can be displayed by the operation through the mouse.

Figure 54A:
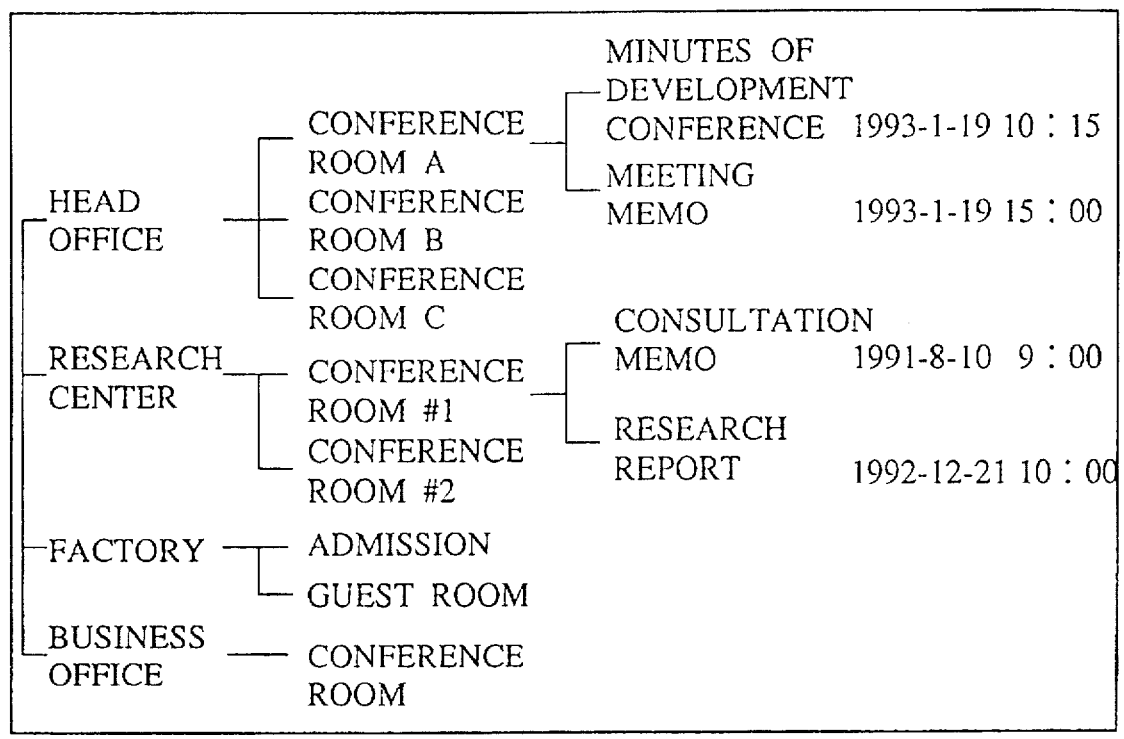
FIGS. 54A and 54B are illustrations of exemplary displays by the retrieval result display unit in the seventh specific embodiment of the system of FIG. 1 in a case corresponding to the third or fourth specific embodiments.
Figure 54B:
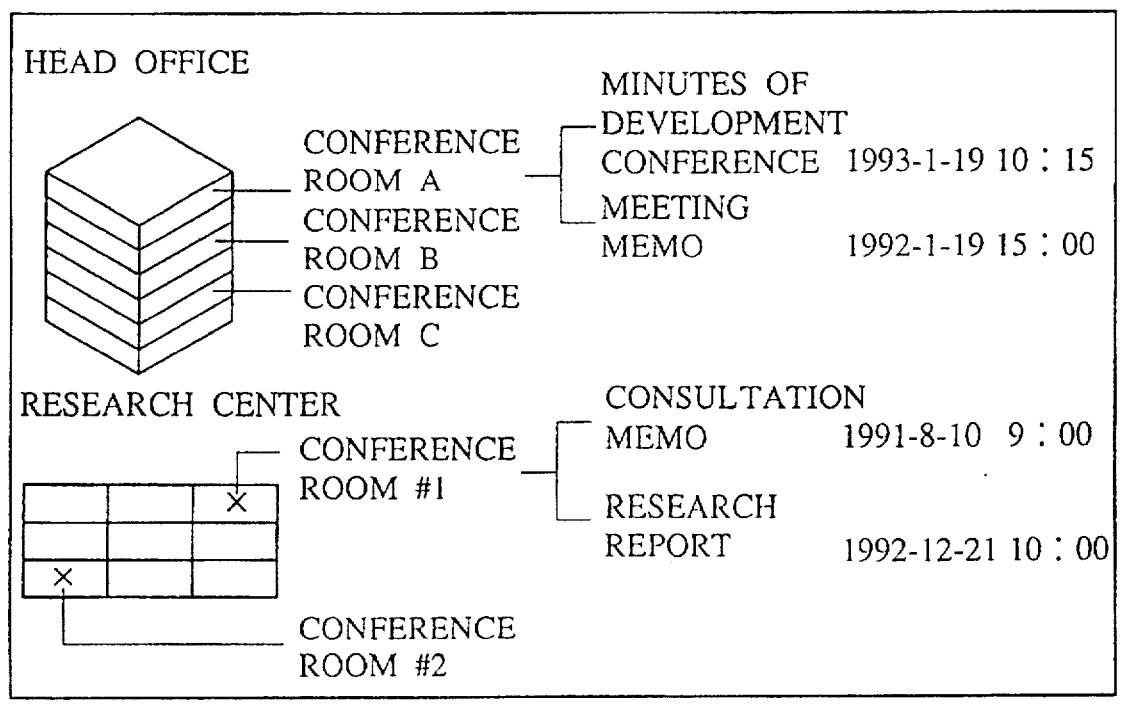

In the modification of the third or fourth specific embodiment described above, the retrieval result display unit 22 is similarly provided with the map database to carry out the similar display of the map. An exemplary display in this case appears as shown in FIG. 54A in which the character strings indicating affiliation names in a company organization are accompanied by the corresponding location names, document names, and time information depicted in a tree structure. In this case, the data in the map database can be given in a format shown in FIG. 55. The tree structure of FIG. 54A is formed to reflect the hierarchical orders of the affiliation levels. Another exemplary display in this case appears as shown in FIG. 54B in which the location names are displayed in relation to the image of the locations. The correspondences between the location image and the location names can be realized by the presently available computer graphics technique.

It is also possible to display the documents related to a certain area within each location in group, such that the document names can be displayed at positions of these documents when that each location is selected. For example, in the display of the atlas of the world, the documents related to Japan can be displayed together at one position, and when this position is specified by the mouse, the display can be switched to that of the atlas of Japan in which the document names are displayed at the respective positions of the documents on the atlas of Japan. Similarly, in the display of the diagram of the company organization, the documents related to the head office can be displayed in one group, and when this position is specified by the mouse, the display is switched to the diagram of the head office organization in which the document names are displayed at the respective positions of the documents in the head office.

In addition to utilize the position information as the retrieval key for retrieving the document as described above, the display of the information concerning the position at which the document selected by the user had been looked up, corrected, or produced can provide the valuable clue for the user to recall the content of that document or the situations in which the user had looked up, corrected, or produced that document in the past. In such a case, the data can be retrieved from the position and document information storage unit 26 or the operation history storage unit 31 by using the document ID of the retrieved document, and the location name can be displayed according to the latitude and longitude values or the location ID corresponding to that document ID.

It is also possible to apply this embodiment to the data other than the documents such as the programs. In a case of the programs, the document IDs and the documents are replaced by the program IDs and the programs.

Next, the eighth specific embodiment concerns with a modification of the above described specific embodiments in that the retrieval of the document is assisted by displaying the group of documents according to the information such as the addresses contained in the documents, in addition to the position information.

In this eighth specific embodiment, the physical configuration of the system is the same as that shown in FIG. 9 described above.

Figures 55, 56:
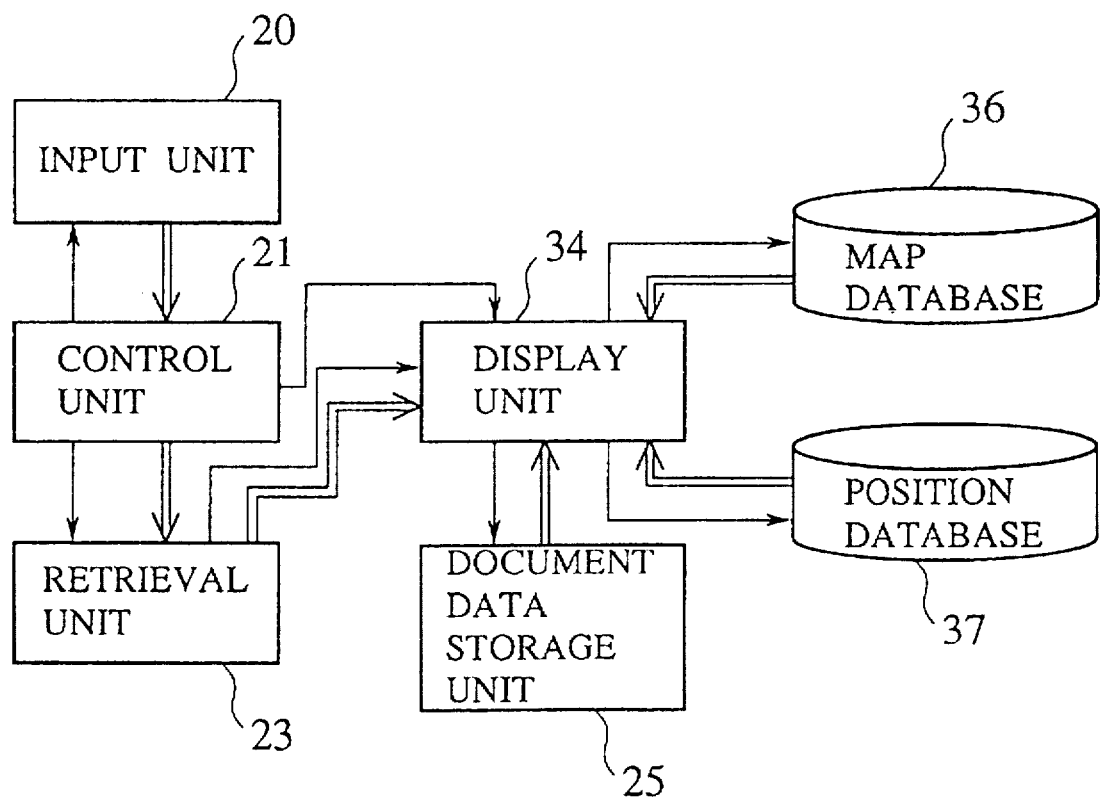
FIG. 55 is a table showing a format and examples for data in the map database in the seventh specific embodiment of the system of FIG. 1.
FIG. 56 is a schematic block diagram for a functional configuration of the eighth specific embodiment of the system of FIG. 1.

The system has the functional configuration as shown in FIG. 56, which comprises: a document data storage unit 25 for storing the document data; an input unit 20 for entering the retrieval command or the display command; a retrieval unit 23 for retrieving the document data according to the retrieval command; a display unit 34 for displaying the retrieval result and the document data; a map database 36 and a position database 37 utilized in the display of the retrieval result or the document data; and a control unit 21 for controlling operation of the above mentioned elements.

First, as shown in FIG. 57, a case in which the address of the author is given in the document will be described. Here, the extraction of the address will be described in detail below, but it suffices to utilize the document frame recognition and analyze the character string within the first document frame. For this analysis, the method used in the machine translation system can be adopted. The address of the author is extracted from the document in this manner, and the document ID and the extracted address are stored in the document data storage unit 25 in a format shown in FIG. 58. In addition, the data in the position database 37 is given in a format shown in FIG. 59.

For each retrieved document, the display unit 34 matches the address of each document with the addresses in the position database 37, and when the address extracted from the document exists in the position database 37, the latitude and longitude values of that document are attached to the document. Then, the map in the map database 36 is displayed, and the document name of that document is displayed at the coordinate position corresponding to the attached latitude and longitude values. Here, in addition to the retrieved document, all the documents in the document data storage unit 25 may be displayed. In such a case, similarly to the seventh specific embodiment described above, it is also possible to limit the number of document names that can be displayed at once to a prescribed number, and the document names in excess of the prescribed number can be displayed by the operation through the mouse.

Next, as shown in FIGS. 60A and 60B, a case in which only the affiliated organization name or the affiliated section name of the author alone is given in the document will be described. Here, the extraction of the affiliated organization or section name can be done similarly as in the case of the address. In this case, the data in the document data storage unit 25 is given in a format shown in FIG. 61. In addition, the data in the position database 37 is given in a format shown in FIG. 62.

For each retrieved document, the display unit 34 matches the affiliated organization or section name of the author of each document with the affiliated organization or section names in the position database 37, and when the affiliated organization or section name extracted from the document exists in the position database 37, the latitude and longitude values of that document are attached to the document. Then, the map in the map database 36 is displayed, and the document name of that document is displayed at the coordinate position corresponding to the attached latitude and longitude values. Here, in addition to the retrieved document, all the documents in the document data storage unit 25 may be displayed. In such a case, similarly to the seventh specific embodiment described above, it is also possible to limit the number of document names that can be displayed at once to a prescribed number, and the document names in excess of the prescribed number can be displayed by the operation through the mouse. Moreover, similarly to the seventh specific embodiment described above, the documents within a certain area can be displayed in one group, and the documents can be displayed at their respective positions only when that certain area is selected.

It is also possible to display a list of the dates and the document names as shown in FIG. 63 by extracting the produced dates, announced dates, or the issued dates given in the title section of the documents, similarly to the case of the address. Likewise, in a case of using a plurality of the document data storage unit 25, as shown in FIG. 64, it is possible to display a list of the issued date assigned to each document data storage unit 25, the name given to each document data storage unit 25, and the document name belonging to each document data storage unit 25.

Next, the ninth specific embodiment concerns with a case in which the schedule produced by the known schedule management system is stored in relation to the data such as the documents, and the desired data are retrieved according to the schedule items.

Figure 65:
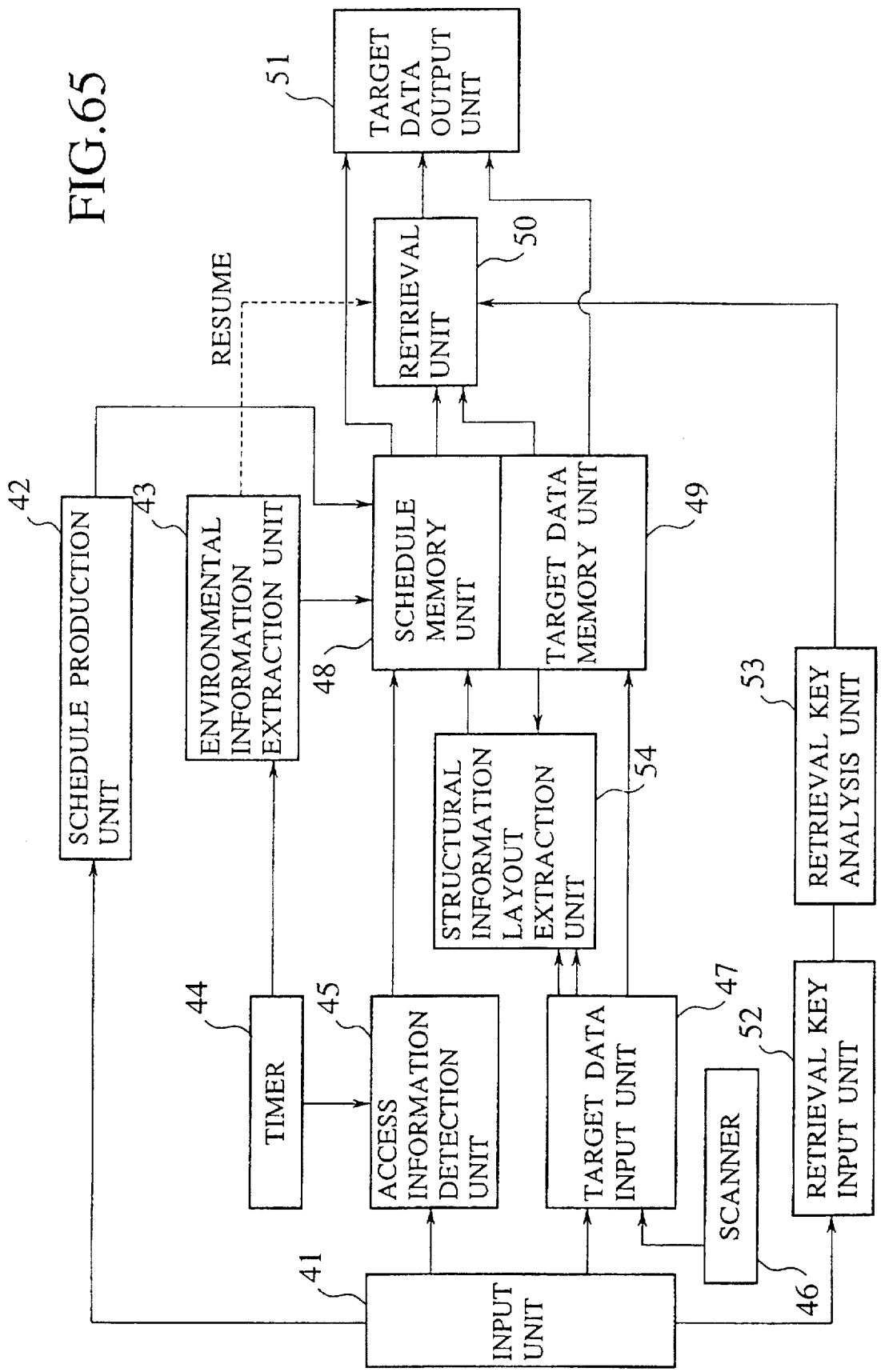
FIG. 65 is a schematic block diagram for a functional configuration of the ninth specific embodiment of the system of FIG. 1.

In this ninth specific embodiment, the system has the functional configuration shown in FIG. 65 which comprises: an input unit 41 such as pen, keyboard, mouse, microphone, and camera for entering various inputs; a schedule production unit 42 for producing a schedule according to the schedule data entered from the input unit 41; an environmental information extraction unit 43 for extracting the environmental information; a timer for measuring time; an access information detection unit 45 for detecting the information concerning the data access operation from the access commands entered from the input unit 41; a scanner for entering image data; a target data input unit 47 for entering the target data specified by the input unit 41 and the scanner 46; a schedule memory unit 48 for storing the schedule produced by the schedule production unit 42; a target data memory unit 49 for storing the target data entered from the target data input unit 47; a retrieval unit 50 for retrieving the schedule stored in the schedule memory unit 48 and the target data stored in the target data memory unit 49; a target data output unit 51 for outputting the target data retrieved by the retrieval unit 50; a retrieval key input unit 52 for entering the retrieval key specified by the input unit 41; a retrieval key analysis unit 53 for analyzing the retrieval key entered from the retrieval key input unit 52; and a structural information layout extraction unit 54 for extracting the structural information layout from the target data entered from the target data input unit 47.

Here, the scheme for relating the data and the schedule includes the following.

(1) Scheme for the user to relate them manually, without using the time data.

(2) Scheme for relating them by analyzing the date given in the data.

(3) Scheme for using the data production time, data change time, data access time, etc.

In addition, as a scheme for storing the specific schedule item with the target data in relation, there is a scheme for storing the schedule with a link information concerning a link to the target data.

As for the scheme for retrieving the data stored in relation to the schedule, the following schemes are possible.

(1) Scheme for retrieving the desired related data directly by specifying the schedule item, using the schedule table as an interface.

(2) Scheme for extracting the schedule item such as " . . . conference" from the schedule table, and retrieving the related data by utilizing the extracted schedule item, as in a case of using the retrieval key "materials used at . . . conference".

The conventional schedule management system is only capable managing the schedule, and has no function for managing the related materials such as the records of the conferences actually attended in conjunction with the schedule or the material prepared in advance.

In this ninth specific embodiment, in addition to such an ordinary function of the conventional schedule management system, it is made possible to trace the links to the target data from the schedule retrieval result by providing the link information to the target data and determining the schedules to be linked.

First, the schedule management function in this ninth specific embodiment will be described. The schedule is given in the following data structure.

Schedule:=(date & time, matter)

Date & time:=[from start time] [to end time] (at least one of these)

Matter:=at least one keyword

Keyword:={location*schedule name*other party *content*other memo}

Schedule table:=table in which the schedule items are arranged in time order

This configuration of the schedule table uses the hierarchical structure of year, month, and data which is utilized in managing the schedule items in a time order as the directory structure itself, and the time of each schedule item as the file name of a file which stores each schedule item separately, as in the following exemplary format.

```
'92—Jan  —1  —0700, 1300,
    *-Feb  *-2  —1000,
    *-...  *-...
    *-Dec  *-31  —
```

Here, the basic functions are to store of the schedule by specifying the date and time, and to take out the schedule by specifying the date and time. It is also possible to provide the function to retrieve the schedule containing the key given in terms of the matters.

The link information is given as follows. In recording the target data, the link information for relating the schedule with the target data is attached to the schedule. For example, in a case of the schedule table having the above described structure, the link information to the data in the target data memory unit 49 is written into the file corresponding to individual schedule. It is also possible to provide the link information from the target data to the schedule, so as to extend the links to be bidirectional.

According to the timing relationship between the time of making the link and the time of the target schedule. there are following three types of the link information. Namely, with the schedule itself as a reference point, an "antecedent" link indicates the fact that it had been produced in the past of the scheduled matter, a "current" link indicates that it has been recorded at a time of the progress of the scheduled matter, and a "retrospective" link indicates that it has been recorded after the scheduled matter was over.

Figure 66A:
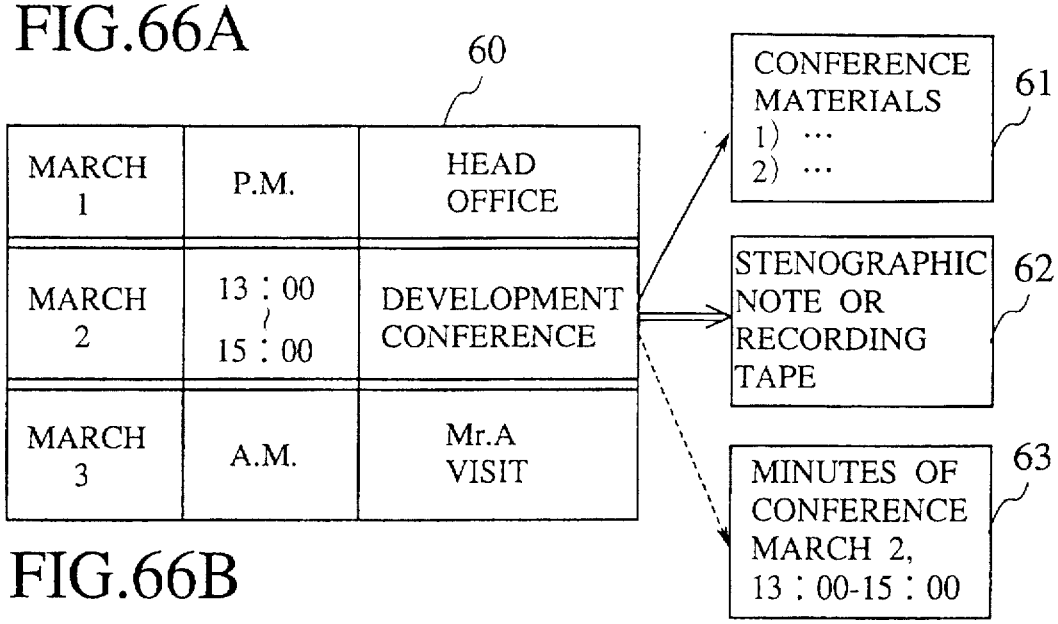
FIGS. 66A and 66B are illustrations of exemplary schedule tables used in the ninth specific embodiment of the system of FIG. 1.

As an example, a typical schedule table 60 is shown in FIG. 66A. Here, suppose that the material 61 for the conference to be held at 13:00 on March 2 was produced during the morning of March 1. In this case, the material production time is before the scheduled matter, so that the "antecedent" link is attached as indicated by the solid line. On the other hand, the stenographic note or recording tape 62 of the conference at 13:00 on March 2 is produced at the same time as the scheduled matter takes place, so that the "current" link is attached as indicated by the doubled line. This "current" link is effective in a case of taking a record of the thing in progress. As for the minutes of conference 63 produced on the next day, as it is produced after the scheduled matter, the "retrospective" link is attached as indicated by the dashed line.

Next, the manner of relating the schedule and the target data by using the link will be described. As a scheme for specifying the schedule item as a target to be related with the entered target data, there are three schemes including the scheme for the user to specify it explicitly, the scheme for identifying it from the target data, and the scheme for identifying it from the environmental information.

In the first scheme, in recording the target data, the user specify explicitly which schedule is to be linked with it. Here, it becomes easier for the user to specify the schedule item when the schedule table is displayed as a list of the candidates from which the user can select the desired schedule item. In the example of FIG. 66A, if the material 61 was produced in the morning of March 1, there is no schedule set up for that time. In this case, at a time of recording the material 61, the schedules before and after that time are displayed such that the user can select the desired schedule to be linked. When the schedule item is specified, the type of the link can be determined by comparing the time. For example, when the user selects the conference on March 2, the time of the material 61 is before that of the selected schedule item, so that the "antecedent" link is attached.

Instead of linking with the schedule after the target data are produced, it is also possible to select the schedule to be linked in advance, and the document can be edited thereafter. For example, in a state of having the display of the schedule table 60 in the morning of March 1, the production of the material 61 can be started after the conference on March 2 is specified, in which case the link is attached automatically when the production of the material 61 is completed.

In the second scheme, the target data is analyzed, and the schedule is identified by recognizing the title or the date. In a case of producing the conference notice or the minutes of conference in the predetermined format, the conference name or the date and time of the conference can be identified easily. Thus, this second scheme is particularly effective in a case of recording the target data given in the predetermined format. For example, in a case the minutes of conference 63 is produced on March 3, the fact that it is about the conference at 13:00 to 15:00 on March 2 is explicitly written in the minutes of conference itself, so that the "retrospective" link can be attached. More specifically, from the target data entered from the target data input unit 47, the character string such as "minutes of conference" and the date and time appearing after that can be extracted by the structural information layout extraction unit 54. Else, the character string appearing after "date and time" can be extracted, or the character string in the first sentence frame can be recognized by the sentence frame recognition and compared with the character string in the schedule. For example, in a case of extracting character string such as "minutes of the development conference" and comparing with the "development conference" in the schedule, "development conference" coincides, so that these can be linked.

In the third scheme, the schedule is identified by using the environmental information other than the target data itself. In this case, the item likely described as the scheduled matter is extracted by identifying the other party from the speech data, or by reading the conference name from the image data. In a case the sufficient recognition result cannot be obtained, the data can be retrieved from the schedule by using the extracted item and the current time as the key, and those schedules having the high level of coincidence can be presented to the user as candidates in an order of the coincidence level.

When the schedule to be linked is determined by any of these schemes or the combination thereof, the type of the link is determined to be one of "antecedent", "current", and "retrospective".

Namely, by comparing the current time at which the target data is produced and the time of the schedule to be linked, the "antecedent" link is attached when the schedule is after the current time, the "current" link is attached when the schedule is on the same time as the current time, and the "retrospective" link is attached in a case the schedule is in the past. In a case of determining the type of the link information after a certain period of time since the production of the target data, the "new data production time" in the access information to be described below can be compared with the time of the schedule.

Next, the manner of retrieving the data related with the schedule will be described.

Namely, the schedule is retrieved by specifying the keyword written in the items such as the date and time, location, other party, and matter. This function has already been realized in the conventional schedule management system. In addition, by relating the access information and the position information, it is also possible to use a plurality of keywords connected by attaching the modifiers to the keywords, or to relax the required level of restriction. For example, the retrieval can be carried out by using the key such as "accessed around ... O'clock" or "produced when I came back from ... (location)".

After the schedule is identified in this manner, the target data is reached by tracing the link information. This tracing of the link to the target data in conjunction with the retrieval is characteristic to the present invention which cannot be found in the conventional schedule management system.

It is also possible to utilize the modifiers other than the keywords described in the schedule for limiting the retrieval range. For example, from a part "produced for" of the retrieval key "material produced for ... conference", it can be judged that the link to be traced is the "antecedent" link to the ... conference. Similarly from a part "after returning" of the retrieval key "produced after returning from ... (location)", it can be judged that the target data is that which had been produced after the time of the visit to ... (location).

Next, the example of the retrieval operation by the retrieval unit 50 will be described.

Figure 66B:
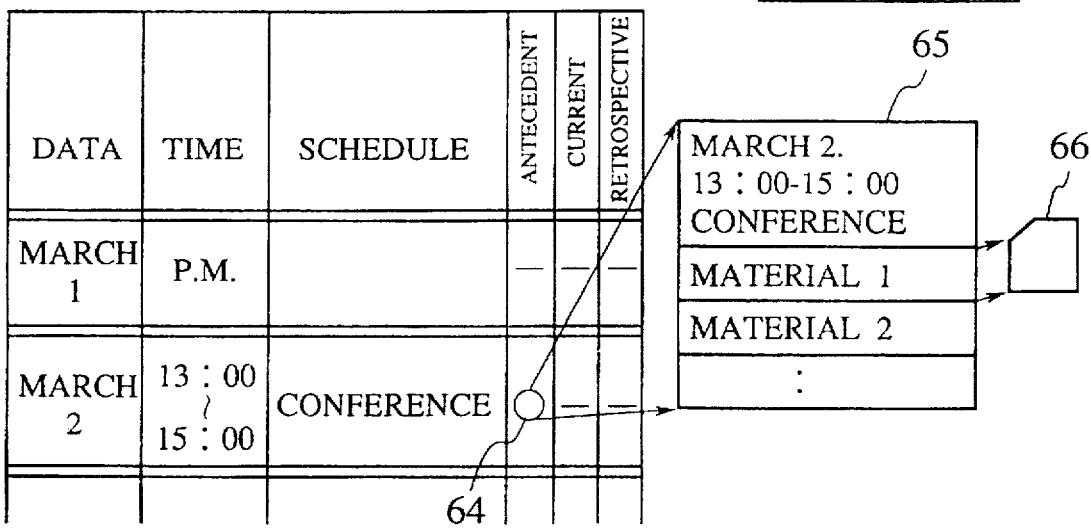

FIG. 66B shows a state in which the schedule table is displayed at the start time of the conference at 13:00 on March 2. This schedule table contains the "antecedent" link entry, the "current" link entry, and the "retrospective" link entry, where a mark 64 on the "antecedent" link entry indicates the presence of the material prepared in advance. When this mark 64 is specified by the input unit 41 such as the mouse or the pen, the material selection window 65 is displayed, from which the desired material can be selected by the user. When the "material 1" is selected, the material content window 66 is displayed. In a case there is only one linked material, it is possible to set up such that the material content window 66 is displayed immediately without displaying the material selection window 65.

Figure 67A:
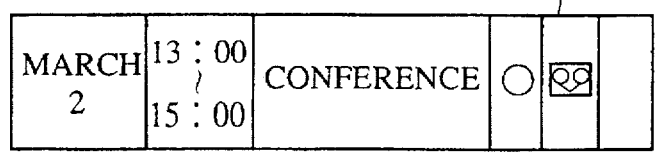
FIGS. 67A and 67B are illustrations of other exemplary schedule tables used in the ninth specific embodiment of the system of FIG. 1.

FIG. 67A shows a state in which only the entry for March 2 is displayed when the schedule table is opened at 16:00 on March 2. In this case, a tape mark 67 on the "current" link entry indicates the presence of the recording tape for the conference. When this tape mark 67 is selected, the recorded tape can be playbacked.

Figure 67B:
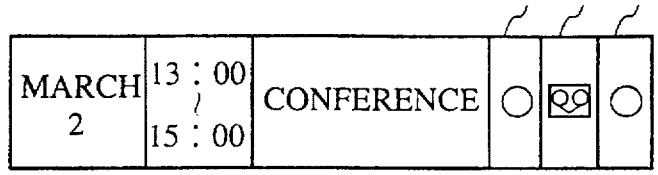

FIG. 67B shows a state in which only the entry for March 2 is displayed after the minutes of conference has been produced. In this case, a mark 68 on the "retrospective" link entry indicates the presence of the material linked by the "retrospective" link. It is also possible here to select the mark 69 to look at the material produced in advance, or to select the mark 67 to playback the actual conference proceeding recorded on the recording tape. Also, the target data can be the document of the electronic mail. In this case, by using the transmission date and time and the subject (title) described in the electronic mail, the link with the schedule can be established.

It is also possible to carry out the retrieval other than that using the . . . conference as the keyword. For example, when the input "material of the development conference held after visiting the head office" is entered, the keywords "head office", "after", and "development conference" are extracted from this input character string. Then, the retrieval from the schedule table is carried out by using the keyword "head office". In a case of the schedule table shown in FIG. 66, it can be judged that this keyword corresponds to March 1. After that, the names of the conference materials linked with March 2 can be displayed.

As a further modification, by replacing the schedule table in the above described description by a program table, it can be applied to the video recorder. Here, the recording reservation can be made in the conventional video recorder. In this case, the program table is stored by the other input unit 41. In order to take out the desired program from the already recorded tape, the retrieval using the program name or the participants name can be carried out.

Also, as a further modification, the time can be specified by using the relative time with respect to a certain reference for measuring time such as the birth date, or the date of joining the company. Then, the record can be retrieved by using the retrieval key such as "a picture taken when I was 11 years old" or "a work done in the 11th year in the company".

Also, the schedule itself can be the target of the retrieval. For example, when the retrieval key "development conference" is entered while the character string "development conference" is included in the schedule, that schedule and the title of the document linked with that schedule can be displayed, as indicated in the example shown in FIG. 68.

Next, the tenth specific embodiment concerns with a case in which the layout information of the data is extracted at a time of producing and recording the data such as the document, the data and the layout information are stored in correspondence, and the desired data is retrieved according to this layout information.

Here, the layout information may include the number of columns, the size and position of document frame, the number of lines, the number of figure/table, the size and position of the figure/table, and the type of figure/table, and the retrieval of the similar data can be carried out by preparing a number of patterns for the size and/or position of the figure/table and allowing the user to select the desired one, or according to the layout of the figure/table handwritten on a tablet.

Figure 69:
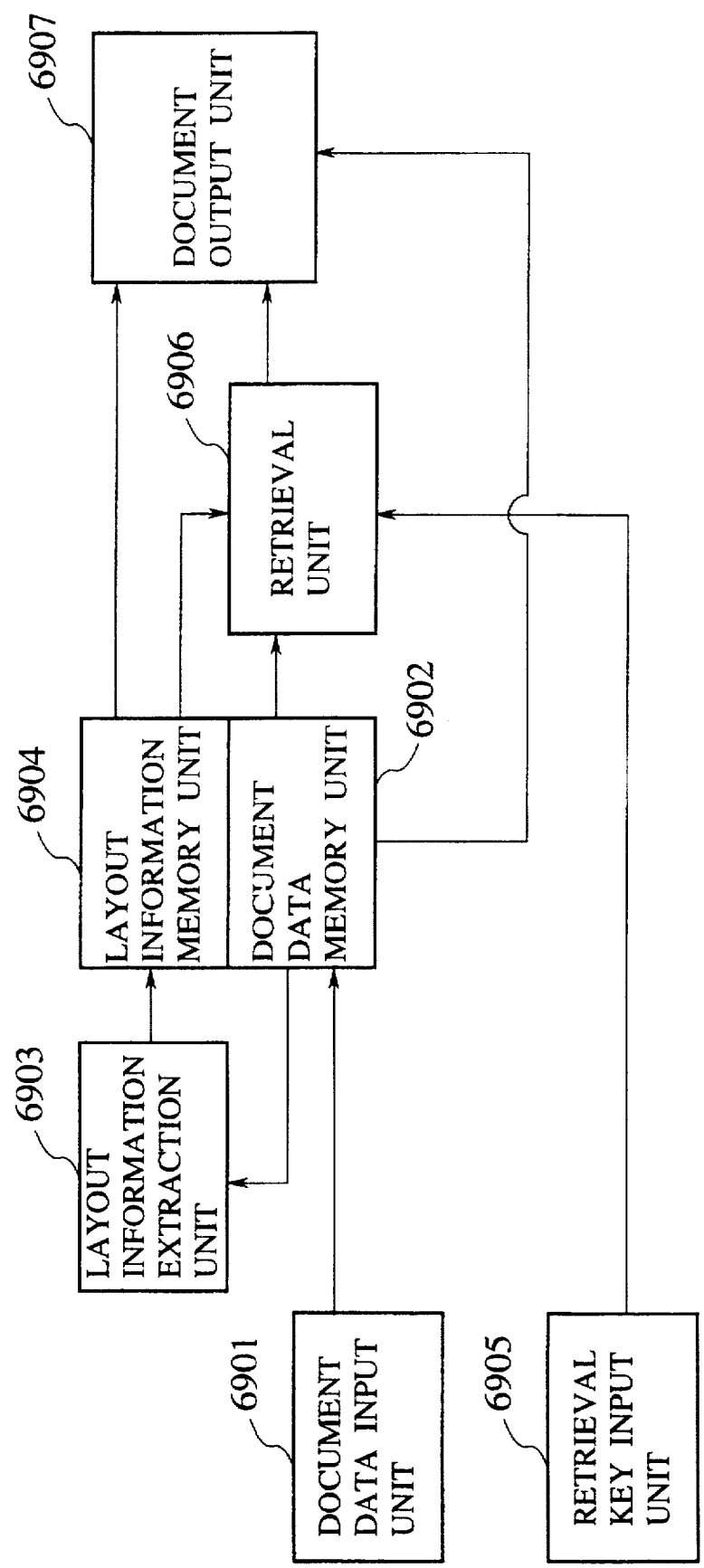
FIG. 69 is a schematic block diagram for a functional configuration of the tenth specific embodiment of the system of FIG. 1.

In this tenth specific embodiment, the system has the functional configuration as shown in FIG. 69, which comprises: a document data input unit 6901 such as an image scanner, a communication cable, a CD-ROM player, a floppy disk drive, etc., for entering the image data, character data, figure data, etc. constituting the document; a document data memory unit 6902 such as a memory, a hard disk, etc. for storing the document entered from the document data input unit 6901; a layout information extraction unit 6903 for extracting the layout information such as the number of pages, the page size, the number of columns, the size and position of the sentence frame, the number of lines, the size and position of column, the letter size, the number of figure/table, the size and position of figure/table, the type of figure/table, etc.; a layout information memory unit 6904 for storing the layout information extracted by the layout information extraction unit 6903; a retrieval key input unit 6905 for entering the layout image of the document to be retrieved specified by the user; a retrieval unit 6906 for retrieving the document from according to the layout information memory unit 6904 by using the retrieval key entered from the retrieval key input unit 6905; and a document output unit 6907 such as a display, a printer, etc. for presenting the document retrieved by the retrieval unit 6906 to the user.

Next, the operation of this system will be described for an exemplary input data shown in FIG. 70.

Figure 70A:
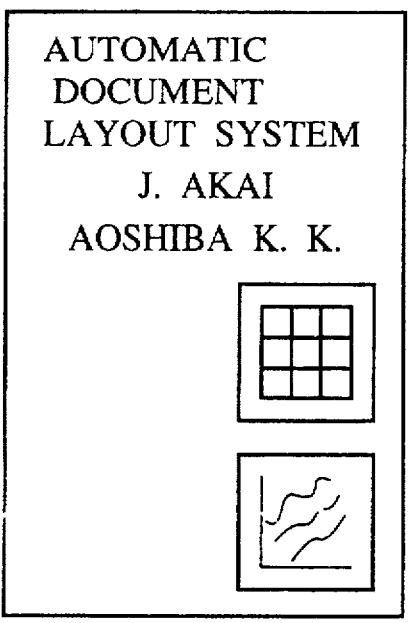
FIGS. 70A and 70B are illustrations of exemplary documents in the tenth specific embodiment of the system of FIG. 1.
Figure 70B:
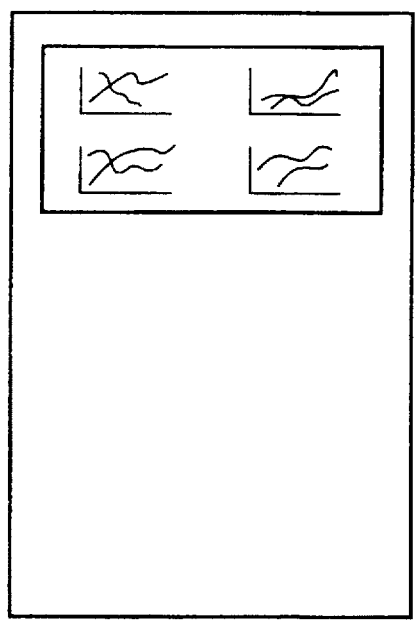

Namely, the data entered from the document data input unit 6901 is the document data formed by the character data, the figure data, and/or the image data, as shown in FIGS. 70A and 70B. At a time of looking up the document data, the document data is taken into the document data memory unit 6902 through the document data input unit 6901, and displayed on the document output unit 6907.

The document data looked up by the user once is transmitted to the layout information extraction unit 6903. As for the operation of the layout information extraction unit 6903, the extraction from the image data has been described in detail in Japanese Patent Application No. 63-7518, while the extraction from the code data such as the character data and the figure data has been described in detail in Japanese Patent Application No. 61-206835.

Figure 71:
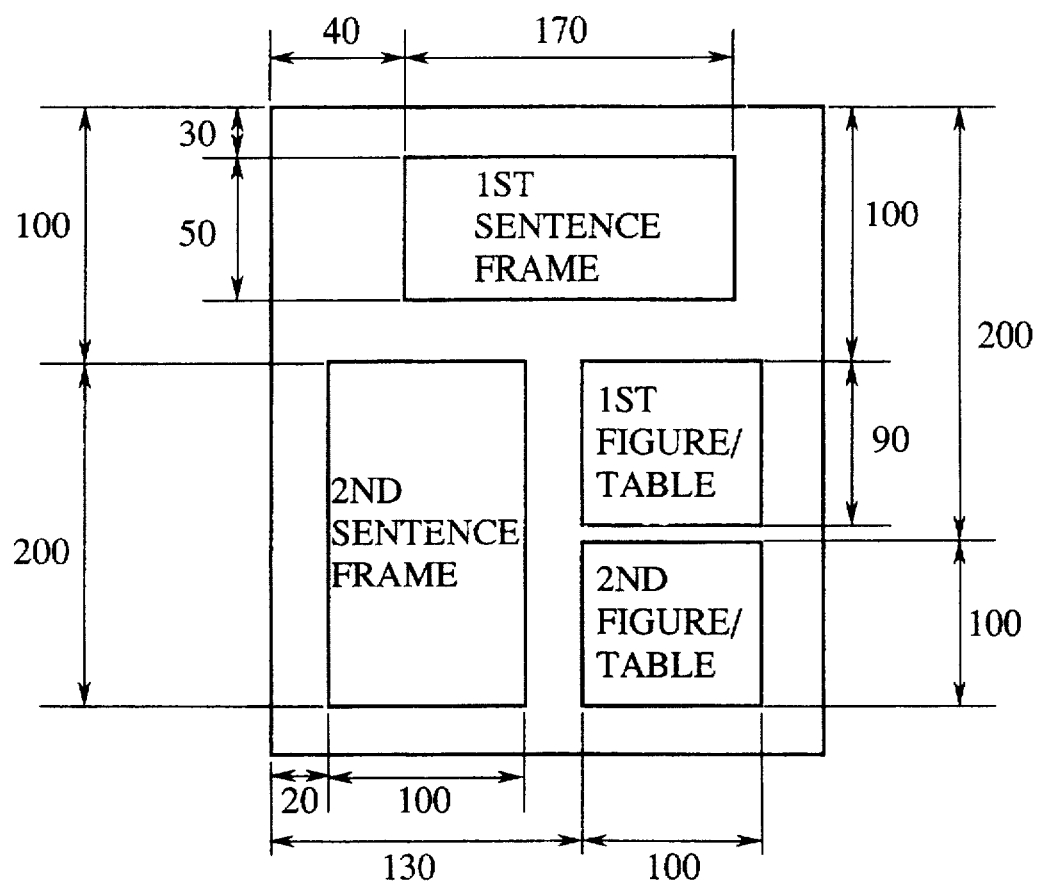
FIG. 71 is an illustration of an exemplary layout of the document in the tenth specific embodiment of the system of FIG. 1.

For example, when the sizes and the positions of the sentence frame and the figure/table are extracted as shown in FIG. 71, the column setting of each page (one column, two columns, two columns with title, etc.) and the figure/table arrangement type are determined and classified. An example of the column template and the associated constraints is shown in FIG. 72. In a case two sentence frames in the extracted layout information are very close to each other, the sentence frame to contain both is re-defined. Then, the column template having a number of columns greater than the number of sentence frames is selected. Then, the values in the extracted layout information such as the position of the sentence frame are substituted into the variables in each column of the column template. Here, in a case there is a figure/table close to the sentence frame, a side facing against the close side is set as the boundary for the sentence frame. In a case the constraint characteristic to each column template is not satisfied as a result of the substitution, the matching of the column template is carried out.

In the example shown in FIG. 71, two sentence frames are extracted. The distance between the neighboring sentence frame and figure/table frame us 20 to 30 mm so that they are not considered as close, and they can be set to the template having more than one columns. When they are set to the template with two columns, the result is SX1=170, SX2=100, SY1=50, SY2=200, PY1=30, PY2=100, PX1+SX1=40+170=210, and PX2=20, so that the constraint cannot be satisfied at all. On the other hand, when they are set to the template with two column and title, where the first sentence frame is used as the title column, the second sentence frame is used as the second column, and the third sentence frame is used as the first figure/table and the second figure/table together, the result is SX2=SX3=100, SY2=SY3=200, PY2=PY3=100, PX2+SX2=120<PX3=130<PX1+SX1=210, PY1+SY1=80<PY2=100, so that the constraint can be satisfied. Thus, the column setting of the first page can be determined as that of two columns with title.

Next, the figure/table arrangement type is classified. An exemplary list of the figure/table arrangement types for the column setting of two columns with title is shown in FIG. 73. In a case of the example of FIG. 71, there are two sentence frames, so that one of F, G, and H can be selected. According to the assignment of the columns described above, the figure/table arrangement type in this exemplary case should be classified as G in which the third column consists of the figure/table exclusively.

The title of the document data, the extracted layout information, and the classification are stored in the layout information memory unit 6904 in a format shown in FIG. 74.

Figure 75A:
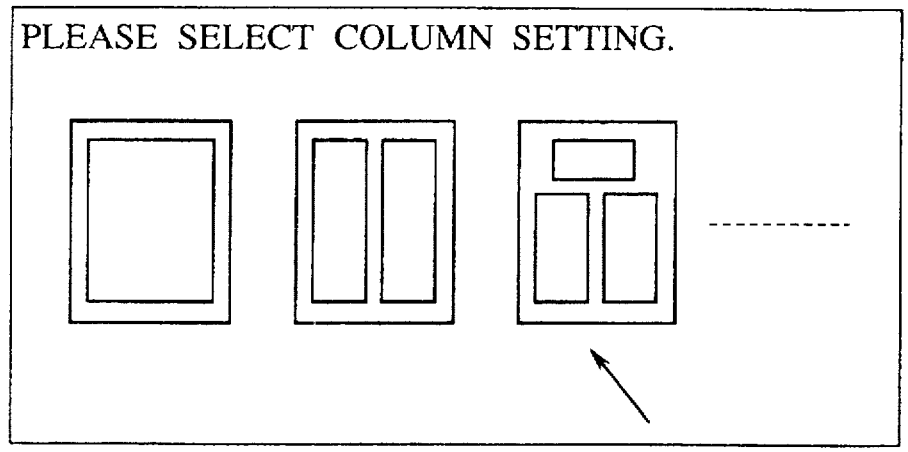
FIGS. 75A and 75B are illustrations of exemplary layout information displays used in the tenth specific embodiment of the system of FIG. 1.
Figure 75B:
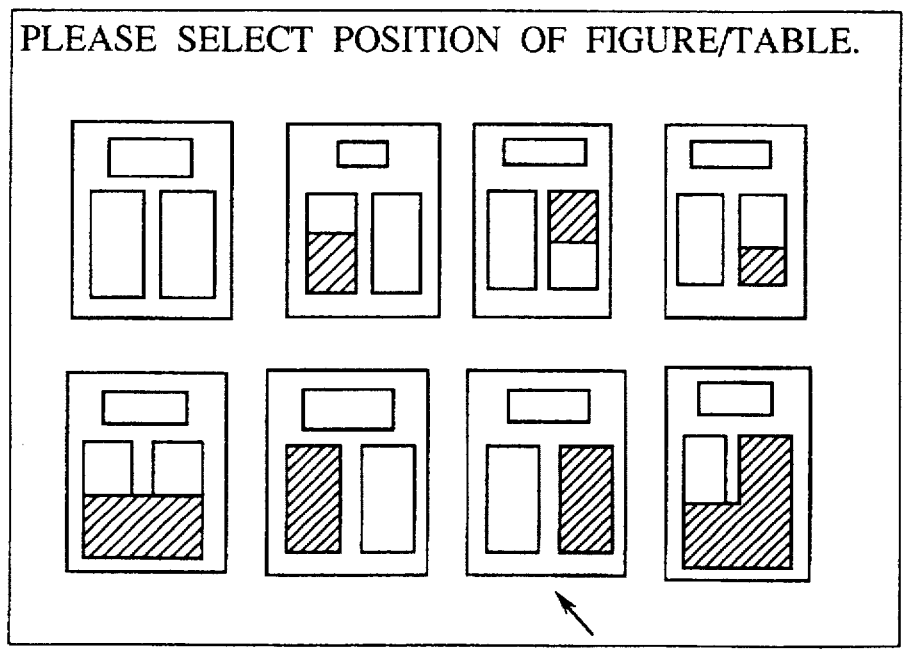

The retrieval key input unit 6905 enters not just the title or the author name of the document data but also the layout information through the following interface. First, as shown in FIG. 75A, a list of the column settings for the document is presented, and the user is asked to select one which is close to the user's memory by using the mouse or the keyboard. When the user selected the column setting of two columns with title, the retrieval key input unit 6905 shows a list of the figure/table arrangement types for the column setting of two columns with title as shown in FIG. 75B, and urges the user to select one close to the user's memory. When this retrieval key is entered, the retrieval unit 6906 searches out the page having the column setting of two columns with title in G type figure/table arrangement from the data in the layout information memory unit 6904, and the retrieved page is transmitted to the document output unit 6907 and presented to the user.

In a case more than one pertinent pages are retrieved, they can be presented sequentially, or they can be contracted and grouped for the simultaneous presentation, from which the user can select the desired one. The document can also be retrieved by using the layout of the figure/table handwritten by the user through the tablet as the retrieval key.

There are cases in which the user's memory concerning the layout is uncertain. For example, the G type arrangement of FIG. 73 may very well be confused with the C, D, or H types in the user's memory. For this reason, the figure/table arrangement types which are easily confused with each other can be stored in the retrieval unit 6906 as the resembling figure/table arrangement types, such that the retrieval is carried out for all the pages in the resembling figure/table arrangement types as well.

Figures 76A, 76B, 76C:
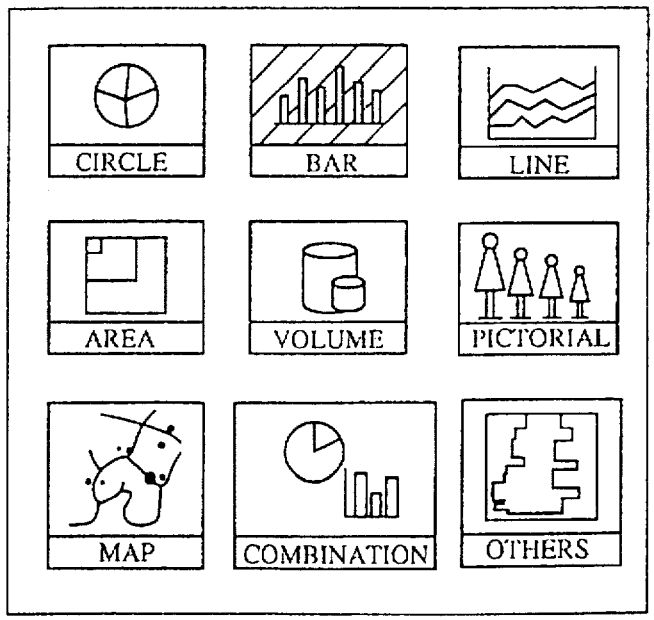
FIGS. 76A, 76B and 76C are illustrations of exemplary interface displays used in the tenth specific embodiment of the system of FIG. 1.

In a case of retrieval according to the figure/table type, the retrieval key input unit 6905 enters the figure/table type through the interface as shown in FIGS. 76A, 76B, and 76C. In FIG. 76A, the figure/table types are enumerated in a list, from which the user selects the appropriate one contained in the page to be retrieved according to the user's memory. In a case the page to be retrieved contains more than one figure/table, more than one items can be selected. Then, for the selected items, the window for entering the detailed classification as shown in FIG. 76B or FIG. 76C is displayed. Here, the types of graph are shown as the graph has been selected.

Figure 77A:
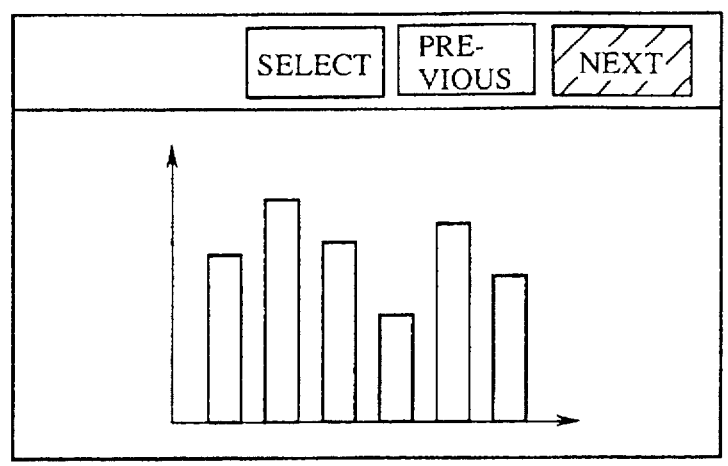
FIGS. 77A, 77B and 77C are illustrations of other exemplary interface displays used in the tenth specific embodiment of the system of FIG. 1.
Figure 77B:
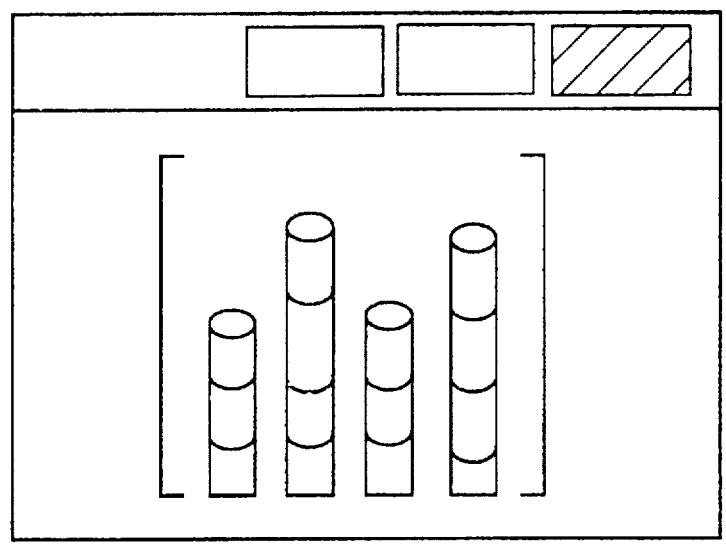
Figure 77C:
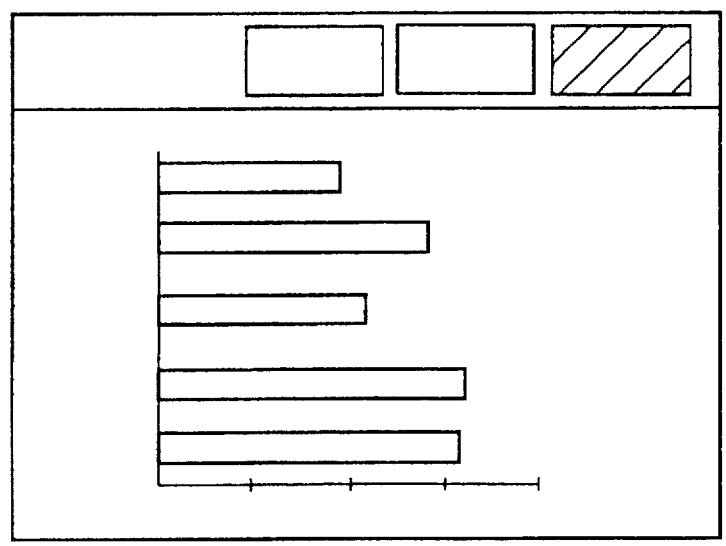
Figure 78:
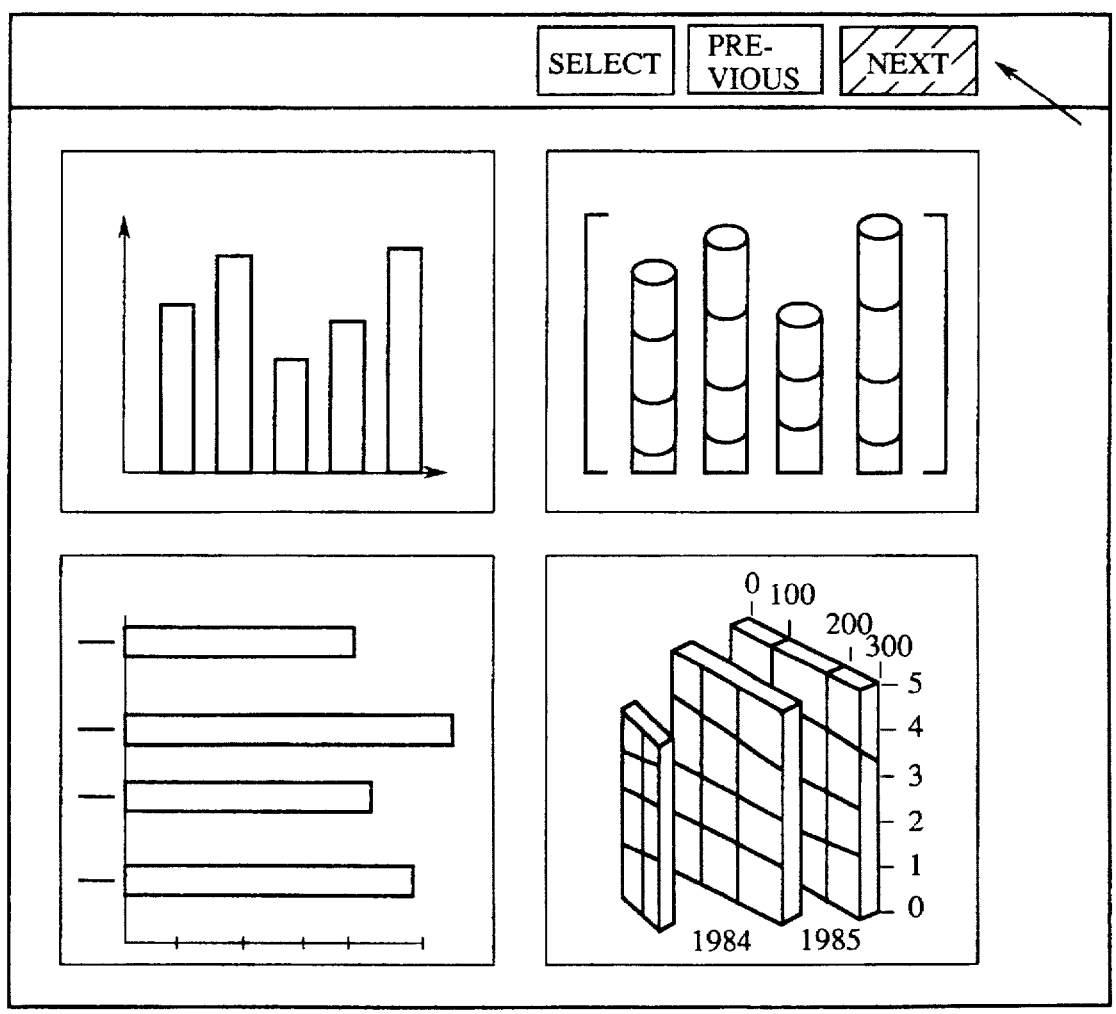
FIG. 78 is an illustration of still another exemplary interface display used in the tenth specific embodiment of the system of FIG. 1.

When the bar graph is selected, this selection is transmitted from the retrieval key input unit 6905 to the retrieval unit 6906. Then, by matching it with the figure/table types in the layout information memory unit 6904, the data of the page on which the bar graph is arranged is presented to the user. Here, the image of page can be presented one by one, or in group. Also, only the figure/table portion can be extracted and presented. For example, as shown in FIG. 77A, the bar graph portion of the retrieved page alone can be presented to the user. In a case more than one pages are retrieved, as the user presses button such as "next" to request the next candidate, the bar graph on the next retrieved page can be presented as shown in FIG. 77B or FIG. 77C. Also, as shown in FIG. 78, the graphs of a plurality of retrieved pages alone may be displayed simultaneously as a list.

The layout information extraction unit 6903 may extract the layout information only from the pages with special features such as the first page, the page with figure/table or photo, and the page which has been looked up by the user for the longest period of time, rather than all the pages of the entered document. Also, the page from which the layout information is to be extracted can be specified by the user. In a case of handling the document for which the layout information is not obtained in advance, the layout information is extracted at a time of the retrieval while searching the pertinent page.

Next, the eleventh specific embodiment concerns with a case in which the data entered, stored, or retrieved in the system are stored in correspondences with the image information entered from an image input device provided at the prescribed position in the system at a time of the entering, storing, or retrieving, such that the desired data can be retrieved by using this image information. In retrieving the data, the changing point in the entered image information is utilized as the environmental information indicating the scene change of the light and shade of the image. In the following, an exemplary case of using the video camera as the image input device will be described.

In this eleventh specific embodiment, the scene changing point (time) can be extracted as the environmental information by the configuration shown in FIG. 79 as follows.

First, the video image entered from the video camera is supplied to the image memories 7902 and 7903 through a switch 7901 on input sides of the image memories 7902 and 7903. Then, by controlling a switch 7904 for data and a switch 7905 for address on output sides of the image memories 7902 and 7903, a histogram calculation unit 7906 calculates the histogram for the luminance in each field in the image memories 7902 and 7903.

Namely, according to the vertical synchronization signal VSYNC, the output of the histogram calculation unit 7906 is latched by the previous image histogram memory unit 7907, and its internal register is cleared. When there is no scene change, the luminance hardly changes between the successive fields. On the contrary, when the change in the luminance is large, it implies that the scene is changing. Thus, a scene change judgement unit 7910 including a subtractor 7911, an absolute value circuit 7912, a summation circuit 7913, a comparator 7914, and a threshold register 7915 judges it as the scene changing point whenever the sum of the absolute values of the difference of the outputs of the histogram calculation unit 7906 between the successive fields is greater than a prescribed threshold set from a host computer, and the time at that timing is recorded.

Figure 80:
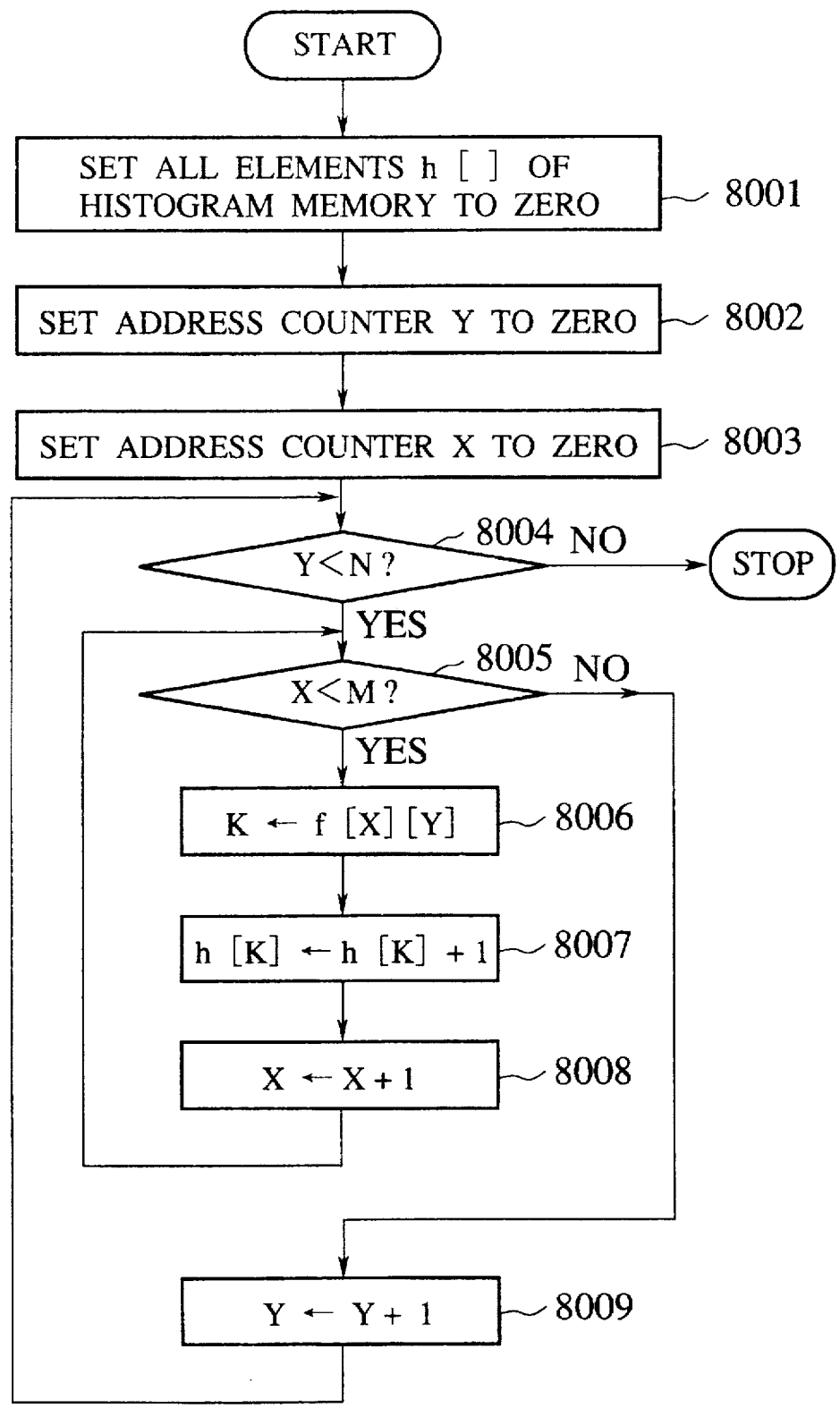
FIG. 80 is a flow chart for the operation of the histogram calculation unit in the configuration of FIG. 79.

In this case, the histogram calculation unit 7906 operates according to the flow chart of FIG. 80, assuming that the display screen size is M×N. Namely, all the element values h[ ] of the histogram memory are set to zero (step 8001), while an address counter Y and an address counter X are also set to zero (steps 8002, 8003). Then, for each Y and X less than N and M, respectively (steps 8004, 8005, 8008, and 8009), the luminance K is set equal to f[X][Y] where f is a picture element value in the image memory (step 8006), and a histogram element value h[K] is increased by one (step 8007).

The scene changing point (time) can also be extracted as the environmental information by the alternative configuration shown in FIG. 81 as follows.

First, the video image entered from the video camera is supplied to the image memories 8102 and 8103 through a switch 8101 on input sides of the image memories 8102 and 8103. Then, by controlling a switch 8104 for data and a switch 8105 for address on output sides of the image memories 8102 and 8103, a dispersion calculation unit 8106 calculates the dispersion, i.e., the spread of the distribution of the histogram for the luminance in each field in the image memories 8102 and 8103. Thus, instead of the absolute value of the difference of the outputs of the histogram calculation unit 7906 in the configuration of FIG. 79, this configuration of FIG. 81 uses the dispersion D as the reference for judging the scene change.

In this case, according to the vertical synchronization signal VSYNC, the output of the dispersion calculation unit 8106 is latched by the previous image dispersion memory unit 8107, and its internal register is cleared. Then, a scene change judgement unit 8110 including a subtractor 8111, an absolute value circuit 8112, a comparator 8113, and a threshold register 8114 judges it as the scene changing point whenever the absolute values of the difference of the outputs of the dispersion calculation unit 8106 between the successive fields is greater than a prescribed threshold set from a host computer. Here, by looking at the shape of the luminance distribution in this manner, the change in the height of the distribution does not influence the judgement result, so that it is possible to prevent the incorrect judgement of a case in which only the brightness of the display screen has changed for the same scene as the occurrence of the scene change.

Figure 82:
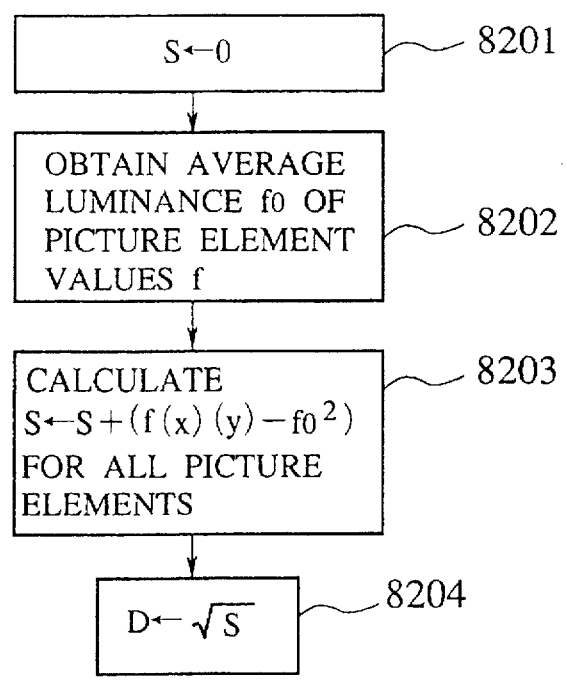
FIG. 82 is a flow chart for the operation of the dispersion calculation unit in the configuration of FIG. 81.

In this case, the dispersion calculation unit 8106 operates according to the flow chart of FIG. 82. Namely, a variable S is set equal to zero (step 8201), and an average luminance $f_0$ of the picture element values f in the image memory is obtained (step 8202). Then, the variable S is updated to be $S+(f(X)(Y)-f_0^2)$ for all the picture elements (step 8203), and finally the square root of the variable S is calculated as the dispersion D (step 8204).

Figure 83:
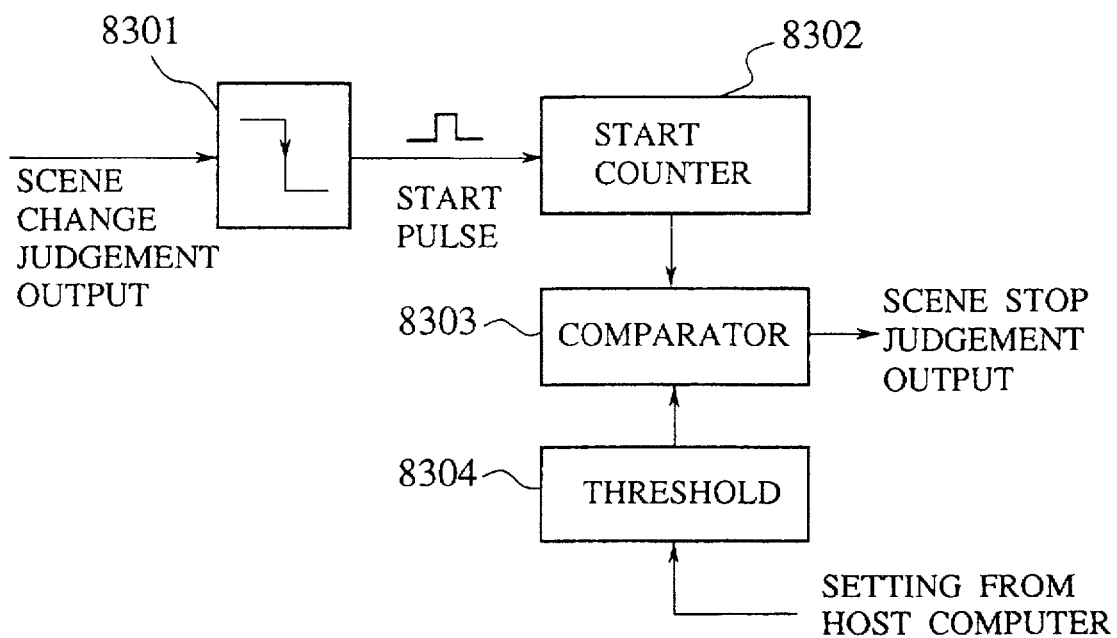
FIG. 83 is a schematic block diagram for additional configuration for detecting the stopping of the scene change in the eleventh specific embodiment of the system of FIG. 1.

On the other hand, FIG. 83 shows an additional configuration for detecting the stopping of the scene change according to the scene change judgement output from the scene change judgement unit 7910 or 8110.

Figure 79:
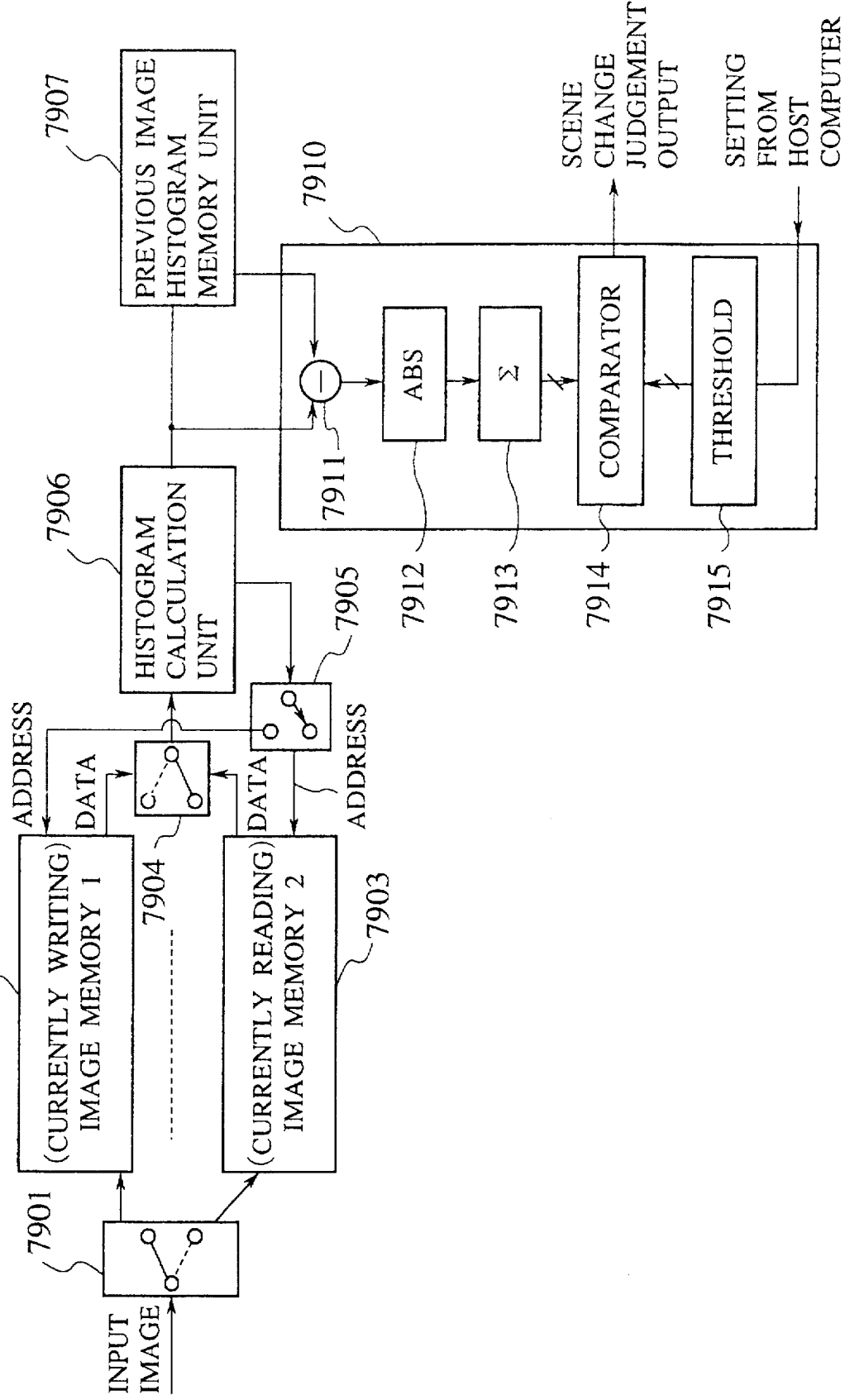
FIG. 79 is a schematic block diagram for a configuration for extracting scene change in the eleventh specific embodiment of the system of FIG. 1.
Figure 81:
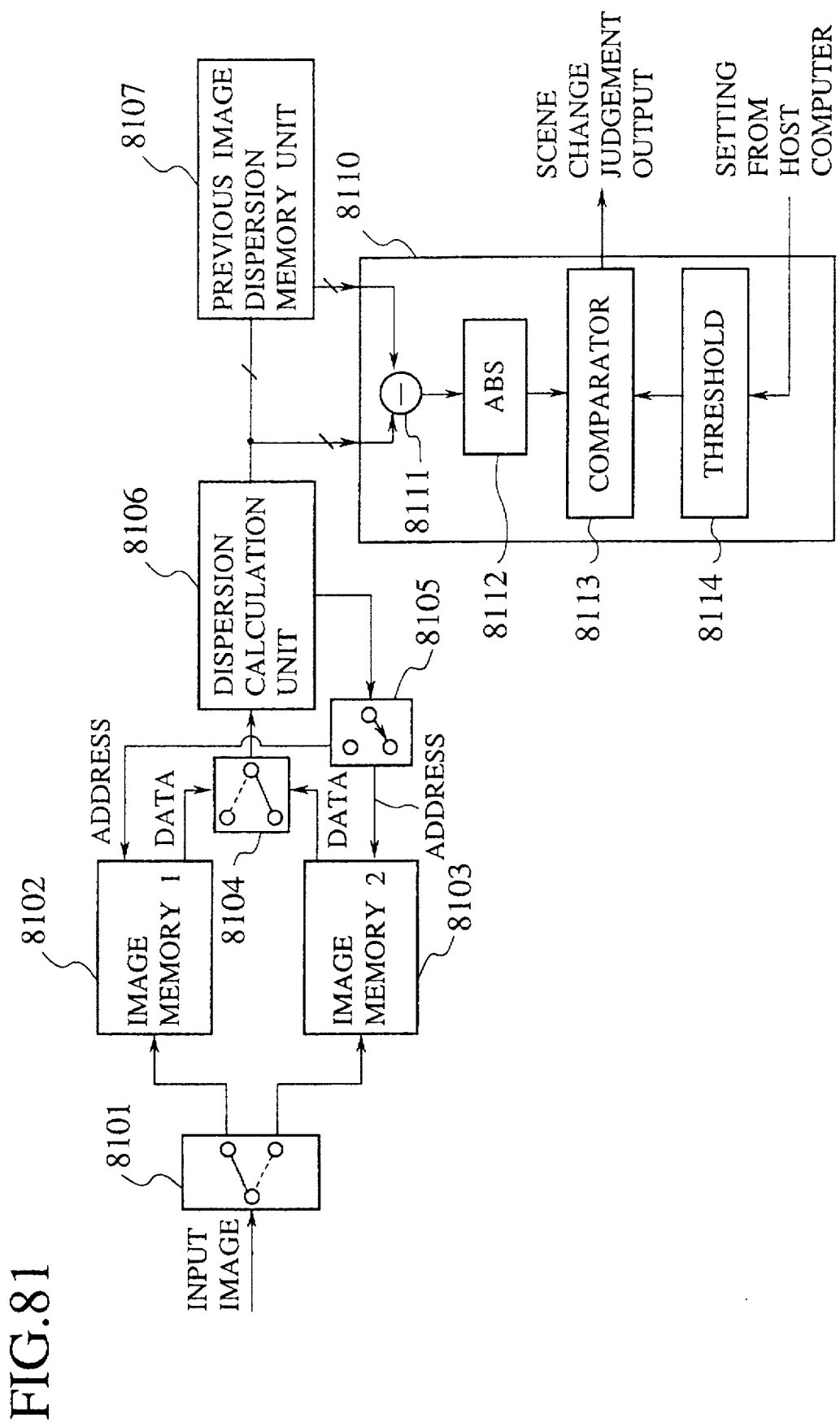
FIG. 81 is a schematic block diagram for another configuration for extracting scene change in the eleventh specific embodiment of the system of FIG. 1.

In this case, the scene change judgement output from the scene change judgement unit 7910 or 8110 of the configuration of FIG. 79 or FIG. 81 is further supplied to a negative edge detector 8301, which outputs a start pulse in response to the detection of the negative edge in the scene change judgement output. The start pulse is then supplied to a start counter 8302 for counting the time elapsed since the last scene change. Then, a comparator 8303 compares the count of the counter 8302 with a prescribed threshold time set from the host computer in a threshold register 8304, to output the scene stop judgement output indicating that the movement of the camera is stopping whenever the scene is not changing for a period longer than that specified by the prescribed threshold time.

Figure 84:
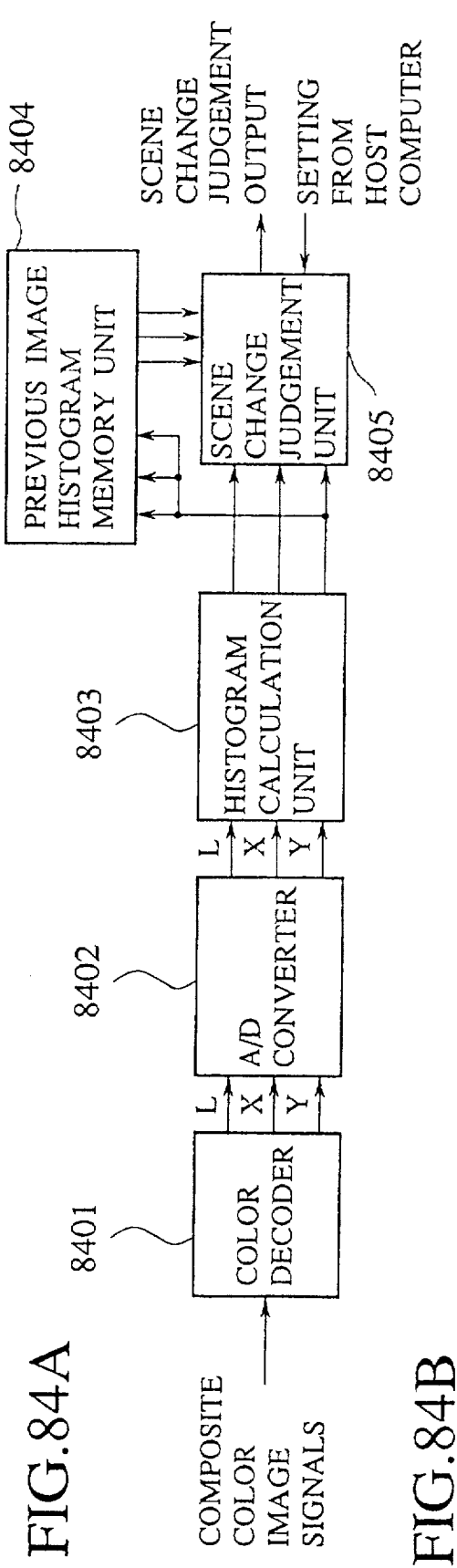
FIGS. 84A and 84B are schematic block diagrams for other configurations for extracting scene change in the eleventh specific embodiment of the system of FIG. 1.

FIG. 84A shows another configuration for detecting the scene change as the environmental information, in which the color information is utilized instead of the luminance used above, and the scene change is judged according to the change of the color of the display screen as a whole. In this configuration of FIG. 84A, the composite color image signals such as the NTSC signals are entered into a color decoder 8401 to separate the lightness L and the X, Y signals in the XY color system, and then digitized by an A/D converter 8402. The digital L, X, and Y signals are then supplied to the histogram calculation unit 8403 to calculate the histogram. Then, using the latched values held by a previous image histogram memory unit 8404, a scene change judgement unit 8405 judges the scene change according to the change in the histogram, just as in the configuration of FIG. 79 described above.

Similarly, FIG. 84B shows another configuration for detecting the scene change as the environmental information, which also utilizes the color information just as in the configuration of FIG. 84A. In this configuration of FIG. 84B, the composite color image signals such as the NTSC signals are entered into a color decoder 8411 to separate the lightness L and the X, Y signals in the XY color system, and then digitized by an A/D converter 8412. The digital L, X, and Y signals are then supplied to the dispersion calculation unit 8413 to calculate the average values $P_L$, $P_X$ and $P_Y$ and the dispersion values $D_L$, $D_X$, and $D_Y$ for each field. Then, using the latched values held by a previous image dispersion memory unit 8414, a scene change judgement unit 8415 judges the scene change according to the change in the dispersion values $D_L$, $D_X$, and $D_Y$, just as in the configuration of FIG. 81 described above.

Figure 85:
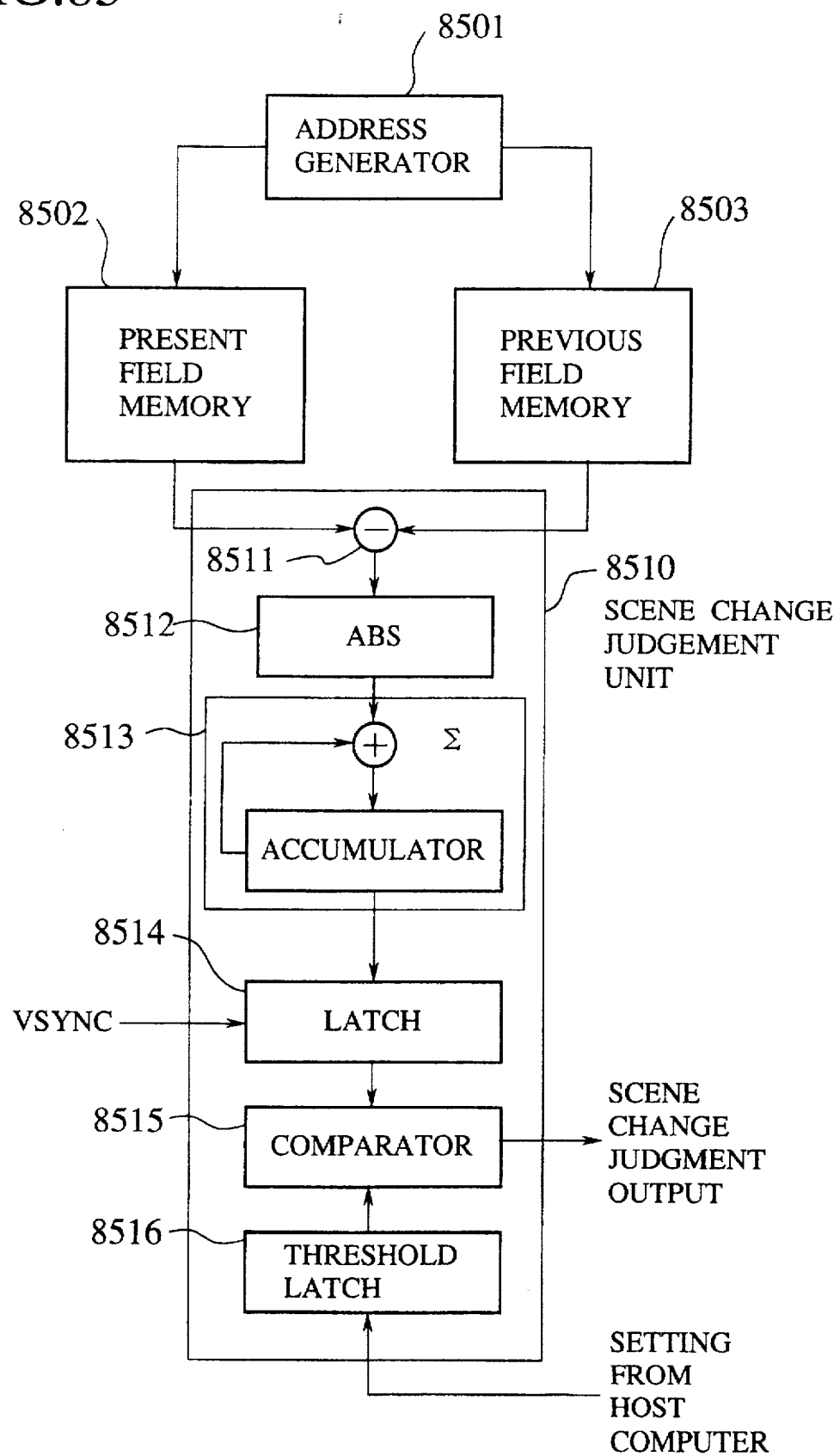
FIG. 85 is a schematic block diagram for another configuration for extracting scene change in the eleventh specific embodiment of the system of FIG. 1.

FIG. 85 shows still another configuration for detecting the scene change as the environmental information. In this configuration of FIG. 85, according to an address generator 8501, the successive video images stored in a present field memory 8502 and a previous field memory 8503 are supplied to a scene change judgement unit 8510 in which the difference between the successive fields of the input video image signals is calculated by a subtractor 8511, and a sum of an absolute value of the difference is calculated by an absolute value circuit 8512 and a summation circuit 8513 formed by an adder and an accumulator. Then, the sum of the absolute value of the difference is latched by a latch 8514 according to the vertical synchronization signal VSYNC, and compared with a prescribed threshold set from the host computer in a rewritable threshold register 8516 at a comparator 8515 which outputs the scene change judgement output indicating the occurrence of the scene change whenever the sum of the absolute value of the difference is greater than the threshold.

Figure 86:
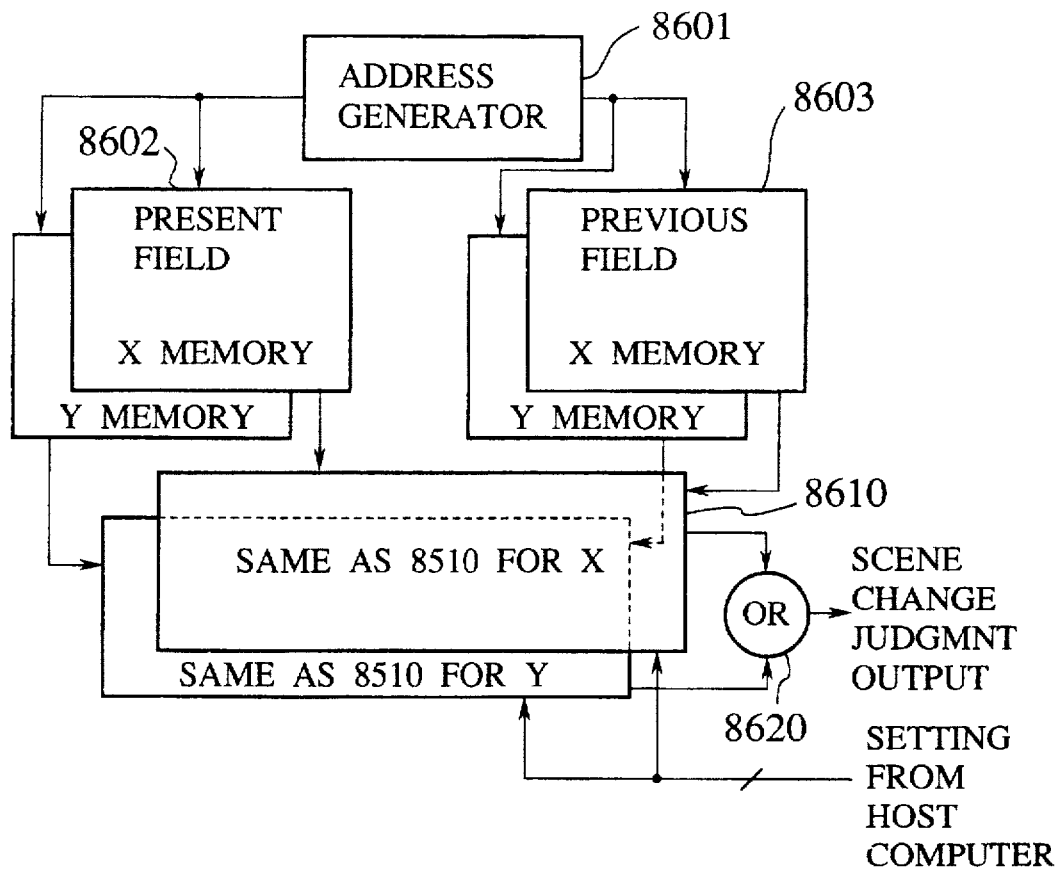
FIG. 86 is a schematic block diagram for another configuration for extracting scene change in the eleventh specific embodiment of the system of FIG. 1.

Similarly, FIG. 86 shows still another configuration for detecting the scene change as the environmental information by utilizing the color information. In this configuration of FIG. 86, according to an address generator 8601, the successive video images stored in a present field memory 8602 and a previous field memory 8603 are supplied to a scene change judgement unit 8610, for each of the X and Y signals. Here, the scene change judgement unit 8610 for each of X and Y signals has a configuration similar to that of the scene change judgement unit 8510 in FIG. 85 described above. Then, according to a difference between the outputs of the scene change judgement unit 8610 for X and Y signals obtained by a subtractor 8620, the scene change judgement output indicating the change of the color can be obtained.

Figure 87:
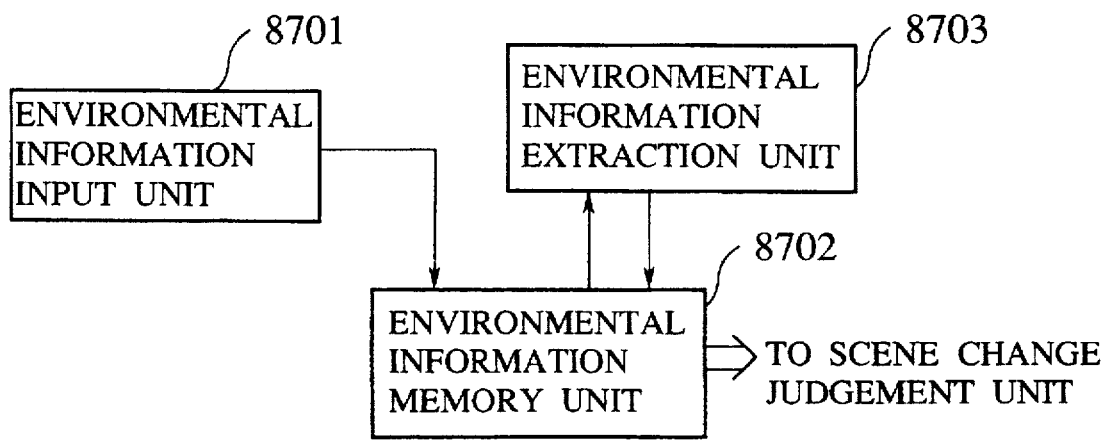
FIG. 87 is a schematic block diagram for additional configurations for storing raw data in the eleventh specific embodiment of the system of FIG. 1.

It is to be noted that in the above description, it is assumed that the scene change in the input video image is to be detected in real time (or nearly real time), but it is also possible to apply the similar scene change judgement schemes to the video images stored once or the already recorded video images. In such a case, if the time required for the detection of the scene change can be set longer than that required in the real time operation, it becomes possible to reduce the calculation speed for detecting the scene change, such that the system size and cost can be reduced. In this case, as shown in FIG. 87, the raw video image data entered from an environmental information input unit 8701 are stored once in an environmental information memory unit 8702, and then the stored raw video image data are subsequently supplied to an environmental information extraction unit 8703 which carries out the scene change judgement operation. The resulting information concerning the scene changing point sequence can then be returned from the environmental information extraction unit 8703 and stored in the environmental information memory unit 8702.

Figure 88A:
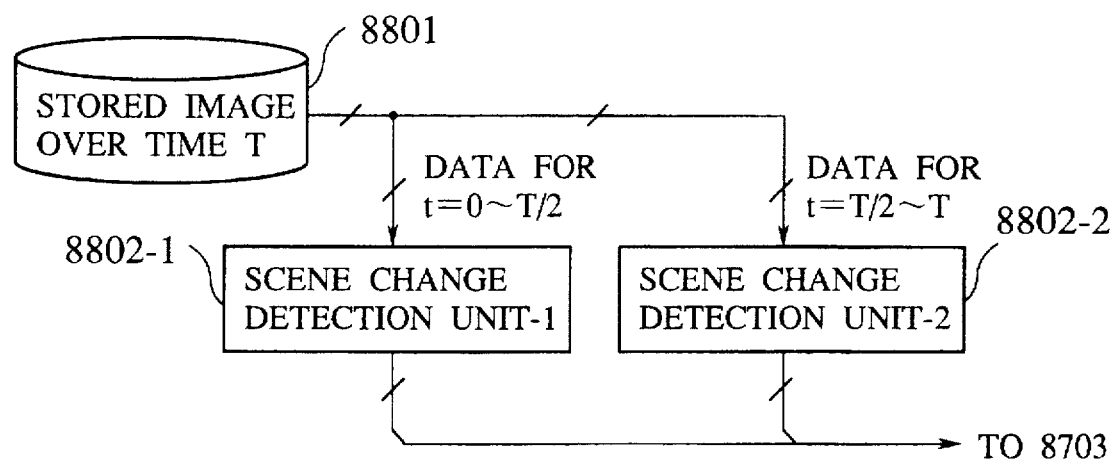
FIGS. 88A and 88B are diagrams showing another scheme for the scene change detection in the eleventh specific embodiment of the system of FIG. 1.
Figure 88B:
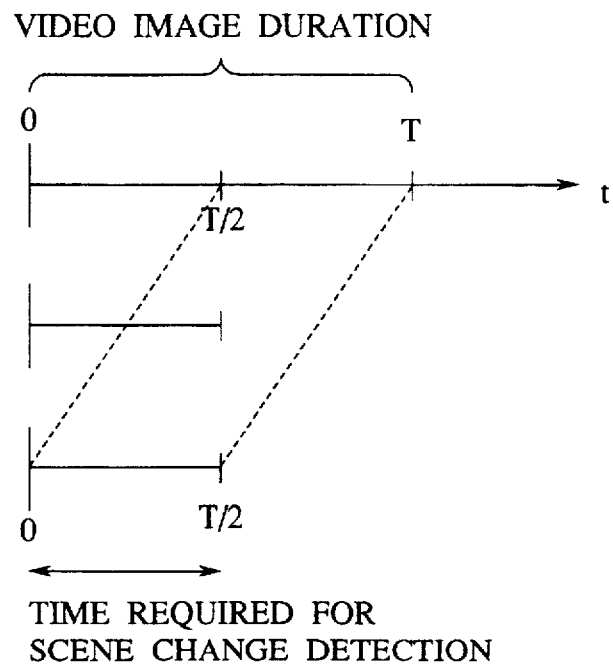

As shown in FIG. 88A, when the video image data are stored in a video image storage unit 8801, it is possible to supply the same stored video images to a plurality of scene change detection units 8802-1 and 8802-2, such that the scene change detection in the stored video images can be carried out in parallel and the time required for the scene change detection can be shortened as indicated in FIG. 88B.

In the above description, it is also assumed to use the scene changing point in the video images as the retrieval key, but the other features such as a scene in which a human being appears on the display screen, or a scene in which a particular person appears on the display screen can also be utilized as the retrieval key instead of the scene changing point.

Figure 89:
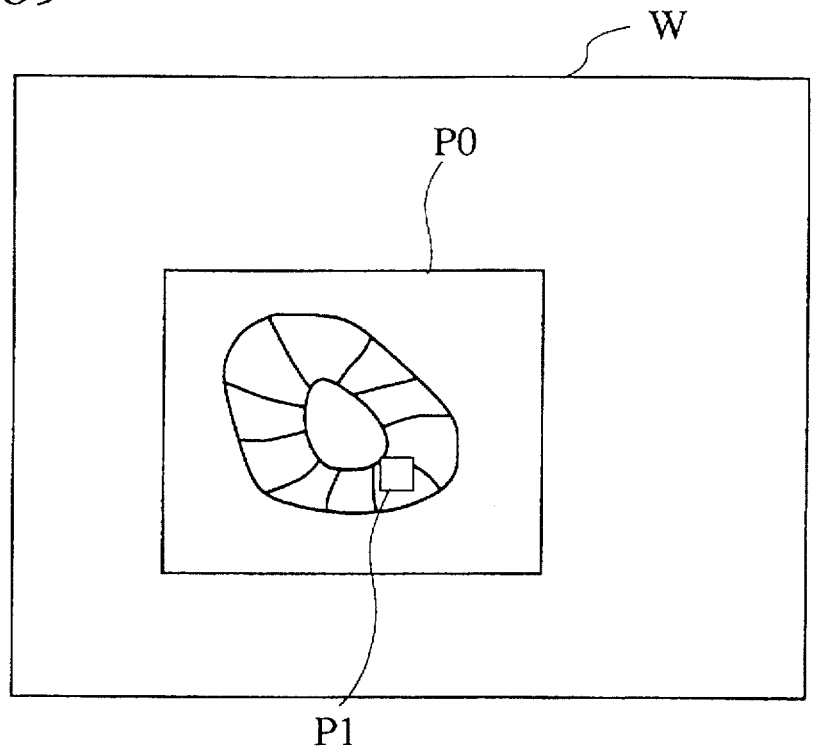
FIG. 89 is an illustration of an exemplary display used in the human being detection in the eleventh specific embodiment of the system of FIG. 1.

Here, the human being can be detected by utilizing the above described color information, by detecting a scene in which a skin color appears on the display screen. In this case, as shown in FIG. 89, the skin color can be specified by displaying the color distribution diagram P0 in the XY color system on the display screen W and allowing the user to specify the desired color point or region on the displayed color distribution diagram P0 by using the pointing device.

Figure 90:
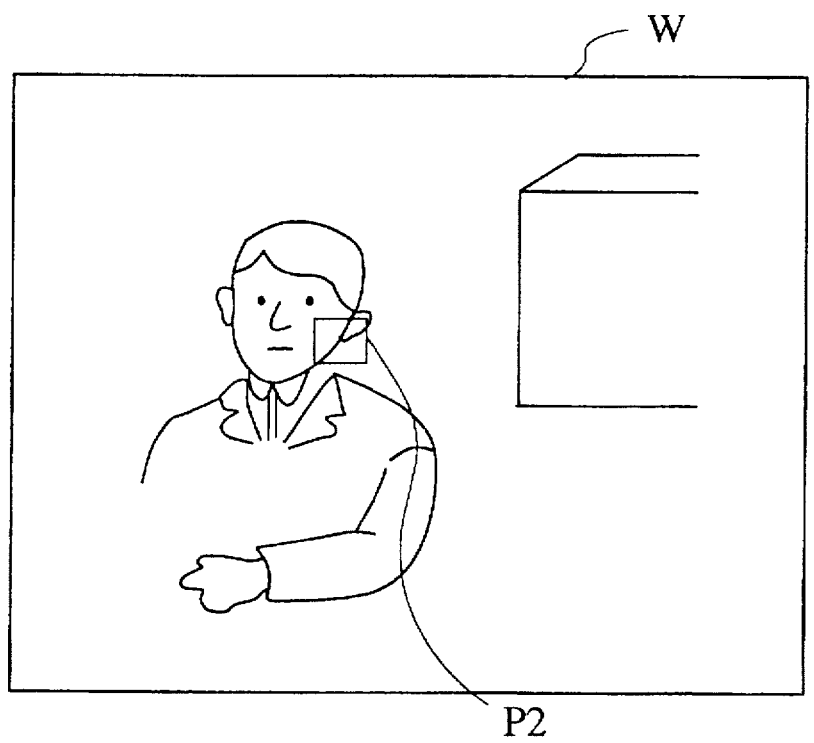
FIG. 90 is an illustration of another exemplary display used in the human being detection in the eleventh specific embodiment of the system of FIG. 1.

Alternatively, as shown in FIG. 90, the video image is paused at a scene in which the human being is appearing on the display screen W, and the skin colored region P2 on this human being such as the face or hand region can be specified by using the pointing device, such that the skin color can be specified according to the color extracted from the specified skin colored region P2.

In order to detect the particular person, the face region is extracted from the scene, and the matching is made with respect to the image of the face of that particular person. In order to extract the face region from the scene, the skin colored region is detected as in the above, an area of the skin colored region is obtained, and the hair, eyes, and a nose are searched out to judge whether it is a human face or not. For the matching between the face region and the face image, the scheme using the correlation calculation and the SSDA (Sequential Similarity Detection Algorithm) are known.

Here, the particular person can be specified by pausing the video image at a scene in which that particular person is appearing on the display screen, and extracting the face region by using the pointing device. In a case the face images of a plurality of persons are registered along their names in advance, it is also possible to specify the particular person by his name instead of his face image. It is also possible to display a list of the registered face images, from which the user can select the desired person by using the pointing device.

In a case the face images of the persons are registered in advance, each registered face image can be utilized as the template in the retrieval, so as to obtain the information concerning who was in the video image, instead of the information concerning whether a particular person was present in the video image or not.

It is to be noted that the time information is obviously contained in the information concerning the scene change in the video image, the scene with a human being, or the scene with a particular person as described above.

Next, the retrieval operation in this eleventh specific embodiment will be described in detail.

One of the central idea of the present invention is to store the document or program along with the environmental information concerning the time it was produced, the time it was registered, the time it was previously looked up, and the last time it was looked up, and to carry out the retrieval of the document or program according to this environmental information, as already mentioned above. In this eleventh specific embodiment, the environmental information is assumed to be given in forms of images.

One scheme for utilizing the images for the retrieval is, as shown in the upper half of FIG. 91, to present a list of the still pictures 9103 such as those of the scene changing points on the display screen or window 9101, such that when a desired still picture 9103 is selected on the displayed list by the pointing P3, the document or program corresponding to the selected still picture 9103 is retrieved and displayed on the display screen or window 9101 as shown in the lower half of FIG. 91.

Figure 92:
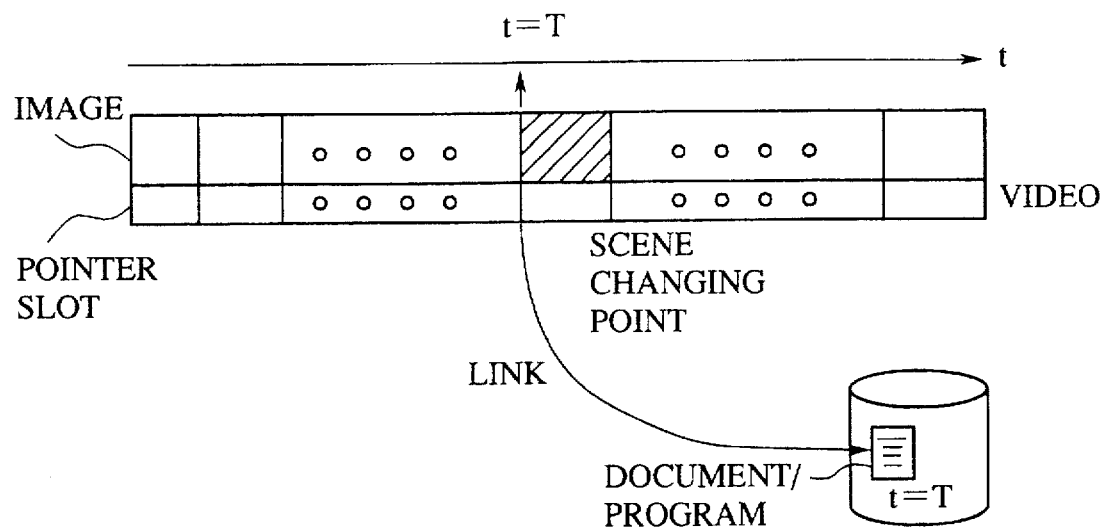
FIG. 92 is a diagram showing a scheme for realizing the scheme of FIG. 91 in the eleventh specific embodiment of the system of FIG. 1.

This scheme is realized, as shown in FIG. 92, by providing a link from the feature scene such as that of the scene changing point in the video image to the document or program. The simplest case of this scheme is to set the scene in the video image corresponding to a certain time (of production, registration, correction, looking up, etc.) which is meaningful to the document or program as the feature scene.

Figure 93:
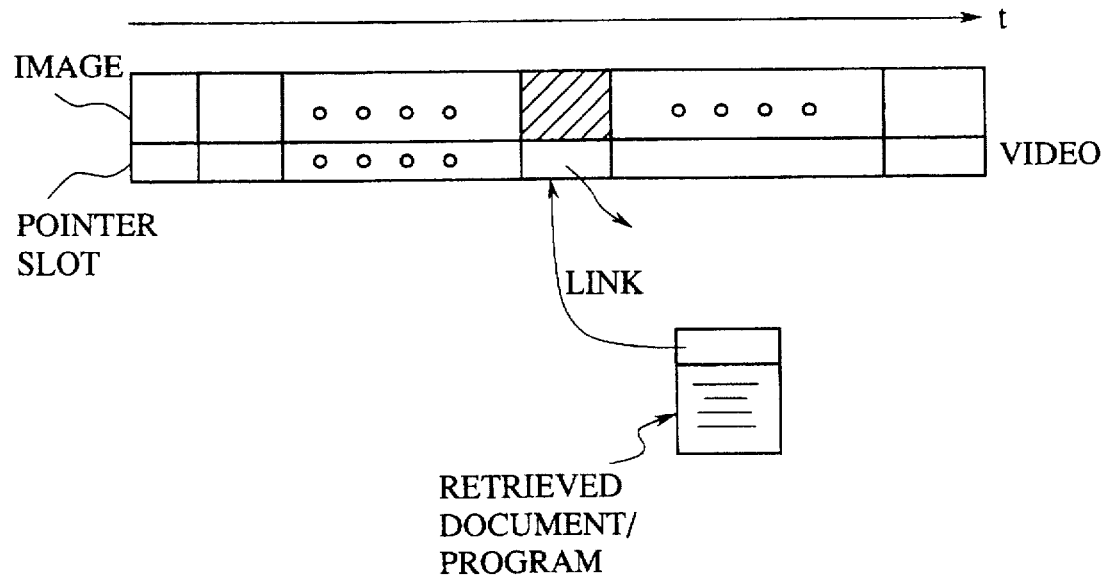
FIG. 93 is a diagram showing another scheme for realizing the scheme of FIG. 91 in the eleventh specific embodiment of the system of FIG. 1.

On the other hand, in order to reproduce the video image at related timings for the document or program which had been retrieved by utilizing the retrieval key other than the image, as shown in FIG. 93, a link in an opposite direction is provided from the document or program to the corresponding scene.

In a case of the video image, it is not necessarily possible to extract all the scenes such as those of the scene changing points which are to be the retrieval keys. In particular, in a case of the scene which is related to the sensitivity of the human being as in a case of "recalling by watching the image" situation, the automatic extraction is not suitable and the intervention of the human being is indispensable.

Figure 94A:
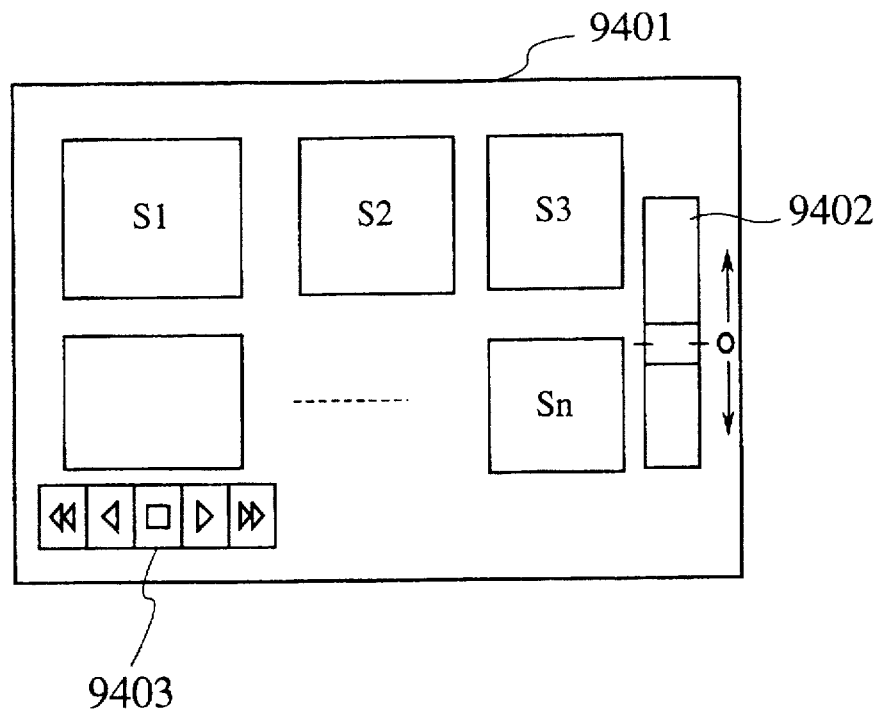
FIGS. 94A and 94B are diagrams showing another scheme for the retrieval in the eleventh specific embodiment of the system of FIG. 1.
Figure 94B:
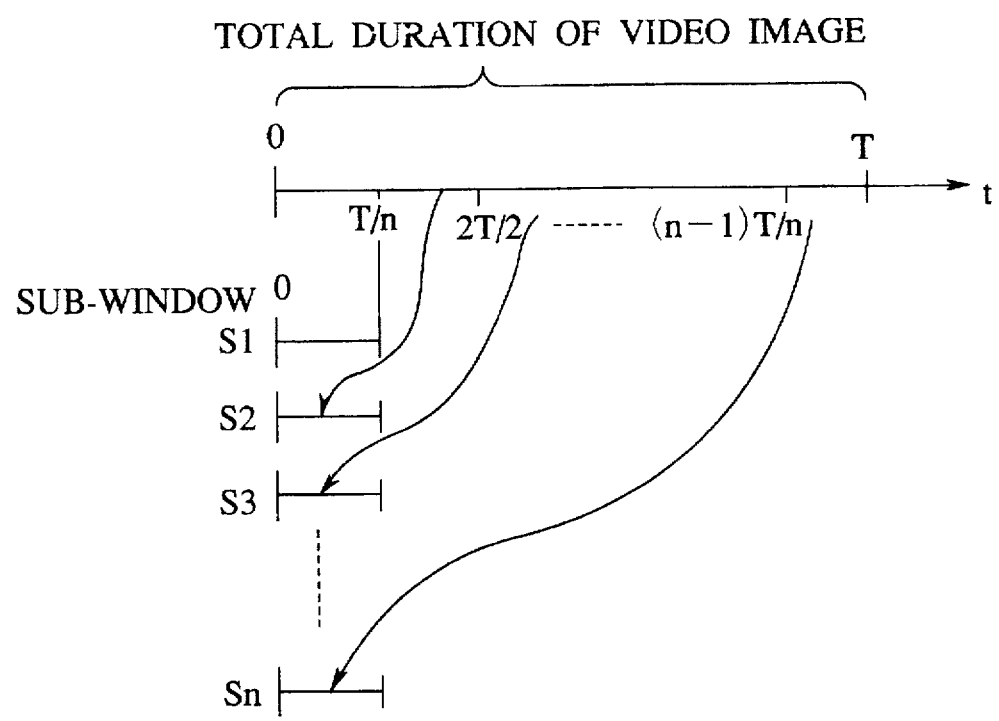

In such a case, the retrieval is carried out while fast forwarding the already recorded video images, and at that point, as shown in FIG. 94A, by dividing the entire video image into n parts or sub-windows (n is an integer) S1 to Sn and reproducing n images in parallel, the time required for the retrieval can be shortened to 1/n, as indicated in FIG. 94B. In FIG. 94A, the display screen or window 9401 is equipped with a scroll bar by which the change of the forward or reverse playback speed can be specified, and buttons 9403 for specifying fast forward, forward, stop, reverse, and fast reverse playback modes.

This can be realized even in a case of using the video images on the sequential media such as the magnetic tape, by simultaneously reading and writing with N heads with respect to N tracks. Also, the same effect can be realized even in the sequential media, by storing the video images for each 1/N duration part of the whole in an order by using N magnetic tape recorders, and reproducing the video images by the N magnetic tape recorders simultaneously.

Figure 95:
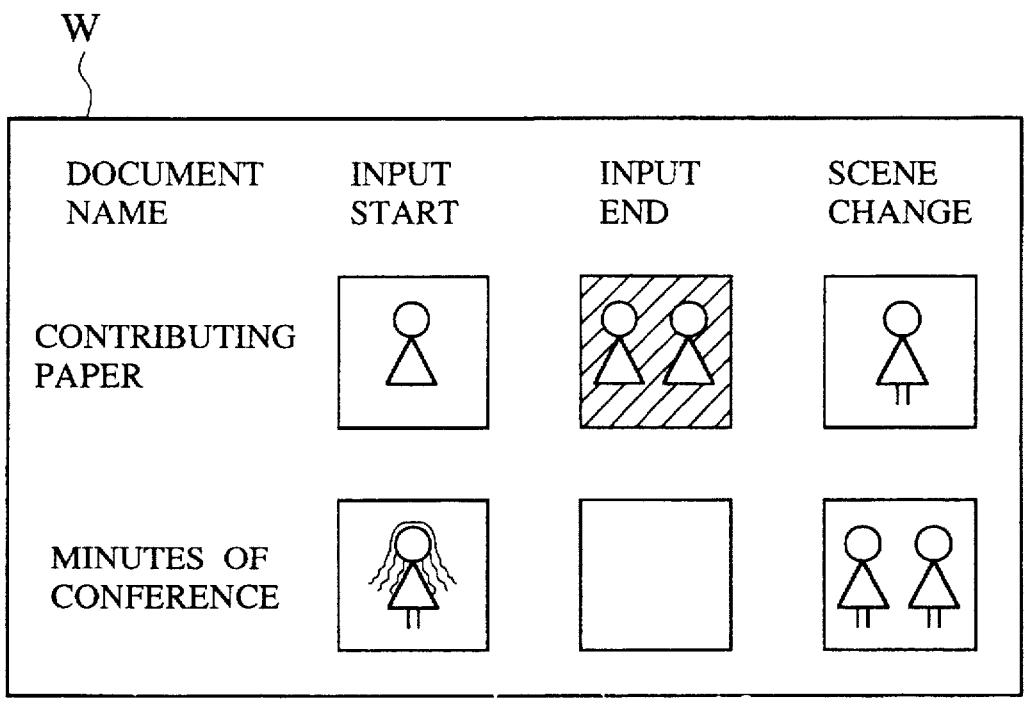
FIG. 95 is an illustration of an exemplary display for the retrieval in the eleventh specific embodiment of the system of FIG. 1.

As the other examples of the retrieval, as shown in FIG. 95, it is possible to display a list of the still pictures of the video images taken by the video camera at the input start and end timings of the document as well as at the scene changing timings during the input operation on the display screen or window W. Then, the user can select the necessary document according to these still pictures.

Here, it is not necessary to limit the presentation to that of the still pictures during the input operation, and the mail titles received during that period, or the speeches recorded during that period can also be outputted.

Also, instead of using the video camera provided on the system, by attaching a compact camera to a name plate or a badge worn by the user to accumulate the images, and then processing the accumulated images at the system as in the above, the image information can be utilized as the behavior record of the user.

Next, the twelfth specific embodiment concerns with a case in which the production start time or the production end time at a time of producing the data such as the document are stored along the data itself, and the desired data is retrieved by using these production start and end times. Also, the graded urgency level of the data is obtained from the production start and end times of the produced data and used as the retrieval key. Also, the diagrammatic figure is used as the retrieval key. Also, the access start and end times at a time of editing the stored data such as the document are stored along the data itself, and the desired data is retrieved by using these access start and end times. Also, the number of access starts is counted to obtain the looking up frequency, and this looking up frequency is used as the retrieval key. Here, in a case of utilizing the weekly report, the access is made every week. Also, the access frequency (density) for a prescribed data is diagrammatically expressed with respect to the elapse of time, and such a diagrammatic figure is used as the retrieval key, while the data applied with the editing based on the specified diagrammatic figure are extracted.

Figure 96:
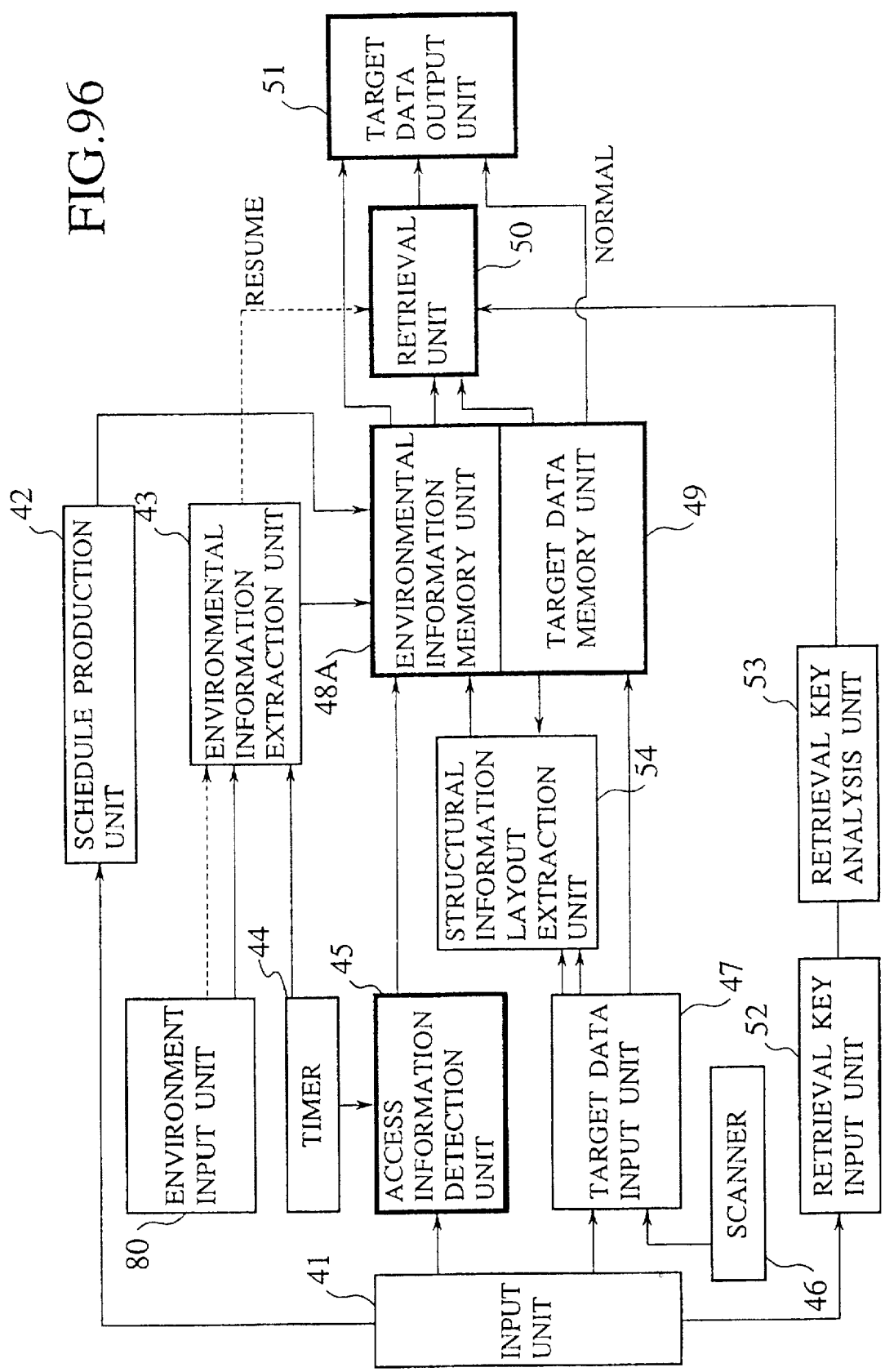
FIG. 96 is a schematic block diagram for a functional configuration of the twelfth specific embodiment of the system of FIG. 1.

In this twelfth specific embodiment, the system has the functional configuration as shown in FIG. 96, which differs from that of the ninth specific embodiment shown in FIG. 65 described above in that the schedule memory unit 48 is replaced by an environmental information memory unit 48A for storing the environmental information, and an environment input unit 80 such as a camera, a microphone, and a GPS for entering the environmental analysis target data to be entered into the environmental information extraction unit 43.

Figures 97, 98:
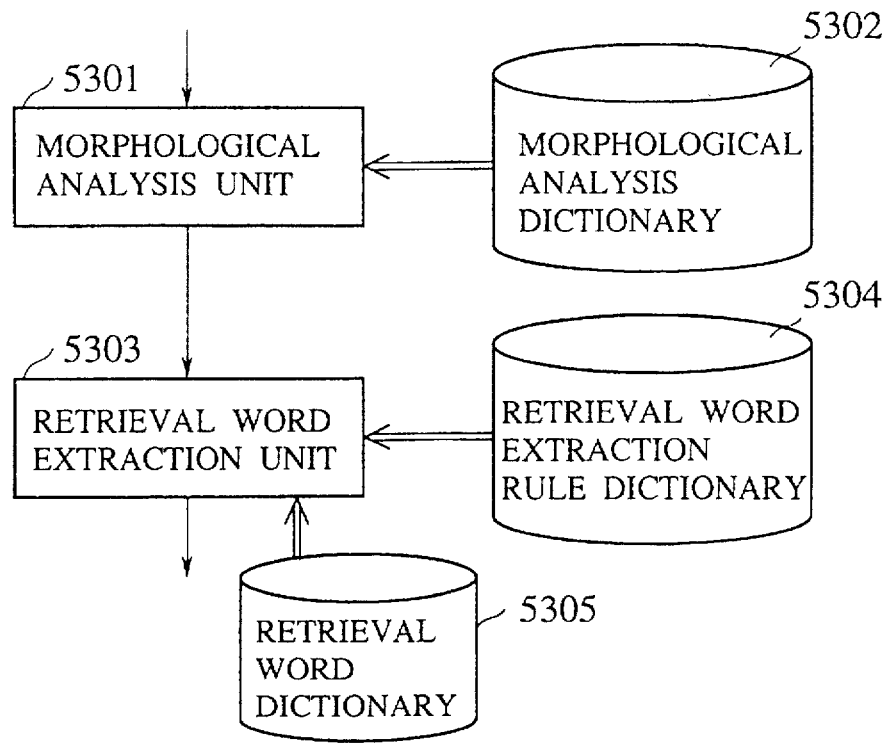
FIG. 97 is a block diagram for a detailed configuration of the retrieval key analysis unit in the configuration of FIG. 96.
FIG. 98 is a table summarizing the retrieval key analysis result obtained in the configuration of FIG. 97.

Here, the retrieval key analysis unit 53 has a detailed configuration as shown in FIG. 97, which comprises a morphological analysis unit 5301 equipped with a morphological analysis dictionary 5302 for applying the morphological analysis, and a retrieval word extraction unit 5303 equipped with a retrieval word extraction rule dictionary 5304 and a retrieval word dictionary 5305 for carrying out the extraction of the retrieval word.

Figures 99, 100:
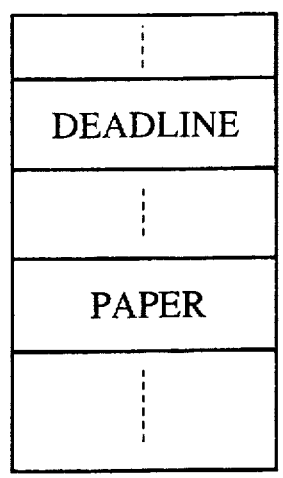
FIG. 99 is an illustration of exemplary content of the retrieval word dictionary in the configuration of FIG. 97.
FIG. 100 is an illustration of exemplary content of the retrieval word extraction rule dictionary in the configuration of FIG. 97.

The exemplary results of the operations in this retrieval key analysis unit 53 including the morphological analysis result and the retrieval word extraction result for a particular retrieval key is shown in FIG. 98, while the exemplary content of the retrieval word dictionary 5305 having entries for the retrieval words such as "deadline" and "paper" is shown in FIG. 99, and the exemplary content of the retrieval word extraction rule dictionary 5304 is shown in FIG. 100. In FIG. 100, a value "−1" indicated in the execution part indicates a relative position from the position of the word in the condition part, so that this execution part indicates the execution of the operation "select" with respect to the immediately preceding word of the word "society" in the condition part.

In this configuration of FIG. 96, the access information detection unit 45 extracts the information related to the operation to make an access to the data at a time of the production or editing of the document data, and stores it into the environmental information memory unit 48A as the access information, or delete the already stored access information in the environmental information memory unit 48A. Here, the operation events detected by the access information detection unit 45 are summarized in the table shown in FIG. 101.

By these operation events,the access information element having the various attributes as summarized in the table shown in FIG. 102 is either generated or deleted.

Among these attributes, the data amount is equal to zero at a time of the new data production in general, but in a case of producing the new data by changing the file name of the data, the finite data amount is present from the beginning.

The access information is formed by these attributes of FIG. 102 and the other attributes of the document such as the number of looking up, the urgency level, the copy source file name, the total number of print out, etc. Here, the number of looking up indicates the total number of the access information elements without a change in the data content. Also, the urgency level E indicates an amount of description per unit time, which can be given by the following equation.

$$E = \frac{V}{\Sigma(Te - Ts)}$$

where the variables in this equation have meanings summarized in the table shown in FIG. 103. Also, the total number of print out indicates the total of the number of print out made for the individual access information element.

Figure 104:
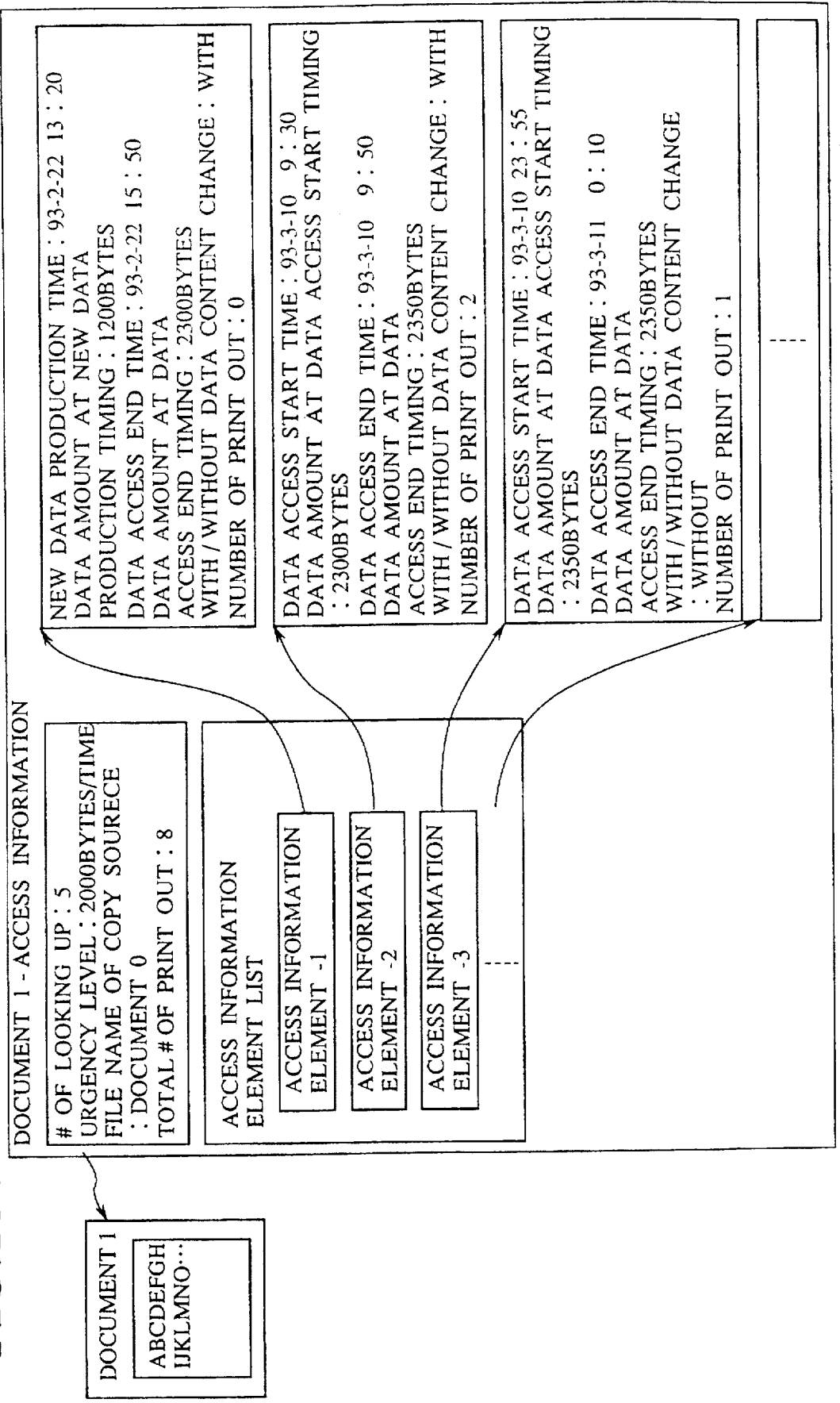
FIG. 104 is an illustration of an exemplary access information display used in the twelfth specific embodiment of the system of FIG. 1.

An exemplary access information is shown in FIG. 104, where this document 1-access information which defines the environmental information is linked with the document 1 itself which defines the target data. The document 1-access information is described in terms of the access information element list and the other attribute information, where each access information element is generated whenever an access is made and added to the list.

Figure 105:
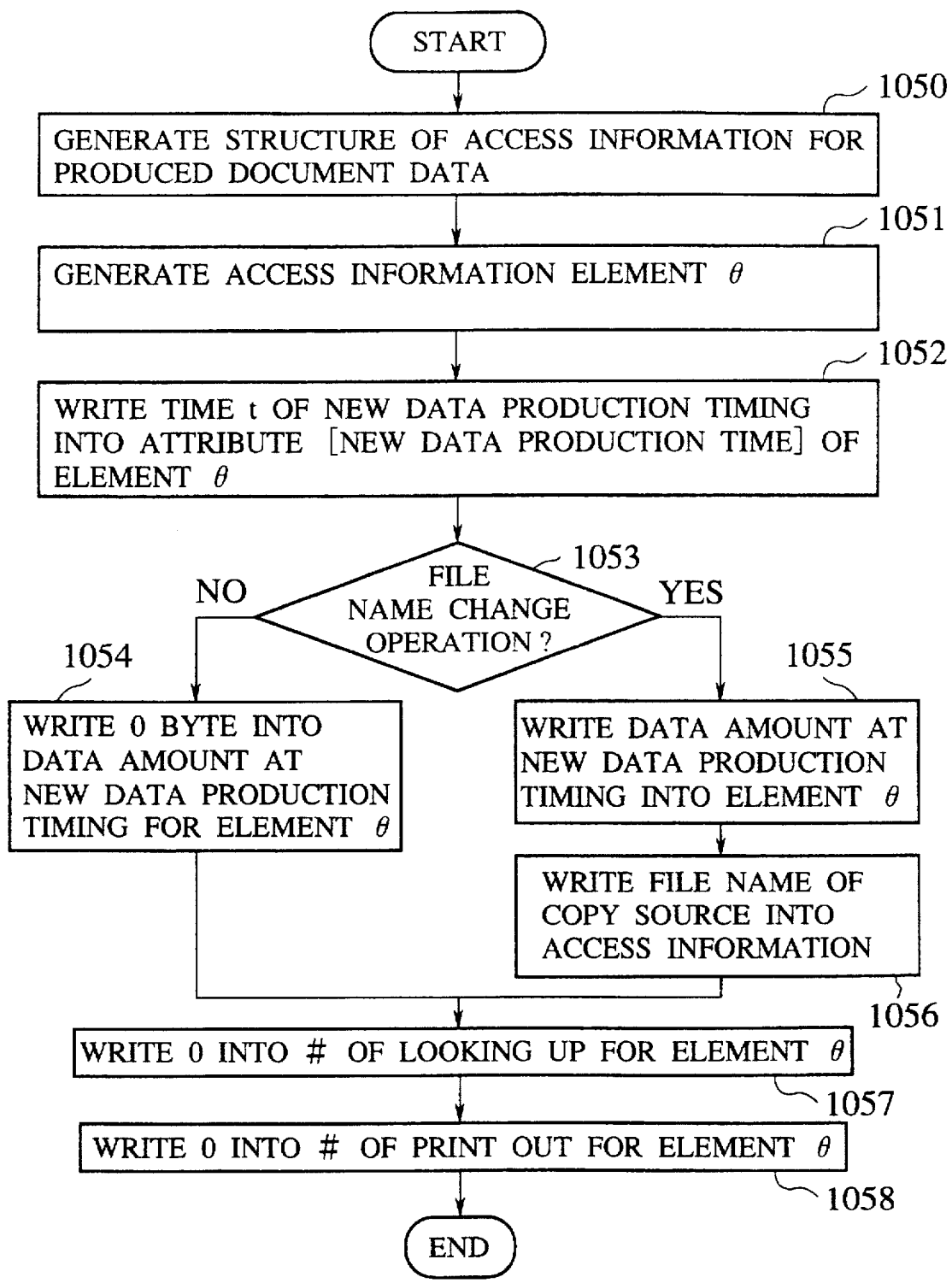
FIG. 105 is a flow chart for one operation of the access information detection unit in the configuration of FIG. 96.

FIG. 105 shows the flow chart for the operation of the access information detection unit 45 with respect to the "new data production" operation and the "storing after data name change" operation. In this case, the structure of the access information for the produced document data is generated (step 1050), the access information element θ is generated (step 1051), and the time t of the new data production timing is written into the attribute [new data production time] of the access information element θ (step 1052). Then, in a case of not carrying out the file name change operation (step 1053 no), "0 byte" is written into the data amount at the new data production timing for the access information element θ (step 1054), whereas in a case of the file name change operation (step 1053 yes), the data amount at the new data production timing is written into the access information element θ (step 1055), and the copy source file name is written into the access information (step 1056). Then, "0" is written into the number of looking up for the access information element θ (step 1057), and "0" is written into the number of print out for the access information element θ (step 1058).

Figure 106:
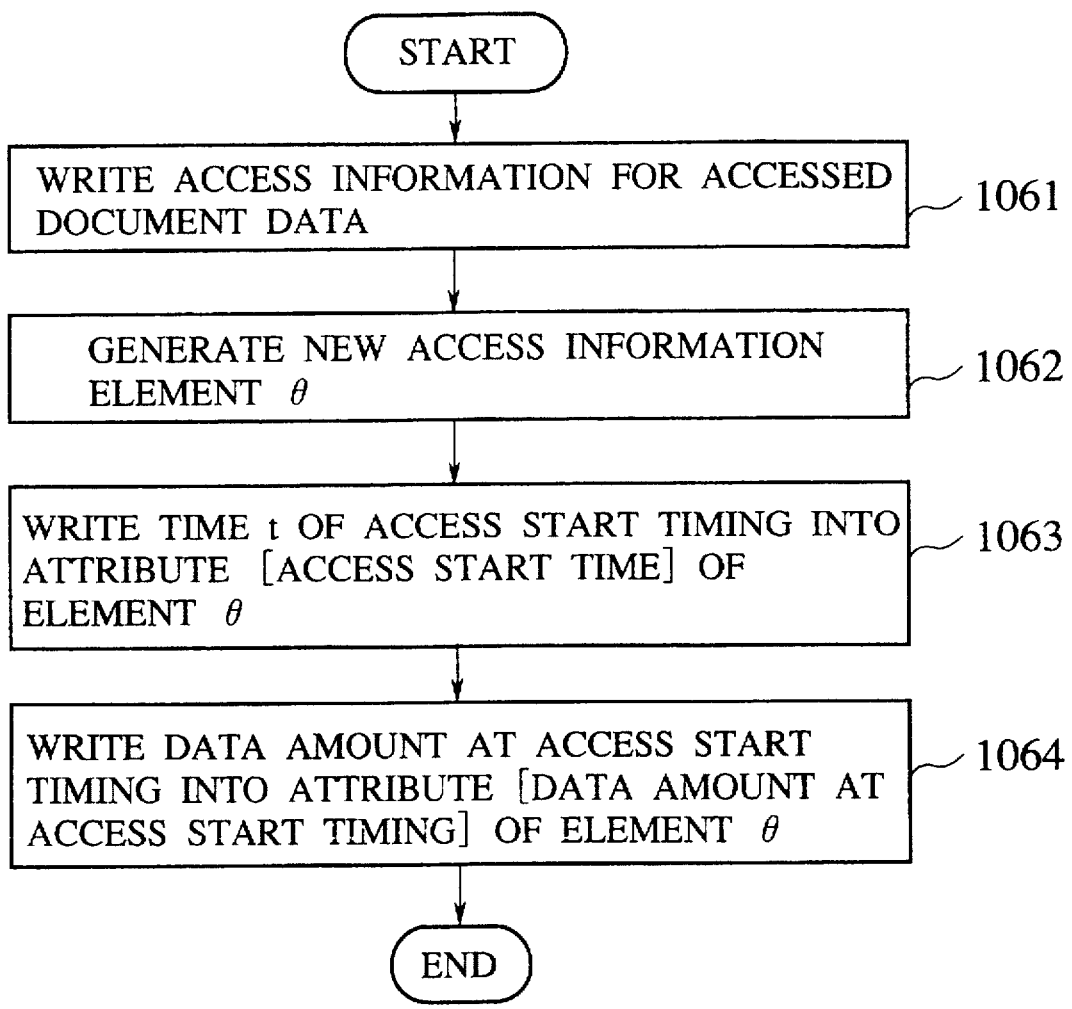
FIG. 106 is a flow chart for another operation of the access information detection unit in the configuration of FIG. 96.

FIG. 106 shows the flow chart for the operation of the access information detection unit 45 with respect to the "data access start" operation. In this case, the access information for the accessed document data is written (step 1061), and the new access information element θ is generated (step 1062). Then, the time t of the access start timing is written into the attribute [access start time] of the access information element θ (step 1063), and the data amount at the access start timing is written into the attribute [data amount at access start timing] of the access information element θ (step 1064).

Figure 107:
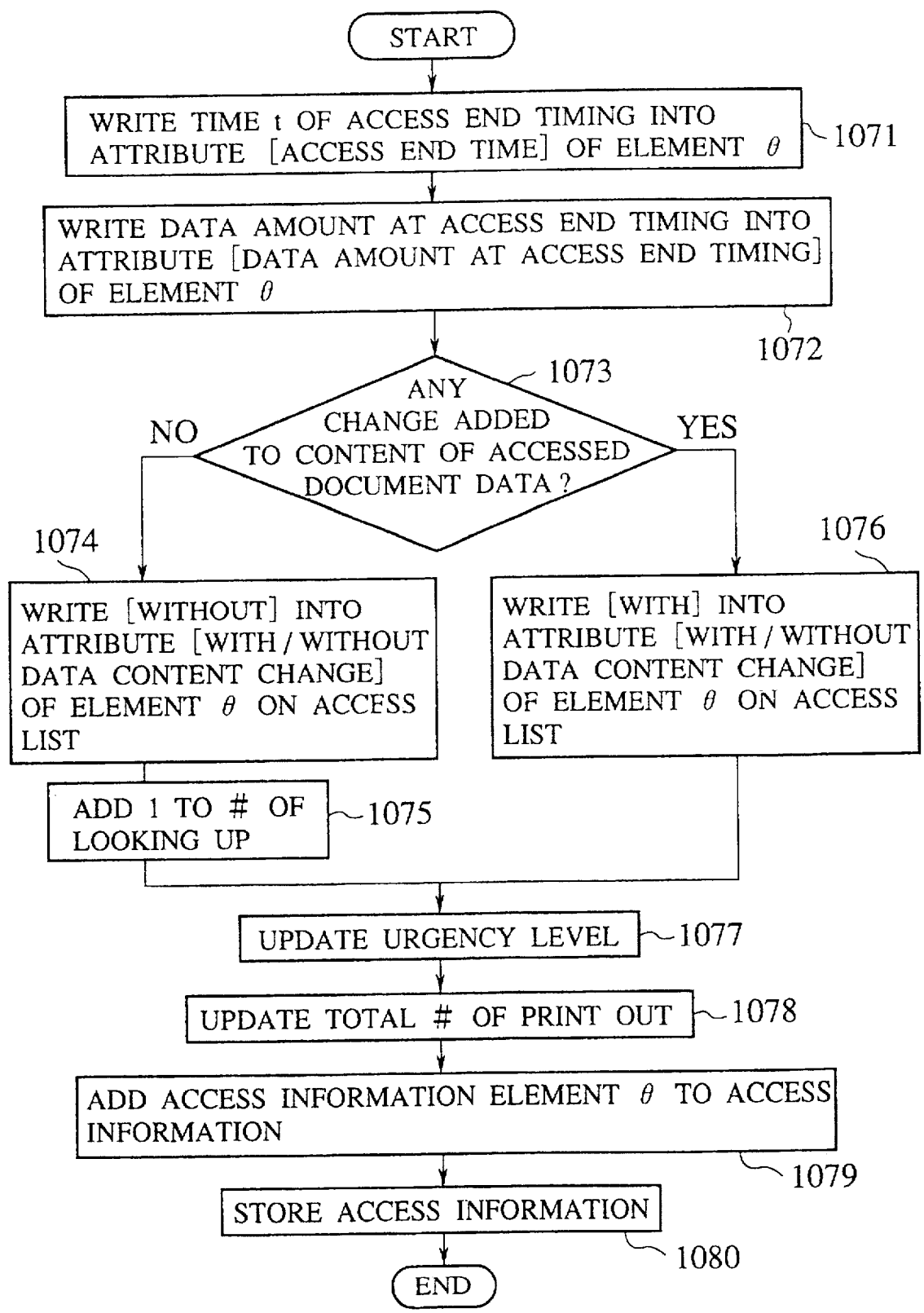
FIG. 107 is a flow chart for another operation of the access information detection unit in the configuration of FIG. 96.

FIG. 107 shows the flow chart for the operation of the access information detection unit 45 with respect to the "data access end" operation. In this case, the time t of the access end timing is written into the attribute [access end time] of the access information element θ (step 1071), and the data amount at the access end timing is written into the attribute [data amount at access end timing] of the access information element θ (step 1072). Then, when there is no change in the content of the accessed document data (step 1073 no), [without] is written into the attribute [with/without data content change] of the access information element θ on the access list (step 1074), and "1" is added to the number of looking up (step 1075). On the other hand, when there is a change in the content of the accessed document data (step 1073 yes), [with] is written into the attribute [with/without data content change] of the access information element θ on the access list (step 1076). Then, the urgency level E is calculated and updated (step 1077), and the total number of print out is calculated and updated (step 1078). Then, the access information element θ is added to the access information (step 1079), and the access information is stored (step 1080).

Figure 108:
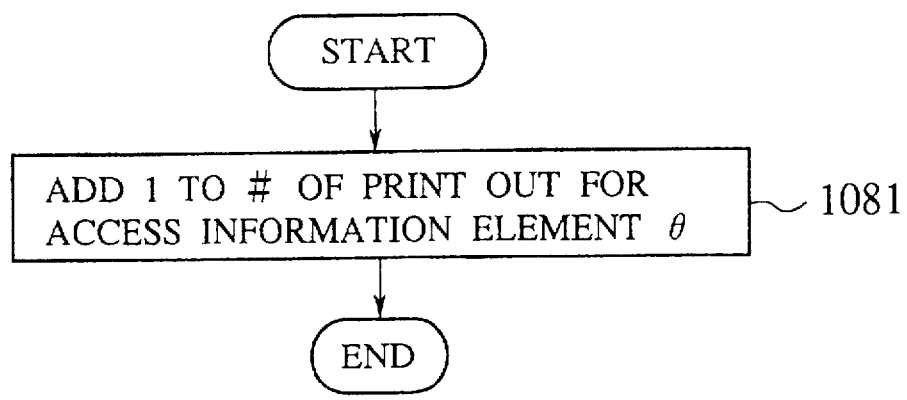
FIG. 108 is a flow chart for another operation of the access information detection unit in the configuration of FIG. 96.

FIG. 108 shows the flow chart for the operation of the access information detection unit 45 with respect to the data print out operation. In this case, "1" is added to the number of print out in the access information element θ (step 1081).

Figure 109:
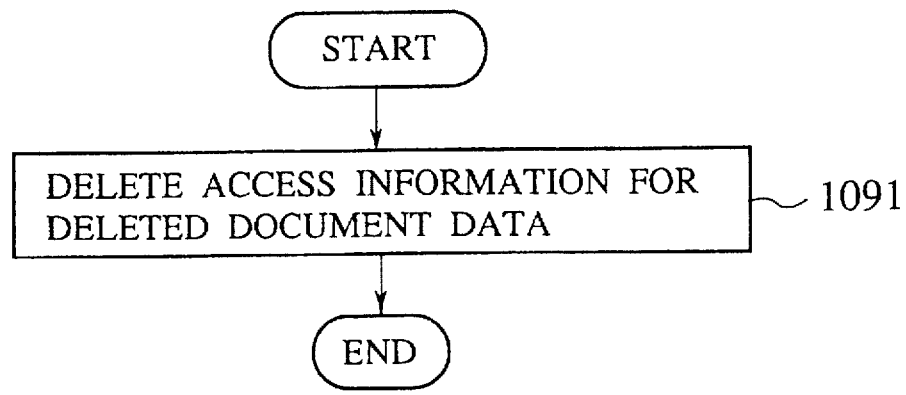
FIG. 109 is a flow chart for another operation of the access information detection unit in the configuration of FIG. 96.

FIG. 109 shows the flow chart for the operation of the access information detection unit 45 with respect to the data deletion operation. In this case, the access information for the deleted document data is deleted (step 1091).

In the configuration of FIG. 96, the retrieval unit 50 carries out the retrieval of the document data by using the keywords as summarized in the table shown in FIG. 110, according to the access information stored in the environmental information memory unit 48A.

Figure 111:
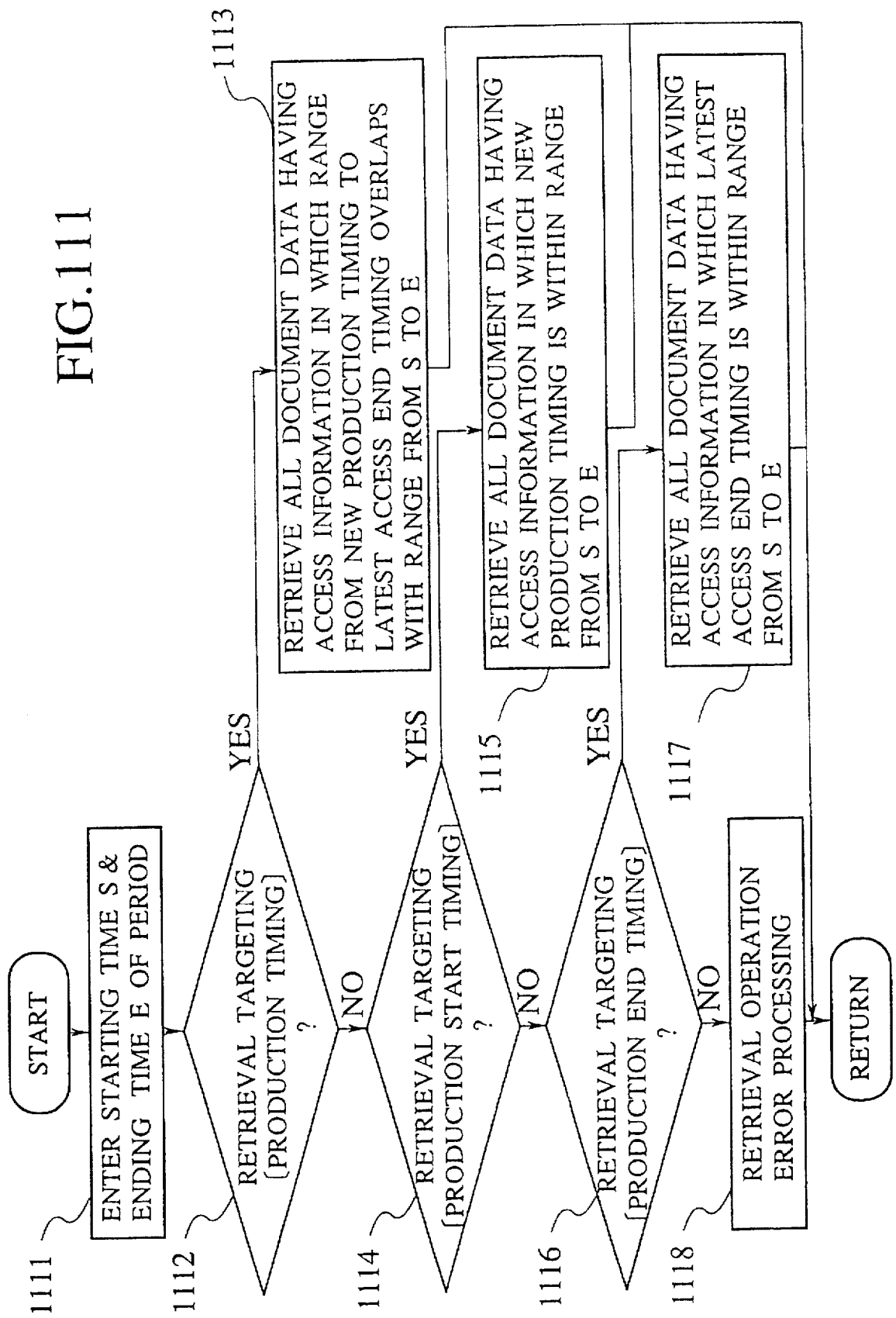
FIG. 111 is a flow chart for one operation of the retrieval unit in the configuration of FIG. 96.

FIG. 111 shows the flow chart for the retrieval operation using the information concerning timing (timing pattern 1) in FIG. 110. In this case, the starting time S and the ending time E of the period are entered (step 1111), and when it is the retrieval targeting [production timing] (step 1112 yes), all the document data having the access information in which the range from the new production timing to the latest access end timing overlaps with the range from the starting time S to the ending time E are retrieved (step 1113). Otherwise (step 1112 no), when it is the retrieval targeting [production start timing] (step 1114 yes), all the document data having the access information in which the new production timing is within the range from the starting time S to the ending time E are retrieved (step 1115). Otherwise (step 1114 no), when it is the retrieval targeting [production end timing] (step 1116 yes), all the document data having the access information in which the latest access end timing is within the range from the starting time S to the ending time E are retrieved (step 1117). Otherwise (step 1116 no), the retrieval operation error processing is carried out (step 1118). By this retrieval operation, the document data at the production timing, the production start timing, and the production end timing can be retrieved by comparing the time information in the access information with the range from the starting time S to the ending time E.

Figure 112:
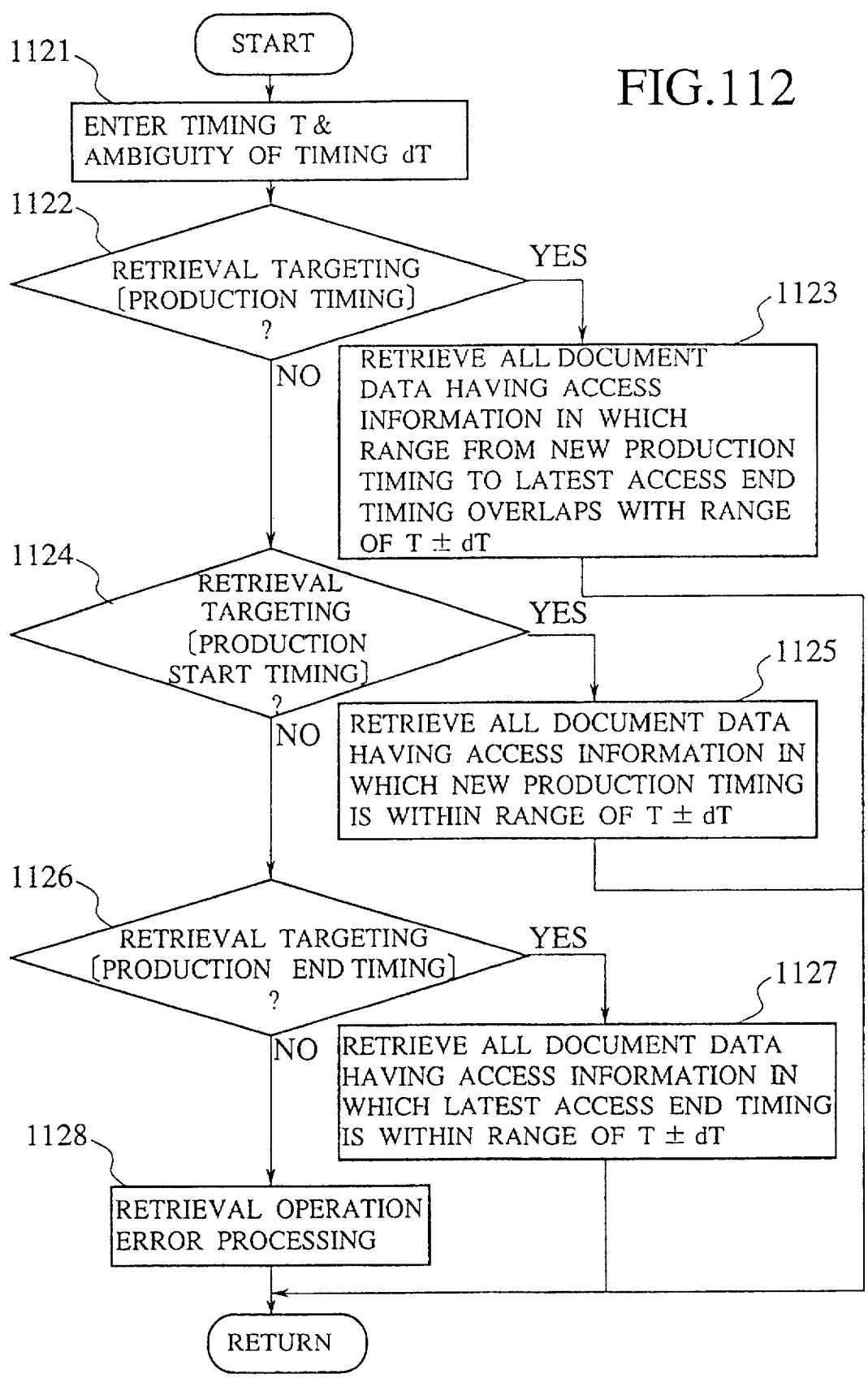
FIG. 112 is a flow chart for another operation of the retrieval unit in the configuration of FIG. 96.

FIG. 112 shows the flow chart for the retrieval operation using the information concerning timing (timing pattern 2) in FIG. 110. In this case, the timing T and the ambiguity of timing dT are entered (step 1121), and when it is the retrieval targeting [production timing] (step 1122 yes), all the document data having the access information in which the range from the new production timing to the latest access end timing overlaps with the range of T±dT are retrieved (step 1123). Otherwise (step 1122 no), when it is the retrieval targeting [production start timing] (step 1124 yes), all the document data having the access information in which the new production timing is within the range of T±dT are retrieved (step 1125). Otherwise (step 1124 no), when it is the retrieval targeting [production end timing] (step 1126 yes), all the document data having the access information in which the latest access end timing is within the range of T±dT are retrieved (step 1127). Otherwise (step 1126 no), the retrieval operation error processing is carried out (step 1128). By this retrieval operation, the document data at the production timing, the production start timing, and the production end timing can be retrieved by comparing the time information in the access information with the range from the time T−dT to the time T+dT.

Figure 113:
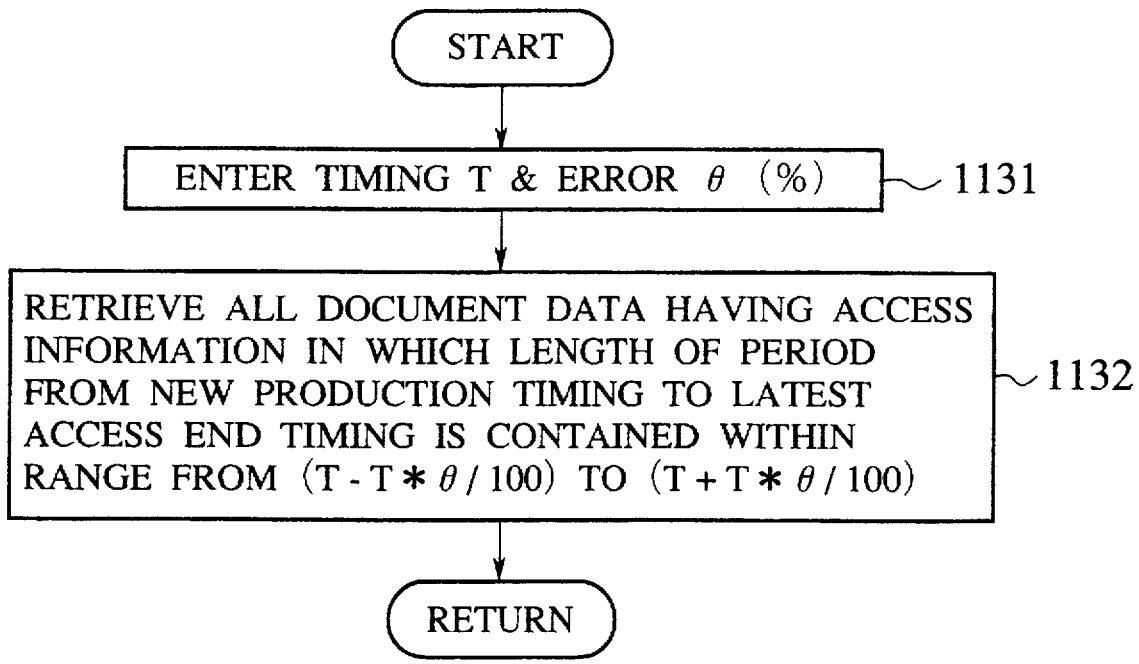
FIG. 113 is a flow chart for another operation of the retrieval unit in the configuration of FIG. 96.

FIG. 113 shows the flow chart for the retrieval operation using the information concerning period in FIG. 110. In this case, the period T and the error θ (%) are entered (step 1131), and all the document data having the access information in which the length of the period from the new production timing to the latest access end timing is contained within the range from (T−T*θ/100) to (T+T*θ/100) are retrieved (step 1132). By this retrieval operation, the document data for which the period between the new data production timing and the latest access end timing is contained within the period T at the error θ (%) can be retrieved.

Figure 114:
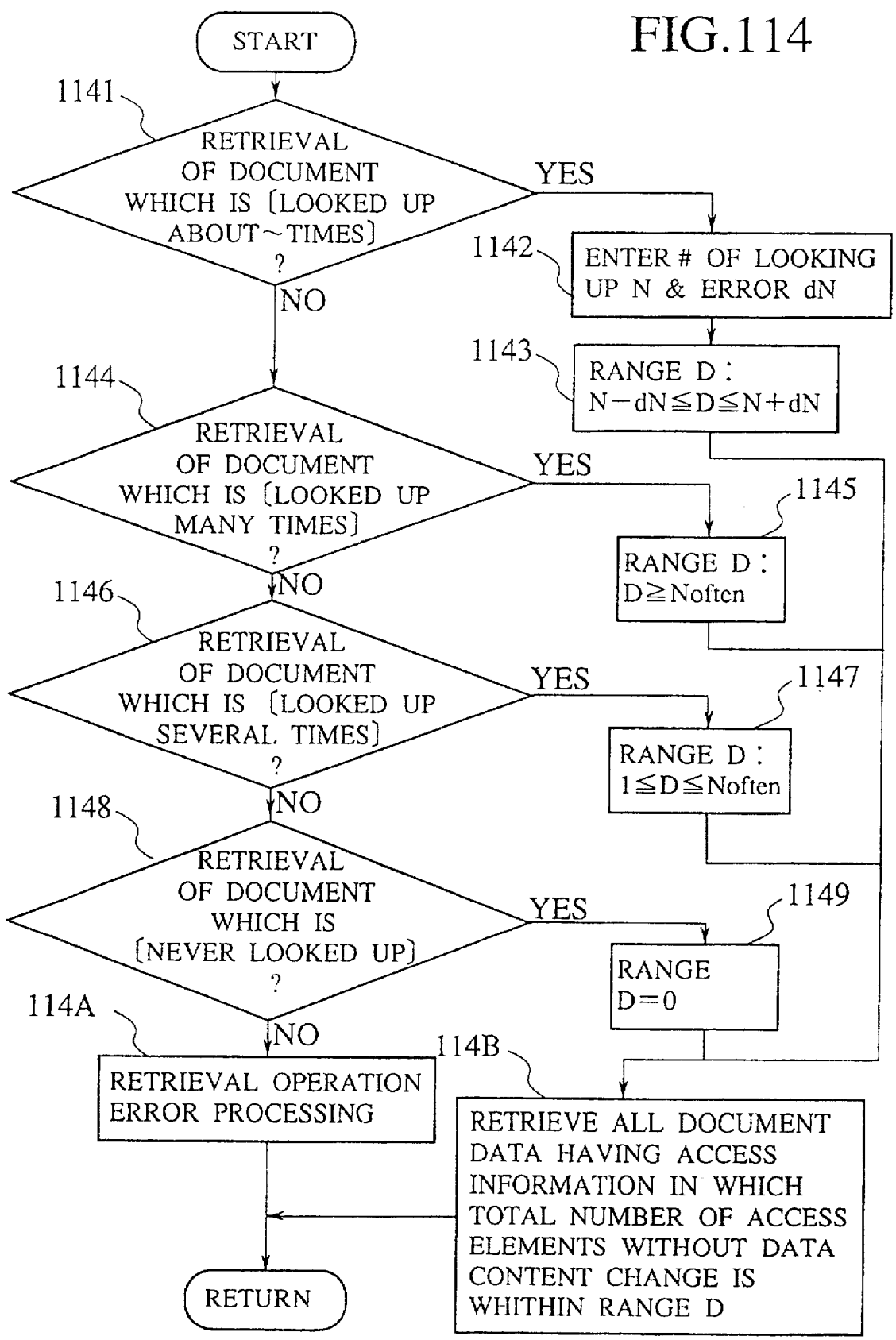
FIG. 114 is a flow chart for another operation of the retrieval unit in the configuration of FIG. 96.

FIG. 114 shows the flow chart for the retrieval operation using the information concerning the look up frequency. In this case, when it is the retrieval of the document which is [looked up about—times] (step 1141 yes), the number of looking up N and the error dN are entered (step 1142), and the range D is set to be N−dN≤D≤N+dN (step 1143). Otherwise (step 1141 no), when it is the retrieval of the document which is [looked up many times] (step 1144 yes), the range D is set to be D≥N$_{often}$ (step 1145). Otherwise (step 1144 no), when it is the retrieval of the document which is [looked up several times] (step 1146 yes), the range D is set to be 1≤D≤N$_{often}$ (step 1147). Otherwise (step 1146 no), when it is the retrieval of the document which is [never looked up] (step 1148 yes), the range D is set to be 0 (step 1149). Otherwise (step 1148 no), the retrieval operation error processing is carried out (step 114A). After the range D is set up at any of the steps 1143, 1145, 1147, and 1149, all the document data having the access information in which the total number of access elements without the data content change is within the range D are retrieved (step 114B). By this retrieval operation, the document data having the access information which satisfies the range D for the number of looking up are retrieved. Here, the number of looking up indicates the total number of the access information elements without a change in the data content. Also, $N_{often}$ is a constant number by which it can be considered as being looked up many times, which is different for different users.

Figure 115:
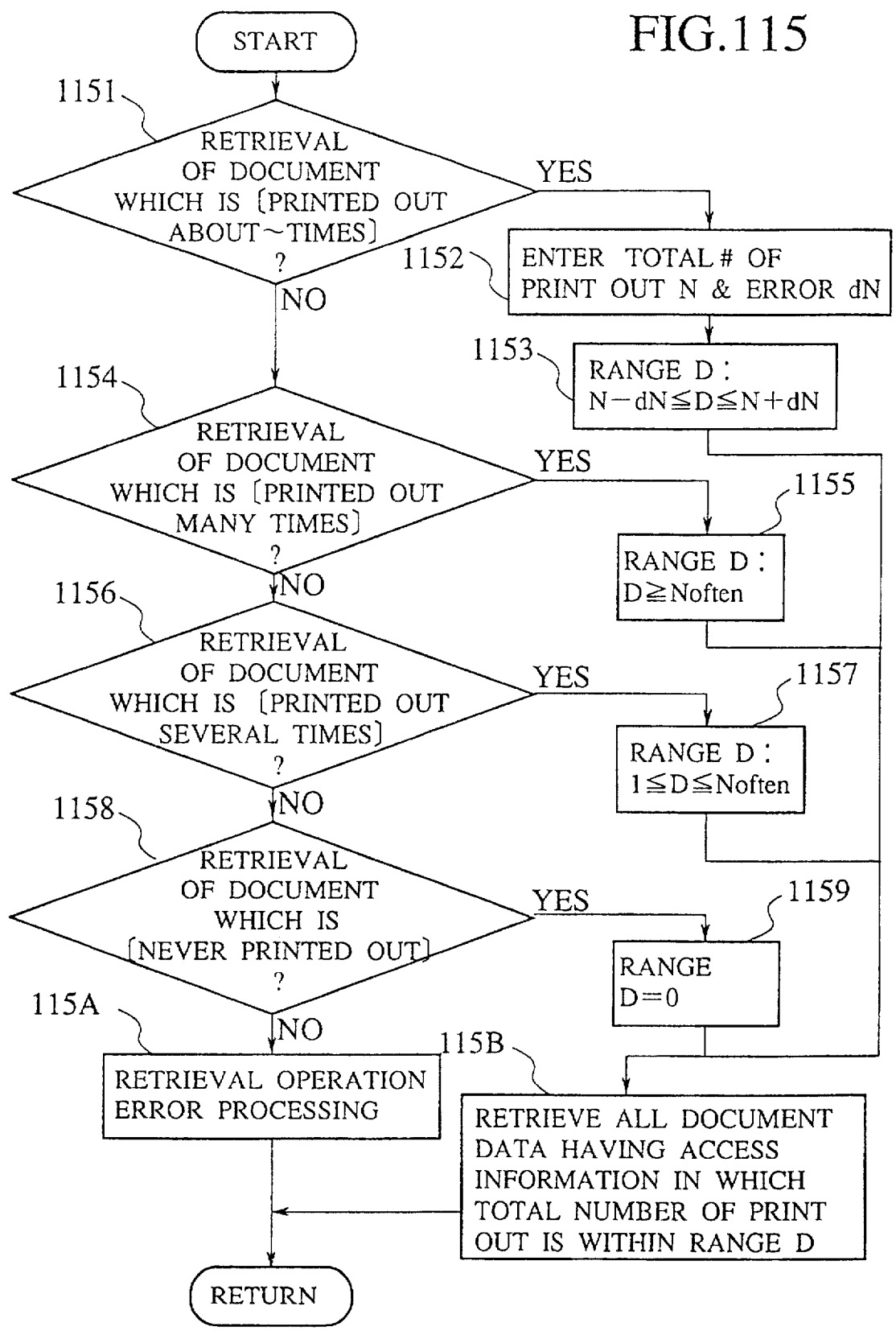
FIG. 115 is a flow chart for another operation of the retrieval unit in the configuration of FIG. 96.

FIG. 115 shows the flow chart for the retrieval operation using the information concerning the print out frequency. In this case, when it is the retrieval of the document which is [printed out about—times] (step 1151 yes), the number of print out N and the error dN are entered (step 1152), and the range D is set to be N–dN≦D≦N+dN (step 1153). Otherwise (step 1151 no), when it is the retrieval of the document which is [printed out many times] (step 1154 yes), the range D is set to be D≧$N_{often}$ (step 1155). Otherwise (step 1154 no), when it is the retrieval of the document which is [printed out several times] (step 1156 yes), the range D is set to be 1≦D≦$N_{often}$ (step 1157). Otherwise (step 1156 no), when it is the retrieval of the document which is [never printed out] (step 1158 yes), the range D is set to be 0 (step 1159). Otherwise (step 1158 no), the retrieval operation error processing is carried out (step 115A). After the range D is set up at any of the steps 1153, 1155, 1157, and 1159, all the document data having the access information in which the total number of print out is within the range D are retrieved (step 115B). By this retrieval operation, the document data having the access information which satisfies the range D for the total number of print out are retrieved. Here, $N_{often}$ is a constant number by which it can be considered as being printed out many times, which is different for different users.

Figure 116:
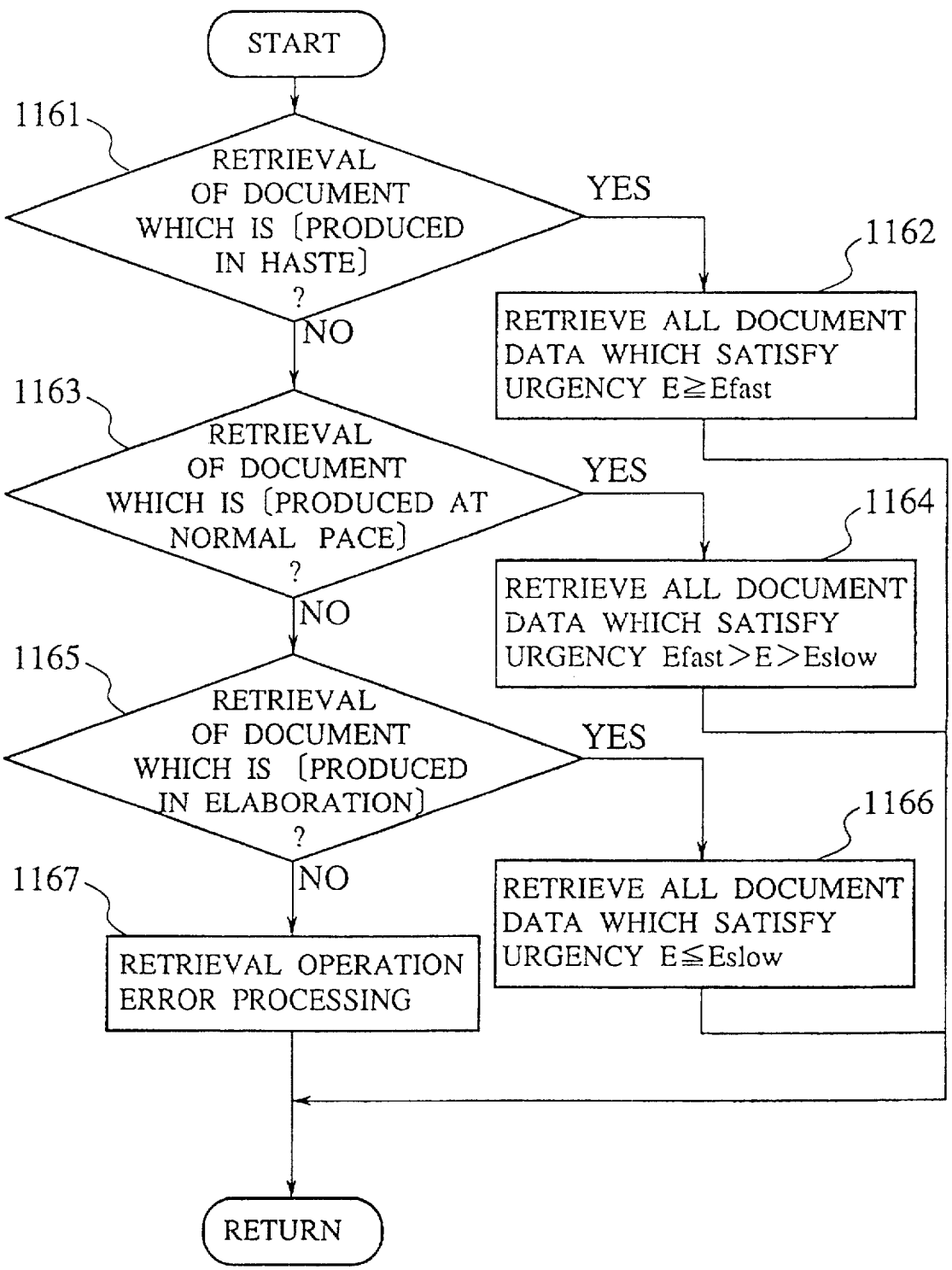
FIG. 116 is a flow chart for another operation of the retrieval unit in the configuration of FIG. 96.

FIG. 116 shows the flow chart for the retrieval operation using the information concerning the urgency level of the production. In this case, when it is the retrieval of the document which is [produced in haste] (step 1161 yes), all the document data which satisfy the urgency level E≧$E_{fast}$ are retrieved (step 1162). Otherwise (step 1161 no), when it is the retrieval of the document which is [produced at a normal pace] (step 1163 yes), all the document data which satisfy the urgency level E in a range of $E_{fast}$≧E≧$E_{slow}$ are retrieved (step 1164). Otherwise (step 1163 no), when it is the retrieval of the document which is [produced in elaboration] (step 1165 yes), all the document data which satisfy the urgency level E≦$E_{slow}$ are retrieved (step 1166). Otherwise (step 1165 no), the retrieval operation error processing is carried out (step 1167). By this retrieval operation, the document data can be retrieved according to the urgency level at the time of its production. For example, the following documents can be retrieved.

(1) Document whose production has started around February and which had been looked up several times.

(2) Document which had been produced around March and which had been written in haste in a single day.

(3) Document which had been produced in elaboration over the period of one month.

Figure 117:
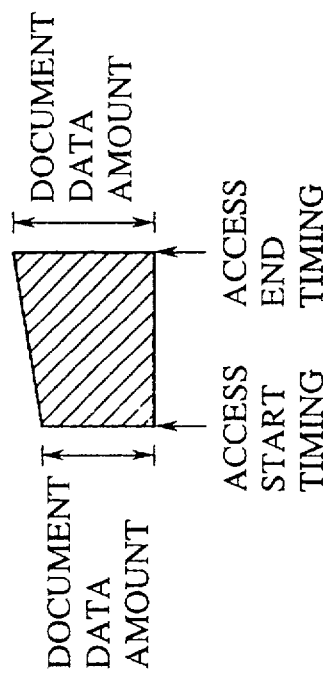
FIG. 117 is an illustration of an exemplary display used in the twelfth specific embodiment of the system of FIG. 1.

FIG. 117 shows an exemplary display of the attribute of the access information element, in which the left edge represents the new production timing or access start timing, while the right edge represents the access end timing. Also, the height of the figure indicates the amount of data at the time of the new production, access start, and access end.

Figure 118:
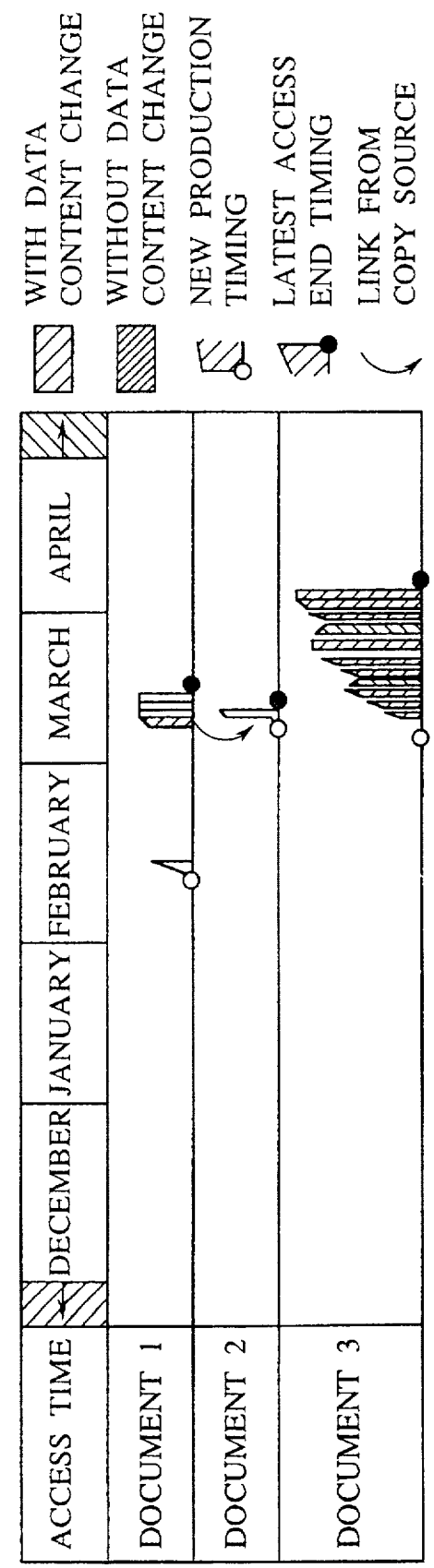
FIG. 118 is an illustration of another exemplary display used in the twelfth specific embodiment of the system of FIG. 1.

FIG. 118 shows an exemplary display of the access information for several (three in FIG. 118) documents in units of months. In this example, the document 1, the document 2, and the document 3 have features of the exemplary retrieval results (1) to (3) described above. Here, the presence or absence of the data content change can be indicated by the hatching pattern of each figure, and the new production timing is indicated by a small blank circle while the latest access end timing is indicated by a small black circle. Also, the link with the copy source file is indicated by a curved arrow.

Figure 119:
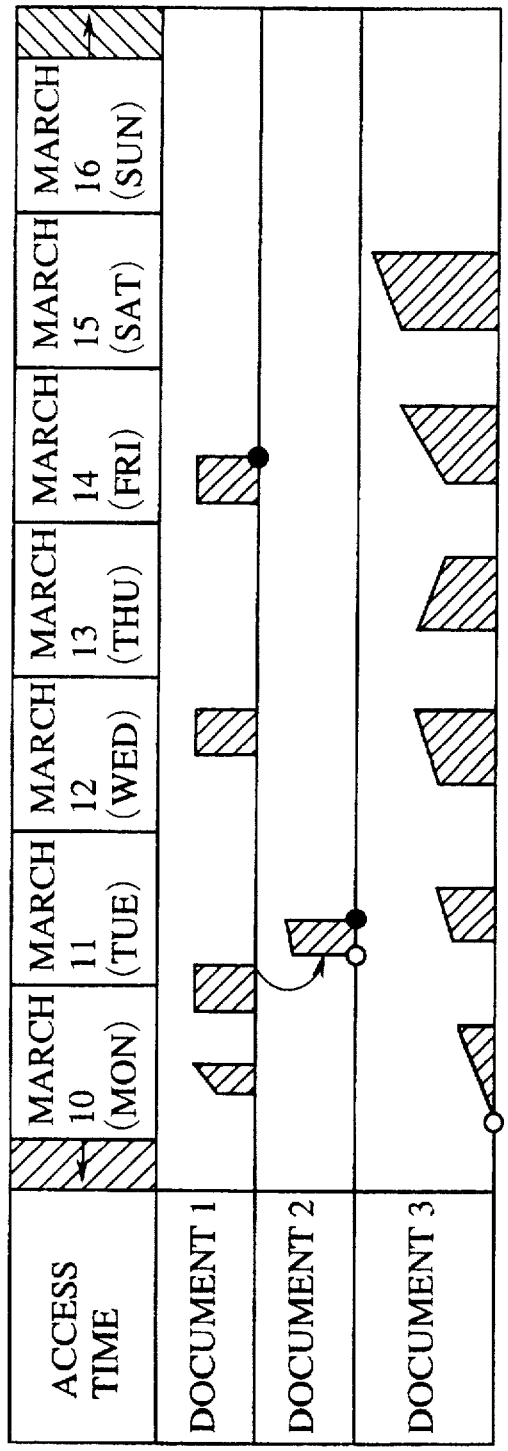
FIG. 119 is an illustration of another exemplary display used in the twelfth specific embodiment of the system of FIG. 1.

FIG. 119 shows an exemplary display of the same data as in FIG. 118 in units of weeks. Here, it is also possible to carry out the retrieval according to the description given in the schedule information generated by the schedule production unit 42 in the configuration of FIG. 96, using the schedule information as the time information rather than the absolute time. This enable the retrieval according to the retrieval key of "document produced around the deadline for the paper of—society". More specifically as shown in FIG. 97, the retrieval words such as society, paper, and deadline are extracted from the retrieval key, to identify the character string without the schedule data which are containing the character string of the extracted retrieval words. Thereafter, the operation similar to that described above can be carried out.

Figure 120:
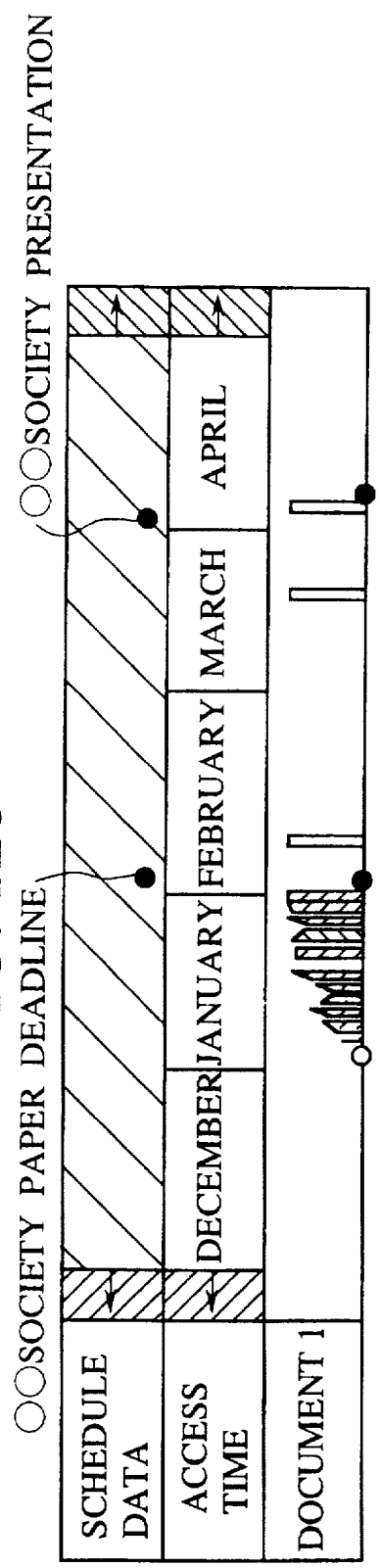
Figure 121:
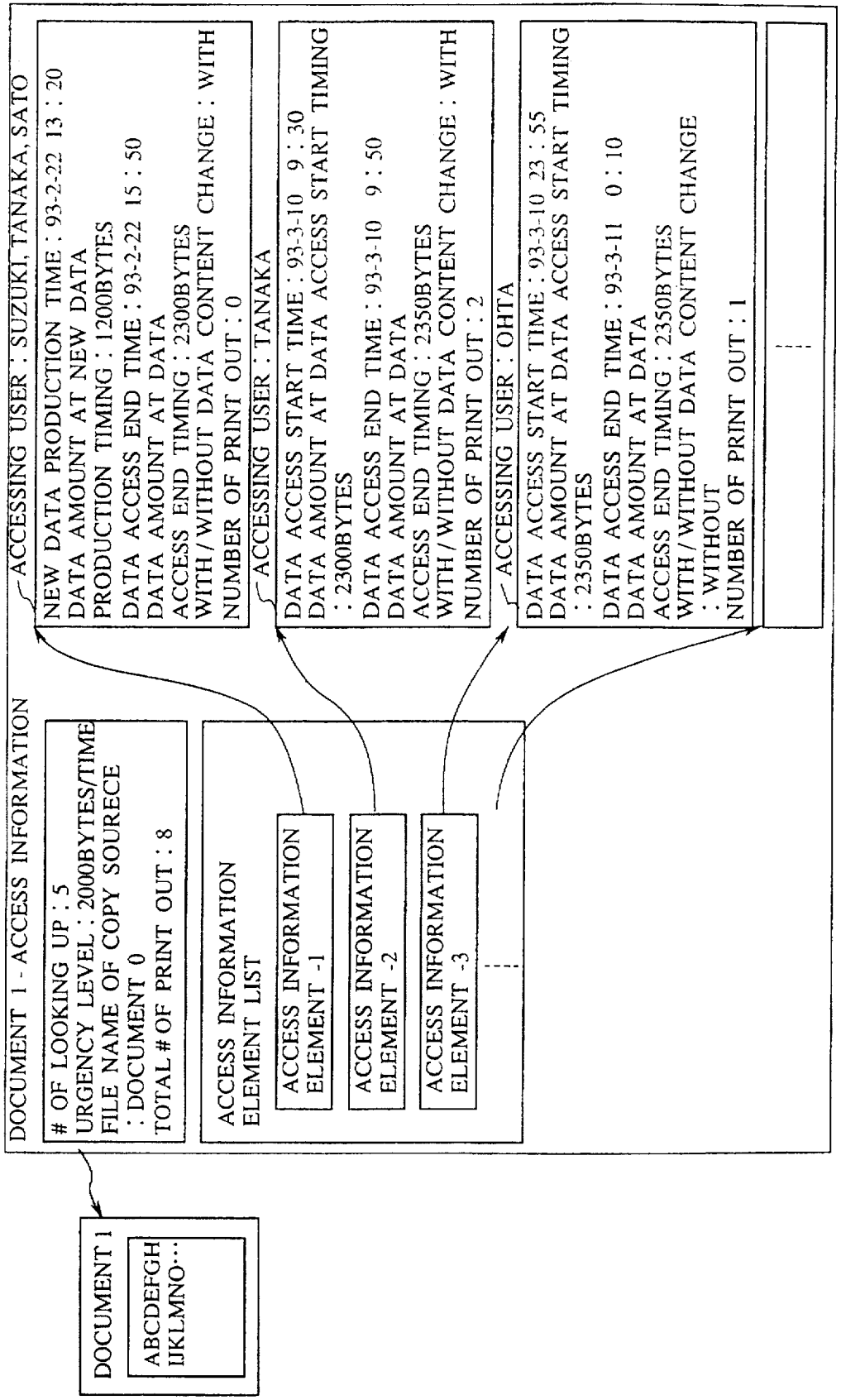

FIG. 120 shows an exemplary display of the document access data which is combined with the schedule data, FIG. 121 shows an exemplary access information, which differs from that of FIG. 104 in that the accessing user's names are also indicated, and FIG. 122 shows an exemplary display of the documents in terms of the production date and the document name, all of which can be utilized in this twelfth specific embodiment as described above.

Next, the thirteenth specific embodiment concerns with a case in which the feature data is obtained from the speech data of the data such as the document, speech, etc. at a time of the data input, the obtained feature data is stored in correspondence to the data, and the desired data is retrieved by using the feature data. Here, the feature data indicates the speaker or a number of speakers identified by carrying out the speaker recognition on the speech data, and implies the environment such as a size of a room, a type of a room, etc. in which the data such as the document, speech, etc. is entered. This feature data classifies the speech data density and tension into categories such as laughter, noisiness, or quietness.

In this thirteenth specific embodiment, the system has the functional configuration similar to that shown in FIG. 96 described above. In this case, the environment input unit 80 has an acoustic media input device such as a microphone for entering the acoustic data such as the the surrounding sound or speech, which is then low pass filtered, A/D converted, sampled, and quantized. it is useful for the acoustic data to be attached with the discretization information such as the sampling frequency and the quantization bit number, and the information concerning the input device, especially for the purpose of the data extraction processing in a case the input data of different forms obtained by various discretization processing are mixedly present.

The environmental analysis target data is always entered throughout a period in which the user is using the system in principle. Namely, the environmental analysis target data is entered whenever the retrieval target data is entered, edited, retrieved, or outputted, or the environmental information is added or corrected by the user. However, when the environmental analysis target data is entered all the time, the amount of data becomes enormous, so that the input of the environmental analysis target data may be omitted when there is no need to carry out the retrieval by using the environmental information obtained from the retrieval target data at that system use as the retrieval key.

The environmental analysis target information to be entered may be given as the multi-channel acoustic data obtained by utilizing a plurality of microphones. For example, in the conference attended by a plurality of speakers, the microphone can be given to one speaker while obtaining the acoustic data reconstructed by emphasizing or de-emphasizing the sounds generated from sound sources at particular positions or in particular directions by utilizing a microphone array. In this case, the information indicating from which microphone it is entered and which position or which direction has been emphasized or deemphasized is attached to the acoustic data as the information concerning the input device.

The environmental information extraction unit 43 analyzes the entered environmental analysis target data immediately and automatically. In a case the environmental analysis target information is the acoustic data, the analysis contents include the surrounding sound level, the surrounding sound type identification, the use location identification according to the surrounding reverberation characteristic, the speaker recognition, the speech recognition, and the speech understanding.

The surrounding sound level can be obtained by calculating the signal power of the acoustic data at a time of entering, editing, retrieving, or outputting the retrieval target data. According to whether the surrounding sound level is exceeding the predetermined threshold level or not, it is possible to obtain the environmental information concerning the noisiness of the surrounding, such as that indicating that the location of the system use is a noisy place, or a quiet place.

Also, by calculating the similarity between the spectral pattern data obtained by the frequency analysis of the acoustic data and the frequency spectral pattern data corresponding to each type of the surrounding sound, it is possible to identify the type of the surrounding sound. For example, it is possible to obtain the environmental information concerning the type of the sound source in the surrounding of the system use location and the system use location implied from it, by using the standard frequency spectral pattern data corresponding to such sounds as the sounds caused by the user himself or the other persons present at the system use location such as those of the hand clapping or laughter, the operation sound of the air conditioner or an automobile, and the surrounding sound such as the call sound of the medium wave radio or telephone, etc. The scheme for this identification of the surrounding sound is the same as that used in the word speech recognition, where the standard frequency spectral pattern data for matching which is provided for each word in the word speech recognition is to be replaced by the standard frequency spectral pattern data for each type of surrounding sound according to the waveform data of the surrounding sound rather than that of the word speech.

It is also possible to generate the test sound at a time of the system use, and obtain the reverberation characteristic by collecting the reverberation sound, so as to identify the system use location. When the location is not moved during the system use, it suffices to generate the test sound such as the beep sound at a beginning of the system use, and collect the resulting reverberation sound. In this case, for the above described identification of the surrounding sound, it suffices to produce the standard frequency spectral pattern data for each system use location separately. In this manner, it is possible to obtain the environmental information concerning the system use location by identifying the system use location in such manners as it is the outdoor location, it is a hall with a lasting reverberation sound, or it is a custom seat of the user.

In a case of dealing with a location at which a plurality of speakers are present, it is possible to determine whose utterance it is by the speaker recognition. Here, as already mentioned above, it is possible to identify the speaker without using the recognition processing by giving a microphone to each speaker and entering the acoustic data from different speakers into different channels, or by providing a directionality by using the microphone array. According to such an information concerning the speaker, it is possible to obtain the environmental information indicating not just whose utterance it is, but also who was present in a vicinity.

Also, by preparing the standard frequency spectral pattern data for phonemes or words to be recognized, it is possible to detect the phonemes or words by calculating the similarity with respect to the spectral pattern data obtained by the frequency analysis of the acoustic data given as the environmental analysis target data. In a case of detecting the phonemes, it is also possible to obtain the word detection result by using the method such as the dynamic planning (DP) method in addition. In a case of detecting the words, the word detection result can be obtained by the word spotting scheme. It is also possible to determine the word recognition result according to the syntactic and semantic analyses of a plurality of word detection result sequences obtainable from combinations of the detected words. Also, it is possible to obtain the semantic content of the utterance formed by the word sequence constituting the recognition result.

Here, there is a need to setup the semantic contents indicated by the words or word sequences to be the recognition targets before the analysis. Namely, only the words or the semantic contents which are set up before the analysis can be obtained as the analysis results automatically at a time of the environmental analysis target data input. Therefore, in a case of the retrieval using the environmental information which utilizes the semantic contents indicated by the words or word sequences not set up at a time of the environmental analysis target data input, it is necessary to make the set up again, take out the environmental analysis target data from a memory for storing the environmental analysis target data, and re-analyze the environmental analysis target data under the new set up. This need for setting up the information desired to be obtained as the recognition result in advance is common to all the recognition or identification analyses in general such as the speech recognition, the speaker recognition, and the surrounding sound identification. When the necessary environmental information is in short at a time of the retrieval, it suffices to carry out the re-analysis of the environmental analysis target data in the above described manner.

Now, as an example of the personal multi-media filing system utilizing the acoustic data as the environmental information, an exemplary case of the application to the conference file will be described in detail.

In this case, the data to be entered into the system is the multi-media data including the acoustic, image, and text data, and such an input multi-media data is going to be the retrieval target data.

Also, at the same time as inputting or outputting the retrieval target data, the acoustic data for obtaining the environmental data are entered. Here, the environmental information at the time of input/output is an information indicating who is inputting/outputting what target data, how, where, when, and with who. Among these, the acoustic data for obtaining the environmental information at the time of the input may be the same as the input target data.

By attaching such an environmental information, it becomes easier to carry out the retrieval operation in a case of subsequently retrieving and outputting the input multimedia data again.

The system extracts the environmental information automatically from the acoustic data, and stores in a state of being linked with the target data.

The target data input unit 47 has means such as microphone, scanner, camera, pen, mouse, keyboard, etc. for inputting the target data such as the acoustic, image, and text.

The input of the acoustic data into the system is made through the microphone. In a case there is no need to carry out the extraction of the environmental information in real time, the acoustic data entered from the microphone can be stored in the target data memory unit 49 once, and utilized later on at a time of extracting the environmental information.

Also, in a case of having a plurality of sound sources as in a case of having a plurality of speakers, in order to improve the quality of the acoustic data and the extraction precision of the environmental information, it is possible to make the multi-channel inputs by entering the acoustic data from a plurality of microphones.

The retrieval target data other than the acoustic data such as the document, video, and image data for distributed materials at the conference, the image data for the state of the conference room, text and image data for memo, etc. are entered through the input device such as scanner, camera, pen, mouse, etc.

The target data memory unit 49 stores the multi-media data entered from the target data input unit 49 along with its input time.

The environment input unit 80 has the acoustic input means such as a microphone. Similarly to the target data input unit 47, the acoustic data such as the speeches of the speakers, voices of the audience, and the environmental noises of the surrounding are entered through the microphone. Also, in a case of having a plurality of speakers, it is similarly possible to make the multi-channel inputs by entering the acoustic data from a plurality of microphones.

Figure 123:
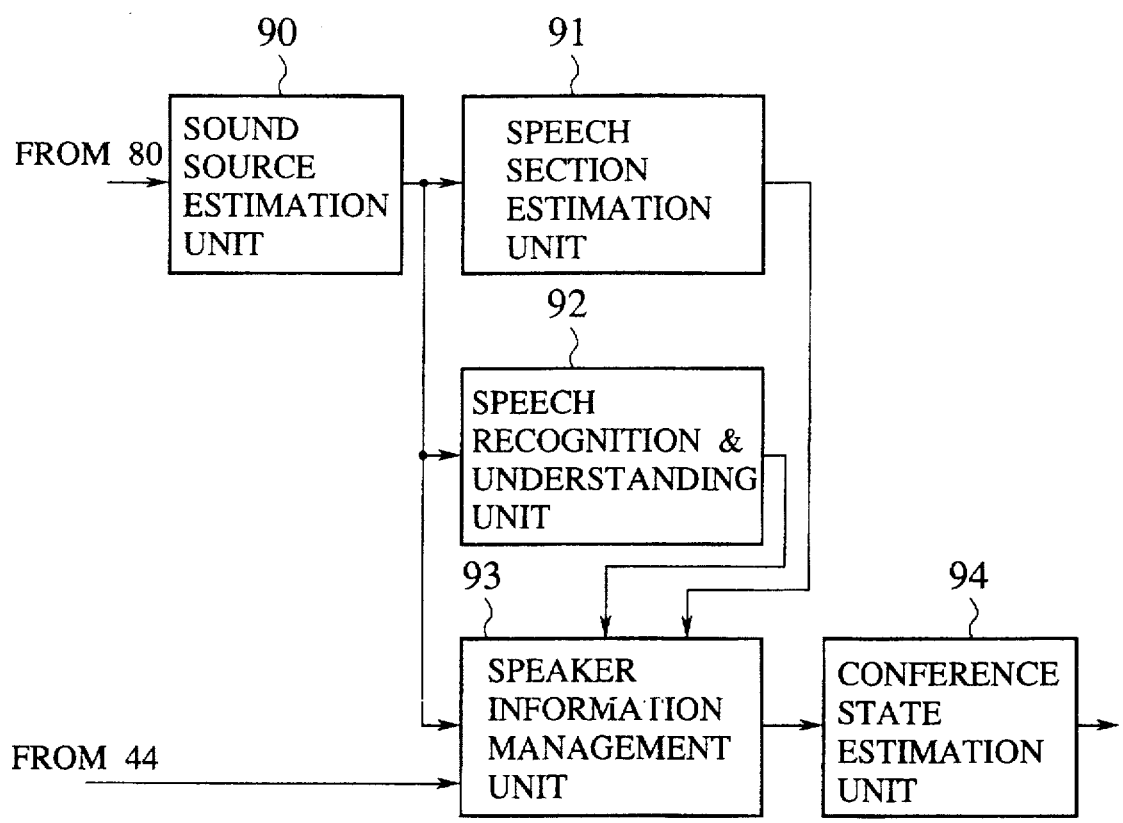

As shown in FIG. 123, the environmental information extraction unit 43 further comprises a sound source estimation unit 90, a speech section estimation unit 91, a speech recognition and understanding unit 92, a speaker information management unit 93, and a conference state estimation unit 94.

The sound source estimation unit 90 estimates the acoustic data components generated by a particular sound source by judging the position and the direction of the sound source contained in the acoustic data entered by a plurality of microphone at the environment input unit 80. The simplest exemplary configuration for this sound source estimation unit 90 is to provide a microphone for each speaker, and estimate the voice components of a certain speaker by making correspondences between the acoustic data entered through the microphones with the speakers. Even in a case a number of speakers and a number of microphones are not coinciding, it is possible to control the acoustic directionality by convoluting the acoustic data entered through the microphones and controlling the convolution coefficients, such that it is possible to distinguish a plurality of speakers according to the arriving directions of the acoustic waves, and estimate the component of a particular speaker or the components of the speakers other than a particular speaker.

Here, the sound source is not necessarily limited to the speeches uttered by human being, and can be the environmental noises of the surrounding.

The speech section estimation unit 91 estimates the timewise sections at which the speeches are existing in the time series of the acoustic data. For example, in a case of determining a starting edge of the speech, a certain power threshold and a period threshold are set up, and when the signals with the power exceeding the power threshold is maintained for a period longer than the period threshold in the acoustic data, a timing at which that power threshold was exceeded is determined as the starting edge. The ending edge can also be determined similarly.

Also, the speech sections can be estimated at a higher precision by setting the power threshold and the period threshold to be different for the starting edge determination and for the ending edge determination. It is also possible to estimate the starting edge and the ending edge of the speech uttered by a particular speaker from the speech signal components of that particular speaker obtained by the sound source estimation unit 90.

The speech recognition and understanding unit 92 carries out the word recognition and the speech recognition by using the acoustic analysis and the syntactic and semantic analyses of the acoustic data, and extracts the semantic content of the utterance. The acoustic analysis obtains the phoneme sequence or word sequence by carrying out the short section frequency analysis at the several milli-seconds intervals for example, and by the pattern matching using the statistical method such as the HMM (Hidden Markov Model) or the multiple similarity method. Then, the syntactic and semantic analysis is carried out by utilizing the history information in addition to the acoustic analysis result, and the final speech recognition and understanding result is obtained. Also, according to the speech signal components of a particular speaker obtained by the sound source estimation unit 90, it is possible to extract the vocabulary and the semantic content uttered by that particular speaker.

The speaker information management unit 93 manages the speech section estimated by the speech section estimation unit 91, and the word recognition result and the semantic content of the utterance obtained by the speech recognition and understanding unit 92, for each speaker estimated by the sound source estimation unit 90, and manages the environmental information indicating which speaker has uttered what and when. These informations are managed within the speaker information management table. It is also possible for the speaker information management table to use not just the speeches uttered by a certain speaker, but also the environmental noise generated by a certain sound source as the management target. Also, by managing these informations in conjunction with the time information, it becomes easier to make the correspondences to the retrieval target data.

The conference state estimation unit 94 includes a speaker switching time interval measurement unit, a surrounding noise measurement unit, a non-speaker originated sound level measurement unit, and a state estimation unit. The speaker switching time interval measurement unit obtains the time elapsed since one speaker finished his speech until another speaker starts his speech, by looking up the speaker information management table. The surrounding noise measurement unit obtains the surrounding noise level from the sound level at the non-speech sections. The non-speaker originated sound level measurement unit obtains the surrounding sound level due to the sound sources other than the speaker of the speech section. The state estimation unit estimates the smoothness of the discussion progress according to the elapsed time measured by the speaker switching time interval measurement unit, and the conference state such as the noisiness of the conference according to the surrounding noise level measured by the surrounding noise measurement unit and the surrounding sound level measured by the non-speaker originated sound level measurement unit. The estimated conference state is managed in the conference state information management table along with the time information.

It is also possible for the environmental information extraction unit 43 to extract the environmental information by utilizing the acoustic data stored in the target data memory unit 49 instead of or in addition to utilizing the acoustic data entered by the environment input unit 80.

The environmental information memory unit 48A stores the content of the speaker information management table and the conference state information management unit used in the environmental information extraction unit 43, along with the time information attached to them.

The retrieval key input unit 52 has input means such as microphone, pen, mouse, keyboard, etc. Here, the retrieval key concerning the content of the speaker information management table and the conference state information management table stored in the environmental information memory unit 48A such as the speaker, the vocabulary, the semantic content, and the atmosphere is entered either as the speech input or the pointing operation using these input means.

The retrieval unit 50 retrieves the content of the speaker information management table and the conference state information management table according to the retrieval key entered from the retrieval key input unit 52, and outputs the matching environmental information and the related target data as the retrieval result in the visual oriented output method such as the character or icon display, or the audio oriented output method such as the speech and artificial sound output.

The target data output unit 51 reproduces and outputs the content of the environmental information and the multimedia data stored in the environmental information memory unit 48A and the target data memory unit 49, and the retrieval result of the retrieval unit 50 either acoustically or visually.

For example, the environmental information can be outputted as follows. Taking the speaker and the time as axes, it is possible to visually express who has uttered when. Also, by taking the semantic content and the speaker as axes, it is possible to visually express who has uttered what and who had uttered similar thing.

Now, some exemplary cases utilizing the sound as the environmental information will be described in detail.

[example 1] Conference file: target data are documents such as speeches and materials.

<At a time of input>

The environment input unit 80 enters the speeches of the speaker and the surrounding sounds through the microphone.

The environmental information extraction unit 43 extracts (1) who has uttered when, and (2) what are the topic, used vocabulary, and semantic content, by carrying out the speech recognition and speech understanding on these speech data. In addition, (3) the conference state such as the atmosphere of the conference is also extracted according to the elapsed time since one speaker finished his speech until another speaker starts his speech, the surrounding noise level at a time of no speech, and the speech and sound level of the non-speakers.

Here, who has uttered can be determined easily when the multi-channel inputs using a plurality of microphones are employed. For example, when there are at least the same number of microphones as the number of speakers, by making correspondences between the microphones and the speakers, who has uttered can be determined easily. Also, even when the number of microphones is less than the number of speakers, by judging the direction of the sound source using the microphone array, the most of the speakers can be judged.

As for the topic, vocabulary, and semantic content, the words in the utterance are recognized by the continuous speech recognition, and the semantic content is judged from a combination of the recognized words. Here, some of the words to be the target of recognition can be specified in advance according to the expected topic, and can be treated with a priority over the other words in determining the recognition result.

As for the start and end of the utterance, the speech section can be detected from the speech level and duration.

The environmental information memory unit 48A stores the speech data or the environmental information extracted by the environmental information extraction unit 43 along with the input time.

The target data output unit 51 presents the environmental information visually, and provides the reproduction of the speech and sound which are the target data, as well as the display output of the document.

<At a time of retrieval>

Figure 124:
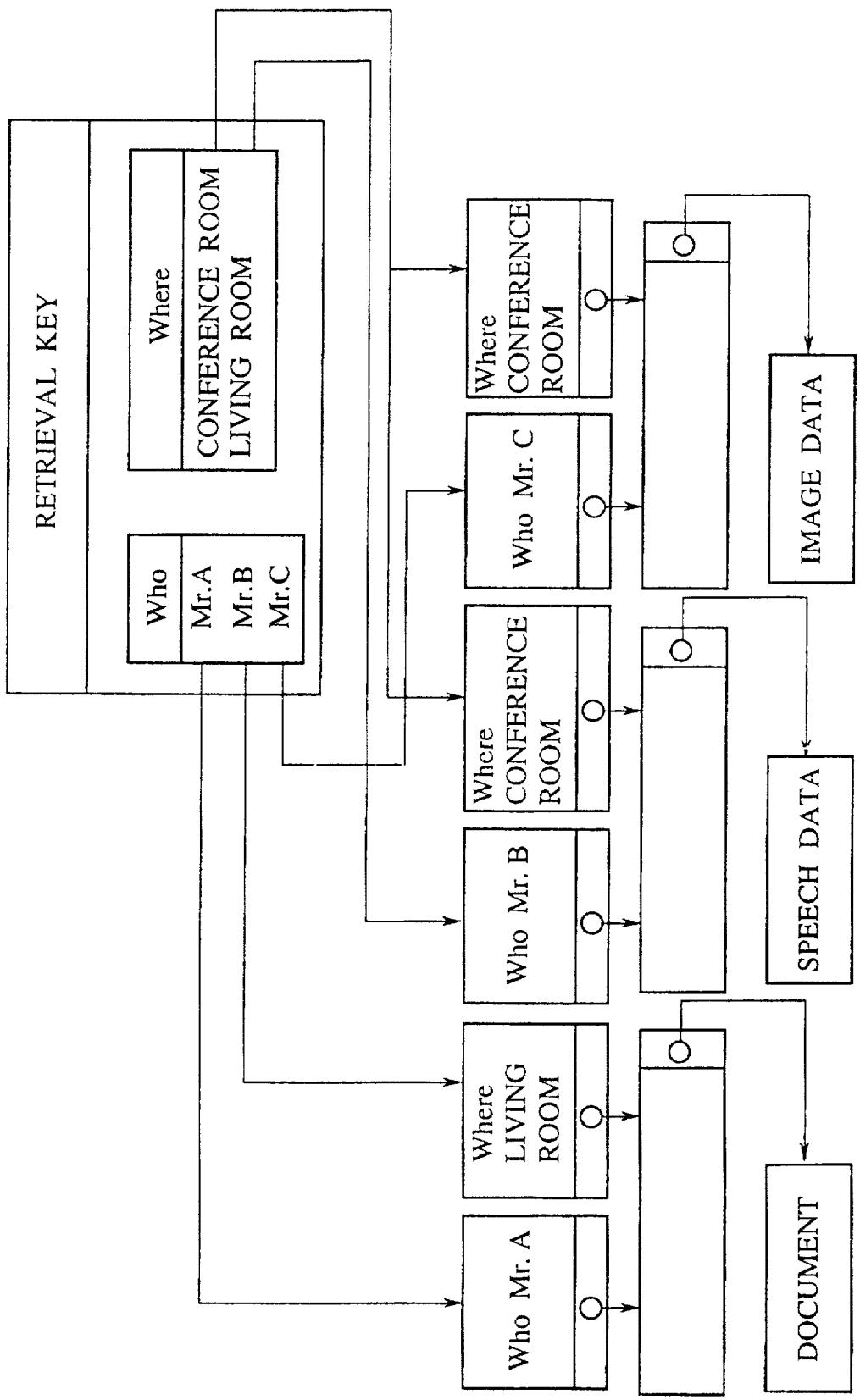

The retrieval key input unit 52 receives the user's retrieval request input from the input device such as pen, keyboard, mouse, camera, etc. For example, the target data output unit 51 can display a list of the environmental information as shown in FIG. 124, and the user can specify the desired environmental information to be used as the retrieval key out of the displayed list by using the input device. Then, the environmental analysis target data from which the selected environmental information has been obtained and the retrieval target data linked with it can be obtained.

In the retrieval targeting at the speaker, what was uttered, vocabulary, and semantic content are displayed in a time order. For example, consider a case in which the dynamic image data such as a motion picture is presented as the retrieval target data, and each of a plurality of persons who watches this retrieval target data states his own impression of each scene. In this case, the speech tape recording the utterances at that location is used as the environmental analysis target data, and the analysis using the speaker estimation result due to the speaker recognition and the recognition result for the words contained in the utterances as the environmental information is carried out. Then, by displaying the obtained environmental information, i.e., the recognition result for each speaker arranged in a time order of the utterances, the utterance content of a particular person or its change can be learned from the environmental information alone, and it is also possible to carry out the retrieval of the retrieval target data for the scene about which a certain person made a certain utterance.

In a case of the retrieval targeting at the vocabulary, the vocabulary repeatedly contained in the utterance can be treated as the keyword of that conference.

In a case of the retrieval targeting at the topic, who has what opinion about a certain topic is displayed.

In a case of the retrieval targeting at the atmosphere of the conference, it is possible to regard the discussion as a hot one when the elapsed time since one speaker finished his speech until another speaker starts his speech is short. Also, according to the speech and sound level due to the non-speakers, whether it is a noisy atmosphere or a quiet atmosphere can be determined.

[Example 2] Document file: target data are non-speech data, and the environmental information is the surrounding noise level information.

<At a time of input>

The environment input unit 80 enters the surrounding sound at a time of the system use through a plurality of microphones.

The environmental information extraction unit 43 extracts the surrounding noise level from the entered sound data, as well as the frequency of the key input for the document production. Here, by extracting the noise near the key input sound spectrum and the other noise separately, the noise caused by the document production can be excluded from the surrounding noise.

The environmental information memory unit 48A stores the entered sound data or the environmental information extracted by the environmental information extraction unit 43 along with the input time.

The target data output unit 51 visually presents the noise information in units of documents, paragraphs, sentences, phrases, clauses, or characters.

<At a time of retrieval>

The retrieval key input unit 52 enters the user's retrieval request input from the input device such as pen, keyboard, mouse, camera, etc.

In a case of the retrieval targeting at the concentration of the document production, the quality of document is judged to be higher for the document produced under the quieter environment, according to the type and level of the surrounding noise.

Next, the fourteenth specific embodiment concerns with a case in which the characteristic number, name, or nickname uniquely assigned (logged in) by the user to a computer is stored, and the desired data such as document is retrieved by using the stored number, name, or nickname.

Presently, many computers such as personal computers and workstations can be connected through a network, and under such an environment, it is possible to look up, or change the data existing on a memory device associated with a certain computer from the other computer. In this fourteenth specific embodiment, it is made possible to retrieve the desired data according to the information indicating at which computer this data had been produced, looked up, or changed under such an environment.

In this fourteenth specific embodiment, the system has the functional configuration as shown in FIG. 126, which comprises: an input unit 1250 for entering the data; a computer ID setting unit 1251 for setting the computer ID; a retrieval target data memory unit 1252 for storing the retrieval target data; a retrieval target data output unit 1253 for outputting the retrieval target data; a data and computer ID memory unit 1254 for storing the data and the computer ID; an environmental information output unit 1255 for outputting the environmental information; a retrieval key input unit 1256 for entering the retrieval key; a retrieval unit 1257 for carrying out the retrieval by using the retrieval key entered from the retrieval key input unit 1256; and a communication unit 1258 for transmitting and receiving the data.

The data in the data and computer ID memory unit 1254 is given in a format shown in FIG. 126, while the data stored in the retrieval target data memory unit 1252 is given in a format shown in FIG. 127.

Figure 128:
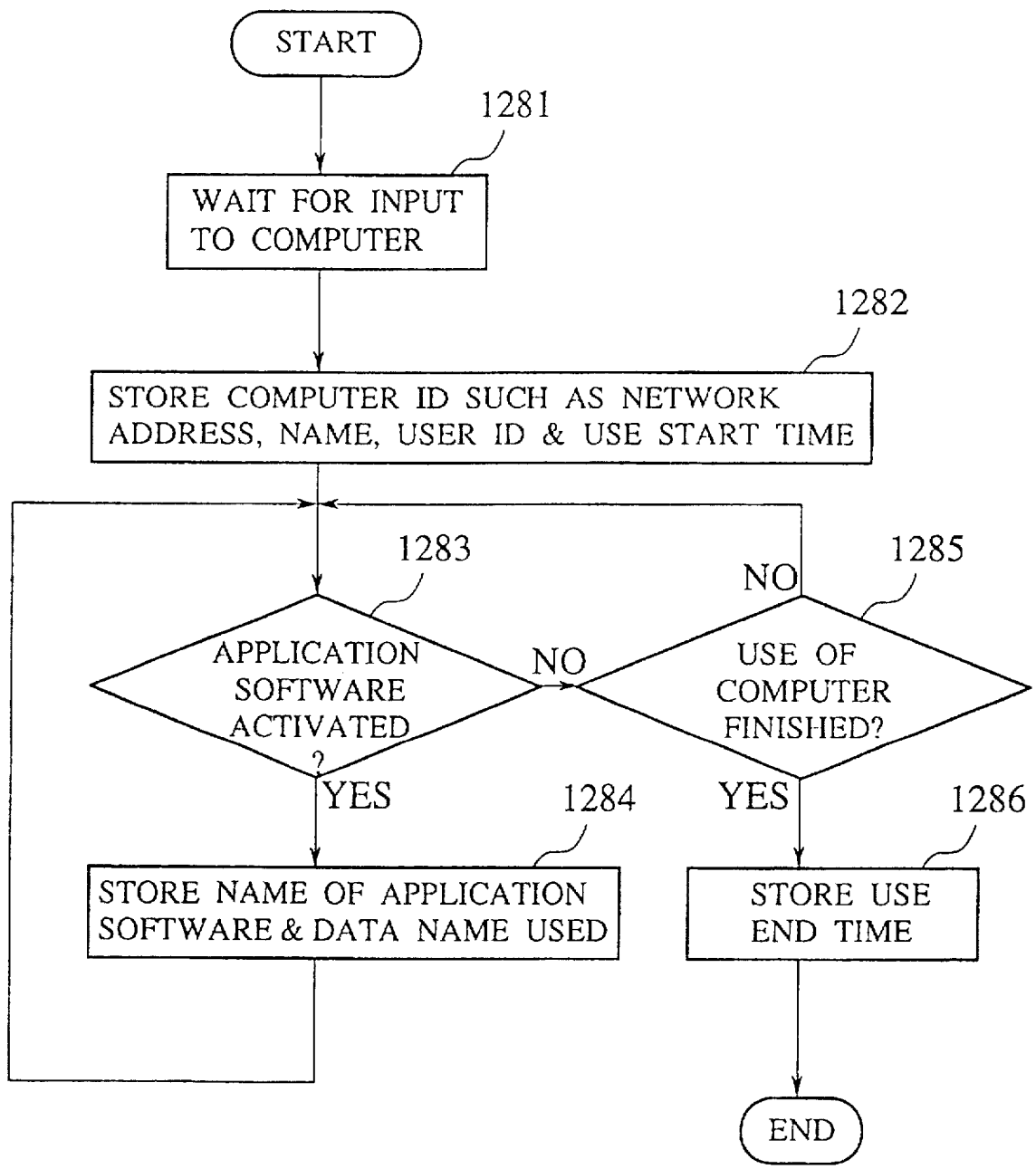

The computer ID setting unit 1251 operates to produce the data in the format shown in FIG. 126 according to the flow chart of FIG. 128 as follows. Namely, the input to the computer is waited (step 1281), and a computer ID such as the network address, a computer name, a user ID, and a use start time are stored into the data and computer ID memory unit 1254 (step 1282). Then, when an application software is activated (step 1283 yes), a name of the activated application software and a data name used in the activated application software are stored in the data and computer ID memory unit 1254 (step 1284), and the operation returns to the step 1283. Otherwise (step 1283 no), when the use of the computer is finished (step 1285 yes), a use end time is stored in the data and computer ID memory unit 1254 (step 1286).

Figure 129:
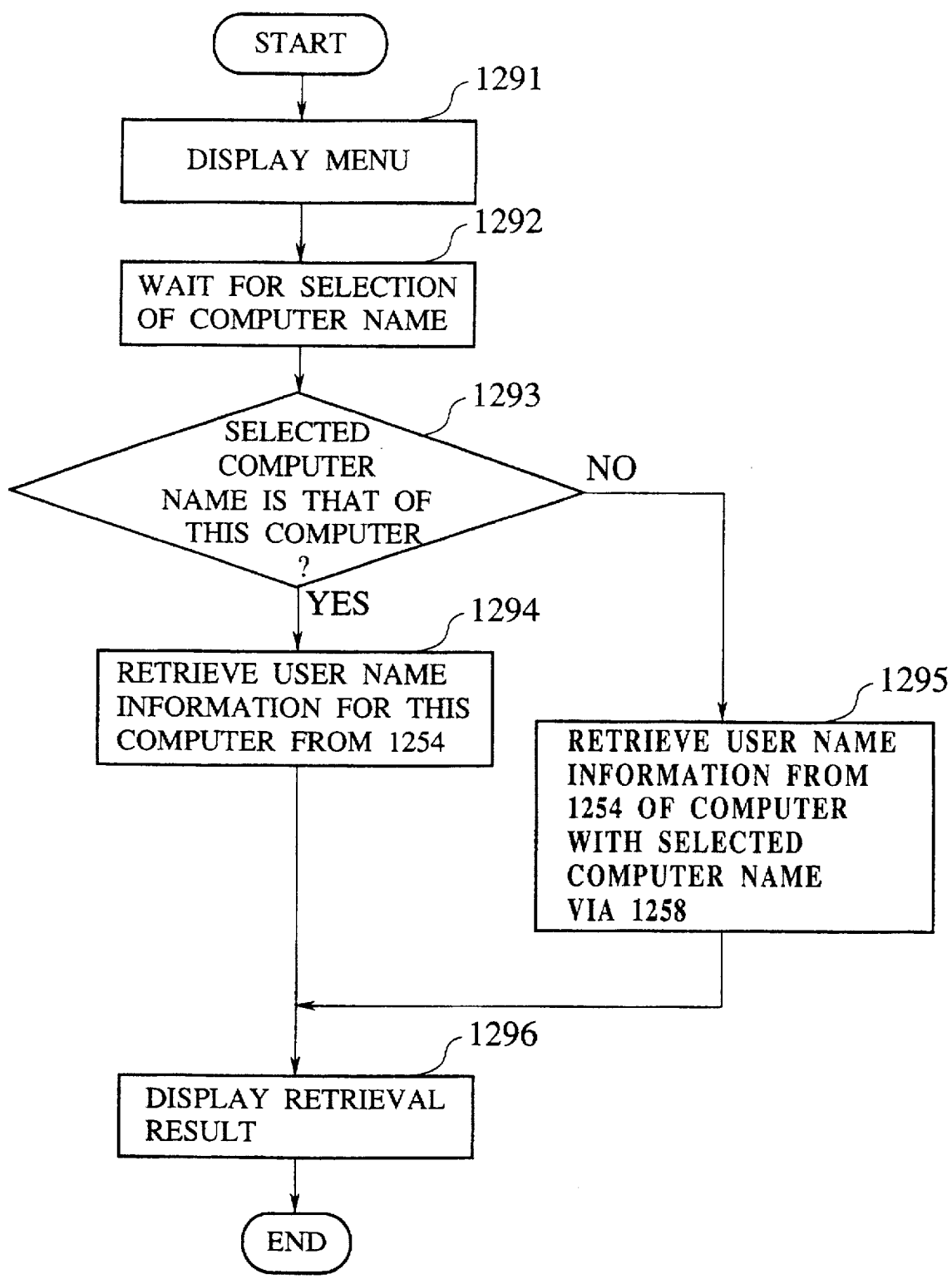

When the retrieval key provided on a window (not shown) of the retrieval key input unit 1256 is pressed by the user, the retrieval operation by the retrieval unit 1257 is carried out. Here, the retrieval unit 1257 operates according to the flow chart of FIG. 129 as follows. Namely, a menu as shown in FIG. 130 is displayed (step 1291) to urge the user to select the computer which had been used by the user, and a selection of an appropriate computer name from the menu by the user is awaited (step 1292). Then, when the computer name selected by the user is that of this computer (step 1293 yes), the pertinent user name information is retrieved from the data and computer ID memory unit 1254 of that computer (step 1294), and the retrieval result is displayed (step 1296) in a form shown in FIG. 131, which enlists the document names, the software/command used, and the date. On the other hand, when the computer name selected by the user is not that of this computer (step 1293 no), the pertinent user name information is retrieved from the data and computer ID memory unit 1254 of the computer having the selected computer name via the communication unit 1258 (step 1295), and the retrieval result is displayed (step 1296) in a form shown in FIG. 131.

This fourteenth specific embodiment can be further modified to store the number, name, or nickname uniquely assigned to the computer is stored along with an arrangement diagram of a room in which this computer is located, such that the desired data can be retrieved according to the arrangement at the location.

In this case, the functional configuration of the system is substantially as shown in FIG. 125 described above. Here, the correspondence table concerning the computers and their positions on the arrangement diagram is given in a data form shown in FIG. 132, which is prepared in advance and stored along with the data in the format shown in FIG. 126 in the data and computer ID memory unit 1254.

In this case, the retrieval unit 1257 operates according to the flow chart of FIG. 133 as follows. Namely, the location name stored in the data and computer ID memory unit 1254 is displayed (step 1331) in a form shown in FIG. 134 to urge the user to select the location name of a location at which the user has used the computer, and a selection of an appropriate location name by the user is awaited (step 1332). Then, when the selection of the location name is made by the user, the arrangement diagram for the selected location name is displayed (step 1333) in a form shown in FIG. 135 to urge the user to specify the position at which the user has used the computer, and a specifying of an appropriate position by the user is awaited (step 1334). Next, when the position is specified by the user, the computer ID or name of the computer located at the specified position is taken out from the data and computer ID memory unit 1254 according to the correspondence table of FIG. 132 (step 1335). Then, when the computer located at the position specified by the user is that of this computer (step 1336 yes), the pertinent user name information is retrieved from the data and computer ID memory unit 1254 of that computer (step 1337), and the retrieval result is displayed (step 1339) in a form shown in FIG. 131 described above. On the other hand, when the computer located at the position specified by the user is not that of this computer (step 1336 no), the pertinent user name information is retrieved from the data and computer ID memory unit 1254 of the computer located at the specified position via the communication unit 1258 (step 1338), and the retrieval result is displayed (step 1339) in a form shown in FIG. 131.

Here, instead of displaying all the location names at the step 1331, the retrieval of the computer ID in the data of FIG. 126 by using the user ID of the user can be carried out from the data and computer ID memory unit 1254 of all the computers, and only the zone names of the room at which the computers corresponding to the retrieved data are located can be displayed.

It is possible for the correspondence table of FIG. 132 to be produced automatically when the computer is connected to the network, by assigning the position indication such as "A1" to an outlet of the network to which the computer can be connected. In this case, even when the computer is moved, the correspondence table can be updated automatically.

Now, an example in which the environmental information output unit 1255 carries out the operation to determine the display range. Here, as an exemplary environmental analysis target data, a case of employing the temperature will be described. The temperature can be measured by the known manner such as that used in the existing digital thermometer. In this example, the retrieval target data are assumed to be the documents.

In this case, the environmental information is given in a format shown in FIG. 136, and the environmental information output unit 1255 operates according to the flow chart of FIG. 137 as follows. Namely, the minimum value M1 of the temperature and the maximum value M2 of the temperature are obtained (steps 1371, 1372), and a scroll bar ranging from the minimum value M1 to the maximum value M2 is displayed (step 1373) in a form shown in FIG. 138. Then, a pointing of a desired position on the displayed scroll bar by the user is awaited (step 1374), and when the pointing is made by the user, the document corresponding to the temperature for the pointed position is displayed (step 1375).

In a case of using the brightness as the environmental analysis target data, the display in a form of a scale of brightness as shown in FIG. 139A can be used, whereas in a case of using the sound as the environmental analysis target data and the sound level as the retrieval key, the display in a form of a scale of sound level as shown in FIG. 139B can be used. Also, in a case of using the sound as the environmental analysis target data and the sound type as the retrieval key, the display in a form of a list of sound types as shown in FIG. 140 can be used.

Now, the second general embodiment of the data retrieval system according to the present invention will be described in detail.

In this second general embodiment, the document image or the recognition processed document image is stored in correspondence with the information indicating the characteristic external, appearance of the document extracted from the input document image, such that the desired document image or the recognition processed document image can be retrieved and outputted by using the information indicating the characteristic external appearance of the document as the retrieval key.

This retrieval using the characteristic external appearance of the document as the retrieval key can be used in parallel to the usual retrieval using the document name or the keyword.

Here, the information indicating the characteristic external appearance of the document can be classified into the following three categories.

(1) Information indicating the characteristic of the medium on which the document image is fixed (such as the color of the paper, the quality of the paper, and the type of the paper, for example).

(2) Information indicating the characteristic of the material by which the document image is fixed on the medium (such as the type of the writing instruments, and presence/absence of stain, for example).

(3) Information indicating the characteristic of the document image expressed on the medium as the image itself (such as the size of margin, the type of characters, the mannerism of the copyist, the density of writing, and the layout, for example).

In this second general embodiment, the information indicating the characteristic external appearance of the document is extracted from the input document image and stored in correspondence to the document itself, so that the retrieval can be carried out in a very natural manner by using the characteristic external appearance which is most likely to remain in the human user's impression of the document as the retrieval key. Here, the information indicating the characteristic external appearance of the document can be extracted from the input document image automatically, so that no specialized sensor is required and no extra demand is made on the user.

More specifically, in this second general embodiment, the system has a schematic configuration as shown in FIG. 141. In this configuration, the papers of the document to be stored in a form of a file are entered as the image data from an image input unit 201 such as a scanner. A specific portion extraction unit 202 then extracts structural elements of the papers such as background portions, character portions, ruled line portions, photograph portions, illustration portions, graph portions, etc. from the input document image data.

On the other hand, a storing information generation unit 203 stores the image data as it is into a data storage unit 204 in a case of storing the input image data as it is in a file, or stores the image data in the data storage unit 204 after converting it into a data format suitable for the storing in a case of applying some processing on the input image data. Here, it is also possible to apply the document structure analysis or the character recognition processing to the input image data before storing into the data storage unit 204. In the following, such data stored in the data storage unit 204 will be referred as stored data.

A specific portion feature recognition unit 205 recognizes the features of each structural element extracted by the specific portion extraction unit 202, such as its form, position, size, shape, color, type, etc. In the following, these features will be referred collectively as the attribute information of the structural elements. This feature recognition can be carried out in parallel to the specific portion extraction operation by the specific portion extraction unit 202 with respect to the entire input image.

An auxiliary information extraction unit 206 determines the auxiliary information such as a type of paper, a quality of paper, a presence of stain, a color of paper, a type of writing instrument, a rate of filling by writing, a type of document, etc.

Then, the structural elements obtained by the specific portion extraction unit 202 and the attribute information obtained by the specific portion feature recognition unit 205 are attached to the stored data along with the other supplementary information, and all of these are stored together as a file in the data storage unit 204. Alternatively, the auxiliary information obtained by the auxiliary information extraction unit 206 and the attribute information obtained by the specific portion feature recognition unit 205 are attached to the stored data along with the other supplementary information, and all of these are stored together as a file in the data storage unit 204. Here, the information concerning the structural elements and the auxiliary information which are attached to the stored data form the information indicating the characteristic external appearance of the document.

At a time of the file retrieval, the operator enters the information indicating the characteristic external appearance of the document as the retrieval data through a retrieval data input unit 207. Then, a retrieval unit 208 carries out the retrieval of the desired file from the data storage unit 204 by matching the retrieval data with the information concerning the structural elements and the auxiliary information attached to the stored data, and an output unit 209 outputs the retrieval result obtained by the retrieval unit 208.

Here, in a case of applying the recognition processing to the image data at the storing information generation unit 203, as a preliminary processing for improving the recognition precision, the noise removal and the stain removal can be carried out, but the noise and stain to be removed in this preliminary processing are identical to those to be recognized by the specific portion feature recognition unit 205, so that they can be shared by the preliminary processing and the specific portion feature recognition processing.

Also, the input image can be given in terms of any of color data, gray (multi-valued) data, and binary data. In any case, the information concerning the structural elements which is suitable for the data type is used, and the suitable features are recognized and stored.

Now, the further details of the specific portion extraction unit 202, the specific portion feature recognition unit 205, and the auxiliary information extraction unit 206 will be described.

First, in a case of extracting the background portions, the specific portion extraction unit, the specific portion feature recognition unit 205, and the auxiliary information extraction unit 206 have detailed configurations as shown in FIG. 142, where it is assumed that the input image data are given in terms of the color data.

In this case, the color separation unit 211 carries out the color separation with respect to the input image data, and each color image separated from the input image data is stored in color image buffers 212. Here, the images in selected colors alone may be stored in the color image buffer 212. The separation of color is achieved by using three fundamental colors RGB or three color elements of value (luminosity), hue, and saturation, and it is preferable to separate the input image data into representative colors (such as red, blue, yellow, green, purple, orange, indigo, white, and black, as well as light blue, pink, yellow green that might be used as the color of the papers) at a step of storing into the color image buffer 212. This color separation is carried out in principle by analyzing the color components contains in each dot of the image data, determining one of the representative colors to which the color of that dot belongs, and storing the information of that dot into the color image buffer corresponding to the determined representative color.

Next, among the separated colors, the most dominant color is determined as the background color. Namely, a number of dots (total area) stored in each color image buffer 212 is calculated by the respective total area calculation unit 213, and the color occupying the maximum total area is determined as the background color by the background color determination unit 214. Then, the background portion extraction unit 215 identifies the background portion in the input image by distinguishing it from the other portions according to the determined background color, and extracts the information of the background portion from the color image buffer 212 for the determined background color according to the information contained in the color image buffer 212 for the determined background color.

Here, in order to realize the extraction of the background portion at higher precision, the identification of the structural elements of the other types (such as the extraction of the character portion described below) obtained from the input image data can be carried out either in advance or simultaneously, and the portion with the maximum total area in the portion other than those identified as the structural elements of the other types can be extracted as the background portion.

Also, instead of determining the background color according to the total area, each color portion of the input image data can be encoded into the run representation such that the background color can be determined from the length of the runs for each color portion or their distribution. It is also possible to obtain connected regions for each color such that the background portion can be identified according to the size of the connected regions, the average value of the areas of the connected regions, or their distribution.

The background color so determined is the information indicating the color of paper used for the document, and this information is stored into the data storage unit 204 along with the stored data of that document, through a paper color extraction unit 221 in the auxiliary information extraction unit 206. Also, according to the size of the extracted background portion, the information indicating the size of margin of the document can be extracted and handled similarly.

Also, for the extracted background portion, a noise detection unit 217 counts a number of small points in the other colors contained in the background portion, and calculates the density of such small points in the other colors per unit are, such that the noise level within the background color can be obtained. This is the information indicating the quality of paper used for the document, and this information is stored into the data storage unit 204 along with the stored data of that document, through a paper quality extraction unit 219 in the auxiliary information extraction unit 206. Here, the paper quality can be stored as a numerical value of the noise, but it is also possible to store it by converting it into information such as "ordinary paper", "recycled paper", "straw paper", etc. by comparing it with the prescribed threshold. The definition of the paper quality can be determined comprehensively from the paper color, concentration, and noise amount. It is also possible to provide a mechanism for detecting the paper thickness on the scanner, and the information of the paper thickness so obtained can also be handled similarly.

In addition, the background may be formed from a plurality of colors. Here, in a case the white background portion covering the entire region and the background portion in the other color which is smaller, the white background portion can be extracted by the stain portion extraction unit 216 as the other structural element called stain portion. Also, instead of using the white color, it is also possible to determine the portion whose shape (contour) is not very linear as the stain portion. When such a stain portion exists, the information indicating presence/absence of the stain is stored into the data storage unit 204 along with the stored data of that document, through a stain information extraction unit 220 in the auxiliary information extraction unit 206. At this point, it is also possible to detect the size (total area) and the position (of a central point or a representative point) of the stain portion by a size and position detection unit 218 and they can be stored as a part of the stain information along with the color of the stain portion. These stain and paper quality can be extracted eve when the input image is the gray image.

Next, in a case of extracting the character portions, the specific portion extraction unit 202, the specific portion feature recognition unit 205, and the auxiliary information extraction unit 206 have detailed configurations as shown in FIG. 143, where the input image data can be any of the color data, gray data, or binary data.

First, a connected region extraction unit 231 extracts the existing connected regions formed by collections of more or less black picture elements from the input image data entered from the image input unit 201 and stored in an image buffer 234. Here, usually, one character constitutes one connected region. Then, for the connected regions, or the entangling connected regions, or regions obtained by merging the connected regions existing in a vicinity, an analysis unit 232 judges whether or not they are arranged linearly, whether or not their sizes are uniform, whether or not they are arranged at nearly constant pitch, or whether or not the reasonable confidence level has been obtained as a result of the character recognition with respect to them. Then, a character portion extraction unit 233 determines whether or not to judge the extracted connected regions as the character portion.

Here, the features of the extracted character portion are distinguished as follows. First, in a case of the color image, a character color detection unit 235 determines the color of the character portion. In a case a plurality of character portions in different colors are present on a single document, the color of each character portion is detected. The detected information indicating the color of the characters is stored in the data storage unit 204 along with the stored data of the document. In a case of having a plurality of colors, the information indicating the correspondences between the positions and the colors of the character portions is stored.

Also, the writing type which provides one feature of the character portion includes types such as handwriting, printing, stamp, dot printing, font, etc. These types are distinguished according to the size and color of the character, a manner of arrangement of the character string, and the shape of frame enclosing the character string, etc., and the resulting information is stored in the data storage unit 204. For example, the feature which is likely to remain in the human user's memory is whether it was written in handwriting or in printing mostly. A writing type judgement unit 237 distinguishes whether it was handwriting or printing by using at least on of a handwriting dictionary 240 and a printing dictionary 241. For instance, when the character recognition is carried out by using the printing dictionary 241, if the document is mostly written in handwriting, there are many characters for which only low confidence level can be obtained, whereas if the document is mostly written in printing, the almost reasonable confidence level can be obtained, so that when a total of the confidence levels for all the characters is higher than a prescribed threshold, it is judged as printing, whereas otherwise it is judged as handwriting. This information indicating whether it is handwriting or printing is stored in the data storage unit 204 as the writing type information along with the stored data of the document. Here, it is also possible to judge whether it is handwriting or printing without using the dictionaries, by looking at the alignment of the connected regions in longitudinal and transverse directions, where it is judged as printing when the deviation from the longitudinal and transverse alignment is very small, and it is judged as handwriting when the deviation is large.

In a case it is judged as handwriting, the following processing is further required. Namely, when this system is used for the personal use, it is important to ascertain whether it is written by the user himself or it is written by someone else. To this end, a copyist recognition unit 244 judges whether the copyist is the owner or not according to the confidence levels obtained by using a owner's handwriting dictionary 245 having the feature patterns for the handwriting of the owner of the system. When the owner's handwriting dictionary 245 is provided for a plurality of persons, it is also possible to estimate the name of the copyist of the document. This copyist information is stored in the data storage unit 204 along with the stored data of the document.

In a case of handwriting, it is also possible to identify the type of the writing instrument. Namely, a writing instrument recognition unit 46 judges whether it is written by a pencil, a ball point pen, a fountain pen, etc. according to a manner of blurring and concentration (provided that the image data is the gray image) of character lines, and a line thickness of the characters detected by a character line thickness detection unit 236. This writing instrument information is stored in the data storage unit 204 along with the stored data of the document. It is also possible to store the character line thickness itself as the writing instrument information. Here, it is also possible to identify the type of writing instrument or a distinction between a copy and an original by distinguishing whether the material fixed on the paper is a lead of the pencil, or an ink of the ball point pen, or an ink of the fountain pen, or a toner of a copy, or a ribbon ink of a printer, etc. by providing a reflected light detector and means for analyzing the spectroscopic characteristic or the reflectivity on the image input unit 201.

In a case it is judged as printing, it is also possible to further judge its font at a font recognition unit 247 as Ming type, courier type, Gothic type, italic type, etc., and stores this information in the data storage unit 204.

It suffices for these informations concerning the characters to reflect the majority of the characters in the document alone.

In a case the handwriting characters and the printing characters are mixedly present, a mixed rate detection unit 248 calculates an estimated handwritten character number or a ratio of the estimated handwritten character number with respect to an estimated total character number, and it is useful to store it in the data storage unit 204 as an information indicating an amount of characters handwritten into the document. It is also possible to obtain this information by calculating a ratio of an area occupied by a region containing the handwritten characters with respect to a total area and an area occupied by a region containing the printing characters with respect to a total area.

The character type which provides another feature of the character portion includes numerals, English alphabets, Japanese kanas, Japanese kanjis, etc. Here, the feature which is likely to remain in the human user's memory is whether it was written in English or Japanese, so that a character type judgement unit 238 distinguishes whether it is written in English or Japanese by using at least one of an English alphabet dictionary 242 and a Japanese kana/kanji dictionary 243. For example, when the character recognition using the English alphabet dictionary 242 is carried out, if the document is mostly written in Japanese, there are many characters for which only low confidence level can be obtained, whereas if the document is mostly written in English, the almost reasonable confidence level can be obtained, so that when a total of the confidence levels for all the characters is higher than a prescribed threshold, it is judged as English, whereas otherwise it is judged as Japanese. This information indicating the type of the language is stored in the data storage unit 204 along with the stored data of the document. Here, it is also possible to carry out the similar processing for the numerals such that the information indicating that it is a document with an array of numbers such as a slip can be added to the information indicating the type of the language.

In addition, a pitch detection unit 239 detects a character pitch and a line pitch for the extracted character portion, and a writing direction recognition unit 249 judges whether the document is in a longitudinal writing or transverse writing according to the pitch information. Here, there are four cases including (1) a transverse writing in a length direction of the paper, (2) a longitudinal writing in a width direction of the paper, (3) a longitudinal writing in a length direction of the paper, and (4) a transverse writing in a width direction of the paper. When the pitch in the width direction is smaller than the pitch in the length direction, it is judged as either one of (1) or (2), and otherwise it is judged as either one of (3) or (4). Moreover, the distinction between (1) and (2) or (3) and (4) can be made by comparing the results of the character recognition under the assumption that the characters are in the readable orientation in an original orientation of the paper and the character recognition under the assumption that the characters are in the readable orientation in a 90° turned orientation of the paper. The information indicating such a writing direction state is stored in the data storage unit 204 along with the stored data of the document.

It is also possible to judge the size or the density of the characters at a character size/density detection unit 250. In this case, instead of storing the numerical values indicating the size and the density of the characters as they are in the data storage unit 204, they can be stored after being converted into the information such as "small characters, densely written", "large characters, coarsely written", etc.

Also, instead of extracting the paper quality or the stain portion from the background portion as described above, at a time of applying the character recognition to the character portion, the recognition processing for the data can be carried out without the preliminary processing such as the normalization which is usually employed in order to improve the recognition rate, and the portion at which the recognition rate is worse than the prescribed threshold collectively can be identified as the stain portion, or it can be judged as a poor quality paper when the recognition rate is poor for an entire paper.

Next, in a case of extracting the specific portions (structural elements), the specific portion extraction unit 202, the specific portion feature recognition unit 205, and the auxiliary information extraction unit 206 have detailed configurations as shown in FIG. 144.

The ruled line portion for tables can be extracted by detecting straight lines at a straight line/curved line detection unit 261, detecting right angle intersections of the detected straight lines at an intersection detection unit 262, and judging the ruled line portion at a ruled line extraction unit 264 as an area in which the positions and lengths of the straight lines are judged as aligned by a first analysis unit 263.

Then, in a case a paper type judgement unit 71 judges that the straight lines at constant pitch are present over the entire paper, it is determined that the type of paper is a report paper with ruled lines or a letter paper. In addition, according to the arrangement of the straight lines, it is also possible to determine whether it is a paper with longitudinal ruled lines or a paper with transverse ruled lines. It is also possible to register the arrangement of the ruled lines, the color, or the mark (company mark etc.) of frequently used paper in a paper type dictionary 272, makes a matching with the extracted straight lines, and identifies the paper as "own company's report paper", "form for submission to the A section", etc. This information indicating the type of paper and/or the information indicating the position and the size of the ruled line portion is stored in the data storage unit 204 along with the stored data of the document.

The drawing portion can be extracted by detecting straight lines and curved lines at the straight line/curved line detection unit 261, detecting their intersections at the intersection detection unit 262, and extracting the area which is not judged as the ruled line portion by a second analysis unit 265 as the drawing portion at a drawing extraction unit 266.

The photograph portion can be extracted at a photograph extraction unit 268 by using the image region separation technique known in the image processing art which is applied by a image region separation unit 267. Here, the photograph portion includes a photogravure portion in which the concentration level changes smoothly in the image, and a halftone photograph portion in which the black dots with varying sizes in accordance with the image portion. Also, by analyzing the color of the photograph portion, it is possible to judge whether it is a color photograph or a monochromatic photograph.

The graph portion can be extracted at a graph extraction unit 270 by using the technique such as the circle extraction, rectangle extraction, and line segment extraction which are usually used in the drawing recognition and which are applied by a circle/rectangle/line segment extraction unit 269. These extraction processings may be applied only to the extracted drawing portion, so as to judge whether the drawing is a graph or the other drawing. Here, the graph portion includes a bar graph, a circle graph, and a line graph.

The structural elements such as the background, character, drawing, photograph, graph, etc. so extracted are stored in the data storage unit 204 along with the stored data of the document, their positions and sizes, the attribute information such as their types, and the auxiliary information. Here, instead of storing the positions and sizes as they are, it is also useful to store them after converting them into the information of the position relation such as "having a photograph on upper right and a graph on lower left", or the information of the occupancy ratio such as "60% occupied by drawings" or "having drawings and characters at a ratio of 1:2", using a position relation/occupancy ratio detection unit 273.

As the other structural elements, the mark or color present at a prescribed position can be used. Namely, whether a specific mark or color is present at a prescribed position or not can be detected, and this information can be stored in the data storage unit 204 along with the stored data of the document. For example, when there is a rule that the document considered to be important by the user is to have a red mark on an upper right corner, it is effective to detect whether the red color is present on an upper right corner of the input image or not, and attach the information indicating whether it is an important document or not to the stored data of the document. Also, without specifying the position, the specific mark or color can be searched through the entire image.

The various informations explained above are stored in the data storage unit 204 in a format shown in FIG. 145. Namely, each structural element, auxiliary information, and their attribute information, numerical data or code corresponding to their names are allocated. For the structural element, as shown in a left half of FIG. 145, the attribute names and the attribute values are given as attribute sets associated with each structural element and stored in a table format. As for the auxiliary information, as shown in the right half of FIG. 145, a pair of the auxiliary information and its attribute value is stored. In order to obtain the effect of the present invention, it suffices to provide at least either one of the attribute sets and the auxiliary information and attribute value pairs. Also, this FIG. 145 only shows an exemplary case, and it is not absolutely necessary to store all of these informations.

The above described information for each structural element in the table format and information expressed as a pair of the auxiliary information and its attribute value may be stored separately from the stored data (document image or its recognition result), in a directory portion for instance, or stored by being attached to a header portion of the stored data. By separately storing them, the retrieval speed in a case of the retrieval using these informations can be made faster as it suffices to search through the directory portion alone and retrieve only those stored data for which these informations match.

Also, the types of the attribute names contained in each structural elements, the types of auxiliary information, and the types of the attribute values that can be defined in the auxiliary information are predetermined. Namely, for the drawing portion for instance, the attribute names are predetermined to include only three types of color, size, and position. Then, which attribute name for which structural element is to be allocated to which part (memory address) of the table is also determined in advance. Then, the attribute values obtained by the specific portion extraction unit 202 and the specific portion feature recognition unit 205 are written into the predetermined entries in the table for the corresponding attribute names. When the extraction or recognition fails, or when the scanner is not capable of handling colors so that the color information cannot be obtained, "NULL" is written into the entries in the table for the attribute names of the items not obtained.

Similarly, for the auxiliary information, which auxiliary information is to be allocated to which storing position in the memory is determined in advance. Then, the attribute values that can be defined in each auxiliary information are also predetermined. For example, the margin has three types of large, medium, and small, while the writing type has two types of handwriting and printing. It can be convenient at a time of the retrieval if these attribute values defined for each auxiliary information are stored in a form of a table. The attribute values obtained by the auxiliary information extraction unit 206 are those selected from the predetermined candidates, and the obtained attribute value is written into the entry of the corresponding auxiliary information, whereas "NULL" is written into the entry of the auxiliary information which could not have been obtained.

Next, the retrieval unit 208 has a detailed configuration as shown in FIG. 146A.

In this case, the user enters the retrieval data given in the natural language such as "document on a pink paper written by myself, which has a stain of coffee" through the retrieval data input unit 207. Then, the retrieval information extraction unit 281 extracts the words for forming the retrieval information such as "pink", "myself", and "stain" from the entered retrieval data according to the information stored in the auxiliary information-attribute value correspondence table memory unit 282 which stores the correspondence table between the auxiliary information and the attribute value defined for it in advance, so as to obtain three retrieval information items "paper color:pink", "copyist:myself", and "stain:present". Then, the retrieval information matching unit 283 searches the attribute set (a pair of auxiliary information and its attribute value as given in right half of FIG. 145) containing each item (such as "paper color") of the obtained retrieval information in those stored in conjunction with the stored data (documents) in the data storage unit 204, matches the searched out attribute values with that of the retrieval information (such as "pink"), and outputs those documents with the matching attribute value to the document presentation unit 285.

In the judgement of the matching, it is not necessary to have the complete matching of all the retrieval information items obtained by the retrieval information extraction unit 281. For example, it is possible to define the similarity between the attribute values for indicating the level of the matching in such a manner that the complete matching is the similarity 100%, a case of pink and red is the similarity 80%, a case of black and white is the similarity 0%, a case of having "NULL" for the stored attribute value is the similarity 50% (indicating the impossibility to judge), etc. in the similarity/weight memory unit 284, and the document can be retrieved when the total value of the similarities for all the retrieval information items of that document is greater than the prescribed threshold.

Also, the auxiliary information includes the item such as "paper color" for which the attribute value can be extracted with a certain level of confidence, as well as the item such as "copyist" which has the ambiguity as to whether it is referring to the user himself or someone else. For this reason, the weight can be assigned to each auxiliary information in advance and stored in the similarity/weight memory unit 284, and at a time of calculating the total similarity, the similarity of the more likely auxiliary information can be given the higher importance while the similarity of the ambiguous auxiliary information is considered basically for reference purpose only, and the weighted sum is used instead of the straightforward total similarity. These weights may not be determined in advance, and can be determined by obtaining the confidence level at a time of the extraction at the auxiliary information extraction unit 206.

It is also effective to use the keyword retrieval in the usual filing system in parallel. Namely, the keywords indicating the content of the document can be attached either automatically or manually to the document data at a time of filing, such that if these keywords can be remembered at a time of the retrieval, the number of retrieved documents can be reduced, and the retrieval using the auxiliary information can be carried out only to the reduced number of retrieved documents. In this case, at a time of attaching the keywords, it is not necessary to pay attention to whether the keyword is unique or not, so that the burden on the user can be reduced. In addition, the retrieval precision can be improved by obtaining the information "filed about . . . (month)" by using the timer function and attaching it to the document data, and using this information concerning time in combination with the auxiliary information for the retrieval.

On the other hand, the retrieval using the structural element and its attribute information can be carried out as follows. Namely, in this case, the stored attribute value is closer to the raw data compared with a case of the auxiliary information, so that the auxiliary information-attribute value correspondence table memory unit 282 stores each structural element, the attribute name given for it, and the information name for the set of the structural element and the attribute name. Then, when the retrieval data "document for which the paper color is pink, there is a stain, the size of the stain is large, and the position of the stain is near the upper right" is entered, the retrieval information items "paper color" "stain size", and "stain position" are extracted by the matching with the information names in the auxiliary information-attribute value correspondence table memory unit 282, and the retrieval data "pink", "large", and "upper right" written immediately after these items are extracted, so as to obtain three sets of retrieval information from them.

In addition, using the information in the auxiliary information-attribute value correspondence table memory unit 282, the information name "paper color" is converted into the structural element and the attribute name "color of background portion", and then a set of the structural element and the attribute information as given in the left half of FIG. 145 in the data storage unit 204 stored in conjunction with the document is matched with the retrieval information. At this point, the attribute set containing the retrieval information item "color of background portion" is searched in the data storage unit 204 first, and its attribute value and that of the retrieval information (such as "pink") are matched, and this document is retrieved when these attribute values match. In the retrieval information, there is a rough expression such as "large", but for "size of the stain" for example, the correspondence between such a rough expression and the numerical value, such as the numerical value "1 to 10" is "small", the numerical value "11 to 20" is "medium", and the numerical value "21 to 30" is "large", is stored in advance, such that "large" can be converted into the corresponding numerical value "21 to 30" before the matching with the attribute value of the data storage unit 204. In this case, the matching is between the numerical values, so that the similarity calculation can be made easily.

It is also possible to carry out the retrieval using both of the auxiliary information and the attribute information of the structural elements. In particular, when the auxiliary information contains a rough information such as "stain:present", while the attribute information of the structural elements contains a detailed information such as the color and the size of the "stain", the auxiliary information attached to the document data is looked up first according to the retrieval data "with a stain" to select out the documents with "stain:present", and the attribute names "color" and "size" of the corresponding structural element "stain" are presented, such that the user can enter the subsequent retrieval data such as "brown" for "color" and "large" for "size" so as to achieve the narrowing by the attribute information of the structural elements. Also, the auxiliary information itself contains the hierarchically structured items such as "font" or "copyist" with respect to the superior "writing type", where "font" is relevant only when "writing type" is "printing" while "copyist" is relevant only when "writing type" is "handwriting", and the interactive narrowing similar to that described above can also be achieved by using these hierarchically structured items in the auxiliary information.

FIG. 146B shows the alternative detailed configuration of the retrieval unit 208.

In this case, the auxiliary information item display unit 286 displays the auxiliary information that can be extracted from the auxiliary information extraction unit 206 along with the attribute values defined in advance for it, in a form of the display 200. Then, the user who is watching this display 200 enters the retrieval data for each auxiliary information from the retrieval data input unit 207 while recalling the desired document in such a manner as "paper color" was "pink", "margin" was "medium", etc. In a case the user cannot recall certain item, the matching is going to be made by omitting that item, so that there is no need to enter anything for that item. With respect to the retrieval data so entered, the retrieval information matching unit 283 selects out the matching documents and presents them at the document presentation unit 285 similarly as in the case of FIG. 146A described above.

In addition to the retrieval using the auxiliary information or the attribute information of the structural elements extracted from the input document image to be filed as described above, it is also useful to utilize them for the browsing purpose. Namely, in a case of allowing the user to select the desired document while presenting the stored data (documents) sequentially in a manner of browsing, the auxiliary information or the attribute information of the structural elements which are stored in conjunction with the presented document can be developed into an image. For example, in accordance to the stored information on the color and the size of the "stain", the image information of the "stain" can be superimposed over the image of the document. In this manner, especially in a case the stored data is obtained by removing noise from the input document image, it is possible to prevent such an inconveniency that the user cannot judge whether it is the desired document or not at a glance while the document is presented in a manner of browsing because of the absence of the remembered noise, so that the convenience in use of the system can be improved.

Also, in addition to the original document image or the stored data, the extracted auxiliary information or attribute information can also be displayed in such a manner as "paper color:pink" for example, and the user can be allowed to correct, change, or add the auxiliary information or attribute information. In this case, when the user made the correction "paper color:white", and the addition "amount of handwriting:many", while deleting "stain:present", these changed auxiliary information and attribute information are stored in the data storage unit 204 in correspondence to the target document.

As described, according to this second general embodiment, the retrieval of the desired document can be achieved by using the information indicating the characteristic external appearance of the document (such as paper color, paper quality, stain, character color, writing type, character type, copyist, writing instrument, font, amount of handwriting, writing direction, character size and density, paper type, position relation of drawings and photographs, etc.) which is automatically extracted from the input document image, so that even when the user cannot clearly remember the content or the keywords of the desired document, it is still possible to realize the retrieval by recalling the peripheral information concerning the desired document.

Now, the third general embodiment of the data retrieval system according to the present invention will be described in detail.

First, a case of forming a time series data recognition and understanding system in which the time series data such as speeches and dynamic images are recognized and processed. Here, the system can also be put in a form of a response system or a dialogue system which receives the result of the recognition or understanding and makes some response or output.

For example, the key data which represents the meaningful portion or the meaning itself of the multi-media data is provided by the result of the processing such as the recognition and the understanding. The link information indicates the correspondence between the key data and the time series data from which the processing result was obtained. Namely, the link information indicates which part of the time series data did the obtained key data originate from.

In general, the processing such as the recognition and the understanding is carried out in a plurality of processing steps. For example, the speech recognition and understanding requires a plurality of processes such as the detection of the speech sections, the speech analysis, the pattern recognition, the language processing, etc.

In a case of the speech recognition based on the word spotting, the processes such as the word detection, the syntactic analysis, the semantic analysis, etc. are required. (See Takebayashi et al.: "A Robust Speech Recognition System using Word-Spotting with Noise Immunity Learning", Proceedings of the ICASSP (International Conference on Acoustics, Speech, and Signal Processing) 91, Toronto, Canada, May 1991, pp. 905–908, for details.)

In such a case in which a plurality of process results are required, the key data is not just the final processing result, and the intermediate processing result obtained at each of the intermediate steps can also be used as the key data.

In this case, the link information can indicate the correspondence with the original input time series data, or the correspondence with the processing result at the immediately preceding step.

For example, in the speech recognition based on the word spotting, the key data can include the detected words,, the syntactic trees formed from the word series, and the meanings obtained as the analysis result, while the link information can indicate the correspondence with the original speech data (such as the time, sampling point, or data address), or else the correspondence with the input speech data can be provided indirectly by using the link information indicating the word series or the syntactic trees as the intermediate results.

In a case of dealing with a plurality of types of data such as the multi-media data as the time series data to be entered, the correspondence between the key data and the time series data can be clarified by including the data identifier indicating which time series data does each key data corresponds to in the link information.

The retrieval is realized such that, when the key data that can be outputted from the recognition and understanding system is specified, the structural information having the coinciding key data is retrieved, and the access to the original time series data is made from the link information registered in the structural information.

More specifically, in this third general embodiment, the system has a configuration as shown in FIG. 147, which operates according to the flow charts of FIG. 148 as follows.

Here, the time series data is entered from the time series data input unit 301 such as a microphone and a camera, at the step 1480. The time series input unit 301 then transmits the entered time series data to the time series data storage unit 302 at the step 1481. The time series data storage unit 302 stores the transmitted time series data at the step 1483.

Similarly, the time series data input unit 301 transmits the entered time series data to the structural analysis unit 303 at the step 1483. Then, the structural analysis unit 303 carried out the recognition processing of the transmitted time series data to detect the key data, and generates the structural information formed at least from the detected key data, the time information for the key data, and the link information for linking the time series data with the key data at the step 1484. The structural information generated by the structural analysis unit 303 is then stored in the structural information storage unit 304 at the step 1485.

Here, the key data is the data useful for the user, which can provide the meaning for a part of the time series data such as the pattern recognition processing result obtained from the input time series data, such as the speech recognition processing result.

The time series data stored in the time series data storage unit 302 and the useful information in the time series data stored in the structural information storage unit 304 can be outputted in accordance with the request from the user, according to the flow chart of FIG. 149 as follows.

The user enters the key data to be entered as the retrieval key to the retrieval command input unit 305 at the step 1490. Then, the retrieval command input unit 305 transmits the entered retrieval command to the retrieval unit 306 at the step 1491.

The retrieval unit 306 retrieves all the structural informations corresponding to the key data in the structural information storage unit 304 according to the retrieval command entered from the retrieval command input unit 305, and retrieves the time series data in the time series data storage unit 302 according to the link information in the retrieved structural informations, at the step 1492.

The retrieval unit 306 also retrieves the meaningful information such as the combination of the keywords according to the retrieved structural information. Then, the retrieval unit 306 transmits the retrieved time series data and meaningful information to the information output unit 307 at the step 1493.

The information output unit 307 then presents the retrieved time series data and meaningful information to the user either visually or acoustically at the step 1494. In a case of presenting the time series data to the user, the time series data and the meaningful information are assumed to be capable of being outputted in distinction from the other portions.

The key data input unit 308 is input devices such as a keyboard or a pointing device such as a mouse, pen, touch panel, etc. This key data input unit 308 accepts the correction and addition of the key data from the user. In a case of using these input devices, the key data and the structural information are displayed on a display screen by the information output unit 307, and the structural information corresponding to the key data are changed whenever there is an input from the user.

In this manner, in addition to the correction of the key data detected by the structural analysis unit 303, it is also possible for the user to make the change and the addition to the structural information. Such an input of the key data by the user can be carried out which confirming the content recorded in the structural information storage unit 304 and the time series data storage unit 302 from the information output unit 307, such that the modification into the structural information suiting the user's request can be made and the quality of the structural information can be improved.

In the following, a case of inputting and outputting the speech data as the time series data will be described in detail.

The speech data is entered by the time series data input unit 301 having input devices such as a microphone.

As shown in FIG. 150A, the time series data input unit 301 attaches the identification data such as the data type and the time information to the entered speech data to form the supplemented time series data. Here, the data type indicates information required for reproducing the input data such as the input device, channel number, media type, and data discretization data such as sampling frequency.

A plurality of the input devices can be used simultaneously, and a multi-channel input utilizing a plurality of microphones is also possible for example. In this case, the channel number indicating the channel from which each data has been entered is also included as one of the data type.

Also, the input start time indicates the time at which the speech data is entered into the system, but in a case the multi-media data originally entered contains the time information, it is also possible to use this time information directly.

FIG. 150B shows the supplemented time series data in a table format for an exemplary case of the time series data with the time series data ID of "SP-129" in which the data whose media is the speech data was entered into the time series data input unit 301 through the microphone with the channel number 2, using the sampling frequency of 12 KHz and the quantization level of 16 bit, where the speech start time was "ts" and the speech end time was "te".

The time series data input unit 301 transmits the supplemented time series data in a form of FIGS. 150A and 150B to the time series data storage unit 302 and the structural analysis unit 303.

The time series data storage unit 302 stores the transmitted supplemented time series data and the information indicating the storing position of the supplemented time series data in which the correspondence between the time series data ID and the address in the time series data storage unit 302 is set. FIG. 151A shows an example of this information in the time series data storage unit 302 which indicates that the time series data with the time series data ID of "SP-129" is stored at the memory region at an address "xxxx" in the time series data storage unit 302. FIG. 151B shows this same information in a table format which similarly indicates that the time series data with the time series data ID of "SP-129" is stored at the memory region at an address "xxxx" in the time series data storage unit 302.

The structural analysis unit 303 detects the key data by carrying out the recognition processing of the supplemented time series data, and generates the structural information formed at least from the detected key data, the time information for the key data, and the link information for linking the time series data with the key data. The structural information is constructed to always include the time information indicating which part of the speech data had each data been obtained, in addition to the structural information name or the structural information ID indicating the type of the structural information. This time information can also be obtained from the start time and the data discretization information such as the sampling frequency in the supplemented time series data. This structural information is displayed in a format shown in FIG. 152.

The structural information of FIG. 152 shows an exemplary case in which the structural information ID "WD-5" has the originating time series data ID "SP-129", the structural information name "word detection result", the start time "t1" and the end time "t2" as the time information, and the keyword "****" which is the detected key data. The detection of the keyword by the recognition processing will be described in detail below.

The structural analysis unit 303 transmits the generated structural information to the structural information storage unit 304, and the structural information storage unit 304 stores the transmitted structural information and the information indicating the storing position of the structural information in which the correspondence between the structural information ID and the address in the structural information storage unit 304 is set. FIG. 153A shows an example of this information in the structural information storage unit 304 which indicates that the structural information with the structural information ID of "WD-5" is stored at the memory region at an address "oooo" in the structural information storage unit 304. FIG. 153B shows this same information in a table format which similarly indicates that the structural information with the structural information ID of "WD-5" is stored at the memory region at an address "oooo" in the structural information storage unit 304.

Now, the recognition processing of the speech data at the structural analysis unit 303 will be described more specifically. Here, as a concrete example of the structural information, the explanation will be given for a case of detecting the key data such as the speech sections, uttered words, the utterance semantic contents, and the utterance environmental information which are obtained by the speech analysis processing, the word detection processing, the syntactic and semantic analysis processing, and the dialogue structure analysis processing.

Here, the structural analysis unit 303 has a detailed configuration as shown in FIG. 154, which comprises a speech section detection unit 311, an acoustic analysis unit 312, a word detection unit 313, a syntactic and semantic analysis unit 314, and an environmental information extraction unit 315.

The speech section detection unit 311 detects the sections at which the speeches are present in the speech data as the key data. This can be realized by checking the speech signal power, and taking a starting point of an instance at which the power has exceeded the threshold over a certain period of time as a starting edge of the speech section while taking a starting point of an instance at which the power has not exceeded the threshold over a certain period of time as an ending edge of the speech section.

In FIG. 155 in which a relationship between the time change and the speech power is shown as a graph for the sake of better comprehension, the starting time "t1" (starting edge) and the ending time "t2" (ending edge) of the speech are going to be detected. Here, the speech section in FIG. 155 is obtained by taking a starting point of an instance at which the power has exceeded the threshold over a certain period of time "dt1" as a starting edge of the speech section while taking a starting point of an instance at which the power has not exceeded the threshold over a certain period of time "dt2" as an ending edge of the speech section. By setting the threshold power and the duration of the continuance period differently for the starting edge detection and the ending edge detection, the detection precision can be improved.

The structural information for the detection of this speech section is expressed as shown in FIG. 156, which contains the structural information ID "VP-013", the originating time series data ID "SP-129", the structural information name "speech section", the start time "t1" and the end time "t2" as the time information, and the speech section "t1 to t2" as the key data. Here, the key data is that which expresses the speech section in terms of times, so that the key data is similar to the time information, but the key data and the time information must be clearly distinguished in the structural information.

The acoustic analysis unit 312 carries out the acoustic analysis of the speech data. Here, the spectral analysis such as that using the FFT (Fast Fourier Transform), the smoothing in the frequency region, and the logarithmic conversion are carried out to obtain the acoustic analysis result, i.e., the frequency spectral pattern, at 8 ms interval from the 16-channel band-pass filter, for example.

By this acoustic analysis result (the frequency spectral pattern) is transmitted to the word detection unit 313 at which the word detection processing is carried out. Here, the word detection unit 313 carries out the word detection processing by using the known method. For example, the pattern of the frequency spectrum sequence for the input speech and the standard pattern of the frequency spectrum sequence of the word to be detected are matched, and the word with a high score can be selected as the word detection result information.

With the word detection result information obtained by the word detection unit 313, the word and the key data such as its starting edge, ending edge, and similarity with respect to the standard pattern can be treated together, such that the key data such as the time information, the word name, and the likelihood to be the registered word can be handled as the structural information in combination with the detected word. As shown in FIG. 157A, the structural information for the word detection contains the structural information ID "WD-7", the originating time series data ID "SP-129", the structural information name "word detection result", the start time "t1" and the end time "t2" as the time information, the word name (keyword) "yes", and the likelihood "0.82".

The words to be detected are determined by the user in advance, and can be changed by adding or deleting according to the need.

Instead of providing the standard pattern for the frequency spectral sequence of each detected word as in the processing described above, the standard pattern for the frequency spectral sequence can be provided in units of phonemes. Also, the matching in units of words and the matching in units of phonemes can be used in parallel.

Now, the word detection result information obtained by the word detection unit 313 is not necessarily the final result of the word recognition. Namely, in addition to the correct words to be detected which are contained in the utterance, there is a possibility for the keywords obtained as the word detection result information to contain the words which are not contained in the actual utterance but erroneously detected as the frequency spectral sequences were resembling.

For example, the word "hai" (meaning "yes" in Japanese) and the word "dai" (meaning "large" in Japanese) are resembling so that there is a possibility for one of these to be erroneously detected for another. Here, when the structural information is generated for the word "large" detected as the key data, as shown in FIG. 157B, the structural information contains the structural information ID "WD-8", the originating time series data ID "SP-129", the structural information name "word detection result", the start time "t1" and the end time "t2" as the time information, the word name (keyword) "large", and the likelihood "0.75".

The syntactic and semantic analysis unit 314 carries out the syntactic and semantic analysis for all the possible word sequences (combinations of the words without the timewise overlap) with respect to the words obtained as the word detection result by the word detection unit 313, and takes the semantic content of the utterance produced by the acceptable word sequence as the semantic representation candidate.

Also, the semantic representation candidate to be obtained here may not necessarily be narrowed to just one, and it is possible to have a plurality of candidates for the acceptable word sequences. By selecting the appropriate semantic representation among these plurality of candidates by considering the history of the semantic contents of the utterances up to then, the meaning of the utterance can be finally determined. Therefore, the final result of the word recognition is the word sequence constituting the semantic representation selected here.

This processing for determining the meaning of the utterances can be realized by the methods such as those disclosed in Tsuboi et al.: "A Real-Time Task-Oriented Speech Understanding System using Keyword-spotting", Proceedings of the ICASSP (International Conference on Acoustics, Speech, and Signal Processing) 92, pp. I-197 to I-200, 1992, and Takebayashi et al.: "A Real-Time Speech Dialogue System using Spontaneous Speech Understanding", Proceedings of the ICSLP (International Conference on Spoken Language Processing) 92, pp. 651–654, 1992.

These are the methods in which the semantic representations are obtained from the expected word arrangement, which can be determined in advance according to the possible word arrangement and its semantic representation. It is also possible for the user to change it by adding or deleting according to the need. The addition and deletion will be described in further detail below.

The semantic representation candidate and the word sequence constituting the semantic representation candidate described above can be handled as the key data concerning the candidate for the semantic content of the utterance. The structural information formed from this key data is shown in FIG. 12, where the structural information contains, the structural information ID "SR-5", the originating time series data ID "SP-129", the structural information name "utterance meaning", the start time "t1" and the end time "t2" as the time information, the meaning of utterance "affirmation", two constituent words "yes" and "that's right", and an indication as to whether it has been selected as the semantic representation or not, which is "selected".

Also, the information concerning the word sequence can be linked with the structural information concerning the word detection result by having a pointer for pointing the structural information obtained as the word detection result. Similarly, the finally selected semantic representation and the word sequence constituting it can also be handled as the structural information concerning the semantic content of the utterance.

The environmental information extraction unit 315 extracts the key data concerning the surrounding environment at a time the speech data was taken in, and produces the structural information. By the incorporation of this environmental information extraction unit 315, it becomes possible to obtain the further detailed structural information.

Figure 159A:
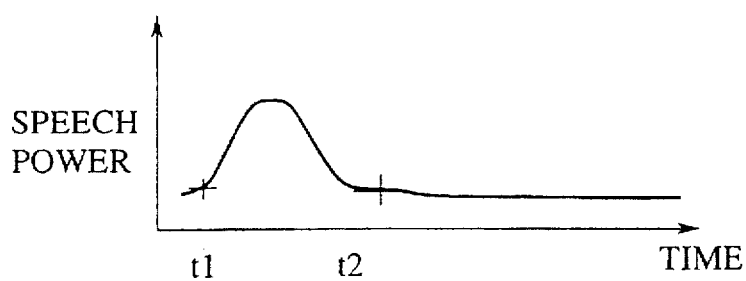
Figure 159B:
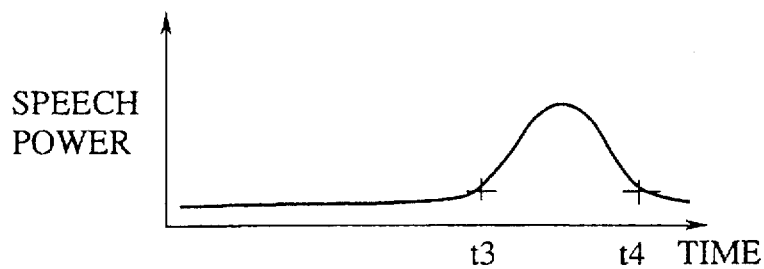

For example, for an exemplary case of dealing with the speeches uttered by a plurality of speakers as the input data, FIG. 159A shows a graph for the speech power of the speech entered from the microphone of the speaker A, and FIG. 159B shows a graph for the speech power of the speech entered from the microphone of the speaker B.

Even without providing the microphone for each participant, it is possible to obtain the gain in the particular direction to be large by constructing the microphone array (microphone with directionality), so that the speech from the direction in which the speaker is present can be taken out with emphasis, and it is also possible to identify the speaker. Therefore, by using these methods, the key data indicating which speaker's utterance it is, and this can be utilized for the structural information.

By comparing the speech sections of all speakers, it is possible to detect the period in which no speaker is uttering as a silent.

On the other hand, by using these methods, it is also possible to extract the components of the surrounding environmental sound other than the utterances of the speakers.

Figure 159C:
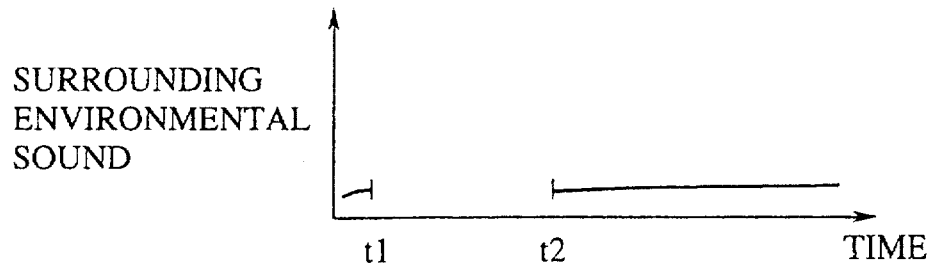
Figure 159D:
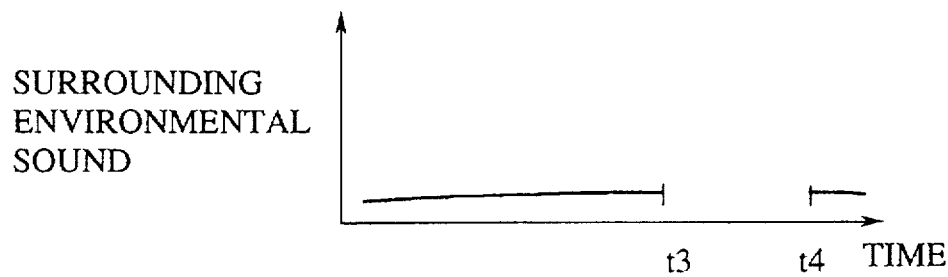

Namely, a portion other than the speech sections of the speech data detected by the speech section detection unit 311 can be handled as the surrounding environmental sound. FIG. 159C shows a graph of the surrounding environmental sound entered from the microphone of the speaker A, while FIG. 159D shows a graph of the surrounding environmental sound entered from the microphone of the speaker B. Here, in FIGS. 159C and 159D, portions which are not the speech sections are taken as the surrounding environmental sound.

In addition to the noise of the surrounding environment other than the speeches, this surrounding environmental sound includes the speeches which are not treated as the speech sections because of the low speech power or the short continuance duration. For this reason, by checking the size of the surrounding environmental sound power, the level of the quietness of the surrounding environment such as the noisiness can be utilized for the structural information. This information indicating the surrounding environment is different from the meaningful key data, so that it is separately defined here as the environmental information.

Figure 159E:
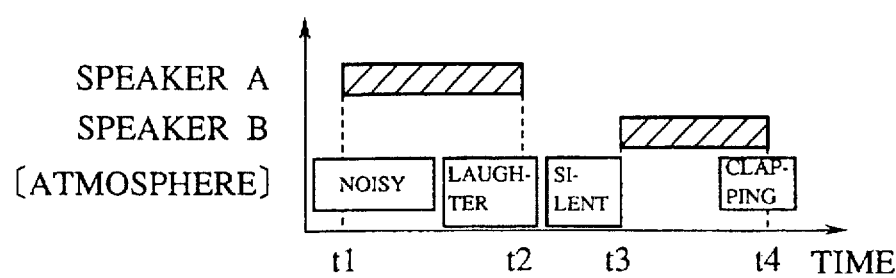

Also, as shown in FIG. 159E, by recognizing the characteristic sounds expressing the atmosphere of the location such as the laughter and hand clapping as the surrounding environmental sound, the atmosphere at a time of the system use can be utilized for the structural information as the environmental information.

By combining the key data of the starting edge and the ending edge of the speech section obtained by the speech section detection unit 311, it is possible to judge that the discussion is hotter when the time since one speaker finished his utterance until another speaker starts his utterance is shorter, and this can be utilized for the structural information as the environmental information. In FIGS. 159A and 159B described above, the discussion is going to be hotter when the time t2 at which the speaker A finished his utterance until the time t3 at which the speaker B started his utterance is shorter.

Also, by producing the dictionary to be the standard patterns for the reverberation characteristic, the location can be estimated from the surrounding environmental sound. In particular, in a case the location at which this system can be used is limited to some extent, it is possible to produce the dictionary to be the standard patterns for the reverberation characteristic by collecting the reverberation characteristic of each location such as the user's own room, the conference room, the corridor, the outdoor, etc.

In this case, as shown in FIG. 160, a test sound generation unit 320 generates the test signal such as the beep sound outputted by the system at a time of turning the power on, and this test signal is entered into the use location estimation unit 321 through a sound input device such as a microphone. The use location estimation unit 141 then matches it with the use location data stored in the reverberation characteristic dictionary 322.

By utilizing the use location estimated in this manner as the environmental information, the information indicating which location had each data been entered can be attached, and stored in the structural information storage unit 304 as the structural information.

In addition, by holding the semantic contents of the utterances exchanged during the dialogue as the dialogue history, it is possible to determine the current dialogue state from the semantic content of the newly entered utterance and the dialogue history. It is also possible to utilize this for the structural information as the key data.

In this third general embodiment, the time series data to be structurally analyzed are entered through the time series data input unit 301, but in addition to do this analysis on-line, as shown in FIG. 161, it is also possible to modify the configuration of FIG. 147 such that the time series data already stored in the time series data storage unit 302 can be transmitted to the structural analysis unit 303, and the new key data can be generated by analyzing the already stored time series data.

By generating the new key data, it is possible to reapply the recognition processing again for the already analyzed time series data. For example, by setting the words different from those recognized at a time of the data input for the recognition vocabulary, the structural analysis can be carried out again.

Also, not just for the word recognition but also for the semantic representation, when it is an outside of a range of the word arrangement or the semantic representation candidate at an expected scene, the word arrangement or the semantic representation can be set up correctly by the user and the structural analysis can be carried out again, so as to generate the appropriate structural information.

Next, some examples of the key data obtained by utilizing these key data will be illustrated. For the sake of simplicity, it is assumed that the speech data for each speaker has already been separated by the method in which a microphone is provided for each speaker.

This speech data for each speaker is analyzed, and the structural information is generated from the key data indicating the speech section and stored in the structural information storage unit 304. This key data indicates when each speaker had uttered, according to which it is possible to determine which speaker had uttered when, how long, and how frequently. Also, it is possible to determine how hot the discussion was according to how frequently the speakers are changed, how many speakers had uttered within a certain period of time, and how long it was since one speaker finished his utterance until another speaker started his utterance.

Similarly, the speech data is analyzed, and the structural information is generated from the key data indicating the recognition result of the word speech recognition and stored in the structural information storage unit 304. For example, in a case of entering the speech data of the conference participants, the word frequently appearing for each topic discussed at the conference can be set as the key data of the recognition target word, such that it becomes possible to determine the rough content of what topic was discussed from that word. Also, by setting the particular word uttered by some person as the key data of the recognition target word, it becomes possible to pick out the portion at which the important utterance was made.

As described above, it is also possible to analyze the speech data already recorded in the time series data storage unit 302, so that it is possible to newly set up the recognition target word after the speech data is entered, and the retrieval of the important utterance that was not expected in advance can also be carried out.

Moreover, the speech data is analyzed, and the structural information is generated from the key data indicating the semantic representation of the utterance and stored in the structural information storage unit 304. Then, it is possible to determine what topic was discussed when and what was the rough content of the discussion from the key data of the semantic representation. It is also possible to determine who had uttered what content, and who and who had uttered the similar content. Also, by showing how the topics had changed in a form of a diagram, the flow of the discussion can be put in order and illustrated.

In a case a plurality of time series data are stored, if there is a structural information which is common to both of these, it is possible to carry out the retrieval by linking them. For example, in a case there is a common speaker appearing in a plurality of speech data, the same speaker can be picked out.

In a case the speech data for a plurality of conferences are entered, according to the structural information indicating the speakers in these conferences, it becomes possible to retrieve the content of the utterance of the participant of one conference made in the other conference.

In a case there is a common word among a plurality of speech data, it is possible to carry out the retrieval to see how the word which was the main topic in one conference had been used in the previous conferences, according to the structural information indicating the word.

Here, an exemplary case of displaying who had uttered what, i.e., the change of the topics and the closeness of the utterance contents, on a display screen will be illustrated.

FIG. 162A shows a figure illustrating the situation at a time of voting in the conference participated by five participants A, B, C, D, and E. Here, as a result of analyzing the speech data at a time of voting, the utterance meaning indicating who had uttered what is also indicated on the display. Namely, FIG. 162A shows that A had uttered the opinion for agreement, B had uttered the opinion for disagreement, C had uttered the opinion for disagreement, D had uttered the opinion for conditional agreement, and E had uttered the opinion for agreement.

FIG. 16B shows a figure illustrating the elapse of time in the conference and the closeness of the utterance contents. Here, there were the proposal 1 of Mr. D and the proposal 2 of Mr. B at the beginning, whose utterance contents were widely distanced. Also, there was no utterance from the other speakers, so that the discussion was stagnant. Later on, since Mr. A had made the proposal 3, the discussion became active, and the opinions of Mr. D had approached to that of Mr. A.

The structural informations themselves are related with each other according to the structural information names, the structural information IDs, and the time informations, so as to generate the new structural information.

In the following, the retrieval, the output, and the input of the key data by the user will be briefly described.

As described above, the key data is utilized as the retrieval key in the retrieval operation. The user enters the key data into the retrieval command input unit 305. Here, the word "yes" is entered as the key data. The key data entered into the retrieval command input unit 305 is transmitted to the retrieval unit 306, which retrieves all the structural informations which have the key data of "yes" from the structural information storage unit 304. The retrieval unit 306 transmits the retrieved structural informations to the information output unit 307, which presents the retrieved structural informations to the user. The user looks up this, and enters the key data for the structural information to be retrieved further through the retrieval command input unit 305.

The retrieval command input unit 305 receives the input of the retrieval key formed by the key data, and transmits it to the retrieval unit 306. For example, in a case of reproducing the time series data at a time the utterance of affirmation was made between "t1" and "t2", the user enters the key data of the start time "t1", the end time "t2", and the utterance meaning "affirmation" into the retrieval command input unit 305.

The retrieval unit 306 then retrieves the structural informations which match with the key data entered by the user from the structural information storage unit 304. Here, the structural information "SR-5" shown in FIG. 158 is retrieved, and as the key data of "yes" is already entered there, the structural information "WD-7" having the key data of "yes" is retrieved from this structural information "SR-5" which also has the key data of "yes".

In a case the meaningful information alone is to be displayed, the retrieved structural informations are transmitted to the information output unit 307, which outputs the meaningful information which is a part of the transmitted structural informations.

In a case of outputting the speech data itself, the retrieval unit 306 makes an access to the speech data stored in the time series data storage unit 302 as well, according to the original speech data ID in the already retrieved structural information "WD-7".

The information output unit 307 comprises a loudspeaker and a display device such as a CRT, and reproduces the original speech data retrieved by the retrieval unit 306.

The output of the time series data corresponds to the reproduction of a part or a whole of the input data, while the output of the structural information is made by expressing the time series data in short time using the visual display, or acoustically by using the sound metaphor.

For example, as the display of the structural information obtained by the word recognition, the recognized word can be displayed by using the text or icon, while the display of the structural information obtained by the utterance understanding, the semantic content can be expressed by the text display of the keywords. In the display of the conference record, the icon display and the text display of the semantic content are made according to the seating order of the speakers, the utterance times, and the semantic contents of the utterances, and the record as to which speaker had uttered what semantic content, who had uttered what semantic content against whose utterance of what semantic content is displayed.

Also, as in FIG. 162B described above, the effective output can be provided by expressing the information such as "active" or "stagnant" visually by the color tone or concentration.

The key data input unit 308 comprises pointing devices such as mouse, pen, and touch panel, and input devices such as keyboard. The key data input unit 308 receives the correction, addition, etc. of the key data from the user through these input devices. In a case of utilizing these input devices, the key data or the structural informations are displayed on the display screen on the information output unit 307, and the key data to be a target of correction or addition by a cursor position, such that the corresponding structural information is changed whenever there is an input from the user into the key data input unit 308.

By allowing the user to enter the key data in this manner, it is possible for the user to make the correction of the structural information and the key data automatically generated by the structural analysis unit 303, as well as to add the key data or the structural information.

The input of the key data by the user is carried out while confirming the contents stored in the structural information storage unit 304 and the time series data storage unit 302 through the information output unit 307, so that the improvement in compliance with the user's request can be made in the structural information, and the quality of the structural information can be improved.

As one of the key data to be entered by the user, it is possible to include the user's evaluation of the speech data or the structural information. For example, when the utterance contents of each speaker can be ranked in ranks such as *, ○, Δ, x, etc., and this is attached to the structural information as the key data. Thus, the extremely important utterance is marked *, the important content portion is marked ○, the utterance which is not important but related to the progress of the topics is marked "Δ", and the utterance not even related to the progress of the topics is marked "x". In a case of checking the portions which are going to be important, the * marked portion alone can be retrieved, while in a case of making an abstract, the portion marked by "○" is retrieved. In a case of following the flow of the topics while there is a free time, the portion marked "Δ" can be retrieved.

Next, a case of forming a time series data recognition and understanding evaluation system which evaluates the recognition and the understanding achieved by the above described recognition and understanding system.

In general, in order to improve the performance of the recognition and understanding system, it is necessary to collect many real data resulting from the actual use of the system, but this in turn requires a time and a labor for managing a huge amount of collected data. In this regard, in the system of this second general embodiment, all the recognition and understanding results are set to be the key data and the link information with respect to the time series data from which it has originated is maintained, so that it is possible to selectively output the time series data from which each recognition and understanding result had been obtained.

In this case, the input time series sequence is the input time series data of the recognition and understanding system as well as the recognition and understanding result data. As in the above described example, in a case a plurality of processing steps are required in the recognition and understanding system, it is also possible for the time series data to include the intermediate processing results at each step.

In the evaluation system, the evaluation scale for evaluating the recognition and understanding performance is set such that:

(A) the desired recognition and understanding result (intermediate result) or the correct recognition and understanding result (intermediate result) corresponds to the key data; or (B) the result of comparison between the recognition and understanding result (intermediate result) of the recognition and understanding system and the desired or correct recognition and understanding result (intermediate result) can be used the key data; or (C) the key data is a label for the time series data which is not the recognition and understanding target in the current recognition and understanding system but should be a target in future.

As for the link information:

(a) the link information can be an information indicating the correspondence with respect to the processing result of the recognition and understanding system; or (b) the link information can be the information (such as time, sampling point, data address, etc.) indicating the correspondence with respect to the input time series data for the recognition and understanding system.

These informations can be entered by the user. When the retrieval is carried out by setting the key data as the above noted desired recognition result (A), and the link information as the above noted (b), the real data of the input data with respect to a certain recognition target can be collected, and the high precision recognition dictionary can be obtained by using the collected data as the data for leaning.

When the above noted key data (B) are collected, the recognition and understanding performance can be obtained, and by tracing the link information, the correctness of the input time series data with respect to a certain recognition target can be collected along with the judgement result.

When the retrieval is carried out by using the above noted key data (C), only the real data which cannot be handled in the current system can be collected.

In the following, an exemplary case of utilizing the system of this embodiment as a speech dialogue evaluation system for evaluating the dialogue between the speech dialogue system and its user will be described in detail with reference to FIG. 163.

As shown in FIG. 163, the speech dialogue evaluation system 330 comprises a speech dialogue system 331 which is a system which recognizes and understands the speech uttered by the user and returns the speech response or the response by the screen display to the user, and a dialogue evaluation system 332 having a function for producing the dialogue speech database by considering the precision of the recognition and understanding result and the dialogue state of the speech dialogue system 331. In other words, the speech dialogue system 331 outputs the structural information by recognizing the speech data just as the structural analysis unit 303 in the above, while the dialogue evaluation system 332 is a time series data recording and reproduction device which carries out the evaluation of the speech recognition result of the speech dialogue system according to the structural information entered from the speech dialogue system 331.

Here, the dialogue evaluation system 332 has the configuration similar to that of FIG. 147 described above, and the same reference numerals as in FIG. 147 are used in the following description of the dialogue evaluation system 332.

The speech dialogue system 331 transmits the supplemented time series data containing the PCM data of the dialogue speech and the information on the dialogue such as the recognition and understanding result and the response contents, as well as the key data and the structural information to the time series data input unit 301 of the dialogue evaluation system 332.

An exemplary file output for the information on the dialogue such as the recognition and understanding result and the response contents transmitted from the speech dialogue system 331 to the time series data input unit 301 of the dialogue evaluation system 332 is shown in FIG. 164, which shows an example in a case of dealing with speeches in Japanese. This file output of the speech dialogue system 331 contains an utterance number indicating an order of each utterance among all the utterances, the speech sections of the utterances by the speech dialogue system and its user, the word detection results, a plurality of semantic representation candidates obtained by the syntactic and semantic analysis, a selected semantic representation (recognition result) which is selected from these plurality of candidates by considering the history of the dialogue, and the response contents. The dialogue evaluation system 332 separates this input data into the speech data and the structural information.

In order to check the precision of the recognition and understanding result of the speech dialogue system 331, it is necessary to provide the correct answers for the word detection and recognition results and the recognition results for the meanings of the utterances, and these are additionally entered by the user by using the key data input unit 308 of the dialogue evaluation system 332.

FIG. 165 shows an exemplary window interface which is the library of the window system and which is realizing a part of the key data input unit 308 and the information output unit 307 for an exemplary case of the speech dialogue system for receiving the orders at a hamburger shop. In this window interface of FIG. 165, the user of the dialogue evaluation system 332 can enter the text of the correct answers for the words by clicking the icons for the recognition words displayed on the screen with the mouse or pen.

In this example, the icons for partitions indicating an end of each utterance are also provided in addition to the recognition words. For example, when the key data input unit 308 of the dialogue evaluation system 332 is formed by this window interface, the text of the correct answers for the recognition words can be easily entered and corrected. Here, in a case of entering the meaning of "ordering one small orange juice", the user can enter this by touching the icons on the display screen with the pen, such as the icon 190 indicating "orange juice", the icon 191 indicating "small", the icon 192 indicating "one", the icon 193 indicating "I want", and the icon 194 indicating the utterance end.

Here, the text of the correct answers for the recognition words entered by the window interface of FIG. 165 is not containing the time information such as the starting and ending edges of the word. In order to obtain the time information, the user of the dialogue evaluation system 332 listens to the output from the information output unit 307 in which the section in which the recognition word exists is partially reproduced from the dialogue speech data, and determines the time information while confirming. The section in which the recognition word exists is determined and entered by the user of the dialogue evaluation system 332, but the burden of input on the user of the dialogue evaluation system 332 can be reduced considerably when the starting and ending edges of the recognition word obtained as the recognition result by the speech dialogue system 331 are set as the initial values.

Similarly, the input of the correct answer for the semantic representation of the utterance can be realized by providing the appropriate window interface. Also, when the order of the correct words is already obtained, the semantic representation of the utterance content can be obtained by applying the semantic analysis to the already obtained word order. By allowing the correction on this semantic representation, the amount of data required to be directly entered by the user of the dialogue evaluation system 332 can be reduced.

The structural information obtained as the user entered the key data of the correct answers is matched with the structural information or the key data outputted by the speech dialogue system 331, i.e., the structural information or the key data entered into the dialogue evaluation system 332, and forms the structural information indicating the word detection performance of the speech dialogue system 331.

For example, when the user entered the key data for the word of the correct answer "yes" from the key data input unit 308, the structural information indicating the word of the correct answer as shown in FIG. 166A is produced.

The structural analysis unit 303 looks up the structural information indicating the word detection result shown in FIG. 157A according to the time information, i.e., the start time "t1" and the end time "t2" in the structural information "WC-5" indicating the word of the correct answer shown in FIG. 166A, to check whether the word of the correct answer has been detected, whether there is any word which has failed to be detected, and whether there is any word which is not in the correct answer but has been detected, and generates the structural information indicating the word detection performance according to these check results.

Here, in a case there is the structural information "WD-7" shown in FIG. 157A, the structural information indicating the word detection performance of the speech dialogue system 331 as shown in FIG. 166B can be produced, in which the pointer or the structural information ID of the structural information "WD-7" indicating the word detection result is contained and the structure information "WC-5" indicating the word of the correct answer is combined.

In addition, by matching the structural information indicating the word detection performance with the structural information indicating the word recognition result, the structural information indicating the word recognition performance is generated. Here, as described above, the structural information indicating the word recognition result has the link information for linking with the structural information indicating the word detection result, so that whether the word is that of the correct answer or not can be judged. Consequently, it is possible to judge whether each of the word sequence contained in the word recognition result is correct or not. In this manner, it is possible to evaluate the word recognition performance of the speech dialogue system 331.

Also, the structural information indicating the semantic representation of the utterance of the correct answer is matched with the structural information indicating the semantic representation candidates or the selected semantic representation, and the structural information indicating the understanding performance contains information regarding whether the semantic representation candidate to be selected has been correctly selected, and whether there is a case in which the semantic representation candidates includes no candidate to be selected.

The above described structural information can be utilized in improving the performance of the speech dialogue system 331 as follows. For example, the improvement of the word detection performance can be achieved as follows.

From the structural information indicating the word of the correct answer entered by the user of the dialogue evaluation system 332, it is possible to enlist the word speech data in the actual dialogue, and from this, it is possible to obtain the speech database in which the speech data for only a certain word are collected. Using this speech database, the learning of the dictionary for the word detection can be carried out again, to improve the word recognition performance. In addition, by using the structural information indicating the word detection performance, the detection precision for each word can be obtained, so that by carrying out the learning again from the word with the particularly low detection performance, the improvement of the word detection performance can be achieved quickly.

Next, an exemplary output at the information output unit 307 of the dialogue evaluation system 332 in which the structural information is displayed in relation to the change of the topics and the timewise progress of the dialogue will be described with reference to FIG. 167. Here, the displayed content of FIG. 167 corresponds to that of the file output of FIG. 164 in Japanese described above.

In this display of FIG. 167, the dialogue speech waveform display section 410 shows the speech waveform of the dialogue speech. This is a reproduction of the time series data for the speech in waveform.

The text display section 411 shows the text representation of the time series data with time information.

The word speech waveform display section 412 shows the speech waveform of a portion which is flashing (shaded in FIG. 167) in the text display section 411.

The word detection result display section 413 shows the words detected from the speech waveform shown in the word speech waveform display section 412. Here, the words with the resembling waveforms and the words with the resembling speech sections are detected.

The word recognition result display section 414 shows the words recognized as the correct ones among the detected words. Here, it shows that the word uttered between 4.74 sec. and 5.12 sec. is recognized as "potato".

The syntactic and semantic candidate display section 415 shows the candidates for the meaning of the sentence among the detected words or the recognized words. Here, it shows that there are five candidates for the meaning of the order according to the detected words, and the first candidate has been selected according to the recognized word.

The syntactic and semantic candidate information display section 416 shows the meaning that "two hamburgers", "one large potato", and "three colas" are going to be ordered according to the candidate selected in the syntactic and semantic candidate display section 415.

The syntactic and semantic correction information display section 417 shows the corrected semantic candidate information in a case the semantic candidate information shown in the syntactic and semantic candidate information display section 416 contains errors.

In this manner, by displaying the structural information in relation to the change of the topics and the timewise progress of the dialogue by utilizing the structural information concerning the dialogue history, it is possible to visually indicate whether the dialogue is stagnating or progressing smoothly.

In the following, the handling of the dialogue data for evaluation (time series data) in this speech dialogue evaluation system will be summarized.

Here, the time series data are the speech data at a time of the dialogue, containing at least two channels for the system response and the user utterance.

The data that can be handled as both the time series data and the structural information include:

(1) the system response, and the start and end times of the user utterance (plural in general);

(2) the (word) speech recognition result (containing the starting and ending edge times of the word) obtained from the user utterance;

(3) the user utterance meaning understanding result (for each utterance of the user);

(4) the internal state of the system; and (5) the response content of the system; which nearly correspond to the processing results of the speech section detection unit, the speech recognition unit (word detection unit), the speech understanding unit, the dialogue management unit, and the response generation unit in the speech dialogue system, respectively, just as the recognition results of the system shown in FIG. 164 for example.

In addition, the correct answers entered by the system developer (evaluator) can be provided as the desired processing.

Then, the dialogue using the speech (as well as the screen display) between the speech dialogue system and the user is carried out for the purpose of evaluation. When the user utterance is entered into the speech dialogue system, by the analysis, recognition and understanding, dialogue processing, and response generation for this speech data, each of the above described speech data, start and end times of utterance, speech recognition result, utterance meaning understanding result, internal state, and response content is determined and generated.

In order to improve the system performance and the user interface, the speech dialogue evaluation system records the above described processing data and the processing results and compares them with the desired processing results entered by the evaluator (the user of the speech dialogue evaluation system), and provides the information useful for the system modification such as the information on the evaluation of the performance of the current speech dialogue system, or the link information for the input data (time series data) used as the source of each processing.

Here, the performance is evaluated according to the obtained information by the comparison of the processing result and the desired processing, such that:

(1) the speech recognition performance is evaluated by the comparison of the speech recognition results between the correct answers entered by the system developer as the desired processing and the processing result of the system; and (2) the speech understanding performance is evaluated by the comparison of the utterance meaning understanding results between the correct answers entered by the system developer as the desired processing and the processing result of the system.

The obtained information can be utilized as the information useful for the modification such that:

(1) for the improvement of the speech recognition performance, the data for learning of the recognition dictionary in which the labels for the correct and incorrect processing results are attached to the actual dialogue speech data can be outputted, and the vocabulary to be newly added can be enlisted;

(2) for the improvement of the speech understanding performance, the unexpected utterances can be enlisted, and the understanding performance can be improved by adding the grammar; and (3) for the improvement of the speech section detection performance, the speech section detection error can be enlisted.

In this manner, by accumulating the structural informations which are the recognition results of the individual recognition means and improving the performance of the individual recognition means, the performance of the speech dialogue evaluation system as a whole can be improved.

Now, a case of using the image data as the time series data, rather than using the speech data as the time series data as in the above, will be described briefly.

In this case, the image data is entered from the time series data input unit 301 formed by the camera, etc. The time series data input unit 301 attaches the identification data to the image data, and transmits it to the time series data storage unit 302 and the structural analysis unit 303. The time series data storage unit 302 is formed by the device for recording the image data such as the VTR device, which records the transmitted image data with the identification data attached.

The structural analysis unit 303 carries out the recognition processing of the image, detects the key data, and generates the structural information. In the current image recognition device, the recognition at the level of "person has moved between times ta and tb" is possible, so that the detection of the key data "person" and "move" is possible. Also, it is possible to generate the structural information having "ta to tb" as the time information, the "person" as the recognition result, and the image data ID, or the structural information having "ta to tb" as the time information, the "move" as the recognition result, and the image data ID.

In a case of retrieving the image data, by entering the key data such as "person" and "move" from the retrieval command input unit 305, the retrieval unit 306 retrieves the structural information having the key data of "person" and "move", and retrieves the image data linked with the retrieved structural information. The retrieved image data is then reproduced by the information output unit 307.

Also, by changing the key data of "person" into a name of the specific person from the key data input unit 308, the key data and the structural information at the higher precision can be generated.

In a case of the image data accompanied by the speech data such as the motion picture or the video, the detection of the key data and the generation of the speech can be carried out for the speech and the image separately, and utilized in realizing the high quality database.

As described, according to this third general embodiment, in the recording and reproduction of the time series data using the multi-media data as the input, the recognition processing of the time series data is carried out to detect the key data, the structural information generated from the key data is recorded along with the time series data, and the retrieval based on the key data is carried out, so that only the time series data and the information meaningful to the user can be reproduced. Also, by allowing the correction and addition of the key data, the structural information can be generated again, and the database having a high quality for the user which is closer to the user's personal needs can be provided. Moreover, by evaluating the recognition and understanding according to the structural information of the time series data, the system performance can be improved.

It is to be noted here that besides those already mentioned above, many modifications and variations of the above embodiments may be made without departing from the novel and advantageous features of the present invention. Accordingly, all such modifications and variations are intended to be included within the scope of the appended claims.

What is claimed is:

1. A data retrieval system, comprising:
   first memory means for storing primary data which are a filing target to be stored in the system and retrieved from the system;
   analysis means for automatically acquiring secondary information at a time of manipulation or input of the primary data, the secondary information being environmental information indicating an environmental condition of the primary data which is not directly indicative of the data content of the primary data;
   second memory means for storing the secondary information associated with the primary data, in correspondence to the primary data stored in the first memory means;
   input means for specifying a retrieval key to be used in selecting the secondary information associated with a desired primary data, said retrieval key not specifying any content of the desired primary data;
   retrieval means for selecting the secondary information from the second memory means in accordance with the retrieval key entered by the input means, and then identifying for retrieval, based on the secondary information, the primary data stored in correspondence to the secondary information selected in accordance with the retrieval key; and
   output means for outputting the primary data identified for retrieval by the retrieval means as a retrieval result for the desired primary data.

2. The system of claim 1, wherein the secondary information is an environmental information indicating an environmental condition of the primary data.

3. The system of claim 2, further comprising means for obtaining a position information indicating a position at which the primary data had been manipulated, and wherein the environmental information is the position information.

4. The system of claim 2, further comprising schedule management means for managing a schedule of a user, and wherein the environmental information is a schedule information indicating the schedule of a user at a time of manipulation of the primary data.

5. The system of claim 2, further comprising imaging means for taking image information at a time of manipulation of the primary data, and wherein the environmental information is the image information taken at a time of manipulation of the primary data.

6. The system of claim 2, further comprising means for measuring a time information indicating start time and end time of manipulation of the primary data, and wherein the environmental information is the time information.

7. The system of claim 2, further comprising means for measuring a time information indicating start time and end time of manipulation of the primary data, and wherein the environmental information is an urgency level of the manipulation of the primary data which is determined from the time information.

8. The system of claim 2, further comprising means for measuring a time information indicating start time and end time of manipulation of the primary data, and wherein the environmental information is a number of times for which the manipulation of the primary data had taken place which is determined from the time information.

9. The system of claim 2, wherein the primary data are speech data, and the environmental information is an acoustic information indicating an acoustic environment in which the speech data had been originally given to the system.

10. The system of claim 9, wherein the acoustic information indicates the acoustic environment concerning speakers who had generated the speech data.

11. The system of claim 9, wherein the acoustic information indicates the acoustic environment concerning a location at which the speech data had been generated.

12. The system of claim 9, wherein the acoustic information indicates the acoustic environment concerning a surrounding sound in which the speech had been generated.

13. The system of claim 2, wherein the environmental information is a device information indicating a computer device by which the primary data had been manipulated.

14. The system of claim 13, wherein the device information identifies the computer device itself.

15. The system of claim 13, wherein the device information indicates a location of the computer device.

16. The system of claim 1, wherein the secondary information indicates a characteristic external appearance of the primary data.

17. The system of claim 16, wherein the characteristic external appearance of the primary document data is specified in terms of features of a medium on which the primary document data had been originally given to the system.

18. The system of claim 16, wherein the characteristic external appearance of the primary document data is specified in terms of visual features of an image of the primary document data by which the primary document data had been originally given to the system.

19. The system of claim 16, wherein the characteristic external appearance of the primary document data is specified in terms of a layout of the primary document data in which the primary document data had been originally given to the system.

20. A data retrieval system, comprising:
first memory means for storing primary document data which are a filing target to be stored in the system and retrieved from the system;
analysis means for automatically acquiring secondary information at a time of input of the primary document data, the secondary information indicating a characteristic external appearance of the primary document data which is not directly indicative of the data content of the primary document data;
second memory means for storing the secondary information associated with the primary document data, in correspondence to the primary document data stored in the first memory means;
input means for specifying a retrieval key to be used in selecting the secondary information associated with a desired primary document data, said retrieval key not specifying any content of the desired primary document data;
retrieval means for selecting the secondary information from the second memory means in accordance with the retrieval key entered by the input means, and then retrieving, based on the secondary information, the primary document data stored in correspondence to the secondary information selected in accordance with the retrieval key; and
output means for outputting the primary document data retrieved by the retrieval means as a retrieval result for the desired primary document data.

21. The system of claim 1, wherein the retrieval key entered by the input means specifies secondary information.

22. The system of claim 21, wherein the secondary information includes one of position information, schedule information, image information, time information, acoustic information, device information, and characteristic external appearance information.

23. A data retrieval system, comprising:
first memory means for storing primary data which are a filing target to be stored in the system and retrieved from the system;
analysis means for automatically acquiring secondary information at a time of manipulation or input of the primary data, the secondary information being environmental information indicating an environmental condition of the primary data which is not directly indicative of the data content of the primary data;
second memory means for storing the secondary information associated with the primary data, in correspondence to the primary data stored in the first memory means;
input means for entering a retrieval key specifying at least one of the secondary information associated with a desired primary data, said retrieval key not specifying any content of the desired primary data;
retrieval means for retrieving, based on the secondary information, the primary data stored in correspondence to the secondary information specified by the retrieval key; and
output means for outputting the primary data retrieved by the retrieval means as a retrieval result for the desired primary data.

24. The system of claim 23, wherein the secondary information includes one of position information, schedule information, image information, time information, acoustic information, device information, and characteristic external appearance information.

25. A data retrieval system, comprising:
first memory means for storing time series data which are a filing target to be stored in the system and retrieved from the system;
structural analysis means for extracting from the time series data key data indicative of a semantic content of the time series data, and generating a structural information containing the key data and a link information for linking the key data with the time series data;
second memory means for storing the structural information generated by the structural analysis means;
input means for specifying a retrieval key indicating the key data associated with a desired time series data to be retrieved, said retrieval key not specifying any content of the desired time series data;
retrieval means for retrieving the structural information which contains the key data indicated by the retrieval key from the second memory means, and identifying for retrieval the time series data identified by the link information contained in the structural information retrieved in accordance with the key data; and
output means for outputting the time series data identified for retrieval by the retrieval means as a retrieval result for the desired time series data.

26. The system of claim 25, wherein the retrieval means retrieves only a portion of the desired time series data which is linked with the key data used as the retrieval key according to the link information contained in the structural information retrieved in accordance with the key data.

27. The system of claim 25, wherein the retrieval means retrieves only the time series data which are linked with the key data used as the retrieval key according to the link information contained in the structural information retrieved in accordance with the key data.

28. The system of claim 25, wherein the structural information further contains an environmental information indicating an environmental condition of the time series data, the retrieval means also retrieves the environmental information of the time series data which are linked with the key data used as the retrieval key, and the output means also visually presents the environmental information.

29. The system of claim 25, wherein the input means also enters a new key data specified by a user, the structural analysis means generating a new structural information from the new key data.

30. The system of claim 25, wherein the input means also enters a new structural information specified by a user, to be stored in the second memory means.

31. A method of data retrieval, comprising the steps of:
storing primary data which are a filing target to be stored and retrieved, in a first memory;
automatically acquiring secondary information at a time of manipulation or input of the primary data, the secondary information being environmental information indicating an environmental condition of the primary data which is not directly indicative of the data content of the primary data;
storing the secondary information associated with the primary data, in a second memory in correspondence to the primary data stored in the first memory;
specifying a retrieval key to be used in selecting the secondary information associated with a desired primary data, said retrieval key not specifying any content of the desired primary data;
selecting the secondary information from the second memory in accordance with the retrieval key entered at the entering step, and then identifying for retrieval, based on the secondary information, the primary data stored in correspondence to the secondary information selected in accordance with the retrieval key; and outputting the primary data identified for retrieval at the identifying step as a retrieval result for the desired primary data.

32. The method of claim 31, wherein the retrieval key specifies secondary information.

33. The method of claim 32, wherein the secondary information includes one of position information, schedule information, image information, time information, acoustic information, device information, and characteristic external appearance information.

34. The method of claim 31, wherein the secondary information is an environmental information indicating an environmental condition of the primary data.

35. The method of claim 34, further comprising the step of obtaining a position information indicating a position at which the primary data had been manipulated, and wherein the environmental information is the position information.

36. The method of claim 34, further comprising the step of managing a schedule of a user, and wherein the environmental information is a schedule information indicating the schedule of a user at a time of manipulation of the primary data.

37. The method of claim 34, further comprising the step of taking image information at a time of manipulation of the primary data, and wherein the environmental information is the image information taken at a time of manipulation of the primary data.

38. The method of claim 34, further comprising the step of measuring a time information indicating start time and end time of manipulation of the primary data, and wherein the environmental information is the time information.

39. The method of claim 34, further comprising the step of measuring a time information indicating start time and end time of manipulation of the primary data, and wherein the environmental information is an urgency level of the manipulation of the primary data which is determined from the time information.

40. The method of claim 34, further comprising the step of measuring a time information indicating start time and end time of manipulation of the primary data, and wherein the environmental information is a number of times for which the manipulation of the primary data had taken place which is determined from the time information.

41. The method of claim 34, wherein the primary data are speech data, and the environmental information is an acoustic information indicating an acoustic environment in which the speech data had been originally given.

42. The method of claim 41, wherein the acoustic information indicates the acoustic environment concerning speakers who had generated the speech data.

43. The method of claim 41, wherein the acoustic information indicates the acoustic environment concerning a location at which the speech data had been generated.

44. The method of claim 41, wherein the acoustic information indicates the acoustic environment concerning a surrounding sound in which the speech had been generated.

45. The method of claim 34, wherein the environmental information is a device information indicating a computer device by which the primary data had been manipulated.

46. The method of claim 45, wherein the device information identifies the computer device itself.

47. The method of claim 45, wherein the device information indicates a location of the computer device.

48. A method of data retrieval, comprising the steps of:

storing primary document data, which are a filing target to be stored and retrieved, in a first memory;

automatically acquiring secondary information at a time of input of the primary document data, the secondary information indicating a characteristic external appearance of the primary document data which is not directly indicative of the data content of the primary document data;

storing the secondary information associated with the primary document data, in a second memory in correspondence to the primary document data stored in the first memory;

specifying a retrieval key to be used in selecting the secondary information associated with a desired primary document data, said retrieval key not specifying any content of the desired primary document data;

selecting the secondary information from the second memory solely in accordance with the retrieval key entered at the entering step, and then retrieving, based on the secondary information, the primary document data stored in correspondence to the secondary information selected in accordance with the retrieval key; and outputting the primary document data retrieved at the retrieving step as a retrieval result for the desired primary document data.

49. The method of claim 48, wherein the characteristic external appearance of the primary document data is specified in terms of features of a medium on which the primary document data had been originally given.

50. The method of claim 48, wherein the characteristic external appearance of the primary document data is specified in terms of features of a fixing material by which the primary document data had been originally fixed on a medium on which the primary document data had been originally given.

51. The method of claim 48, wherein the characteristic external appearance of the primary document data is specified in terms of visual features of an image of the primary document data by which the primary document data had been originally given.

52. The method of claim 48, wherein the characteristic external appearance of the primary document data is specified in terms of a layout of the primary document data in which the primary document data had been originally given.

53. A method of data retrieval, comprising the steps of:

storing primary data which are a filing target to be stored in the system and retrieved from the system, in a first memory;

automatically acquiring secondary information at a time of manipulation or input of the primary data, the secondary information being environmental information indicating an environmental condition of the primary data which is not directly indicative of the data content of the primary data;

storing the secondary information associated with the primary data, in a second memory in correspondence to the primary data stored in the first memory;

entering a retrieval key specifying at least one of the secondary information associated with a desired primary data, said retrieval key not specifying any content of the desired primary data;

retrieving based on the secondary information, the primary data stored in correspondence to the secondary information specified by the retrieval key; and outputting the primary data retrieved at the retrieving step as a retrieval result for the desired primary data.

54. A method of data retrieval, comprising the steps of:

storing time series data which are a filing target to be stored and retrieved, in a first memory;

extracting from the time series data key data indicative of a semantic content of the time series data, and generating a structural information containing the key data and a link information for linking the key data with the time series data;

storing the structural information in a second memory;

specifying a retrieval key indicating the key data associated with a desired time series data to be retrieved, said retrieval key not specifying any content of the desired time series data;

retrieving the structural information which contains the key data indicated by the retrieval key from the second memory, and identifying for retrieval the time series data identified by the link information contained in the structural information retrieved in accordance with the key data; and outputting the time series data identified for retrieval at the identifying step as a retrieval result for the desired time series data.

55. The method of claim 54, wherein the retrieving step retrieves only a portion of the desired time series data which is linked with the key data used as the retrieval key according to the link information contained in the structural information retrieved in accordance with the key data.

56. The method of claim 54, wherein the retrieving step retrieves only the time series data which are linked with the key data used as the retrieval key according to the link information contained in the structural information retrieved in accordance with the key data.

57. The method of claim 54, wherein the structural information further contains an environmental information indicating an environmental condition of the time series data, the retrieving step also retrieves the environmental information of the time series data which are linked with the key data used as the retrieval key, and the outputting step also visually presents the environmental information.

58. The method of claim 54, further comprising the step of entering a new key data specified by a user, the extracting step generating a new structural information from the new key data.

59. The method of claim 54, further comprising the step of entering a new structural information specified by a user, to be stored in the second memory.

60. A data retrieval system, comprising:

first memory means for storing primary document data which are a filing target to be stored in the system and retrieved from the system;

analysis means for automatically acquiring secondary information at a time of input of the primary document data, the secondary information indicating a characteristic external appearance of the primary document data which is not directly indicative of the data content of the primary document data;

second memory means for storing the secondary information associated with the primary document data, in correspondence to the primary document data stored in the first memory means;

input means for entering a retrieval key specifying at least one of the secondary information associated with a desired primary document data, said retrieval key not specifying any content of the desired primary document data;

retrieval means for identifying for retrieval, based on the secondary information, the primary document data stored in correspondence to the secondary information specified by the retrieval key; and output means for outputting the primary document data identified for retrieval by the retrieval means as a retrieval result for the desired primary document data.

61. A method of data retrieval, comprising the steps of:

storing primary document data, which are a filing target to be stored and retrieved, in a first memory;

automatically acquiring secondary information at a time of input of the primary document data, the secondary information indicating a characteristic external appearance of the primary document data which is not directly indicative of the data content of the primary document data;

storing the secondary information associated with the primary document data, in a second memory in correspondence to the primary document data stored in the first memory;

entering a retrieval key specifying at least one of the secondary information associated with a desired primary document data, said retrieval key not specifying any content of the desired primary document data;

identifying for retrieval, based on the secondary information, the primary document data stored in correspondence to the secondary information specified by the retrieval key; and outputting the primary document data identified for retrieval at the identifying step as a retrieval result for the desired primary document data.

62. A method of keeping, in a memory unit connected to a CPU, and retrieving from the memory unit, data contained in physical records, said method comprising the steps of:

inputting data contained in a physical record into the memory unit;

automatically acquiring at least one secondary information data about the physical record during the step of inputting, the secondary information data being indicative of the physical conditions of and around the physical record but unrelated to the data contained in the physical record;

storing the secondary information data about the physical record in correspondence to the data contained in the physical record;

entering a retrieval key for specifying at least one secondary information data;

identifying for retrieval the data contained in the physical record stored in correspondence to the at least one secondary information data specified by the retrieval key; and outputting the data contained in the physical record identified for retrieval at the identifying step as a retrieval result.

63. The method of claim 62, wherein the step of inputting includes the step of inputting one or more of document data, image data, and acoustic data.

64. The method of claim 62, wherein the step of automatically acquiring at least one secondary information data includes the step of automatically aquiring secondary information data that is indicative of environmental conditions during the step of inputting.

65. The method of claim 62, wherein the step of automatically acquiring at least one secondary information data includes the step of automatically aquiring position information data during the step of inputting using a global positioning system.

66. The method of claim 62, wherein the step of automatically acquiring at least one secondary information data includes the step of automatically aquiring environmental conditions, including one or more of temperature, humidity, and pressure, during the step of inputting.

67. The method of claim 62, wherein the step of automatically acquiring at least one secondary information data includes the step of automatically aquiring user health conditions, including one or more of pulse rate, blood pressure, body temperature, and blood sugar level, during the step of inputting.

68. The method of claim 62, wherein the step of automatically acquiring at least one secondary information data includes the step of automatically aquiring secondary information data that is indicative of an external appearance of the physical record.

* * * * *